(12) United States Patent
Fujisaki

(10) Patent No.: US 9,326,267 B1
(45) Date of Patent: *Apr. 26, 2016

(54) COMMUNICATION DEVICE

(71) Applicant: Iwao Fujisaki, Tokyo (JP)

(72) Inventor: Iwao Fujisaki, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/701,488

(22) Filed: Apr. 30, 2015

Related U.S. Application Data

(63) Continuation of application No. 13/740,258, filed on Jan. 13, 2013, now Pat. No. 9,049,556, which is a continuation of application No. 12/245,715, filed on Oct. 4, 2008, now Pat. No. 8,452,307, which is a continuation of application No. 12/166,478, filed on Jul. 2, 2008, now abandoned.

(51) Int. Cl.
| | |
|---|---|
| *H04W 24/00* | (2009.01) |
| *H04W 64/00* | (2009.01) |
| *H04W 4/02* | (2009.01) |
| *H04M 3/42* | (2006.01) |

(52) U.S. Cl.
CPC .............. *H04W 64/006* (2013.01); *H04M 3/42* (2013.01); *H04W 4/021* (2013.01); *H04W 4/023* (2013.01); *H04W 4/025* (2013.01)

(58) Field of Classification Search
CPC ......... H04W 4/02; H04W 64/00; H04W 4/22; H04W 4/20; H04W 4/028; H04W 4/025; H04W 64/006; H04W 4/021; H04W 68/00; H04L 67/18
USPC .................................... 455/456.1–457, 404.2
See application file for complete search history.

(56) References Cited

U.S. PATENT DOCUMENTS

| | | |
|---|---|---|
| 4,934,773 A | 6/1990 | Becker |
| 5,173,881 A | 12/1992 | Sindle |
| 5,272,638 A | 12/1993 | Martin et al. |
| 5,345,272 A | 9/1994 | Ersoz et al. |
| 5,353,376 A | 10/1994 | Oh et al. |
| 5,388,147 A | 2/1995 | Grimes |
| 5,405,152 A | 4/1995 | Katanics et al. |
| 5,414,461 A | 5/1995 | Kishi et al. |
| 5,418,837 A | 5/1995 | Johansson et al. |
| 5,438,357 A | 8/1995 | McNelley |
| 5,442,453 A | 8/1995 | Takagi et al. |
| 5,446,904 A | 8/1995 | Belt et al. |
| 5,479,476 A | 12/1995 | Finke-Anlauff |
| 5,530,472 A | 6/1996 | Bregman et al. |
| 5,539,810 A | 7/1996 | Kennedy et al. |
| 5,550,754 A | 8/1996 | McNelley et al. |

(Continued)

FOREIGN PATENT DOCUMENTS

| | | |
|---|---|---|
| GB | 2386027 A1 | 9/2003 |
| JP | 2196373 A1 | 8/1990 |

(Continued)

OTHER PUBLICATIONS

Fehily "Windows XP: Visual QuickStart Guide" published by Peachpit Press in 2003.

(Continued)

*Primary Examiner* — Olumide T Ajibade Akonai

(57) ABSTRACT

The communication device comprising a voice communication implementer, a caller's phone number displaying implementer, and an area dependent notice type changing implementer.

18 Claims, 1 Drawing Sheet

(56) References Cited

U.S. PATENT DOCUMENTS

| | | |
|---|---|---|
| 5,559,554 A | 9/1996 | Uekane et al. |
| 5,566,073 A | 10/1996 | Margolin |
| 5,625,675 A | 4/1997 | Katsumaru et al. |
| 5,629,741 A | 5/1997 | Hopper |
| 5,687,331 A | 11/1997 | Volk et al. |
| 5,758,280 A | 5/1998 | Kimura |
| 5,772,586 A | 6/1998 | Heinonen et al. |
| 5,778,304 A | 7/1998 | Grube et al. |
| 5,786,846 A | 7/1998 | Hiroaki |
| 5,796,338 A | 8/1998 | Mardirossian |
| 5,825,408 A | 10/1998 | Yuyama et al. |
| 5,844,824 A | 12/1998 | Newman et al. |
| 5,902,349 A | 5/1999 | Endo et al. |
| 5,903,706 A | 5/1999 | Wakabayashi et al. |
| 5,918,180 A | 6/1999 | Dimino |
| 5,924,040 A | 7/1999 | Trompower |
| 5,936,610 A | 8/1999 | Endo |
| 5,940,139 A | 8/1999 | Smoot |
| 5,959,661 A | 9/1999 | Isono |
| 6,009,336 A | 12/1999 | Harris et al. |
| 6,034,715 A | 3/2000 | Ishida et al. |
| 6,069,648 A | 5/2000 | Suso et al. |
| 6,073,034 A | 6/2000 | Jacobsen et al. |
| 6,081,265 A | 6/2000 | Nakayama et al. |
| 6,085,112 A | 7/2000 | Kleinschmidt et al. |
| 6,094,237 A | 7/2000 | Hashimoto |
| 6,115,597 A | 9/2000 | Kroll et al. |
| 6,128,594 A | 10/2000 | Gulli et al. |
| 6,144,848 A | 11/2000 | Walsh et al. |
| 6,148,212 A | 11/2000 | Park et al. |
| 6,161,134 A | 12/2000 | Wang et al. |
| 6,167,283 A | 12/2000 | Korpela et al. |
| 6,192,343 B1 | 2/2001 | Morgan et al. |
| 6,195,089 B1 | 2/2001 | Chaney et al. |
| 6,198,942 B1 | 3/2001 | Hayashi et al. |
| 6,202,060 B1 | 3/2001 | Tran |
| 6,202,212 B1 | 3/2001 | Sturgeon et al. |
| 6,216,013 B1 | 4/2001 | Moore et al. |
| 6,216,158 B1 | 4/2001 | Luo et al. |
| 6,222,482 B1 | 4/2001 | Gueziec |
| 6,225,944 B1 | 5/2001 | Hayes |
| 6,226,500 B1 | 5/2001 | Nonami |
| 6,241,612 B1 | 6/2001 | Heredia |
| 6,243,039 B1 | 6/2001 | Elliot |
| 6,253,075 B1 | 6/2001 | Beghtol et al. |
| 6,265,988 B1 | 7/2001 | LeMense et al. |
| 6,282,435 B1 | 8/2001 | Wagner et al. |
| 6,285,317 B1 | 9/2001 | Ong |
| 6,285,757 B1 | 9/2001 | Carroll et al. |
| 6,292,666 B1 | 9/2001 | Siddiqui et al. |
| 6,311,077 B1 | 10/2001 | Bien |
| 6,366,651 B1 | 4/2002 | Griffith et al. |
| 6,385,465 B1 | 5/2002 | Yoshioka |
| 6,385,654 B1 | 5/2002 | Tanaka |
| 6,405,033 B1 | 6/2002 | Kennedy, III et al. |
| 6,411,198 B1 | 6/2002 | Hirai et al. |
| 6,421,470 B1 | 7/2002 | Nozaki et al. |
| 6,421,602 B1 | 7/2002 | Bullock et al. |
| 6,438,380 B1 | 8/2002 | Bi et al. |
| 6,442,404 B1 | 8/2002 | Sakajiri |
| 6,445,802 B1 | 9/2002 | Dan |
| 6,487,422 B1 | 11/2002 | Lee |
| 6,507,643 B1 | 1/2003 | Groner |
| 6,510,325 B1 | 1/2003 | Mack, II et al. |
| 6,512,919 B2 | 1/2003 | Ogasawara |
| 6,518,956 B1 | 2/2003 | Sato |
| 6,519,566 B1 | 2/2003 | Boyer et al. |
| 6,526,293 B1 | 2/2003 | Matsuo |
| 6,528,533 B2 | 3/2003 | Lauffer |
| 6,529,742 B1 | 3/2003 | Yang |
| 6,542,750 B2 | 4/2003 | Hendrey et al. |
| 6,549,215 B2 | 4/2003 | Jouppi |
| 6,549,756 B1 | 4/2003 | Engstrom |
| 6,553,309 B2 | 4/2003 | Uchida et al. |
| 6,587,547 B1 | 7/2003 | Zirngibl et al. |
| 6,615,186 B1 | 9/2003 | Kolls |
| 6,618,704 B2 | 9/2003 | Kanevsky et al. |
| 6,630,958 B2 | 10/2003 | Tanaka et al. |
| 6,647,251 B1 | 11/2003 | Siegle et al. |
| 6,650,877 B1 | 11/2003 | Tarbouriech et al. |
| 6,650,894 B1 | 11/2003 | Berstis et al. |
| 6,658,272 B1 | 12/2003 | Lenchik et al. |
| 6,658,461 B1 | 12/2003 | Mazo |
| 6,662,023 B1 | 12/2003 | Helle |
| 6,665,711 B1 | 12/2003 | Boyle et al. |
| 6,668,177 B2 | 12/2003 | Salmimaa et al. |
| 6,678,366 B1 | 1/2004 | Burger et al. |
| 6,681,120 B1 | 1/2004 | Kim |
| 6,687,515 B1 | 2/2004 | Kosaka |
| 6,690,932 B1 | 2/2004 | Barnier et al. |
| 6,694,143 B1 | 2/2004 | Beamish et al. |
| 6,701,148 B1 | 3/2004 | Wilson et al. |
| 6,701,162 B1 | 3/2004 | Everett |
| 6,707,942 B1 | 3/2004 | Cortopassi et al. |
| 6,711,399 B1 | 3/2004 | Granier |
| 6,725,022 B1 | 4/2004 | Clayton et al. |
| 6,728,533 B2 | 4/2004 | Ishii |
| 6,763,226 B1 | 7/2004 | McZeal, Jr. |
| 6,772,174 B1 | 8/2004 | Pettersson |
| 6,775,361 B1 | 8/2004 | Arai et al. |
| 6,779,030 B1 | 8/2004 | Dugan et al. |
| 6,782,412 B2 | 8/2004 | Brophy et al. |
| 6,788,332 B1 | 9/2004 | Cook |
| 6,788,928 B2 | 9/2004 | Kohinata et al. |
| 6,795,715 B1 | 9/2004 | Kubo et al. |
| 6,812,954 B1 | 11/2004 | Priestman et al. |
| 6,813,501 B2 | 11/2004 | Kinnunen et al. |
| 6,819,939 B2 | 11/2004 | Masamura |
| 6,820,055 B2 | 11/2004 | Saindon et al. |
| 6,850,209 B2 | 2/2005 | Mankins et al. |
| 6,865,372 B2 | 3/2005 | Mauney et al. |
| 6,870,828 B1 | 3/2005 | Giordano, III |
| 6,876,379 B1 | 4/2005 | Fisher |
| 6,883,000 B1 | 4/2005 | Gropper |
| 6,888,927 B1 | 5/2005 | Cruickshank et al. |
| 6,891,525 B2 | 5/2005 | Ogoro |
| 6,895,084 B1 | 5/2005 | Saylor et al. |
| 6,895,259 B1 | 5/2005 | Blank nee Keller et al. |
| 6,898,321 B1 | 5/2005 | Knee et al. |
| 6,901,383 B1 | 5/2005 | Ricketts et al. |
| 6,905,414 B2 | 6/2005 | Danieli et al. |
| 6,912,544 B1 | 6/2005 | Weiner |
| 6,922,212 B2 | 7/2005 | Nakakubo et al. |
| 6,937,868 B2 | 8/2005 | Himmel et al. |
| 6,947,527 B2 | 9/2005 | Clark et al. |
| 6,947,728 B2 | 9/2005 | Tagawa et al. |
| 6,954,645 B2 | 10/2005 | Tsai et al. |
| 6,958,675 B2 | 10/2005 | Maeda et al. |
| 6,961,559 B1 | 11/2005 | Chow et al. |
| 6,970,178 B2 | 11/2005 | Tanioka et al. |
| 6,970,703 B2 | 11/2005 | Fuchs et al. |
| 6,973,628 B2 | 12/2005 | Asami |
| 6,992,699 B1 | 1/2006 | Vance et al. |
| 6,993,362 B1 | 1/2006 | Aberg |
| 6,999,757 B2 | 2/2006 | Bates et al. |
| 7,003,598 B2 | 2/2006 | Kavanagh |
| 7,007,239 B1 | 2/2006 | Hawkins et al. |
| 7,012,999 B2 | 3/2006 | Ruckart et al. |
| 7,019,770 B1 | 3/2006 | Katz |
| 7,028,077 B2 | 4/2006 | Toshimitsu et al. |
| 7,030,880 B2 | 4/2006 | Tanioka et al. |
| 7,035,666 B2 | 4/2006 | Silberfenig et al. |
| 7,058,356 B2 | 6/2006 | Slotznick |
| 7,065,525 B1 | 6/2006 | Sasaki et al. |
| 7,076,052 B2 | 7/2006 | Yoshimura |
| 7,081,832 B2 | 7/2006 | Nelson et al. |
| 7,085,578 B2 * | 8/2006 | Barclay .......... H04W 4/02 455/404.2 |
| 7,085,739 B1 | 8/2006 | Winter et al. |
| 7,089,298 B2 | 8/2006 | Nyman et al. |
| 7,106,846 B2 | 9/2006 | Nguyen et al. |
| 7,107,081 B1 | 9/2006 | Fujisaki |
| 7,113,981 B2 | 9/2006 | Slate |
| 7,117,152 B1 | 10/2006 | Mukherji et al. |

(56) References Cited

U.S. PATENT DOCUMENTS

| | | |
|---|---|---|
| 7,126,951 B2 | 10/2006 | Belcea et al. |
| 7,127,238 B2 | 10/2006 | Vandermeijden et al. |
| 7,127,271 B1 | 10/2006 | Fujisaki |
| 7,130,630 B1 | 10/2006 | Moton, Jr. et al. |
| 7,139,555 B2 | 11/2006 | Apfel |
| 7,142,810 B2 | 11/2006 | Oesterling |
| 7,142,890 B2 | 11/2006 | Irimajiri et al. |
| 7,146,179 B2 | 12/2006 | Parulski et al. |
| 7,148,911 B1 | 12/2006 | Mitsui et al. |
| 7,174,171 B2 * | 2/2007 | Jones ............ G08G 1/20 340/539.13 |
| 7,224,792 B2 | 5/2007 | Fusco |
| 7,224,851 B2 | 5/2007 | Kinjo |
| 7,224,987 B1 | 5/2007 | Bhela et al. |
| 7,231,231 B2 | 6/2007 | Kokko et al. |
| 7,233,781 B2 | 6/2007 | Hunter et al. |
| 7,233,795 B1 | 6/2007 | Ryden |
| 7,240,093 B1 | 7/2007 | Danieli et al. |
| 7,245,293 B2 | 7/2007 | Hoshino et al. |
| 7,251,255 B1 | 7/2007 | Young |
| 7,254,408 B2 | 8/2007 | Kim |
| 7,260,416 B2 | 8/2007 | Shippee |
| 7,266,186 B1 | 9/2007 | Henderson |
| 7,269,413 B2 | 9/2007 | Kraft |
| 7,277,711 B2 | 10/2007 | Nyu |
| 7,321,783 B2 | 1/2008 | Kim |
| 7,324,823 B1 * | 1/2008 | Rosen ............ H04W 8/16 455/410 |
| 7,346,373 B2 | 3/2008 | Kim |
| 7,372,447 B1 | 5/2008 | Jacobsen et al. |
| 7,383,067 B2 | 6/2008 | Phillips et al. |
| 7,418,346 B2 | 8/2008 | Breed et al. |
| 7,433,845 B1 | 10/2008 | Flitcroft et al. |
| 7,444,168 B2 | 10/2008 | Nakagawa et al. |
| 7,450,709 B2 | 11/2008 | Gonzalez et al. |
| 7,451,084 B2 | 11/2008 | Funakura |
| 7,532,879 B1 | 5/2009 | Fujisaki |
| 7,551,899 B1 | 6/2009 | Nicolas et al. |
| 7,642,929 B1 | 1/2010 | Pinkus et al. |
| 7,643,037 B1 | 1/2010 | Langmacher et al. |
| 7,657,252 B2 | 2/2010 | Futami |
| 7,686,693 B2 | 3/2010 | Danieli et al. |
| 7,707,592 B2 | 4/2010 | Wesslen et al. |
| 7,707,602 B2 | 4/2010 | Cragun et al. |
| 7,725,077 B2 | 5/2010 | Jung et al. |
| 7,752,188 B2 | 7/2010 | Lagerstedt et al. |
| 7,769,364 B2 | 8/2010 | Logan et al. |
| 7,787,857 B2 | 8/2010 | Peterman |
| 7,787,887 B2 | 8/2010 | Gupta et al. |
| 7,853,295 B1 | 12/2010 | Fujisaki |
| 7,853,297 B1 | 12/2010 | Fujisaki |
| 7,865,567 B1 | 1/2011 | Hendricks et al. |
| 7,873,349 B1 | 1/2011 | Smith Corey et al. |
| 7,890,089 B1 | 2/2011 | Fujisaki |
| 7,899,410 B2 | 3/2011 | Rakshani et al. |
| 7,922,086 B2 | 4/2011 | Jung et al. |
| 7,941,141 B2 | 5/2011 | Shoykhet et al. |
| 7,953,439 B2 | 5/2011 | Rofougaran |
| 7,970,414 B1 | 6/2011 | Werden et al. |
| 8,099,108 B2 | 1/2012 | Camp et al. |
| 8,117,266 B2 | 2/2012 | Moore |
| 8,126,400 B2 | 2/2012 | Jung et al. |
| 8,145,040 B2 | 3/2012 | Toyoshima |
| 8,175,655 B1 | 5/2012 | Fujisaki |
| 8,208,954 B1 | 6/2012 | Fujisaki |
| 8,229,504 B1 | 7/2012 | Fujisaki |
| 8,260,313 B1 | 9/2012 | Wick et al. |
| 8,311,578 B1 | 11/2012 | Fujisaki |
| 8,364,201 B1 | 1/2013 | Fujisaki |
| 8,433,300 B1 | 4/2013 | Fujisaki |
| 8,433,364 B1 | 4/2013 | Fujisaki |
| 8,452,307 B1 * | 5/2013 | Fujisaki ............ H04W 64/006 455/414.1 |
| 8,472,935 B1 | 6/2013 | Fujisaki |
| 8,559,983 B1 | 10/2013 | Fujisaki |
| 8,620,384 B1 | 12/2013 | Fujisaki |
| 8,747,222 B2 | 6/2014 | Yamashita |
| 8,755,838 B1 | 6/2014 | Fujisaki |
| 8,825,026 B1 | 9/2014 | Fujisaki |
| 8,825,090 B1 | 9/2014 | Fujisaki |
| 9,049,556 B1 * | 6/2015 | Fujisaki ............ H04W 64/006 |
| 2001/0005826 A1 | 6/2001 | Shibuya |
| 2001/0011293 A1 | 8/2001 | Murakami et al. |
| 2001/0028350 A1 | 10/2001 | Matsuoka et al. |
| 2001/0029425 A1 | 10/2001 | Myr |
| 2001/0035829 A1 | 11/2001 | Yu et al. |
| 2001/0048364 A1 | 12/2001 | Kalthoff et al. |
| 2001/0049470 A1 | 12/2001 | Mault et al. |
| 2002/0002044 A1 | 1/2002 | Naruse et al. |
| 2002/0002705 A1 | 1/2002 | Byrnes et al. |
| 2002/0006804 A1 | 1/2002 | Mukai et al. |
| 2002/0009978 A1 | 1/2002 | Dukach et al. |
| 2002/0016724 A1 | 2/2002 | Yang et al. |
| 2002/0019225 A1 | 2/2002 | Miyashita |
| 2002/0026348 A1 | 2/2002 | Fowler et al. |
| 2002/0028690 A1 | 3/2002 | McKenna et al. |
| 2002/0031120 A1 | 3/2002 | Rakib |
| 2002/0034292 A1 | 3/2002 | Tuoriniemi et al. |
| 2002/0036231 A1 | 3/2002 | Monaghan et al. |
| 2002/0037738 A1 | 3/2002 | Wycherley et al. |
| 2002/0038219 A1 | 3/2002 | Yanay et al. |
| 2002/0039914 A1 | 4/2002 | Hama et al. |
| 2002/0041262 A1 | 4/2002 | Mukai et al. |
| 2002/0047787 A1 | 4/2002 | Mikkola et al. |
| 2002/0049630 A1 | 4/2002 | Furuta et al. |
| 2002/0052754 A1 | 5/2002 | Joyce et al. |
| 2002/0054068 A1 | 5/2002 | Ellis et al. |
| 2002/0055872 A1 | 5/2002 | LaBrie et al. |
| 2002/0061767 A1 | 5/2002 | Sladen et al. |
| 2002/0065037 A1 | 5/2002 | Messina et al. |
| 2002/0066115 A1 | 5/2002 | Wendelrup |
| 2002/0068558 A1 | 6/2002 | Janik |
| 2002/0068585 A1 | 6/2002 | Chan et al. |
| 2002/0068599 A1 | 6/2002 | Rodriguez et al. |
| 2002/0072395 A1 | 6/2002 | Miramontes |
| 2002/0077808 A1 | 6/2002 | Liu et al. |
| 2002/0080163 A1 | 6/2002 | Morey |
| 2002/0085700 A1 | 7/2002 | Metcalf |
| 2002/0094806 A1 | 7/2002 | Kamimura |
| 2002/0097984 A1 | 7/2002 | Abecassis |
| 2002/0098857 A1 | 7/2002 | Ishii |
| 2002/0102960 A1 | 8/2002 | Lechner |
| 2002/0103872 A1 | 8/2002 | Watanabe |
| 2002/0104095 A1 | 8/2002 | Nguyen et al. |
| 2002/0110246 A1 | 8/2002 | Gosior et al. |
| 2002/0115469 A1 | 8/2002 | Rekimoto et al. |
| 2002/0120718 A1 | 8/2002 | Lee |
| 2002/0123336 A1 | 9/2002 | Kamada |
| 2002/0127997 A1 | 9/2002 | Karlstedt et al. |
| 2002/0128000 A1 | 9/2002 | do Nascimento |
| 2002/0133342 A1 | 9/2002 | McKenna |
| 2002/0137470 A1 | 9/2002 | Baron et al. |
| 2002/0137503 A1 | 9/2002 | Roderique |
| 2002/0137526 A1 | 9/2002 | Shinohara |
| 2002/0141086 A1 | 10/2002 | Lang et al. |
| 2002/0142763 A1 | 10/2002 | Kolsky |
| 2002/0147645 A1 | 10/2002 | Alao et al. |
| 2002/0151326 A1 | 10/2002 | Awada et al. |
| 2002/0151327 A1 | 10/2002 | Levitt |
| 2002/0160724 A1 | 10/2002 | Arai et al. |
| 2002/0164975 A1 | 11/2002 | Lu |
| 2002/0164996 A1 | 11/2002 | Dorenbosch |
| 2002/0165850 A1 | 11/2002 | Roberts et al. |
| 2002/0173344 A1 | 11/2002 | Cupps et al. |
| 2002/0177407 A1 | 11/2002 | Mitsumoto |
| 2002/0178225 A1 | 11/2002 | Madenberg et al. |
| 2002/0183045 A1 | 12/2002 | Emmerson et al. |
| 2002/0183098 A1 | 12/2002 | Lee et al. |
| 2002/0191951 A1 | 12/2002 | Sodeyama et al. |
| 2002/0193997 A1 | 12/2002 | Fitzpatrick et al. |
| 2002/0198017 A1 | 12/2002 | Babasaki et al. |
| 2002/0198813 A1 | 12/2002 | Patterson, Jr. et al. |
| 2002/0198936 A1 | 12/2002 | McIntyre et al. |
| 2003/0003967 A1 | 1/2003 | Ito |

(56) References Cited

U.S. PATENT DOCUMENTS

| | | |
|---|---|---|
| 2003/0005056 A1 | 1/2003 | Yamamoto et al. |
| 2003/0006879 A1 | 1/2003 | Kang et al. |
| 2003/0007556 A1 | 1/2003 | Oura et al. |
| 2003/0013483 A1 | 1/2003 | Ausems et al. |
| 2003/0014286 A1 | 1/2003 | Cappellini |
| 2003/0016189 A1 | 1/2003 | Abe et al. |
| 2003/0017857 A1 | 1/2003 | Kitson et al. |
| 2003/0018744 A1 | 1/2003 | Johanson et al. |
| 2003/0025788 A1 | 2/2003 | Beardsley |
| 2003/0032406 A1 | 2/2003 | Minear et al. |
| 2003/0037265 A1 | 2/2003 | Sameshima et al. |
| 2003/0038800 A1 | 2/2003 | Kawahara |
| 2003/0038893 A1 | 2/2003 | Rajamaki et al. |
| 2003/0045311 A1 | 3/2003 | Larikka et al. |
| 2003/0045329 A1 | 3/2003 | Kinoshita |
| 2003/0052964 A1 | 3/2003 | Priestman et al. |
| 2003/0055994 A1 | 3/2003 | Herrmann et al. |
| 2003/0061606 A1 | 3/2003 | Hartwig et al. |
| 2003/0063580 A1 | 4/2003 | Pond |
| 2003/0063732 A1 | 4/2003 | Mcknight |
| 2003/0065784 A1 | 4/2003 | Herrod |
| 2003/0065805 A1 | 4/2003 | Barnes, Jr. |
| 2003/0069693 A1 | 4/2003 | Snapp et al. |
| 2003/0070162 A1 | 4/2003 | Oshima et al. |
| 2003/0073432 A1 | 4/2003 | Meade, II |
| 2003/0074398 A1 | 4/2003 | Matsuo |
| 2003/0083055 A1 | 5/2003 | Riordan et al. |
| 2003/0084104 A1 | 5/2003 | Salem et al. |
| 2003/0084121 A1 | 5/2003 | De Boor et al. |
| 2003/0093503 A1 | 5/2003 | Yamaki et al. |
| 2003/0093790 A1 | 5/2003 | Logan et al. |
| 2003/0099367 A1 | 5/2003 | Okamura |
| 2003/0107580 A1 | 6/2003 | Egawa et al. |
| 2003/0110450 A1 | 6/2003 | Sakai |
| 2003/0117376 A1 | 6/2003 | Ghulam |
| 2003/0119479 A1 | 6/2003 | Arima et al. |
| 2003/0119485 A1 | 6/2003 | Ogasawara |
| 2003/0119562 A1 | 6/2003 | Kokubo |
| 2003/0120784 A1 | 6/2003 | Johnson et al. |
| 2003/0125008 A1 | 7/2003 | Shimamura |
| 2003/0132928 A1 | 7/2003 | Kori |
| 2003/0135563 A1 | 7/2003 | Bodin et al. |
| 2003/0137970 A1 | 7/2003 | Odman |
| 2003/0144024 A1 | 7/2003 | Luo |
| 2003/0148772 A1 | 8/2003 | Ben-Ari |
| 2003/0149662 A1 | 8/2003 | Shore |
| 2003/0153355 A1 | 8/2003 | Warren |
| 2003/0156208 A1 | 8/2003 | Obradovich |
| 2003/0166399 A1 | 9/2003 | Tokkonen et al. |
| 2003/0169329 A1 | 9/2003 | Parker et al. |
| 2003/0201982 A1 | 10/2003 | Iesaka |
| 2003/0204562 A1 | 10/2003 | Hwang |
| 2003/0208541 A1 | 11/2003 | Musa |
| 2003/0220835 A1 | 11/2003 | Barnes, Jr. |
| 2003/0222762 A1 | 12/2003 | Beigl et al. |
| 2003/0222982 A1 | 12/2003 | Hamdan et al. |
| 2003/0223554 A1 | 12/2003 | Zhang |
| 2003/0224760 A1 | 12/2003 | Day |
| 2003/0227570 A1 | 12/2003 | Kim et al. |
| 2003/0229900 A1 | 12/2003 | Reisman |
| 2003/0236709 A1 | 12/2003 | Hendra et al. |
| 2003/0236866 A1 | 12/2003 | Light |
| 2004/0003307 A1 | 1/2004 | Tsuji |
| 2004/0004616 A1 | 1/2004 | Konya et al. |
| 2004/0027369 A1 | 2/2004 | Kellock et al. |
| 2004/0029640 A1 | 2/2004 | Masuyama et al. |
| 2004/0033795 A1 | 2/2004 | Walsh et al. |
| 2004/0034692 A1 | 2/2004 | Eguchi et al. |
| 2004/0052504 A1 | 3/2004 | Yamada et al. |
| 2004/0060061 A1 | 3/2004 | Parker |
| 2004/0067751 A1 | 4/2004 | Vandermeijden et al. |
| 2004/0068399 A1 | 4/2004 | Ding |
| 2004/0072595 A1 | 4/2004 | Anson et al. |
| 2004/0082321 A1 | 4/2004 | Kontianinen |
| 2004/0087326 A1 | 5/2004 | Dunko et al. |
| 2004/0092255 A1 | 5/2004 | Ji et al. |
| 2004/0103303 A1 | 5/2004 | Yamauchi et al. |
| 2004/0107072 A1 | 6/2004 | Dietrich et al. |
| 2004/0114732 A1 | 6/2004 | Choe et al. |
| 2004/0117108 A1 | 6/2004 | Nemeth |
| 2004/0128359 A1 | 7/2004 | Horvitz et al. |
| 2004/0137893 A1 | 7/2004 | Muthuswamy et al. |
| 2004/0139208 A1 | 7/2004 | Tuli |
| 2004/0142678 A1 | 7/2004 | Krasner |
| 2004/0150725 A1 | 8/2004 | Taguchi |
| 2004/0157664 A1 | 8/2004 | Link |
| 2004/0166832 A1 | 8/2004 | Portman et al. |
| 2004/0166879 A1 | 8/2004 | Meadows et al. |
| 2004/0174863 A1 | 9/2004 | Caspi et al. |
| 2004/0183937 A1 | 9/2004 | Viinikanoja et al. |
| 2004/0185865 A1 | 9/2004 | Maanoja |
| 2004/0189827 A1 | 9/2004 | Kim et al. |
| 2004/0198374 A1 | 10/2004 | Bajikar |
| 2004/0203520 A1 | 10/2004 | Schirtzinger et al. |
| 2004/0203904 A1 | 10/2004 | Gwon et al. |
| 2004/0203909 A1 | 10/2004 | Koster |
| 2004/0204018 A1 | 10/2004 | Kuo |
| 2004/0204035 A1 | 10/2004 | Raghuram et al. |
| 2004/0204126 A1 | 10/2004 | Reyes et al. |
| 2004/0216037 A1 | 10/2004 | Hishida et al. |
| 2004/0218738 A1 | 11/2004 | Arai et al. |
| 2004/0219951 A1 | 11/2004 | Holder |
| 2004/0223049 A1 | 11/2004 | Taniguchi et al. |
| 2004/0235520 A1 | 11/2004 | Cadiz et al. |
| 2004/0242240 A1 | 12/2004 | Lin |
| 2004/0248586 A1 | 12/2004 | Patel et al. |
| 2004/0252197 A1 | 12/2004 | Fraley et al. |
| 2004/0259537 A1 | 12/2004 | Ackley |
| 2004/0264662 A1 | 12/2004 | Silver |
| 2004/0266418 A1 | 12/2004 | Kotzin |
| 2004/0267628 A1 | 12/2004 | Stillman |
| 2005/0004749 A1 | 1/2005 | Park |
| 2005/0032527 A1 | 2/2005 | Sheha et al. |
| 2005/0036509 A1 | 2/2005 | Acharya et al. |
| 2005/0046584 A1 | 3/2005 | Breed |
| 2005/0048987 A1 | 3/2005 | Glass |
| 2005/0070257 A1 | 3/2005 | Saarinen et al. |
| 2005/0075097 A1 | 4/2005 | Lehikoinen et al. |
| 2005/0090768 A1 | 4/2005 | Brattesani et al. |
| 2005/0113080 A1 | 5/2005 | Nishimura |
| 2005/0113113 A1 | 5/2005 | Reed |
| 2005/0120225 A1 | 6/2005 | Kirsch et al. |
| 2005/0136949 A1 | 6/2005 | Barnes, Jr. |
| 2005/0144560 A1 | 6/2005 | Gruen et al. |
| 2005/0151877 A1 | 7/2005 | Fisher |
| 2005/0159189 A1 | 7/2005 | Iyer |
| 2005/0163289 A1 | 7/2005 | Caspi et al. |
| 2005/0164684 A1 | 7/2005 | Chen et al. |
| 2005/0165871 A1 | 7/2005 | Barrs, II et al. |
| 2005/0166242 A1 | 7/2005 | Matsumoto et al. |
| 2005/0186954 A1 | 8/2005 | Kenney |
| 2005/0192030 A1 | 9/2005 | Asthana et al. |
| 2005/0207555 A1 | 9/2005 | Lee et al. |
| 2005/0227731 A1 | 10/2005 | Kall |
| 2005/0235312 A1 | 10/2005 | Karaoguz et al. |
| 2005/0261945 A1 | 11/2005 | Mougin et al. |
| 2005/0272448 A1 | 12/2005 | Tran et al. |
| 2005/0272504 A1 | 12/2005 | Eguchi et al. |
| 2005/0282582 A1 | 12/2005 | Slotznick et al. |
| 2006/0003813 A1 | 1/2006 | Seligmann et al. |
| 2006/0031407 A1 | 2/2006 | Dispensa et al. |
| 2006/0033809 A1 | 2/2006 | Farley |
| 2006/0035628 A1 | 2/2006 | Miller et al. |
| 2006/0041923 A1 | 2/2006 | McQuaide, Jr. |
| 2006/0052100 A1 | 3/2006 | Almgren |
| 2006/0059038 A1 | 3/2006 | Iuchi et al. |
| 2006/0084413 A1 | 4/2006 | Myoung |
| 2006/0114100 A1 | 6/2006 | Ghabra et al. |
| 2006/0121986 A1 | 6/2006 | Pelkey et al. |
| 2006/0126284 A1 | 6/2006 | Moscovitch |
| 2006/0133590 A1 | 6/2006 | Jiang |
| 2006/0140173 A1 | 6/2006 | Hoover |
| 2006/0140387 A1 | 6/2006 | Boldt |
| 2006/0143655 A1 | 6/2006 | Ellis et al. |

(56) References Cited

U.S. PATENT DOCUMENTS

| | | |
|---|---|---|
| 2006/0166650 A1 | 7/2006 | Berger et al. |
| 2006/0167677 A1 | 7/2006 | Bitzer |
| 2006/0206913 A1 | 9/2006 | Jerding et al. |
| 2006/0229114 A2 | 10/2006 | Kim |
| 2006/0234693 A1 | 10/2006 | Isidore et al. |
| 2006/0234758 A1 | 10/2006 | Parupudi et al. |
| 2006/0258396 A1 | 11/2006 | Matsuoka |
| 2006/0262911 A1 | 11/2006 | Chin et al. |
| 2006/0276172 A1 | 12/2006 | Rydgren et al. |
| 2006/0284732 A1 | 12/2006 | Brock-Fisher |
| 2007/0005809 A1 | 1/2007 | Kobayashi et al. |
| 2007/0015550 A1 | 1/2007 | Kayanuma |
| 2007/0032255 A1 | 2/2007 | Koo et al. |
| 2007/0037605 A1 | 2/2007 | Logan |
| 2007/0050832 A1 | 3/2007 | Wright et al. |
| 2007/0061845 A1 | 3/2007 | Barnes |
| 2007/0097879 A1 | 5/2007 | Bleckert et al. |
| 2007/0099703 A1 | 5/2007 | Terebilo |
| 2007/0109262 A1 | 5/2007 | Oshima et al. |
| 2007/0135145 A1 | 6/2007 | Lee et al. |
| 2007/0135150 A1 | 6/2007 | Ushiki et al. |
| 2007/0142047 A1 | 6/2007 | Heeschen et al. |
| 2007/0190944 A1 | 8/2007 | Doan et al. |
| 2007/0191029 A1 | 8/2007 | Zarem et al. |
| 2007/0204014 A1 | 8/2007 | Greer et al. |
| 2007/0216760 A1 | 9/2007 | Kondo et al. |
| 2007/0218891 A1 | 9/2007 | Cox |
| 2007/0262848 A1 | 11/2007 | Berstis et al. |
| 2007/0293240 A1 | 12/2007 | Drennan et al. |
| 2008/0006762 A1 | 1/2008 | Fadell et al. |
| 2008/0014917 A1 | 1/2008 | Rhoads et al. |
| 2008/0016534 A1 | 1/2008 | Ortiz et al. |
| 2008/0039125 A1 | 2/2008 | Fan et al. |
| 2008/0058005 A1 | 3/2008 | Zicker et al. |
| 2008/0070561 A1 | 3/2008 | Keum et al. |
| 2008/0070588 A1 | 3/2008 | Morin |
| 2008/0082930 A1 | 4/2008 | Omernick et al. |
| 2008/0104544 A1 | 5/2008 | Collins et al. |
| 2008/0109840 A1 | 5/2008 | Walter et al. |
| 2008/0139222 A1 | 6/2008 | Falvo et al. |
| 2008/0140686 A1 | 6/2008 | Hong et al. |
| 2008/0146272 A1 | 6/2008 | Rao et al. |
| 2008/0151696 A1 | 6/2008 | Giroud et al. |
| 2008/0167078 A1 | 7/2008 | Eibye |
| 2008/0172173 A1 | 7/2008 | Chang et al. |
| 2008/0176545 A1 | 7/2008 | Dicke et al. |
| 2008/0242271 A1 | 10/2008 | Schmidt et al. |
| 2008/0242283 A1 | 10/2008 | Ruckart |
| 2008/0254811 A1 | 10/2008 | Stewart |
| 2008/0299989 A1 | 12/2008 | King et al. |
| 2009/0017812 A1 | 1/2009 | Chan et al. |
| 2009/0047972 A1 | 2/2009 | Neeraj |
| 2009/0111486 A1 | 4/2009 | Burstrom |
| 2009/0124243 A1 | 5/2009 | Routley et al. |
| 2009/0150807 A1 | 6/2009 | George et al. |
| 2009/0153490 A1 | 6/2009 | Nymark et al. |
| 2009/0186628 A1 | 7/2009 | Yonker et al. |
| 2009/0221330 A1 | 9/2009 | Tomimori |
| 2009/0290369 A1 | 11/2009 | Schofield et al. |
| 2009/0319947 A1 | 12/2009 | Wang et al. |
| 2010/0030557 A1 | 2/2010 | Molloy et al. |
| 2010/0062740 A1 | 3/2010 | Ellis et al. |
| 2010/0079267 A1 | 4/2010 | Lin |
| 2010/0145700 A1 | 6/2010 | Kennewick et al. |
| 2012/0059545 A1 | 3/2012 | Furuno et al. |
| 2012/0064874 A1 | 3/2012 | Pierce et al. |
| 2013/0298059 A1 | 11/2013 | Raskin |
| 2015/0018091 A1 | 1/2015 | Suzuki et al. |

FOREIGN PATENT DOCUMENTS

| | | |
|---|---|---|
| JP | H10155141 A1 | 6/1998 |
| JP | H11/195137 A1 | 7/1999 |
| JP | 2002/252691 A1 | 9/2002 |
| JP | 2003/078977 A1 | 3/2003 |
| JP | 2003/228726 A1 | 8/2003 |
| JP | 2003/263656 A1 | 9/2003 |
| JP | 2005/216149 A1 | 8/2005 |
| WO | 01/31893 A1 | 5/2001 |
| WO | 03001457 A1 | 1/2003 |
| WO | 03096660 A1 | 11/2003 |

OTHER PUBLICATIONS

Casio, "Pocket PC User's Guide" published on Feb. 3, 2000.
Audiovox, "Pocket PC Phone User Manual" published on Mar. 19, 2004.
Palm, "Using your Treo" published in Feb. 2004.
Palm, "Palm Treo 600 Support Knowledge Library, Solution ID 29492" published in Jan. 2004.
Dataviz, "Documents to Go included on Treo 600 Smartphone from palmOne" published in Nov. 2003.
Palm, "Treo 600 smartphone" published in 2003.
FCC's wireless Enhanced 911 (E911) rules, Phase I and Phase II.
HI Corporation's company history (http://www.hicorp.co.jp/english/corporate/history.html) Copyright notice on the web: (c) 2007-2011 HI Corporation. All Rights Reserved.
HI Corporation to Offer 3D Graphics to Motorola Mobile Phone Platform Customers (http://www.wirelessdevnet.com/news/2003/203/news7.html) Published on the web on: Jul. 21, 2003.
Development of NTT docomo Mova N504i—NEC Gi-Ho (Technology Magazine) vol. 56 No. May 2003, p. 144 Published in: May 2003.
Winners of Tokyo Venture Technology Grand Prize in 2000-2009 (http://www.sangyo-rodo.metro.tokyo.jp/shoko/sogyo/venture/2000-2009winners.pdf) Published in: 2000-2009.

* cited by examiner

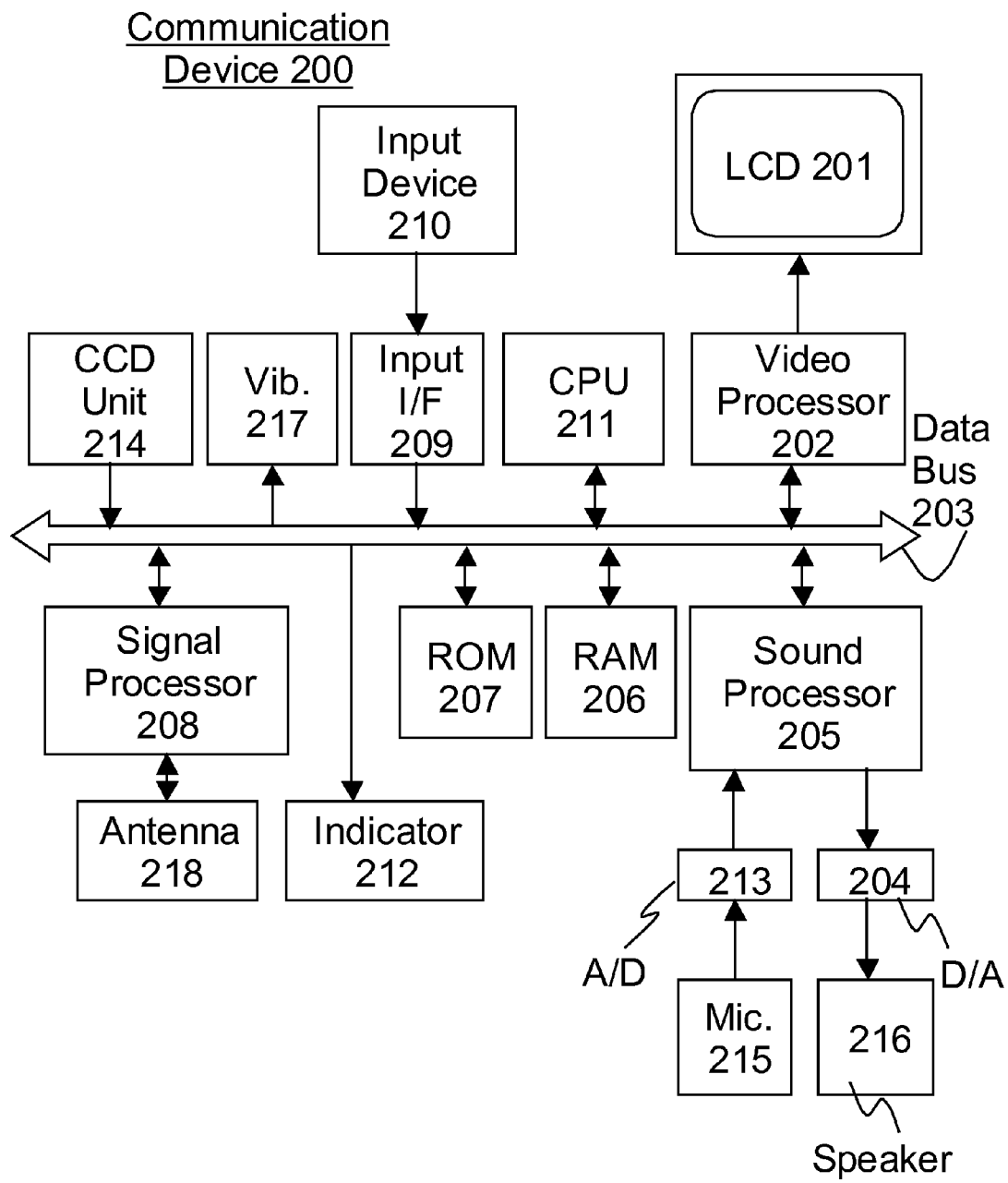

COMMUNICATION DEVICE

CROSS REFERENCE TO RELATED APPLICATIONS

This application is a continuation of U.S. Ser. No. 13/740,258 filed 2013 Jan. 13, which is a continuation of U.S. Ser. No. 12/245,715 filed 2008 Oct. 4, which is a continuation of U.S. Ser. No. 12/166,478 filed 2008 Jul. 2, all of which are hereby incorporated herein by reference in their entirety.

BACKGROUND OF INVENTION

The invention relates to communication device and more particularly to the communication device which is capable to communicate with another communication device in a wireless fashion.

U.S. Pat. No. 6,327,471 is introduced as prior art of the present invention of which the summary is the following: "A method and an apparatus is provided for acquiring satellite signals to establish the exact spatial position of a cellular radiotelephone, in order to perform a timely dropoff or smooth handoff to another base station or frequency. The cellular radiotelephone is equipped with its own positioning system which uses satellite data to determine its spatial position. The communication system is preferably a Code Division Multiple Access (CDMA) system, and the positioning system is preferably a Global Positioning System (GPS). The method of the present invention may be used to determine the base station closest to the cellular radiotelephone. In the alternative, it may be used to compute a distance between the cellular radiotelephone and a location where the quality level of the cellular radiotelephone communication signal is predicted to be less than the predetermined value, and to determine from the computed distance whether the cellular radiotelephone should be handed off." However, this prior art does not disclose the communication device comprising a voice communication implementer, a caller's phone number displaying implementer, and an area dependent notice type changing implementer.

For the avoidance of doubt, the number of the prior arts introduced herein (and/or in IDS) may be of a large one, however, applicant has no intent to hide the more relevant prior art(s) in the less relevant ones.

SUMMARY OF INVENTION

It is an object of the present invention to provide a device capable to implement a plurality of functions.

It is another object of the present invention to provide merchandise to merchants attractive to the customers in the U.S.

It is another object of the present invention to provide mobility to the users of communication device.

It is another object of the present invention to provide more convenience to the customers in the U.S.

It is another object of the present invention to provide more convenience to the users of communication device or any tangible thing in which the communication device is fixedly or detachably (i.e., removably) installed.

It is another object of the present invention to overcome the shortcomings associated with the foregoing prior art.

The present invention introduces the communication device comprising a voice communication implementer, a caller's phone number displaying implementer, and an area dependent notice type changing implementer.

BRIEF DESCRIPTION OF DRAWINGS

The above and other aspects, features, and advantages of the invention will be better understood by reading the following more particular description of the invention, presented in conjunction with the following drawing, wherein:

FIG. 1 is a block diagram illustrating an exemplary embodiment of the present invention.

DETAILED DESCRIPTION

The following description is of the best presently contemplated mode of carrying out the present invention. This description is not to be taken in a limiting sense but is made merely for the purpose of describing the general principles of the invention. For example, each description of random access memory in this specification illustrate(s) only one function or mode in order to avoid complexity in its explanation, however, such description does not mean that only one function or mode can be implemented at a time. In other words, more than one function or mode can be implemented simultaneously by way of utilizing the same random access memory. In addition, the figure number is cited after the elements in parenthesis in a manner for example 'RAM 206 (FIG. 1)'. It is done so merely to assist the readers to have a better understanding of this specification, and must not be used to limit the scope of the claims in any manner since the figure numbers cited are not exclusive. There are only few data stored in each storage area described in this specification. This is done so merely to simplify the explanation and, thereby, to enable the reader of this specification to understand the content of each function with less confusion. Therefore, more than few data (hundreds and thousands of data, if necessary) of the same kind, not to mention, are preferred to be stored in each storage area to fully implement each function described herein. The scope of the invention should be determined by referencing the appended claims.

FIG. 1 is a simplified block diagram of the Communication Device 200 utilized in the present invention. Referring to FIG. 1, Communication Device 200 includes CPU 211 which controls and administers the overall function and operation of Communication Device 200. CPU 211 uses RAM 206 to temporarily store data and/or to perform calculation to perform its function, and to implement the present invention, modes, functions, and systems explained hereinafter. Video Processor 202 generates analog and/or digital video signals which are displayed on LCD 201. ROM 207 stores the data and programs which are essential to operate Communication Device 200. Wireless signals are received by Antenna 218 and processed by Signal Processor 208. Input signals are input by Input Device 210, such as a dial pad, a joystick, and/or a keypad, and the signals are transferred via Input Interface 209 and Data Bus 203 to CPU 211. Indicator 212 is an LED lamp which is designed to output different colors (e.g., red, blue, green, etc). Analog audio data is input to Microphone 215. A/D 213 converts the analog audio data into a digital format. Speaker 216 outputs analog audio data which is converted into an analog format from digital format by D/A 204. Sound Processor 205 produces digital audio signals that are transferred to D/A 204 and also processes the digital audio signals transferred from A/D 213. CCD Unit 214 captures video image which is stored in RAM 206 in a digital format. Vibrator 217 vibrates the entire device by the command from CPU 211.

As another embodiment, LCD 201 or LCD 201/Video Processor 202 may be separated from the other elements described in FIG. 1, and be connected in a wireless fashion to be wearable and/or head-mountable.

When Communication Device 200 is in the voice communication mode, the analog audio data input to Microphone 215 is converted to a digital format by A/D 213 and transmitted to another device via Antenna 218 in a wireless fashion after being processed by Signal Processor 208, and the wireless signal representing audio data which is received via Antenna 218 is output from Speaker 216 after being processed by Signal Processor 208 and converted to analog signal by D/A 204. For the avoidance of doubt, the definition of Communication Device 200 in this specification includes so-called 'PDA'. The definition of Communication Device 200 also includes in this specification any device which is mobile and/or portable and which is capable to send and/or receive audio data, text data, image data, video data, and/or other types of data in a wireless fashion via Antenna 218. The definition of Communication Device 200 further includes any micro device embedded or installed into devices and equipments (e.g., VCR, TV, tape recorder, heater, air conditioner, fan, clock, micro wave oven, dish washer, refrigerator, oven, washing machine, dryer, door, window, automobile, motorcycle, and modem) to remotely control these devices and equipments. The size of Communication Device 200 is irrelevant. Communication Device 200 may be installed in houses, buildings, bridges, boats, ships, submarines, airplanes, and spaceships, and firmly fixed therein.

This paragraph illustrate(s) the elements of Communication Device 200. The elements of Communication Device 200 described in this paragraph is identical to the ones described in FIG. 1, except Communication Device 200 has new element, i.e., LED 219. Here, LED 219 receives infra red signals from other wireless devices, which are transferred to CPU 211 via Data Bus 203. LED 219 also sends infra red signals in a wireless fashion which are composed by CPU 211 and transferred via Data Bus 203. As the second embodiment, LED 219 may be connected to Signal Processor 208. Here, LED 219 transfers the received infra red signals to Signal Processor 208, and Signal Processor 208 processes and converts the signals to a CPU readable format which are transferred to CPU 211 via Data Bus 203. The data produced by CPU 211 are processed by Signal Processor 208 and transferred to another device via LED 219 in a wireless fashion. The task of LED 219 is as same as that of Antenna 218 described in FIG. 1 except that LED 219 utilizes infra red signals for implementing wireless communication in the second embodiment. For the avoidance of doubt, the reference to FIG. 1 (e.g., referring to FIG. 1 in parenthesis) automatically refers to this paragraph in this specification.

This paragraph illustrate(s) the data stored in Host H. In the present embodiment, Host H includes Host Information Storage Area H00a which stores various types of data to assist and/or co-operate with Communication Device 200 to implement all modes, functions, and systems described in this specification. As another embodiment, Host H may be composed of a plurality of computers, i.e., one master computer and a plurality of slave computers, wherein the master computer is connected to the plurality of slave computers. As another embodiment, Host H may also be composed of a plurality of master computers by way of utilizing peer-to-peer connection.

<<Emotion Sensing Function>>

The following paragraphs illustrate the emotion sensing function, wherein a current emotional status which indicates the current emotional status of the user is identified by an emotion sensor, an emotional status audiovisual data which indicates said current emotional status is output from said communication device, an emotional status message which indicates said current emotional status is transferred to another device, a current location which indicates the current geographic location of said communication device is refrained from being notified to another device when said current emotional status indicates a certain emotional status of the user, a phone call is refrained from being answered when said current emotional status indicates said certain emotional status of the user, when a document is opened, an emotional status icon which indicates said current emotional status is displayed, a first emotional status which indicates the emotional status of the user at the time/date indicated by a first time/date is produced, a first location which indicates the geographic location at the time/date indicated by said first time/date is produced, a second emotional status which indicates the emotional status of the user at the time/date indicated by a second time/date is produced, a second location which indicates the geographic location at the time/date indicated by said second time/date is produced, and said first emotional status, said first location, said second emotional status, and said second location are indicated on said display.

This paragraph illustrates the relationship between Data Bus 203 (FIG. 1) and Emotion Sensor ES729. In the present embodiment, Emotion Sensor ES729 is connected to Data Bus 203 (FIG. 1). Emotion Sensor ES729 is the sensor attached to the user to detect the current status of the user's emotion. Emotion Sensor ES729 may monitor the brainwave, blood pressure, and/or blood flow to identify the current status of the user's emotion.

This paragraph illustrates the storage area included in Host H. In the present embodiment, Host H includes Emotion Sensing Info Storage Area H729a of which the data and the software program(s) stored therein are described hereinafter.

This paragraph illustrates the storage area(s) included in Emotion Sensing Info Storage Area H729a. In the present embodiment, Emotion Sensing Info Storage Area H729a includes Emotion Sensing Data Storage Area H729b and Emotion Sensing Software Storage Area H729c. Emotion Sensing Data Storage Area H729b stores the data necessary to implement the present function on the side of Host H, such as the one(s) described hereinafter. Emotion Sensing Software Storage Area H729c stores the software program(s) necessary to implement the present function on the side of Host H, such as the one(s) described hereinafter.

This paragraph illustrates the storage area(s) included in Emotion Sensing Data Storage Area H729b. In the present embodiment, Emotion Sensing Data Storage Area H729b includes Emotion Sensor Data Storage Area H729b1, Entire Emotion Sensor Category Data Storage Area H729b2, Currently Detected Emotional Status Data Storage Area H729b3, Entire Current Emotion Audiovisual Data Storage Area H729b4, Indicating Current Emotion Audiovisual Data Storage Area H729b5, Entire Current Emotion Message Data Storage Area H729b6, Current Emotion Message Receiving Device Data Storage Area H72967, Sending Current Emotion Message Data Storage Area H72968, Current Location Data Storage Area H729b9, Current Location Notification Permitting Emotional Status Data Storage Area H729b10, Current Location Notification Refraining Emotional Status Data Storage Area H729b11, and Current Location Notification Refraining Message Data Storage Area H729b12. Emotion Sensor Data Storage Area H729b1 stores the emotion sensor data retrieved from Emotion Sensor ES729. Here, the emotion sensor data may indicate the brainwave of a certain pattern and strength, the blood pressure of a certain level, and/or the blood flow of a certain amount. Entire Emotion Sensor Category Data Storage Area H729b2 stores the data described hereinafter. Currently Detected Emotional Status Data Storage Area H729b3 stores the currently detected emotional status data which is one of the following depending on the current emotional status of the user: the 1st emotion sensor category data, the 2nd emotion sensor category data, the 3rd emotion sensor category data, and the 4th emotion sensor category data. Entire Current Emotion Audiovisual Data Storage Area H729b4 stores the data described hereinafter. Indicating Current Emotion Audiovisual Data Storage Area H729b5 stores the indicating current emotion audiovisual data which is one of the following depending on the current emotional status of the user: the 1st current emotion audiovisual data, the 2nd current emotion audiovisual data, the 3rd current emotion audiovisual data, and the 4th current emotion audiovisual data. Entire Current Emotion Message Data Storage Area H729b6 stores the data described hereinafter. Current Emotion Message Receiving Device Data Storage Area H729b7 stores the current emotion message receiving device data which indicates the device (not shown) which receives the sending current emotion message data. Sending Current Emotion Message Data Storage Area H729b8 stores the sending current emotion message data which is the message indicating the current status of the user's emotion. Current Location Data Storage Area H729b9 stores the current location data which indicates the current geographic location of Communication Device 200 in (x,y,z) format. Current Location Notification Permitting Emotional Status Data Storage Area H729b10 stores the current location notification permitting emotional status data which includes both the 3rd emotion sensor category data (e.g., delight) and the 4th emotion sensor category data (e.g., pleasure). Current Location Notification Refraining Emotional Status Data Storage Area H729b11 stores the current location notification refraining emotional status data which includes both the 1st emotion sensor category data (e.g., anger) and the 2nd emotion sensor category data (e.g., sorrow). Current Location Notification Refraining Message Data Storage Area H729b12 stores the current location notification refraining message data which is the message indicating that the current geographic location of the user can not be notified.

This paragraph illustrates the storage area(s) included in Emotion Sensing Data Storage Area H729b in addition to the ones described in the previous paragraph. In the present embodiment, Emotion Sensing Data Storage Area H729b further includes Phone Call Answer Permitting Emotional Status Data Storage Area H729b13, Phone Call Notifying Audiovisual Data Storage Area H729b14, Phone Call Answer Refraining Emotional Status Data Storage Area H729b15, Phone Call Answer Refraining Message Data Storage Area H729b16, Document Data Storage Area H729b17, Entire Emotion Icon Data Storage Area H729b18, Currently Displaying Emotion Icon Data Storage Area H729b19, Entire Time Data Storage Area H729b20, Entire Time Location Data Storage Area H729b21, Entire Time Emotional Status Data Storage Area H729b22, Map Data Storage Area H729b23, Entire Time Location Icon Data Storage Area H729b24, and Work Area H729b25. Phone Call Answer Permitting Emotional Status Data Storage Area H729b13 stores the phone call answer permitting emotional status data which includes both the 3rd emotion sensor category data (e.g., delight) and the 4th emotion sensor category data (e.g., pleasure). Phone Call Notifying Audiovisual Data Storage Area H729b14 stores the phone call notifying audiovisual data which is the audiovisual data output from Speaker 216 (FIG. 1) and LCD 201 (FIG. 1) to notify that a phone call is received. Phone Call Answer Refraining Emotional Status Data Storage Area H729b15 stores the phone call answer refraining emotional status data which includes both the 1st emotion sensor category data (e.g., anger) and the 2nd emotion sensor category data (e.g., sorrow). Phone Call Answer Refraining Message Data Storage Area H729b16 stores the phone call answer refraining message data which is the message indicating that the phone call can not be answered. Document Data Storage Area H729b17 stores the document data which is the document or email authored by the user. Entire Emotion Icon Data Storage Area H729b18 stores the data described hereinafter. Currently Displaying Emotion Icon Data Storage Area H729b19 stores the currently displaying emotion icon data which is one of the following depending on the current emotional status of the user: the 1st emotion icon data, the 2nd emotion icon data, the 3rd emotion icon data, and the 4th emotion icon data. Entire Time Data Storage Area H729b20 stores the data described hereinafter. Entire Time Location Data Storage Area H729b21 stores the data described hereinafter. Entire Time Emotional Status Data Storage Area H729b22 stores the data described hereinafter. Map Data Storage Area H729b23 stores the map data which is the three dimensional image data indicating a map. Entire Time Location Icon Data Storage Area H729b24 stores the data described hereinafter. Work Area H729b25 is utilized as a work area to perform calculation and temporarily store data to implement the present function.

This paragraph illustrates the storage area(s) included in Entire Emotion Sensor Category Data Storage Area H729b2. In the present embodiment, Entire Emotion Sensor Category Data Storage Area H729b2 includes 1st Emotion Sensor Category Data Storage Area H729b2a, 2nd Emotion Sensor Category Data Storage Area H729b2b, 3rd Emotion Sensor Category Data Storage Area H729b2c, and 4th Emotion Sensor Category Data Storage Area H729b2d. 1st Emotion Sensor Category Data Storage Area H729b2a stores the 1st emotion sensor category data which indicates the brainwave of the 1st pattern and strength, the blood pressure of the 1st level, and/or a blood flow of the 1st amount indicating the user's 1st emotional status (e.g., anger). 2nd Emotion Sensor Category Data Storage Area H729b2b stores the 2nd emotion sensor category data which indicates the brainwave of the 2nd pattern and strength, the blood pressure of the 2nd level, and/or a blood flow of the 2nd amount indicating the user's 2nd emotional status (e.g., sorrow). 3rd Emotion Sensor Category Data Storage Area H729b2c stores the 3rd emotion sensor category data which indicates the brainwave of the 3rd pattern and strength, the blood pressure of the 3rd level, and/or a blood flow of the 3rd amount indicating the user's 3rd emotional status (e.g., delight). 4th Emotion Sensor Category Data Storage Area H729b2d stores the 4th emotion sensor category data which indicates the brainwave of the 4th pattern and strength, the blood pressure of the 4th level, and/or a blood flow of the 4th amount indicating the user's 4th emotional status (e.g., pleasure).

This paragraph illustrates the storage area(s) included in Entire Current Emotion Audiovisual Data Storage Area H729b4. In the present embodiment, Entire Current Emotion Audiovisual Data Storage Area H729b4 includes 1st Current Emotion Audiovisual Data Storage Area H729b4a, 2nd Current Emotion Audiovisual Data Storage Area H729b4b, 3rd Current Emotion Audiovisual Data Storage Area H729b4c, and 4th Current Emotion Audiovisual Data Storage Area H729b4d. 1st Current Emotion Audiovisual Data Storage Area H729b4a stores the 1st current emotion audiovisual data which is the audiovisual data output from Communication Device 200 when the 1st emotion sensor category data is stored as the currently detected emotional status data in Currently Detected Emotional Status Data Storage Area H729b3.

2nd Current Emotion Audiovisual Data Storage Area H729b4b stores the 2nd current emotion audiovisual data which is the audiovisual data output from Communication Device 200 when the 2nd emotion sensor category data is stored as the currently detected emotional status data in Currently Detected Emotional Status Data Storage Area H729b3. 3rd Current Emotion Audiovisual Data Storage Area H729b4c stores the 3rd current emotion audiovisual data which is the audiovisual data output from Communication Device 200 when the 3rd emotion sensor category data is stored as the currently detected emotional status data in Currently Detected Emotional Status Data Storage Area H729b3. 4th Current Emotion Audiovisual Data Storage Area H729b4d stores the 4th current emotion audiovisual data which is the audiovisual data output from Communication Device 200 when the 4th emotion sensor category data is stored as the currently detected emotional status data in Currently Detected Emotional Status Data Storage Area H729b3.

This paragraph illustrates the storage area(s) included in Entire Current Emotion Message Data Storage Area H729b6. In the present embodiment, Entire Current Emotion Message Data Storage Area H729b6 includes 1st Current Emotion Message Data Storage Area H729b6a, 2nd Current Emotion Message Data Storage Area H729b6b, 3rd Current Emotion Message Data Storage Area H729b6c, and 4th Current Emotion Message Data Storage Area H729b6d. 1st Current Emotion Message Data Storage Area H729b6a stores the 1st current emotion message data which is the message indicating that the user is in the 1st emotional status (e.g., anger). 2nd Current Emotion Message Data Storage Area H729b6b stores the 2nd current emotion message data which is the message indicating that the user is in the 2nd emotional status (e.g., sorrow). 3rd Current Emotion Message Data Storage Area H729b6c stores the 3rd current emotion message data which is the message indicating that the user is in the 3rd emotional status (e.g., delight). 4th Current Emotion Message Data Storage Area H729b6d stores the 4th current emotion message data which is the message indicating that the user is in the 4th emotional status (e.g., pleasure).

This paragraph illustrates the storage area(s) included in Entire Emotion Icon Data Storage Area H729b18. In the present embodiment, Entire Emotion Icon Data Storage Area H729b18 includes 1st Emotion Icon Data Storage Area H729b18a, 2nd Emotion Icon Data Storage Area H729b18b, 3rd Emotion Icon Data Storage Area H729b18c, and 4th Emotion Icon Data Storage Area H729b18d. 1st Emotion Icon Data Storage Area H729b18a stores the 1st emotion icon data which is the image of the icon indicating that the user is in the 1st emotional status (e.g., anger). 2nd Emotion Icon Data Storage Area H729b18b stores the 2nd emotion icon data which is the image of the icon indicating that the user is in the 2nd emotional status (e.g., sorrow). 3rd Emotion Icon Data Storage Area H729b18c stores the 3rd emotion icon data which is the image of the icon indicating that the user is in the 3rd emotional status (e.g., delight). 4th Emotion Icon Data Storage Area H729b18d stores the 4th emotion icon data which is the image of the icon indicating that the user is in the 4th emotional status (e.g., pleasure).

This paragraph illustrates the storage area(s) included in Entire Time Data Storage Area H729b20. In the present embodiment, Entire Time Data Storage Area H729b20 includes First Time Data Storage Area H729b20a and Second Time Data Storage Area H729b20b. First Time Data Storage Area H729b20a stores the first time data which indicates a specific time/date. Second Time Data Storage Area H729b20b stores the second time data which indicates another specific time/date.

This paragraph illustrates the storage area(s) included in Entire Time Location Data Storage Area H729b21. In the present embodiment, Entire Time Location Data Storage Area H729b21 includes First Time Location Data Storage Area H729b21a and Second Time Location Data Storage Area H729b21b. First Time Location Data Storage Area H729b21a stores the first time location data which indicates the geographic location of Communication Device 200 at the time/date indicated by the first time data. Second Time Location Data Storage Area H729b21b stores the second time location data which indicates the geographic location of Communication Device 200 at the time/date indicated by the second time data.

This paragraph illustrates the storage area(s) included in Entire Time Emotional Status Data Storage Area H729b22. In the present embodiment, Entire Time Emotional Status Data Storage Area H729b22 includes First Time Emotional Status Data Storage Area H729b22a and Second Time Emotional Status Data Storage Area H729b22b. First Time Emotional Status Data Storage Area H729b22a stores the first time emotional status data which indicates the user's emotional status at the time/date indicated by the first time data. Second Time Emotional Status Data Storage Area H729b22b stores the second time emotional status data which indicates the user's emotional status at the time/date indicated by the second time data.

This paragraph illustrates the storage area(s) included in Entire Time Location Icon Data Storage Area H729b24. In the present embodiment, Entire Time Location Icon Data Storage Area H729b24 includes First Time Location Icon Data Storage Area H729b24a and Second Time Location Icon Data Storage Area H729b24b. First Time Location Icon Data Storage Area H729b24a stores the first time location icon data which is the image of the icon utilized to indicate the first time location data on the map data. Second Time Location Icon Data Storage Area H729b24b stores the second time location icon data which is the image of the icon utilized to indicate the second time location data on the map data.

This paragraph illustrates the software program(s) stored in Emotion Sensing Software Storage Area H729c. In the present embodiment, Emotion Sensing Software Storage Area H729c stores Current Location Data Producing Software H729c1, Emotion Sensor Data Producing Software H729c2, Currently Detected Emotional Status Data Producing Software H729c3, Indicating Current Emotion Audiovisual Data Producing Software H729c4, Indicating Current Emotion Audiovisual Data Outputting Software H729c5, Sending Current Emotion Message Data Producing Software H729c6, Sending Current Emotion Message Data Transferring Software H729c7, Current Location Notification Permitting Software H729c8, Current Location Notification Refraining Software H729c9, and Phone Call Answer Permitting Software H729c10. Current Location Data Producing Software H729c1 is the software program described hereinafter. Emotion Sensor Data Producing Software H729c2 is the software program described hereinafter. Currently Detected Emotional Status Data Producing Software H729c3 is the software program described hereinafter. Indicating Current Emotion Audiovisual Data Producing Software H729c4 is the software program described hereinafter. Indicating Current Emotion Audiovisual Data Outputting Software H729c5 is the software program described hereinafter. Sending Current Emotion Message Data Producing Software H729c6 is the software program described hereinafter. Sending Current Emotion Message Data Transferring Software H729c7 is the software program described hereinafter. Current Location Notification Permitting Software H729c8 is the software program described hereinafter. Current Location Notification Refraining Software H729c9 is the software program described hereinafter. Phone Call Answer Permitting Software H729c10 is the software program described hereinafter.

This paragraph illustrates the software program(s) stored in Emotion Sensing Software Storage Area H729c in addition to the ones described in the previous paragraph. In the present embodiment, Emotion Sensing Software Storage Area H729c further stores Phone Call Answer Refraining Software H729c11, Currently Displaying Emotion Icon Data Producing Software H729c12, Document Data Producing Software H729c13, Document Data Displaying Software H729c14, First Time Location Data Producing Software H729c15, Second Time Location Data Producing Software H729c16, First Time Emotional Status Data Producing Software H729c17, Second Time Emotional Status Data Producing Software H729c18, First Time Emotion Log Displaying Software H729c19, and Second Time Emotion Log Displaying Software H729c20. Phone Call Answer Refraining Software H729c11 is the software program described hereinafter. Currently Displaying Emotion Icon Data Producing Software H729c12 is the software program described hereinafter. Document Data Producing Software H729c13 is the software program described hereinafter. Document Data Displaying Software H729c14 is the software program described hereinafter. First Time Location Data Producing Software H729c15 is the software program described hereinafter. Second Time Location Data Producing Software H729c16 is the software program described hereinafter. First Time Emotional Status Data Producing Software H729c17 is the software program described hereinafter. Second Time Emotional Status Data Producing Software H729c18 is the software program described hereinafter. First Time Emotion Log Displaying Software H729c19 is the software program described hereinafter. Second Time Emotion Log Displaying Software H729c20 is the software program described hereinafter.

This paragraph illustrates the storage area included in RAM 206 (FIG. 1) of Communication Device 200. In the present embodiment, RAM 206 includes Emotion Sensing Info Storage Area 206729a of which the data and the software program(s) stored therein are described hereinafter.

The data and/or the software program(s) necessary to implement the present function may be downloaded from Host H to Communication Device 200.

This paragraph illustrates the storage area(s) included in Emotion Sensing Info Storage Area 206729a. In the present embodiment, Emotion Sensing Info Storage Area 206729a includes Emotion Sensing Data Storage Area 206729b and Emotion Sensing Software Storage Area 206729c. Emotion Sensing Data Storage Area 206729b stores the data necessary to implement the present function on the side of Communication Device 200, such as the one(s) described hereinafter. Emotion Sensing Software Storage Area 206729c stores the software program(s) necessary to implement the present function on the side of Communication Device 200, such as the one(s) described hereinafter.

This paragraph illustrates the storage area(s) included in Emotion Sensing Data Storage Area 206729b. In the present embodiment, Emotion Sensing Data Storage Area 206729b includes Emotion Sensor Data Storage Area 206729b1, Entire Emotion Sensor Category Data Storage Area 206729b2, Currently Detected Emotional Status Data Storage Area 206729b3, Entire Current Emotion Audiovisual Data Storage Area 206729b4, Indicating Current Emotion Audiovisual Data Storage Area 206729b5, Entire Current Emotion Message Data Storage Area 206729b6, Current Emotion Message Receiving Device Data Storage Area 20672967, Sending Current Emotion Message Data Storage Area 20672968, Current Location Data Storage Area 206729b9, Current Location Notification Permitting Emotional Status Data Storage Area 206729b10, Current Location Notification Refraining Emotional Status Data Storage Area 206729b11, and Current Location Notification Refraining Message Data Storage Area 206729b12. Emotion Sensor Data Storage Area 206729b1 stores the emotion sensor data retrieved from Emotion Sensor ES729. Here, the emotion sensor data may indicate the brainwave of a certain pattern and strength, the blood pressure of a certain level, and/or the blood flow of a certain amount. Entire Emotion Sensor Category Data Storage Area 206729b2 stores the data described hereinafter. Currently Detected Emotional Status Data Storage Area 206729b3 stores the currently detected emotional status data which is one of the following depending on the current emotional status of the user: the 1st emotion sensor category data, the 2nd emotion sensor category data, the 3rd emotion sensor category data, and the 4th emotion sensor category data. Entire Current Emotion Audiovisual Data Storage Area 206729b4 stores the data described hereinafter. Indicating Current Emotion Audiovisual Data Storage Area 206729b5 stores the indicating current emotion audiovisual data which is one of the following depending on the current emotional status of the user: the 1st current emotion audiovisual data, the 2nd current emotion audiovisual data, the 3rd current emotion audiovisual data, and the 4th current emotion audiovisual data. Entire Current Emotion Message Data Storage Area 206729b6 stores the data described hereinafter. Current Emotion Message Receiving Device Data Storage Area 20672967 stores the current emotion message receiving device data which indicates the device (not shown) which receives the sending current emotion message data. Sending Current Emotion Message Data Storage Area 20672968 stores the sending current emotion message data which is the message indicating the current status of the user's emotion. Current Location Data Storage Area 206729b9 stores the current location data which indicates the current geographic location of Communication Device 200 in (x,y,z) format. Current Location Notification Permitting Emotional Status Data Storage Area 206729b10 stores the current location notification permitting emotional status data which includes both the 3rd emotion sensor category data (e.g., delight) and the 4th emotion sensor category data (e.g., pleasure). Current Location Notification Refraining Emotional Status Data Storage Area 206729b11 stores the current location notification refraining emotional status data which includes both the 1st emotion sensor category data (e.g., anger) and the 2nd emotion sensor category data (e.g., sorrow). Current Location Notification Refraining Message Data Storage Area 206729b12 stores the current location notification refraining message data which is the message indicating that the current geographic location of the user can not be notified.

This paragraph illustrates the storage area(s) included in Emotion Sensing Data Storage Area 206729b in addition to the ones described in the previous paragraph. In the present embodiment, Emotion Sensing Data Storage Area 206729b further includes Phone Call Answer Permitting Emotional Status Data Storage Area 206729b13, Phone Call Notifying Audiovisual Data Storage Area 206729b14, Phone Call Answer Refraining Emotional Status Data Storage Area 206729b15, Phone Call Answer Refraining Message Data Storage Area 206729b16, Document Data Storage Area 206729b17, Entire Emotion Icon Data Storage Area 206729b18, Currently Displaying Emotion Icon Data Storage Area 206729b19, Entire Time Data Storage Area 206729b20, Entire Time Location Data Storage Area 206729*b*21, Entire Time Emotional Status Data Storage Area 206729*b*22, Map Data Storage Area 206729*b*23, Entire Time Location Icon Data Storage Area 206729*b*24, and Work Area 206729*b*25. Phone Call Answer Permitting Emotional Status Data Storage Area 206729*b*13 stores the phone call answer permitting emotional status data which includes both the 3rd emotion sensor category data (e.g., delight) and the 4th emotion sensor category data (e.g., pleasure). Phone Call Notifying Audiovisual Data Storage Area 206729*b*14 stores the phone call notifying audiovisual data which is the audiovisual data output from Speaker 216 (FIG. 1) and LCD 201 (FIG. 1) to notify that a phone call is received. Phone Call Answer Refraining Emotional Status Data Storage Area 206729*b*15 stores the phone call answer refraining emotional status data which includes both the 1st emotion sensor category data (e.g., anger) and the 2nd emotion sensor category data (e.g., sorrow). Phone Call Answer Refraining Message Data Storage Area 206729*b*16 stores the phone call answer refraining message data which is the message indicating that the phone call can not be answered. Document Data Storage Area 206729*b*17 stores the document data which is the document or email authored by the user. Entire Emotion Icon Data Storage Area 206729*b*18 stores the data described hereinafter. Currently Displaying Emotion Icon Data Storage Area 206729*b*19 stores the currently displaying emotion icon data which is one of the following depending on the current emotional status of the user: the 1st emotion icon data, the 2nd emotion icon data, the 3rd emotion icon data, and the 4th emotion icon data. Entire Time Data Storage Area 206729*b*20 stores the data described hereinafter. Entire Time Location Data Storage Area 206729*b*21 stores the data described hereinafter. Entire Time Emotional Status Data Storage Area 206729*b*22 stores the data described hereinafter. Map Data Storage Area 206729*b*23 stores the map data which is the three dimensional image data indicating a map. Entire Time Location Icon Data Storage Area 206729*b*24 stores the data described hereinafter. Work Area 206729*b*25 is utilized as a work area to perform calculation and temporarily store data to implement the present function.

This paragraph illustrates the storage area(s) included in Entire Emotion Sensor Category Data Storage Area 206729*b*2. In the present embodiment, Entire Emotion Sensor Category Data Storage Area 206729*b*2 includes 1st Emotion Sensor Category Data Storage Area 206729*b*2*a*, 2nd Emotion Sensor Category Data Storage Area 206729*b*2*b*, 3rd Emotion Sensor Category Data Storage Area 206729*b*2*c*, and 4th Emotion Sensor Category Data Storage Area 206729*b*2*d*. 1st Emotion Sensor Category Data Storage Area 206729*b*2*a* stores the 1st emotion sensor category data which indicates the brainwave of the 1st pattern and strength, the blood pressure of the 1st level, and/or a blood flow of the 1st amount indicating the user's 1st emotional status (e.g., anger). 2nd Emotion Sensor Category Data Storage Area 206729*b*2*b* stores the 2nd emotion sensor category data which indicates the brainwave of the 2nd pattern and strength, the blood pressure of the 2nd level, and/or a blood flow of the 2nd amount indicating the user's 2nd emotional status (e.g., sorrow). 3rd Emotion Sensor Category Data Storage Area 206729*b*2*c* stores the 3rd emotion sensor category data which indicates the brainwave of the 3rd pattern and strength, the blood pressure of the 3rd level, and/or a blood flow of the 3rd amount indicating the user's 3rd emotional status (e.g., delight). 4th Emotion Sensor Category Data Storage Area 206729*b*2*d* stores the 4th emotion sensor category data which indicates the brainwave of the 4th pattern and strength, the blood pressure of the 4th level, and/or a blood flow of the 4th amount indicating the user's 4th emotional status (e.g., pleasure).

This paragraph illustrates the storage area(s) included in Entire Current Emotion Audiovisual Data Storage Area 206729*b*4. In the present embodiment, Entire Current Emotion Audiovisual Data Storage Area 206729*b*4 includes 1st Current Emotion Audiovisual Data Storage Area 206729*b*4*a*, 2nd Current Emotion Audiovisual Data Storage Area 206729*b*4*b*, 3rd Current Emotion Audiovisual Data Storage Area 206729*b*4*c*, and 4th Current Emotion Audiovisual Data Storage Area 206729*b*4*d*. 1st Current Emotion Audiovisual Data Storage Area 206729*b*4*a* stores the 1st current emotion audiovisual data which is the audiovisual data output from Communication Device 200 when the 1st emotion sensor category data is stored as the currently detected emotional status data in Currently Detected Emotional Status Data Storage Area 206729*b*3. 2nd Current Emotion Audiovisual Data Storage Area 206729*b*4*b* stores the 2nd current emotion audiovisual data which is the audiovisual data output from Communication Device 200 when the 2nd emotion sensor category data is stored as the currently detected emotional status data in Currently Detected Emotional Status Data Storage Area 206729*b*3. 3rd Current Emotion Audiovisual Data Storage Area 206729*b*4*c* stores the 3rd current emotion audiovisual data which is the audiovisual data output from Communication Device 200 when the 3rd emotion sensor category data is stored as the currently detected emotional status data in Currently Detected Emotional Status Data Storage Area 206729*b*3. 4th Current Emotion Audiovisual Data Storage Area 206729*b*4*d* stores the 4th current emotion audiovisual data which is the audiovisual data output from Communication Device 200 when the 4th emotion sensor category data is stored as the currently detected emotional status data in Currently Detected Emotional Status Data Storage Area 206729*b*3.

This paragraph illustrates the storage area(s) included in Entire Current Emotion Message Data Storage Area 206729*b*6. In the present embodiment, Entire Current Emotion Message Data Storage Area 206729*b*6 includes 1st Current Emotion Message Data Storage Area 206729*b*6*a*, 2nd Current Emotion Message Data Storage Area 206729*b*6*b*, 3rd Current Emotion Message Data Storage Area 206729*b*6*c*, and 4th Current Emotion Message Data Storage Area 206729*b*6*d*. 1st Current Emotion Message Data Storage Area 206729*b*6*a* stores the 1st current emotion message data which is the message indicating that the user is in the 1st emotional status (e.g., anger). 2nd Current Emotion Message Data Storage Area 206729*b*6*b* stores the 2nd current emotion message data which is the message indicating that the user is in the 2nd emotional status (e.g., sorrow). 3rd Current Emotion Message Data Storage Area 206729*b*6*c* stores the 3rd current emotion message data which is the message indicating that the user is in the 3rd emotional status (e.g., delight). 4th Current Emotion Message Data Storage Area 206729*b*6*d* stores the 4th current emotion message data which is the message indicating that the user is in the 4th emotional status (e.g., pleasure).

This paragraph illustrates the storage area(s) included in Entire Emotion Icon Data Storage Area 206729*b*18. In the present embodiment, Entire Emotion Icon Data Storage Area 206729*b*18 includes 1st Emotion Icon Data Storage Area 206729*b*18*a*, 2nd Emotion Icon Data Storage Area 206729*b*18*b*, 3rd Emotion Icon Data Storage Area 206729*b*18*c*, and 4th Emotion Icon Data Storage Area 206729*b*18*d*. 1st Emotion Icon Data Storage Area 206729*b*18*a* stores the 1st emotion icon data which is the image of the icon indicating that the user is in the 1st emotional status (e.g., anger). 2nd Emotion Icon Data Storage Area 206729*b*18*b* stores the 2nd emotion icon data which is the image of the icon indicating that the user is in the 2nd emotional status (e.g., sorrow). 3rd Emotion Icon Data Storage Area 206729*b*18*c* stores the 3rd emotion icon data which is the image of the icon indicating that the user is in the 3rd emotional status (e.g., delight). 4th Emotion Icon Data Storage Area 206729*b*18*d* stores the 4th emotion icon data which is the image of the icon indicating that the user is in the 4th emotional status (e.g., pleasure).

This paragraph illustrates the storage area(s) included in Entire Time Data Storage Area 206729*b*20. In the present embodiment, Entire Time Data Storage Area 206729*b*20 includes First Time Data Storage Area 206729*b*20*a* and Second Time Data Storage Area 206729*b*20*b*. First Time Data Storage Area 206729*b*20*a* stores the first time data which indicates a specific time/date. Second Time Data Storage Area 206729*b*20*b* stores the second time data which indicates another specific time/date.

This paragraph illustrates the storage area(s) included in Entire Time Location Data Storage Area 206729*b*21. In the present embodiment, Entire Time Location Data Storage Area 206729*b*21 includes First Time Location Data Storage Area 206729*b*21*a* and Second Time Location Data Storage Area 206729*b*21*b*. First Time Location Data Storage Area 206729*b*21*a* stores the first time location data which indicates the geographic location of Communication Device 200 at the time/date indicated by the first time data. Second Time Location Data Storage Area 206729*b*21*b* stores the second time location data which indicates the geographic location of Communication Device 200 at the time/date indicated by the second time data.

This paragraph illustrates the storage area(s) included in Entire Time Emotional Status Data Storage Area 206729*b*22. In the present embodiment, Entire Time Emotional Status Data Storage Area 206729*b*22 includes First Time Emotional Status Data Storage Area 206729*b*22*a* and Second Time Emotional Status Data Storage Area 206729*b*22*b*. First Time Emotional Status Data Storage Area 206729*b*22*a* stores the first time emotional status data which indicates the user's emotional status at the time/date indicated by the first time data. Second Time Emotional Status Data Storage Area 206729*b*22*b* stores the second time emotional status data which indicates the user's emotional status at the time/date indicated by the second time data.

This paragraph illustrates the storage area(s) included in Entire Time Location Icon Data Storage Area 206729*b*24. In the present embodiment, Entire Time Location Icon Data Storage Area 206729*b*24 includes First Time Location Icon Data Storage Area 206729*b*24*a* and Second Time Location Icon Data Storage Area 206729*b*24*b*. First Time Location Icon Data Storage Area 206729*b*24*a* stores the first time location icon data which is the image of the icon utilized to indicate the first time location data on the map data. Second Time Location Icon Data Storage Area 206729*b*24*b* stores the second time location icon data which is the image of the icon utilized to indicate the second time location data on the map data.

This paragraph illustrates the software program(s) stored in Emotion Sensing Software Storage Area 206729*c*. In the present embodiment, Emotion Sensing Software Storage Area 206729*c* stores Current Location Data Producing Software 206729*c*1, Emotion Sensor Data Producing Software 206729*c*2, Currently Detected Emotional Status Data Producing Software 206729*c*3, Indicating Current Emotion Audiovisual Data Producing Software 206729*c*4, Indicating Current Emotion Audiovisual Data Outputting Software 206729*c*5, Sending Current Emotion Message Data Producing Software 206729*c*6, Sending Current Emotion Message Data Transferring Software 206729*c*7, Current Location Notification Permitting Software 206729*c*8, Current Location Notification Refraining Software 206729*c*9, and Phone Call Answer Permitting Software 206729*c*10. Current Location Data Producing Software 206729*c*1 is the software program described hereinafter. Emotion Sensor Data Producing Software 206729*c*2 is the software program described hereinafter. Currently Detected Emotional Status Data Producing Software 206729*c*3 is the software program described hereinafter. Indicating Current Emotion Audiovisual Data Producing Software 206729*c*4 is the software program described hereinafter. Indicating Current Emotion Audiovisual Data Outputting Software 206729*c*5 is the software program described hereinafter. Sending Current Emotion Message Data Producing Software 206729*c*6 is the software program described hereinafter. Sending Current Emotion Message Data Transferring Software 206729*c*7 is the software program described hereinafter. Current Location Notification Permitting Software 206729*c*8 is the software program described hereinafter. Current Location Notification Refraining Software 206729*c*9 is the software program described hereinafter. Phone Call Answer Permitting Software 206729*c*10 is the software program described hereinafter.

This paragraph illustrates the software program(s) stored in Emotion Sensing Software Storage Area 206729*c* (Cont.). In the present embodiment, Emotion Sensing Software Storage Area 206729*c* (Cont.) stores Phone Call Answer Refraining Software 206729*c*11, Currently Displaying Emotion Icon Data Producing Software 206729*c*12, Document Data Producing Software 206729*c*13, Document Data Displaying Software 206729*c*14, First Time Location Data Producing Software 206729*c*15, Second Time Location Data Producing Software 206729*c*16, First Time Emotional Status Data Producing Software 206729*c*17, Second Time Emotional Status Data Producing Software 206729*c*18, First Time Emotion Log Displaying Software 206729*c*19, and Second Time Emotion Log Displaying Software 206729*c*20. Phone Call Answer Refraining Software 206729*c*11 is the software program described hereinafter. Currently Displaying Emotion Icon Data Producing Software 206729*c*12 is the software program described hereinafter. Document Data Producing Software 206729*c*13 is the software program described hereinafter. Document Data Displaying Software 206729*c*14 is the software program described hereinafter. First Time Location Data Producing Software 206729*c*15 is the software program described hereinafter. Second Time Location Data Producing Software 206729*c*16 is the software program described hereinafter. First Time Emotional Status Data Producing Software 206729*c*17 is the software program described hereinafter. Second Time Emotional Status Data Producing Software 206729*c*18 is the software program described hereinafter. First Time Emotion Log Displaying Software 206729*c*19 is the software program described hereinafter. Second Time Emotion Log Displaying Software 206729*c*20 is the software program described hereinafter.

This paragraph illustrate(s) Current Location Data Producing Software H729*c*1 of Host H and Current Location Data Producing Software 206729*c*1 of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step and sends the data to Host H in a wireless fashion (S2). Host H receives the current location data from Communication Device 200 and stores the data in Current Location Data Storage Area H729*b*9 (S3). The foregoing sequence is repeated periodically.

This paragraph illustrate(s) Emotion Sensor Data Producing Software H729*c*2 of Host H and Emotion Sensor Data Producing Software 206729*c*2 of Communication Device 200, which produce(s) the emotion sensor data. In the present embodiment, CPU 211 (FIG. 1) retrieves the emotion sensor data via Emotion Sensor ES729 and sends the data to Host H in a wireless fashion (S1). Host H receives the emotion sensor data from Communication Device 200 and stores the data in Emotion Sensor Data Storage Area H729*b*1 (S2). The foregoing sequence is repeated periodically.

This paragraph illustrate(s) Currently Detected Emotional Status Data Producing Software H729*c*3 of Host H, which produce(s) the currently detected emotional status data. In the present embodiment, Host H retrieves the emotion sensor data from Emotion Sensor Data Storage Area H729*b*1 (S1). Host H identifies the data (e.g., the 1st emotion sensor category data) stored in Entire Emotion Sensor Category Data Storage Area H729*b*2 corresponding to the emotion sensor data retrieved in the previous step (S2). Host H stores the data (e.g., the 1st emotion sensor category data) identified in the previous step as the currently detected emotional status data in Currently Detected Emotional Status Data Storage Area H729*b*3 (S3). The foregoing sequence is repeated periodically.

This paragraph illustrate(s) Indicating Current Emotion Audiovisual Data Producing Software H729*c*4 of Host H, which produce(s) the indicating current emotion audiovisual data. In the present embodiment, Host H identifies the currently detected emotional status data (e.g., the 1st emotion sensor category data) stored in Currently Detected Emotional Status Data Storage Area H729*b*3 (S1). Host H identifies the data (e.g., the 1st current emotion audiovisual data) stored in Entire Current Emotion Audiovisual Data Storage Area H729*b*4 corresponding to the currently detected emotional status data identified in the previous step (S2). Host H stores the data (e.g., the 1st current emotion audiovisual data) identified in the previous step as the indicating current emotion audiovisual data in Indicating Current Emotion Audiovisual Data Storage Area H729*b*5 (S3). The foregoing sequence is repeated periodically.

This paragraph illustrate(s) Indicating Current Emotion Audiovisual Data Outputting Software H729*c*5 of Host H and Indicating Current Emotion Audiovisual Data Outputting Software 206729*c*5 of Communication Device 200, which output(s) the indicating current emotion audiovisual data. In the present embodiment, Host H retrieves the indicating current emotion audiovisual data from Indicating Current Emotion Audiovisual Data Storage Area H729*b*5 and sends the data to Communication Device 200 (S1). CPU 211 (FIG. 1) receives the indicating current emotion audiovisual data from Host H in a wireless fashion and outputs the data from Speaker 216 (FIG. 1) and LCD 201 (FIG. 1) (S2). The foregoing sequence is repeated periodically.

This paragraph illustrate(s) Sending Current Emotion Message Data Producing Software H729*c*6 of Host H, which produce(s) the sending current emotion message data. In the present embodiment, Host H identifies the currently detected emotional status data (e.g., the 1st emotion sensor category data) stored in Currently Detected Emotional Status Data Storage Area H729*b*3 (S1). Host H identifies the data (e.g., the 1st current emotion message data) stored in Entire Current Emotion Message Data Storage Area H729*b*6 corresponding to the currently detected emotional status data identified in the previous step (S2). Host H stores the data (e.g., the 1st current emotion message data) identified in the previous step as the sending current emotion message data in Sending Current Emotion Message Data Storage Area H72968 (S3). The foregoing sequence is repeated periodically.

This paragraph illustrate(s) Sending Current Emotion Message Data Transferring Software H729*c*7 of Host H, which transfer(s) the sending current emotion message data. In the present embodiment, Host H retrieves the sending current emotion message data from Sending Current Emotion Message Data Storage Area H72968 (S1). Host H retrieves the current emotion message receiving device data from Current Emotion Message Receiving Device Data Storage Area H72967 (S2). Host H sends the sending current emotion message data retrieved in S1 to the device indicated by the current emotion message receiving device data retrieved in the previous step (S3). By implementing the present sequence, the recipient of this message data is capable to know the current emotional status of the user. The foregoing sequence is repeated periodically.

This paragraph illustrate(s) Current Location Notification Permitting Software H729*c*8 of Host H, which permit(s) to notify the current geographic location of the user. In the present embodiment, Host H periodically checks the incoming signal addressed to Communication Device 200 (S1). If the incoming signal indicates the current location notifying request, Host H proceeds to the next step (S2). Here, the current location notifying request indicates the request of another device (not shown) to notify the current geographic location of Communication Device 200. Host H retrieves the currently detected emotional status data from Currently Detected Emotional Status Data Storage Area H729*b*3 (S3). Host H retrieves the current location notification permitting emotional status data from Current Location Notification Permitting Emotional Status Data Storage Area H729*b*10 (S4). If the currently detected emotional status data retrieved in S3 is included in the current location notification permitting emotional status data retrieved in the previous step, Host H proceeds to the next step (S5). Host H retrieves the current location data from Current Location Data Storage Area H729*b*9 (S6). Host H sends the current location data retrieved in the previous step (S7). Here, the current location data is sent in response to the current location notifying request. The foregoing sequence is repeated periodically.

This paragraph illustrate(s) Current Location Notification Refraining Software H729*c*9 of Host H, which refrain(s) from notifying the current geographic location of the user. In the present embodiment, Host H periodically checks the incoming signal addressed to Communication Device 200 (S1). If the incoming signal indicates the current location notifying request, Host H proceeds to the next step (S2). Here, the current location notifying request indicates the request of another device (not shown) to notify the current geographic location of Communication Device 200. Host H retrieves the currently detected emotional status data from Currently Detected Emotional Status Data Storage Area H729*b*3 (S3). Host H retrieves the current location notification refraining emotional status data from Current Location Notification Refraining Emotional Status Data Storage Area H729*b*11 (S4). If the currently detected emotional status data retrieved in S3 is included in the current location notification refraining emotional status data retrieved in the previous step, Host H proceeds to the next step (S5). Host H retrieves the current location notification refraining message data from Current Location Notification Refraining Message Data Storage Area H729*b*12 (S6). Host H sends the current location notification refraining message data retrieved in the previous step (S7). Here, the current geographic location of the user is not notified and the current location notification refraining message data is sent in response to the current location notifying request. The foregoing sequence is repeated periodically.

This paragraph illustrate(s) Phone Call Answer Permitting Software H729c10 of Host H and Phone Call Answer Permitting Software 206729c10 of Communication Device 200, which permit(s) to answer phone call. In the present embodiment, Host H periodically checks the incoming signal addressed to Communication Device 200 (S1). If the incoming signal indicates a phone call, Host H proceeds to the next step (S2). Host H retrieves the currently detected emotional status data from Currently Detected Emotional Status Data Storage Area H729b3 (S3). Host H retrieves the phone call answer permitting emotional status data from Phone Call Answer Permitting Emotional Status Data Storage Area H729b13 (S4). If the currently detected emotional status data retrieved in S3 is included in the phone call answer permitting emotional status data retrieved in the previous step, Host H proceeds to the next step (S5). Host H retrieves the phone call notifying audiovisual data from Phone Call Notifying Audiovisual Data Storage Area H729b14 and sends the data to Communication Device 200 (S6). CPU 211 (FIG. 1) receives the phone call notifying audiovisual data from Host H in a wireless fashion and outputs the data from Speaker 216 (FIG. 1) and LCD 201 (FIG. 1) (S7). The foregoing sequence is repeated periodically.

This paragraph illustrate(s) Phone Call Answer Refraining Software H729c11 of Host H, which refrain(s) from answering phone call. In the present embodiment, Host H periodically checks the incoming signal addressed to Communication Device 200 (S1). If the incoming signal indicates a phone call, Host H proceeds to the next step (S2). Host H retrieves the currently detected emotional status data from Currently Detected Emotional Status Data Storage Area H729b3 (S3). Host H retrieves the phone call answer refraining emotional status data from Phone Call Answer Refraining Emotional Status Data Storage Area H729b15 (S4). If the currently detected emotional status data retrieved in S3 is included in the phone call answer refraining emotional status data retrieved in the previous step, Host H proceeds to the next step (S5). Host H retrieves the phone call answer refraining message data from Phone Call Answer Refraining Message Data Storage Area H729b16 (S6). Host H sends the phone call answer refraining message data retrieved in the previous step (S7). Here, the phone call is not answered and the phone call answer refraining message data is sent to the caller instead. The foregoing sequence is repeated periodically.

This paragraph illustrate(s) Currently Displaying Emotion Icon Data Producing Software H729c12 of Host H, which produce(s) the currently displaying emotion icon data. In the present embodiment, Host H identifies the currently detected emotional status data (e.g., the 1st emotion sensor category data) stored in Currently Detected Emotional Status Data Storage Area H729b3 (S1). Host H identifies the data (e.g., the 1st emotion icon data) stored in Entire Emotion Icon Data Storage Area H729b18 corresponding to the currently detected emotional status data identified in the previous step (S2). Host H stores the data (e.g., the 1st emotion icon data) identified in the previous step as the currently displaying emotion icon data in Currently Displaying Emotion Icon Data Storage Area H729b19 (S3). The foregoing sequence is repeated periodically.

This paragraph illustrate(s) Document Data Producing Software H729c13 of Host H and Document Data Producing Software 206729c13 of Communication Device 200, which produce(s) the document data. In the present embodiment, Host H retrieves the currently displaying emotion icon data from Currently Displaying Emotion Icon Data Storage Area H729b19 and sends the data to Communication Device 200 (S1). CPU 211 (FIG. 1) receives the currently displaying emotion icon data from Host H in a wireless fashion (S2). CPU 211 (FIG. 1) produces the document data in accordance with the alphanumeric data input via Input Device 210 (FIG. 1) or voice recognition system with the currently displaying emotion icon data embedded therein. (S3). CPU 211 (FIG. 1) sends the document data produced in the previous step to Host H in a wireless fashion (S4). Host H receives the document data from Communication Device 200 and stores the data in Document Data Storage Area H729b17 (S5).

This paragraph illustrate(s) Document Data Displaying Software H729c14 of Host H and Document Data Displaying Software 206729c14 of Communication Device 200, which display(s) the document data. In the present embodiment, Host H retrieves the document data from Document Data Storage Area H729b17 and sends the data to Communication Device 200 (S1). CPU 211 (FIG. 1) receives the document data from Host H in a wireless fashion and displays the data on LCD 201 (FIG. 1) (S2). Here, the currently displaying emotion icon data embedded in the document data is also displayed.

This paragraph illustrate(s) First Time Location Data Producing Software H729c15 of Host H, which produce(s) the first time location data. In the present embodiment, Host H retrieves the first time data from First Time Data Storage Area H729b20a (S1). Host H identifies the current time (S2). If the first time data retrieved in S1 matches with the current time identified in the previous step, Host H proceeds to the next step (S3). Host H retrieves the current location data from Current Location Data Storage Area H729b9 (S4). Host H stores the current location data retrieved in the previous step as the first time location data in First Time Location Data Storage Area H729b21a (S5). The foregoing sequence is repeated periodically.

This paragraph illustrate(s) Second Time Location Data Producing Software H729c16 of Host H, which produce(s) the second time location data. In the present embodiment, Host H retrieves the second time data from Second Time Data Storage Area H729b20b (S1). Host H identifies the current time (S2). If the second time data retrieved in S1 matches with the current time identified in the previous step, Host H proceeds to the next step (S3). Host H retrieves the current location data from Current Location Data Storage Area H729b9 (S4). Host H stores the current location data retrieved in the previous step as the second time location data in Second Time Location Data Storage Area H729b21b (S5). The foregoing sequence is repeated periodically.

This paragraph illustrate(s) First Time Emotional Status Data Producing Software H729c17 of Host H, which produce(s) the first time emotional status data. In the present embodiment, Host H retrieves the first time data from First Time Data Storage Area H729b20a (S1). Host H identifies the current time (S2). If the first time data retrieved in S1 matches with the current time identified in the previous step, Host H proceeds to the next step (S3). Host H retrieves the currently detected emotional status data from Currently Detected Emotional Status Data Storage Area H729b3 (S4). Host H stores the currently detected emotional status data retrieved in the previous step as the first time emotional status data in First Time Emotional Status Data Storage Area H729b22a (S5). The foregoing sequence is repeated periodically.

This paragraph illustrate(s) Second Time Emotional Status Data Producing Software H729c18 of Host H, which produce(s) the second time emotional status data. In the present embodiment, Host H retrieves the second time data from Second Time Data Storage Area H729b20b (S1). Host H identifies the current time (S2). If the second time data retrieved in S1 matches with the current time identified in the previous step, Host H proceeds to the next step (S3). Host H retrieves the currently detected emotional status data from Currently Detected Emotional Status Data Storage Area H729b3 (S4). Host H stores the currently detected emotional status data retrieved in the previous step as the second time emotional status data in Second Time Emotional Status Data Storage Area H729b22b (S5). The foregoing sequence is repeated periodically.

This paragraph illustrate(s) First Time Emotion Log Displaying Software H729c19 of Host H and First Time Emotion Log Displaying Software 206729c19 of Communication Device 200, which display(s) the log of the user's emotional status at the time/date indicated by the first time data. In the present embodiment, Host H retrieves the first time data from First Time Data Storage Area H729b20a and sends the data to Communication Device 200 (S1). CPU 211 (FIG. 1) receives the first time data from Host H in a wireless fashion and displays the data on LCD 201 (FIG. 1) (S2). Host H retrieves the map data from Map Data Storage Area H729b23 and sends the data to Communication Device 200 (S3). CPU 211 (FIG. 1) receives the map data from Host H in a wireless fashion and displays the data on LCD 201 (FIG. 1) (S4). Host H retrieves the first time location data from First Time Location Data Storage Area H729b21a and sends the data to Communication Device 200 (S5). CPU 211 (FIG. 1) receives the first time location data from Host H in a wireless fashion (S6). Host H retrieves the first time location icon data from First Time Location Icon Data Storage Area H729b24a and sends the data to Communication Device 200 (S7). CPU 211 (FIG. 1) receives the first time location icon data from Host H in a wireless fashion (S8). CPU 211 (FIG. 1) displays the first time location icon data received in the previous step at the location corresponding to the first time location data received in S6 on the map data displayed in S4 (S9). Host H retrieves the first time emotional status data from First Time Emotional Status Data Storage Area H729b22a and sends the data to Communication Device 200 (S10). CPU 211 (FIG. 1) receives the first time emotional status data from Host H in a wireless fashion and displays the data on LCD 201 (FIG. 1) (S11). The foregoing sequence is repeated periodically.

This paragraph illustrate(s) Second Time Emotion Log Displaying Software H729c20 of Host H and Second Time Emotion Log Displaying Software 206729c20 of Communication Device 200, which display(s) the log of the user's emotional status at the time/date indicated by the second time data. In the present embodiment, Host H retrieves the second time data from Second Time Data Storage Area H729b20b and sends the data to Communication Device 200 (S1). CPU 211 (FIG. 1) receives the second time data from Host H in a wireless fashion and displays the data on LCD 201 (FIG. 1) (S2). Host H retrieves the map data from Map Data Storage Area H729b23 and sends the data to Communication Device 200 (S3). CPU 211 (FIG. 1) receives the map data from Host H in a wireless fashion and displays the data on LCD 201 (FIG. 1) (S4). Host H retrieves the second time location data from Second Time Location Data Storage Area H729b21b and sends the data to Communication Device 200 (S5). CPU 211 (FIG. 1) receives the second time location data from Host H in a wireless fashion (S6). Host H retrieves the second time location icon data from Second Time Location Icon Data Storage Area H729b24b and sends the data to Communication Device 200 (S7). CPU 211 (FIG. 1) receives the second time location icon data from Host H in a wireless fashion (S8). CPU 211 (FIG. 1) displays the second time location icon data received in the previous step at the location corresponding to the second time location data received in S6 on the map data displayed in S4 (S9). Host H retrieves the second time emotional status data from Second Time Emotional Status Data Storage Area H729b22b and sends the data to Communication Device 200 (S10). CPU 211 (FIG. 1) receives the second time emotional status data from Host H in a wireless fashion and displays the data on LCD 201 (FIG. 1) (S11). The foregoing sequence is repeated periodically.

The following paragraphs illustrate another embodiment wherein Communication Device 200 plays the major role in implementing the present function.

This paragraph illustrate(s) Current Location Data Producing Software 206729c1 of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step (S2). CPU 211 (FIG. 1) stores the current location data produced in the previous step in Current Location Data Storage Area 206729b9 (S3). The foregoing sequence is repeated periodically.

This paragraph illustrate(s) Emotion Sensor Data Producing Software 206729c2 of Communication Device 200, which produce(s) the emotion sensor data. In the present embodiment, CPU 211 (FIG. 1) retrieves the emotion sensor data via Emotion Sensor ES729 (S1). CPU 211 (FIG. 1) stores the emotion sensor data retrieved in the previous step in Emotion Sensor Data Storage Area 206729b1 (S2). The foregoing sequence is repeated periodically.

This paragraph illustrate(s) Currently Detected Emotional Status Data Producing Software 206729c3 of Communication Device 200, which produce(s) the currently detected emotional status data. In the present embodiment, CPU 211 (FIG. 1) retrieves the emotion sensor data from Emotion Sensor Data Storage Area 206729b1 (S1). CPU 211 (FIG. 1) identifies the data (e.g., the 1st emotion sensor category data) stored in Entire Emotion Sensor Category Data Storage Area 206729b2 corresponding to the emotion sensor data retrieved in the previous step (S2). CPU 211 (FIG. 1) stores the data (e.g., the 1st emotion sensor category data) identified in the previous step as the currently detected emotional status data in Currently Detected Emotional Status Data Storage Area 206729b3 (S3). The foregoing sequence is repeated periodically.

This paragraph illustrate(s) Indicating Current Emotion Audiovisual Data Producing Software 206729c4 of Communication Device 200, which produce(s) the indicating current emotion audiovisual data. In the present embodiment, CPU 211 (FIG. 1) identifies the currently detected emotional status data (e.g., the 1st emotion sensor category data) stored in Currently Detected Emotional Status Data Storage Area 206729b3 (S1). CPU 211 (FIG. 1) identifies the data (e.g., the 1st current emotion audiovisual data) stored in Entire Current Emotion Audiovisual Data Storage Area 206729b4 corresponding to the currently detected emotional status data identified in the previous step (S2). CPU 211 (FIG. 1) stores the data (e.g., the 1st current emotion audiovisual data) identified in the previous step as the indicating current emotion audiovisual data in Indicating Current Emotion Audiovisual Data Storage Area 206729b5 (S3). The foregoing sequence is repeated periodically.

This paragraph illustrate(s) Indicating Current Emotion Audiovisual Data Outputting Software 206729c5 of Communication Device 200, which output(s) the indicating current emotion audiovisual data. In the present embodiment, CPU 211 (FIG. 1) retrieves the indicating current emotion audiovisual data from Indicating Current Emotion Audiovisual Data Storage Area 206729*b*5 (S1). CPU 211 (FIG. 1) outputs the indicating current emotion audiovisual data retrieved in the previous step from Speaker 216 (FIG. 1) and LCD 201 (FIG. 1) (S2). The foregoing sequence is repeated periodically.

This paragraph illustrate(s) Sending Current Emotion Message Data Producing Software 206729*c*6 of Communication Device 200, which produce(s) the sending current emotion message data. In the present embodiment, CPU 211 (FIG. 1) identifies the currently detected emotional status data (e.g., the 1st emotion sensor category data) stored in Currently Detected Emotional Status Data Storage Area 206729*b*3 (S1). CPU 211 (FIG. 1) identifies the data (e.g., the 1st current emotion message data) stored in Entire Current Emotion Message Data Storage Area 206729*b*6 corresponding to the currently detected emotional status data identified in the previous step (S2). CPU 211 (FIG. 1) stores the data (e.g., the 1st current emotion message data) identified in the previous step as the sending current emotion message data in Sending Current Emotion Message Data Storage Area 2067296*8* (S3). The foregoing sequence is repeated periodically.

This paragraph illustrate(s) Sending Current Emotion Message Data Transferring Software 206729*c*7 of Communication Device 200, which transfer(s) the sending current emotion message data. In the present embodiment, CPU 211 (FIG. 1) retrieves the sending current emotion message data from Sending Current Emotion Message Data Storage Area 2067296*8* (S1). CPU 211 (FIG. 1) retrieves the current emotion message receiving device data from Current Emotion Message Receiving Device Data Storage Area 2067296*7* (S2). CPU 211 (FIG. 1) sends the sending current emotion message data retrieved in S1 to the device indicated by the current emotion message receiving device data retrieved in the previous step (S3). By implementing the present sequence, the recipient of this message data is capable to know the current emotional status of the user. The foregoing sequence is repeated periodically.

This paragraph illustrate(s) Current Location Notification Permitting Software 206729*c*8 of Communication Device 200, which permit(s) to notify the current geographic location of the user. In the present embodiment, CPU 211 (FIG. 1) periodically checks the incoming signal addressed to Communication Device 200 (S1). If the incoming signal indicates the current location notifying request, CPU 211 (FIG. 1) proceeds to the next step (S2). Here, the current location notifying request indicates the request of another device (not shown) to notify the current geographic location of Communication Device 200. CPU 211 (FIG. 1) retrieves the currently detected emotional status data from Currently Detected Emotional Status Data Storage Area 206729*b*3 (S3). CPU 211 (FIG. 1) retrieves the current location notification permitting emotional status data from Current Location Notification Permitting Emotional Status Data Storage Area 206729*b*10 (S4). If the currently detected emotional status data retrieved in S3 is included in the current location notification permitting emotional status data retrieved in the previous step, CPU 211 (FIG. 1) proceeds to the next step (S5). CPU 211 (FIG. 1) retrieves the current location data from Current Location Data Storage Area 206729*b*9 (S6). CPU 211 (FIG. 1) sends the current location data retrieved in the previous step (S7). Here, the current location data is sent in response to the current location notifying request. The foregoing sequence is repeated periodically.

This paragraph illustrate(s) Current Location Notification Refraining Software 206729*c*9 of Communication Device 200, which refrain(s) from notifying the current geographic location of the user. In the present embodiment, CPU 211 (FIG. 1) periodically checks the incoming signal addressed to Communication Device 200 (S1). If the incoming signal indicates the current location notifying request, CPU 211 (FIG. 1) proceeds to the next step (S2). Here, the current location notifying request indicates the request of another device (not shown) to notify the current geographic location of Communication Device 200. CPU 211 (FIG. 1) retrieves the currently detected emotional status data from Currently Detected Emotional Status Data Storage Area 206729*b*3 (S3). CPU 211 (FIG. 1) retrieves the current location notification refraining emotional status data from Current Location Notification Refraining Emotional Status Data Storage Area 206729*b*11 (S4). If the currently detected emotional status data retrieved in S3 is included in the current location notification refraining emotional status data retrieved in the previous step, CPU 211 (FIG. 1) proceeds to the next step (S5). CPU 211 (FIG. 1) retrieves the current location notification refraining message data from Current Location Notification Refraining Message Data Storage Area 206729*b*12 (S6). CPU 211 (FIG. 1) sends the current location notification refraining message data retrieved in the previous step (S7). Here, the current geographic location of the user is not notified and the current location notification refraining message data is sent in response to the current location notifying request. The foregoing sequence is repeated periodically.

This paragraph illustrate(s) Phone Call Answer Permitting Software 206729*c*10 of Communication Device 200, which permit(s) to answer phone call. In the present embodiment, CPU 211 (FIG. 1) periodically checks the incoming signal addressed to Communication Device 200 (S1). If the incoming signal indicates a phone call, CPU 211 (FIG. 1) proceeds to the next step (S2). CPU 211 (FIG. 1) retrieves the currently detected emotional status data from Currently Detected Emotional Status Data Storage Area 206729*b*3 (S3). CPU 211 (FIG. 1) retrieves the phone call answer permitting emotional status data from Phone Call Answer Permitting Emotional Status Data Storage Area 206729*b*13 (S4). If the currently detected emotional status data retrieved in S3 is included in the phone call answer permitting emotional status data retrieved in the previous step, CPU 211 (FIG. 1) proceeds to the next step (S5). CPU 211 (FIG. 1) retrieves the phone call notifying audiovisual data from Phone Call Notifying Audiovisual Data Storage Area 206729*b*14 (S6). CPU 211 (FIG. 1) outputs the phone call notifying audiovisual data retrieved in the previous step from Speaker 216 (FIG. 1) and LCD 201 (FIG. 1) (S7). The foregoing sequence is repeated periodically.

This paragraph illustrate(s) Phone Call Answer Refraining Software 206729*c*11 of Communication Device 200, which refrain(s) from answering phone call. In the present embodiment, CPU 211 (FIG. 1) periodically checks the incoming signal addressed to Communication Device 200 (S1). If the incoming signal indicates a phone call, CPU 211 (FIG. 1) proceeds to the next step (S2). CPU 211 (FIG. 1) retrieves the currently detected emotional status data from Currently Detected Emotional Status Data Storage Area 206729*b*3 (S3). CPU 211 (FIG. 1) retrieves the phone call answer refraining emotional status data from Phone Call Answer Refraining Emotional Status Data Storage Area 206729*b*15 (S4). If the currently detected emotional status data retrieved in S3 is included in the phone call answer refraining emotional status data retrieved in the previous step, CPU 211 (FIG. 1) proceeds to the next step (S5). CPU 211 (FIG. 1) retrieves the phone call answer refraining message data from Phone Call Answer Refraining Message Data Storage Area 206729*b*16 (S6). CPU 211 (FIG. 1) sends the phone call answer refraining message data retrieved in the previous step (S7). Here, the phone call is not answered and the phone call answer refraining message data is sent to the caller instead. The foregoing sequence is repeated periodically.

This paragraph illustrate(s) Currently Displaying Emotion Icon Data Producing Software 206729*c*12 of Communication Device 200, which produce(s) the currently displaying emotion icon data. In the present embodiment, CPU 211 (FIG. 1) identifies the currently detected emotional status data (e.g., the 1st emotion sensor category data) stored in Currently Detected Emotional Status Data Storage Area 206729*b*3 (S1). CPU 211 (FIG. 1) identifies the data (e.g., the 1st emotion icon data) stored in Entire Emotion Icon Data Storage Area 206729*b*18 corresponding to the currently detected emotional status data identified in the previous step (S2). CPU 211 (FIG. 1) stores the data (e.g., the 1st emotion icon data) identified in the previous step as the currently displaying emotion icon data in Currently Displaying Emotion Icon Data Storage Area 206729*b*19 (S3). The foregoing sequence is repeated periodically.

This paragraph illustrate(s) Document Data Producing Software 206729*c*13 of Communication Device 200, which produce(s) the document data. In the present embodiment, CPU 211 (FIG. 1) retrieves the currently displaying emotion icon data from Currently Displaying Emotion Icon Data Storage Area 206729*b*19 (S1). CPU 211 (FIG. 1) produces the document data in accordance with the alphanumeric data input via Input Device 210 (FIG. 1) or voice recognition system with the currently displaying emotion icon data embedded therein. (S2). CPU 211 (FIG. 1) stores the document data produced in the previous step in Document Data Storage Area 206729*b*17 (S3).

This paragraph illustrate(s) Document Data Displaying Software 206729*c*14 of Communication Device 200, which display(s) the document data. In the present embodiment, CPU 211 (FIG. 1) retrieves the document data from Document Data Storage Area 206729*b*17 (S1). CPU 211 (FIG. 1) displays the document data retrieved in the previous step on LCD 201 (FIG. 1) (S2). Here, the currently displaying emotion icon data embedded in the document data is also displayed.

This paragraph illustrate(s) First Time Location Data Producing Software 206729*c*15 of Communication Device 200, which produce(s) the first time location data. In the present embodiment, CPU 211 (FIG. 1) retrieves the first time data from First Time Data Storage Area 206729*b*20*a* (S1). CPU 211 (FIG. 1) identifies the current time (S2). If the first time data retrieved in S1 matches with the current time identified in the previous step, CPU 211 (FIG. 1) proceeds to the next step (S3). CPU 211 (FIG. 1) retrieves the current location data from Current Location Data Storage Area 206729*b*9 (S4). CPU 211 (FIG. 1) stores the current location data retrieved in the previous step as the first time location data in First Time Location Data Storage Area 206729*b*21*a* (S5). The foregoing sequence is repeated periodically.

This paragraph illustrate(s) Second Time Location Data Producing Software 206729*c*16 of Communication Device 200, which produce(s) the second time location data. In the present embodiment, CPU 211 (FIG. 1) retrieves the second time data from Second Time Data Storage Area 206729*b*20*b* (S1). CPU 211 (FIG. 1) identifies the current time (S2). If the second time data retrieved in S1 matches with the current time identified in the previous step, CPU 211 (FIG. 1) proceeds to the next step (S3). CPU 211 (FIG. 1) retrieves the current location data from Current Location Data Storage Area 206729*b*9 (S4). CPU 211 (FIG. 1) stores the current location data retrieved in the previous step as the second time location data in Second Time Location Data Storage Area 206729*b*21*b* (S5). The foregoing sequence is repeated periodically.

This paragraph illustrate(s) First Time Emotional Status Data Producing Software 206729*c*17 of Communication Device 200, which produce(s) the first time emotional status data. In the present embodiment, CPU 211 (FIG. 1) retrieves the first time data from First Time Data Storage Area 206729*b*20*a* (S1). CPU 211 (FIG. 1) identifies the current time (S2). If the first time data retrieved in S1 matches with the current time identified in the previous step, CPU 211 (FIG. 1) proceeds to the next step (S3). CPU 211 (FIG. 1) retrieves the currently detected emotional status data from Currently Detected Emotional Status Data Storage Area 206729*b*3 (S4). CPU 211 (FIG. 1) stores the currently detected emotional status data retrieved in the previous step as the first time emotional status data in First Time Emotional Status Data Storage Area 206729*b*22*a* (S5). The foregoing sequence is repeated periodically.

This paragraph illustrate(s) Second Time Emotional Status Data Producing Software 206729*c*18 of Communication Device 200, which produce(s) the second time emotional status data. In the present embodiment, CPU 211 (FIG. 1) retrieves the second time data from Second Time Data Storage Area 206729*b*20*b* (S1). CPU 211 (FIG. 1) identifies the current time (S2). If the second time data retrieved in S1 matches with the current time identified in the previous step, CPU 211 (FIG. 1) proceeds to the next step (S3). CPU 211 (FIG. 1) retrieves the currently detected emotional status data from Currently Detected Emotional Status Data Storage Area 206729*b*3 (S4). CPU 211 (FIG. 1) stores the currently detected emotional status data retrieved in the previous step as the second time emotional status data in Second Time Emotional Status Data Storage Area 206729*b*22*b* (S5). The foregoing sequence is repeated periodically.

This paragraph illustrate(s) First Time Emotion Log Displaying Software 206729*c*19 of Communication Device 200, which display(s) the log of the user's emotional status at the time/date indicated by the first time data. In the present embodiment, CPU 211 (FIG. 1) retrieves the first time data from First Time Data Storage Area 206729*b*20*a* (S1). CPU 211 (FIG. 1) displays the first time data retrieved in the previous step on LCD 201 (FIG. 1) (S2). CPU 211 (FIG. 1) retrieves the map data from Map Data Storage Area 206729*b*23 (S3). CPU 211 (FIG. 1) retrieves the first time location data from First Time Location Data Storage Area 206729*b*21*a* (S4). CPU 211 (FIG. 1) retrieves the first time location icon data from First Time Location Icon Data Storage Area 206729*b*24*a* (S5). CPU 211 (FIG. 1) displays the first time location icon data retrieved in the previous step at the location corresponding to the first time location data retrieved in S4 on the map data displayed in S3 (S6). CPU 211 (FIG. 1) retrieves the first time emotional status data from First Time Emotional Status Data Storage Area 206729*b*22*a* (S7). CPU 211 (FIG. 1) displays the first time emotional status data retrieved in the previous step on LCD 201 (FIG. 1) (S8). The foregoing sequence is repeated periodically.

This paragraph illustrate(s) Second Time Emotion Log Displaying Software 206729*c*20 of Communication Device 200, which display(s) the log of the user's emotional status at the time/date indicated by the second time data. In the present embodiment, CPU 211 (FIG. 1) retrieves the second time data from Second Time Data Storage Area 206729*b*20*b* (S1). CPU 211 (FIG. 1) displays the second time data retrieved in the previous step on LCD 201 (FIG. 1) (S2). CPU 211 (FIG. 1) retrieves the map data from Map Data Storage Area 206729*b*23 (S3). CPU 211 (FIG. 1) retrieves the second time location data from Second Time Location Data Storage Area 206729*b*21*b* (S4). CPU 211 (FIG. 1) retrieves the second time location icon data from Second Time Location Icon Data Storage Area 206729*b*24*b* (S5). CPU 211 (FIG. 1) displays the second time location icon data retrieved in the previous step at the location corresponding to the second time location data retrieved in S4 on the map data displayed in S3 (S6). CPU 211 (FIG. 1) retrieves the second time emotional status data from Second Time Emotional Status Data Storage Area 206729*b*22*b* (S7). CPU 211 (FIG. 1) displays the second time emotional status data retrieved in the previous step on LCD 201 (FIG. 1) (S8). The foregoing sequence is repeated periodically.

<<Email Reception Conditionally Notifying Function>>

The following paragraphs illustrate the email reception conditionally notifying function, wherein upon receiving an email, the sender's email address thereof is identified, if the sender's email address indicates a 1st email address, a 1st audiovisual data is output from said communication device and the current location of said communication device is registered as a 1st location, if the sender's email address indicates a 2nd email address, a 2nd audiovisual data is output from said communication device and the current location of said communication device is registered as a 2nd location, if the sender's email address indicates a 3rd email address, a 3rd audiovisual data is output from said communication device and the current location of said communication device is registered as a 3rd location, and said 1st location, said 2nd location, and said 3rd location are indicated on said display.

This paragraph illustrates the storage area included in Host H. In the present embodiment, Host H includes Email Reception Conditionally Notifying Info Storage Area H730*a* of which the data and the software program(s) stored therein are described hereinafter.

This paragraph illustrates the storage area(s) included in Email Reception Conditionally Notifying Info Storage Area H730*a*. In the present embodiment, Email Reception Conditionally Notifying Info Storage Area H730*a* includes Email Reception Conditionally Notifying Data Storage Area H730*b* and Email Reception Conditionally Notifying Software Storage Area H730*c*. Email Reception Conditionally Notifying Data Storage Area H730*b* stores the data necessary to implement the present function on the side of Host H, such as the one(s) described hereinafter. Email Reception Conditionally Notifying Software Storage Area H730*c* stores the software program(s) necessary to implement the present function on the side of Host H, such as the one(s) described hereinafter.

This paragraph illustrates the storage area(s) included in Email Reception Conditionally Notifying Data Storage Area H730*b*. In the present embodiment, Email Reception Conditionally Notifying Data Storage Area H730*b* includes Entire Email Address Data Storage Area H730*b*1, Inbox Data Storage Area H730*b*2, Entire Email Reception Notification Audiovisual Data Storage Area H730*b*3, Current Location Data Storage Area H730*b*4, Entire Email Received Location Data Storage Area H730*b*5, Map Data Storage Area H730*b*6, Entire Email Received Location Icon Data Storage Area H730*b*7, and Work Area H730*b*8. Entire Email Address Data Storage Area H730*b*1 stores the data described hereinafter. Inbox Data Storage Area H730*b*2 stores the inbox data which includes the email data. The email data addressed to the user of Communication Device 200 is stored in the present storage area. Entire Email Reception Notification Audiovisual Data Storage Area H730*b*3 stores the data described hereinafter. Current Location Data Storage Area H730*b*4 stores the current location data which indicates the current geographic location of Communication Device 200 in (x,y,z) format. Entire Email Received Location Data Storage Area H730*b*5 stores the data described hereinafter. Map Data Storage Area H730*b*6 stores the map data which is the three dimensional image data indicating a map. Entire Email Received Location Icon Data Storage Area H730*b*7 stores the data described hereinafter. Work Area H730*b*8 is utilized as a work area to perform calculation and temporarily store data to implement the present function.

This paragraph illustrates the storage area(s) included in Entire Email Address Data Storage Area H730*b*1. In the present embodiment, Entire Email Address Data Storage Area H730*b*1 includes 1st Email Address Data Storage Area H730*b*1*a*, 2nd Email Address Data Storage Area H730*b*1*b*, and 3rd Email Address Data Storage Area H730*b*1*c*. 1st Email Address Data Storage Area H730*b*1*a* stores the 1st email address data which indicates the 1st email address. 2nd Email Address Data Storage Area H730*b*1*b* stores the 2nd email address data which indicates the 2nd email address. 3rd Email Address Data Storage Area H730*b*1*c* stores the 3rd email address data which indicates the 3rd email address.

This paragraph illustrates the storage area(s) included in Entire Email Reception Notification Audiovisual Data Storage Area H730*b*3. In the present embodiment, Entire Email Reception Notification Audiovisual Data Storage Area H730*b*3 includes 1st Email Reception Notification Audiovisual Data Storage Area H730*b*3*a*, 2nd Email Reception Notification Audiovisual Data Storage Area H730*b*3*b*, and 3rd Email Reception Notification Audiovisual Data Storage Area H730*b*3*c*. 1st Email Reception Notification Audiovisual Data Storage Area H730*b*3*a* stores the 1st email reception notification audiovisual data which is the audiovisual data output from Speaker 216 (FIG. 1) and LCD 201 (FIG. 1) when the email sent from the 1st email address is received. 2nd Email Reception Notification Audiovisual Data Storage Area H730*b*3*b* stores the 2nd email reception notification audiovisual data which is the audiovisual data output from Speaker 216 (FIG. 1) and LCD 201 (FIG. 1) when the email sent from the 2nd email address is received. 3rd Email Reception Notification Audiovisual Data Storage Area H730*b*3*c* stores the 3rd email reception notification audiovisual data which is the audiovisual data output from Speaker 216 (FIG. 1) and LCD 201 (FIG. 1) when the email sent from the 3rd email address is received.

This paragraph illustrates the storage area(s) included in Entire Email Received Location Data Storage Area H730*b*5. In the present embodiment, Entire Email Received Location Data Storage Area H730*b*5 includes 1st Email Received Location Data Storage Area H730*b*5*a*, 2nd Email Received Location Data Storage Area H730*b*5*b*, and 3rd Email Received Location Data Storage Area H730*b*5*c*. 1st Email Received Location Data Storage Area H730*b*5*a* stores the 1st email received location data which indicates the geographic location in (x,y,z) format at which the email sent from the 1st email address is received. 2nd Email Received Location Data Storage Area H730*b*5*b* stores the 2nd email received location data which indicates the geographic location in (x,y,z) format at which the email sent from the 2nd email address is received. 3rd Email Received Location Data Storage Area H730*b*5*c* stores the 3rd email received location data which indicates the geographic location in (x,y,z) format at which the email sent from the 3rd email address is received.

This paragraph illustrates the storage area(s) included in Entire Email Received Location Icon Data Storage Area H730*b*7. In the present embodiment, Entire Email Received Location Icon Data Storage Area H730*b*7 includes 1st Email Received Location Icon Data Storage Area H730*b*7*a*, 2nd Email Received Location Icon Data Storage Area H730*b*7*b*, and 3rd Email Received Location Icon Data Storage Area H730*b*7*c*. 1st Email Received Location Icon Data Storage Area H730*b*7*a* stores the 1st email received location icon data which is the image of the icon utilized to indicate the 1st email received location data on the map data. 2nd Email Received Location Icon Data Storage Area H730*b*7*b* stores the 2nd email received location icon data which is the image of the icon utilized to indicate the 2nd email received location data on the map data. 3rd Email Received Location Icon Data Storage Area H730*b*7*c* stores the 3rd email received location icon data which is the image of the icon utilized to indicate the 3rd email received location data on the map data.

This paragraph illustrates the software program(s) stored in Email Reception Conditionally Notifying Software Storage Area H730*c*. In the present embodiment, Email Reception Conditionally Notifying Software Storage Area H730*c* stores Current Location Data Producing Software H730*c*1, 1st Email Reception Notification Audiovisual Data Outputting Software H730*c*2, 2nd Email Reception Notification Audiovisual Data Outputting Software H730*c*3, 3rd Email Reception Notification Audiovisual Data Outputting Software H730*c*4, and Email Reception Location Log Displaying Software H730*c*5. Current Location Data Producing Software H730*c*1 is the software program described hereinafter. 1st Email Reception Notification Audiovisual Data Outputting Software H730*c*2 is the software program described hereinafter. 2nd Email Reception Notification Audiovisual Data Outputting Software H730*c*3 is the software program described hereinafter. 3rd Email Reception Notification Audiovisual Data Outputting Software H730*c*4 is the software program described hereinafter. Email Reception Location Log Displaying Software H730*c*5 is the software program described hereinafter.

This paragraph illustrates the storage area included in RAM 206 (FIG. 1) of Communication Device 200. In the present embodiment, RAM 206 includes Email Reception Conditionally Notifying Info Storage Area 206730*a* of which the data and the software program(s) stored therein are described hereinafter.

The data and/or the software program(s) necessary to implement the present function may be downloaded from Host H to Communication Device 200.

This paragraph illustrates the storage area(s) included in Email Reception Conditionally Notifying Info Storage Area 206730*a*. In the present embodiment, Email Reception Conditionally Notifying Info Storage Area 206730*a* includes Email Reception Conditionally Notifying Data Storage Area 206730*b* and Email Reception Conditionally Notifying Software Storage Area 206730*c*. Email Reception Conditionally Notifying Data Storage Area 206730*b* stores the data necessary to implement the present function on the side of Communication Device 200, such as the one(s) described hereinafter. Email Reception Conditionally Notifying Software Storage Area 206730*c* stores the software program(s) necessary to implement the present function on the side of Communication Device 200, such as the one(s) described hereinafter.

This paragraph illustrates the storage area(s) included in Email Reception Conditionally Notifying Data Storage Area 206730*b*. In the present embodiment, Email Reception Conditionally Notifying Data Storage Area 206730*b* includes Entire Email Address Data Storage Area 206730*b*1, Inbox Data Storage Area 206730*b*2, Entire Email Reception Notification Audiovisual Data Storage Area 206730*b*3, Current Location Data Storage Area 206730*b*4, Entire Email Received Location Data Storage Area 206730*b*5, Map Data Storage Area 206730*b*6, Entire Email Received Location Icon Data Storage Area 206730*b*7, and Work Area 206730*b*8. Entire Email Address Data Storage Area 206730*b*1 stores the data described hereinafter. Inbox Data Storage Area 206730*b*2 stores the inbox data which includes the email data. The email data addressed to the user of Communication Device 200 is stored in the present storage area. Entire Email Reception Notification Audiovisual Data Storage Area 206730*b*3 stores the data described hereinafter. Current Location Data Storage Area 206730*b*4 stores the current location data which indicates the current geographic location of Communication Device 200 in (x,y,z) format. Entire Email Received Location Data Storage Area 206730*b*5 stores the data described hereinafter. Map Data Storage Area 206730*b*6 stores the map data which is the three dimensional image data indicating a map. Entire Email Received Location Icon Data Storage Area 206730*b*7 stores the data described hereinafter. Work Area 206730*b*8 is utilized as a work area to perform calculation and temporarily store data to implement the present function.

This paragraph illustrates the storage area(s) included in Entire Email Address Data Storage Area 206730*b*1. In the present embodiment, Entire Email Address Data Storage Area 206730*b*1 includes 1st Email Address Data Storage Area 206730*b*1*a*, 2nd Email Address Data Storage Area 206730*b*1*b*, and 3rd Email Address Data Storage Area 206730*b*1*c*. 1st Email Address Data Storage Area 206730*b*1*a* stores the 1st email address data which indicates the 1st email address. 2nd Email Address Data Storage Area 206730*b*1*b* stores the 2nd email address data which indicates the 2nd email address. 3rd Email Address Data Storage Area 206730*b*1*c* stores the 3rd email address data which indicates the 3rd email address.

This paragraph illustrates the storage area(s) included in Entire Email Reception Notification Audiovisual Data Storage Area 206730*b*3. In the present embodiment, Entire Email Reception Notification Audiovisual Data Storage Area 206730*b*3 includes 1st Email Reception Notification Audiovisual Data Storage Area 206730*b*3*a*, 2nd Email Reception Notification Audiovisual Data Storage Area 206730*b*3*b*, and 3rd Email Reception Notification Audiovisual Data Storage Area 206730*b*3*c*. 1st Email Reception Notification Audiovisual Data Storage Area 206730*b*3*a* stores the 1st email reception notification audiovisual data which is the audiovisual data output from Speaker 216 (FIG. 1) and LCD 201 (FIG. 1) when the email sent from the 1st email address is received. 2nd Email Reception Notification Audiovisual Data Storage Area 206730*b*3*b* stores the 2nd email reception notification audiovisual data which is the audiovisual data output from Speaker 216 (FIG. 1) and LCD 201 (FIG. 1) when the email sent from the 2nd email address is received. 3rd Email Reception Notification Audiovisual Data Storage Area 206730*b*3*c* stores the 3rd email reception notification audiovisual data which is the audiovisual data output from Speaker 216 (FIG. 1) and LCD 201 (FIG. 1) when the email sent from the 3rd email address is received.

This paragraph illustrates the storage area(s) included in Entire Email Received Location Data Storage Area 206730*b*5. In the present embodiment, Entire Email Received Location Data Storage Area 206730*b*5 includes 1st Email Received Location Data Storage Area 206730*b*5*a*, 2nd Email Received Location Data Storage Area 206730*b*5*b*, and 3rd Email Received Location Data Storage Area 206730*b*5*c*. 1st Email Received Location Data Storage Area 206730*b*5*a* stores the 1st email received location data which indicates the geographic location in (x,y,z) format at which the email sent from the 1st email address is received. 2nd Email Received Location Data Storage Area 206730b5b stores the 2nd email received location data which indicates the geographic location in (x,y,z) format at which the email sent from the 2nd email address is received. 3rd Email Received Location Data Storage Area 206730b5c stores the 3rd email received location data which indicates the geographic location in (x,y,z) format at which the email sent from the 3rd email address is received.

This paragraph illustrates the storage area(s) included in Entire Email Received Location Icon Data Storage Area 206730b7. In the present embodiment, Entire Email Received Location Icon Data Storage Area 206730b7 includes 1st Email Received Location Icon Data Storage Area 206730b7a, 2nd Email Received Location Icon Data Storage Area 206730b7b, and 3rd Email Received Location Icon Data Storage Area 206730b7c. 1st Email Received Location Icon Data Storage Area 206730b7a stores the 1st email received location icon data which is the image of the icon utilized to indicate the 1st email received location data on the map data. 2nd Email Received Location Icon Data Storage Area 206730b7b stores the 2nd email received location icon data which is the image of the icon utilized to indicate the 2nd email received location data on the map data. 3rd Email Received Location Icon Data Storage Area 206730b7c stores the 3rd email received location icon data which is the image of the icon utilized to indicate the 3rd email received location data on the map data.

This paragraph illustrates the software program(s) stored in Email Reception Conditionally Notifying Software Storage Area 206730c. In the present embodiment, Email Reception Conditionally Notifying Software Storage Area 206730c stores Current Location Data Producing Software 206730c1, 1st Email Reception Notification Audiovisual Data Outputting Software 206730c2, 2nd Email Reception Notification Audiovisual Data Outputting Software 206730c3, 3rd Email Reception Notification Audiovisual Data Outputting Software 206730c4, and Email Reception Location Log Displaying Software 206730c5. Current Location Data Producing Software 206730c1 is the software program described hereinafter. 1st Email Reception Notification Audiovisual Data Outputting Software 206730c2 is the software program described hereinafter. 2nd Email Reception Notification Audiovisual Data Outputting Software 206730c3 is the software program described hereinafter. 3rd Email Reception Notification Audiovisual Data Outputting Software 206730c4 is the software program described hereinafter. Email Reception Location Log Displaying Software 206730c5 is the software program described hereinafter.

This paragraph illustrate(s) Current Location Data Producing Software H730c1 of Host H and Current Location Data Producing Software 206730c1 of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step and sends the data to Host H in a wireless fashion (S2). Host H receives the current location data from Communication Device 200 and stores the data in Current Location Data Storage Area H730b4 (S3). The foregoing sequence is repeated periodically.

This paragraph illustrate(s) 1st Email Reception Notification Audiovisual Data Outputting Software H730c2 of Host H and 1st Email Reception Notification Audiovisual Data Outputting Software 206730c2 of Communication Device 200, which output(s) the 1st email reception notification audiovisual data. In the present embodiment, Host H periodically checks the incoming signal addressed to Communication Device 200 (S1). If an email data is detected in the incoming signal, Host H proceeds to the next step (S2). Host H retrieves the sender's email address data from the email data detected in the previous step (S3). Host H retrieves the 1st email address data from 1st Email Address Data Storage Area H730b1a (S4). If the sender's email address data retrieved in S3 matches with the 1st email address data retrieved in the previous step, Host H proceeds to the next step (S5). Host H retrieves the 1st email reception notification audiovisual data from 1st Email Reception Notification Audiovisual Data Storage Area H730b3a and sends the data to Communication Device 200 (S6). CPU 211 (FIG. 1) receives the 1st email reception notification audiovisual data from Host H in a wireless fashion and outputs the data from Speaker 216 (FIG. 1) and LCD 201 (FIG. 1) (S7). Host H retrieves the current location data from Current Location Data Storage Area H730b4 (S8). Host H stores the current location data retrieved in the previous step as the 1st email received location data in 1st Email Received Location Data Storage Area H730b5a (S9). Host H stores the email data detected in S2 in Inbox Data Storage Area H730b2 (S10). The foregoing sequence is repeated periodically.

This paragraph illustrate(s) 2nd Email Reception Notification Audiovisual Data Outputting Software H730c3 of Host H and 2nd Email Reception Notification Audiovisual Data Outputting Software 206730c3 of Communication Device 200, which output(s) the 2nd email reception notification audiovisual data. In the present embodiment, Host H periodically checks the incoming signal addressed to Communication Device 200 (S1). If an email data is detected in the incoming signal, Host H proceeds to the next step (S2). Host H retrieves the sender's email address data from the email data detected in the previous step (S3). Host H retrieves the 2nd email address data from 2nd Email Address Data Storage Area H730b1b (S4). If the sender's email address data retrieved in S3 matches with the 2nd email address data retrieved in the previous step, Host H proceeds to the next step (S5). Host H retrieves the 2nd email reception notification audiovisual data from 2nd Email Reception Notification Audiovisual Data Storage Area H730b3b and sends the data to Communication Device 200 (S6). CPU 211 (FIG. 1) receives the 2nd email reception notification audiovisual data from Host H in a wireless fashion and outputs the data from Speaker 216 (FIG. 1) and LCD 201 (FIG. 1) (S7). Host H retrieves the current location data from Current Location Data Storage Area H730b4 (S8). Host H stores the current location data retrieved in the previous step as the 2nd email received location data in 2nd Email Received Location Data Storage Area H730b5b (S9). Host H stores the email data detected in S2 in Inbox Data Storage Area H730b2 (S10). The foregoing sequence is repeated periodically.

This paragraph illustrate(s) 3rd Email Reception Notification Audiovisual Data Outputting Software H730c4 of Host H and 3rd Email Reception Notification Audiovisual Data Outputting Software 206730c4 of Communication Device 200, which output(s) the 3rd email reception notification audiovisual data. In the present embodiment, Host H periodically checks the incoming signal addressed to Communication Device 200 (S1). If an email data is detected in the incoming signal, Host H proceeds to the next step (S2). Host H retrieves the sender's email address data from the email data detected in the previous step (S3). Host H retrieves the 3rd email address data from 3rd Email Address Data Storage Area H730b1c (S4). If the sender's email address data retrieved in S3 matches with the 3rd email address data retrieved in the previous step, Host H proceeds to the next step (S5). Host H retrieves the 3rd email reception notification audiovisual data from 3rd Email Reception Notification Audiovisual Data Storage Area H730b3c and sends the data to Communication Device 200 (S6). CPU 211 (FIG. 1) receives the 3rd email reception notification audiovisual data from Host H in a wireless fashion and outputs the data from Speaker 216 (FIG. 1) and LCD 201 (FIG. 1) (S7). Host H retrieves the current location data from Current Location Data Storage Area H730b4 (S8). Host H stores the current location data retrieved in the previous step as the 3rd email received location data in 3rd Email Received Location Data Storage Area H730b5c (S9). Host H stores the email data detected in S2 in Inbox Data Storage Area H730b2 (S10). The foregoing sequence is repeated periodically.

This paragraph illustrate(s) Email Reception Location Log Displaying Software H730c5 of Host H and Email Reception Location Log Displaying Software 206730c5 of Communication Device 200, which display(s) the email reception location log. In the present embodiment, Host H retrieves the map data from Map Data Storage Area H730b6 and sends the data to Communication Device 200 (S1). CPU 211 (FIG. 1) receives the map data from Host H in a wireless fashion and displays the data on LCD 201 (FIG. 1) (S2). Host H retrieves the 1st email received location data from 1st Email Received Location Data Storage Area H730b5a and sends the data to Communication Device 200 (S3). CPU 211 (FIG. 1) receives the 1st email received location data from Host H in a wireless fashion (S4). Host H retrieves the 1st email received location icon data from 1st Email Received Location Icon Data Storage Area H730b7a and sends the data to Communication Device 200 (S5). CPU 211 (FIG. 1) receives the 1st email received location icon data from Host H in a wireless fashion (S6). CPU 211 (FIG. 1) displays the 1st email received location icon data received in the previous step at the location corresponding to the 1st email received location data received in S4 on the map data displayed in S2 (S7). Host H retrieves the 2nd email received location data from 2nd Email Received Location Data Storage Area H730b5b and sends the data to Communication Device 200 (S8). CPU 211 (FIG. 1) receives the 2nd email received location data from Host H in a wireless fashion (S9). Host H retrieves the 2nd email received location icon data from 2nd Email Received Location Icon Data Storage Area H730b7b and sends the data to Communication Device 200 (S10). CPU 211 (FIG. 1) receives the 2nd email received location icon data from Host H in a wireless fashion (S11). CPU 211 (FIG. 1) displays the 2nd email received location icon data received in the previous step at the location corresponding to the 2nd email received location data received in S9 on the map data displayed in S2 (S12). Host H retrieves the 3rd email received location data from 3rd Email Received Location Data Storage Area H730b5c and sends the data to Communication Device 200 (S13). CPU 211 (FIG. 1) receives the 3rd email received location data from Host H in a wireless fashion (S14). Host H retrieves the 3rd email received location icon data from 3rd Email Received Location Icon Data Storage Area H730b7c and sends the data to Communication Device 200 (S15). CPU 211 (FIG. 1) receives the 3rd email received location icon data from Host H in a wireless fashion (S16). CPU 211 (FIG. 1) displays the 3rd email received location icon data received in the previous step at the location corresponding to the 3rd email received location data received in S14 on the map data displayed in S2 (S17). The foregoing sequence is repeated periodically.

The following paragraphs illustrate another embodiment wherein Communication Device 200 plays the major role in implementing the present function.

This paragraph illustrate(s) Current Location Data Producing Software 206730c1 of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step (S2). CPU 211 (FIG. 1) stores the current location data produced in the previous step in Current Location Data Storage Area 206730b4 (S3). The foregoing sequence is repeated periodically.

This paragraph illustrate(s) 1st Email Reception Notification Audiovisual Data Outputting Software 206730c2 of Communication Device 200, which output(s) the 1st email reception notification audiovisual data. In the present embodiment, CPU 211 (FIG. 1) periodically checks the incoming signal addressed to Communication Device 200 (S1). If an email data is detected in the incoming signal, CPU 211 (FIG. 1) proceeds to the next step (S2). CPU 211 (FIG. 1) retrieves the sender's email address data from the email data detected in the previous step (S3). CPU 211 (FIG. 1) retrieves the 1st email address data from 1st Email Address Data Storage Area 206730b1a (S4). If the sender's email address data retrieved in S3 matches with the 1st email address data retrieved in the previous step, CPU 211 (FIG. 1) proceeds to the next step (S5). CPU 211 (FIG. 1) retrieves the 1st email reception notification audiovisual data from 1st Email Reception Notification Audiovisual Data Storage Area 206730b3a (S6). CPU 211 (FIG. 1) outputs the 1st email reception notification audiovisual data retrieved in the previous step from Speaker 216 (FIG. 1) and LCD 201 (FIG. 1) (S7). CPU 211 (FIG. 1) retrieves the current location data from Current Location Data Storage Area 206730b4 (S8). CPU 211 (FIG. 1) stores the current location data retrieved in the previous step as the 1st email received location data in 1st Email Received Location Data Storage Area 206730b5a (S9). CPU 211 (FIG. 1) stores the email data detected in S2 in Inbox Data Storage Area 206730b2 (S10). The foregoing sequence is repeated periodically.

This paragraph illustrate(s) 2nd Email Reception Notification Audiovisual Data Outputting Software 206730c3 of Communication Device 200, which output(s) the 2nd email reception notification audiovisual data. In the present embodiment, CPU 211 (FIG. 1) periodically checks the incoming signal addressed to Communication Device 200 (S1). If an email data is detected in the incoming signal, CPU 211 (FIG. 1) proceeds to the next step (S2). CPU 211 (FIG. 1) retrieves the sender's email address data from the email data detected in the previous step (S3). CPU 211 (FIG. 1) retrieves the 2nd email address data from 2nd Email Address Data Storage Area 206730b1b (S4). If the sender's email address data retrieved in S3 matches with the 2nd email address data retrieved in the previous step, CPU 211 (FIG. 1) proceeds to the next step (S5). CPU 211 (FIG. 1) retrieves the 2nd email reception notification audiovisual data from 2nd Email Reception Notification Audiovisual Data Storage Area 206730b3b (S6). CPU 211 (FIG. 1) outputs the 2nd email reception notification audiovisual data retrieved in the previous step from Speaker 216 (FIG. 1) and LCD 201 (FIG. 1) (S7). CPU 211 (FIG. 1) retrieves the current location data from Current Location Data Storage Area 206730b4 (S8). CPU 211 (FIG. 1) stores the current location data retrieved in the previous step as the 2nd email received location data in 2nd Email Received Location Data Storage Area 206730b5b (S9). CPU 211 (FIG. 1) stores the email data detected in S2 in Inbox Data Storage Area 206730b2 (S10). The foregoing sequence is repeated periodically.

This paragraph illustrate(s) 3rd Email Reception Notification Audiovisual Data Outputting Software 206730c4 of Communication Device 200, which output(s) the 3rd email reception notification audiovisual data. In the present embodiment, CPU 211 (FIG. 1) periodically checks the incoming signal addressed to Communication Device 200 (S1). If an email data is detected in the incoming signal, CPU 211 (FIG. 1) proceeds to the next step (S2). CPU 211 (FIG. 1) retrieves the sender's email address data from the email data detected in the previous step (S3). CPU 211 (FIG. 1) retrieves the 3rd email address data from 3rd Email Address Data Storage Area 206730b1c (S4). If the sender's email address data retrieved in S3 matches with the 3rd email address data retrieved in the previous step, CPU 211 (FIG. 1) proceeds to the next step (S5). CPU 211 (FIG. 1) retrieves the 3rd email reception notification audiovisual data from 3rd Email Reception Notification Audiovisual Data Storage Area 206730b3c (S6). CPU 211 (FIG. 1) outputs the 3rd email reception notification audiovisual data retrieved in the previous step from Speaker 216 (FIG. 1) and LCD 201 (FIG. 1) (S7). CPU 211 (FIG. 1) retrieves the current location data from Current Location Data Storage Area 206730b4 (S8). CPU 211 (FIG. 1) stores the current location data retrieved in the previous step as the 3rd email received location data in 3rd Email Received Location Data Storage Area 206730b5c (S9). CPU 211 (FIG. 1) stores the email data detected in S2 in Inbox Data Storage Area 206730b2 (S10). The foregoing sequence is repeated periodically.

This paragraph illustrate(s) Email Reception Location Log Displaying Software 206730c5 of Communication Device 200, which display(s) the email reception location log. In the present embodiment, CPU 211 (FIG. 1) retrieves the map data from Map Data Storage Area 206730b6 (S1). CPU 211 (FIG. 1) displays the map data retrieved in the previous step on LCD 201 (FIG. 1) (S2). CPU 211 (FIG. 1) retrieves the 1st email received location data from 1st Email Received Location Data Storage Area 206730b5a (S3). CPU 211 (FIG. 1) retrieves the 1st email received location icon data from 1st Email Received Location Icon Data Storage Area 206730b7a (S4). CPU 211 (FIG. 1) displays the 1st email received location icon data retrieved in the previous step at the location corresponding to the 1st email received location data retrieved in S3 on the map data displayed in S2 (S5). CPU 211 (FIG. 1) retrieves the 2nd email received location data from 2nd Email Received Location Data Storage Area 206730b5b (S6). CPU 211 (FIG. 1) retrieves the 2nd email received location icon data from 2nd Email Received Location Icon Data Storage Area 206730b7b (S7). CPU 211 (FIG. 1) displays the 2nd email received location icon data retrieved in the previous step at the location corresponding to the 2nd email received location data retrieved in S6 on the map data displayed in S2 (S8). CPU 211 (FIG. 1) retrieves the 3rd email received location data from 3rd Email Received Location Data Storage Area 206730b5c (S9). CPU 211 (FIG. 1) retrieves the 3rd email received location icon data from 3rd Email Received Location Icon Data Storage Area 206730b7c (S10). CPU 211 (FIG. 1) displays the 3rd email received location icon data retrieved in the previous step at the location corresponding to the 3rd email received location data retrieved in S9 on the map data displayed in S2 (S11). The foregoing sequence is repeated periodically.

<<Microphone Mounted Headphone Replay Pausing Function>>

The following paragraphs illustrate the microphone mounted headphone replay pausing function, wherein a headphone is connected to said communication device and a mounted microphone is mounted on said headphone, when a 1st triggering event, a 2nd triggering event, or a 3rd triggering event occurs while replaying an audio data, replaying said audio data is temporarily paused and replaying said audio data is resumed unless a permanently pausing command is input via said input device within a predetermined period of time, wherein said 1st triggering event indicates that the sound volume of the audio data retrieved from said mounted microphone exceeds a certain level, said 2nd triggering event indicates that a certain voice type data or the voice print data is detected in the audio data retrieved from said mounted microphone, and said 3rd triggering event indicates that a certain text data is detected in the audio data retrieved from said mounted microphone, a 1st triggering event occurred message is displayed when replaying said audio data is paused due to said 1st triggering event, a 2nd triggering event occurred message is displayed when replaying said audio data is paused due to said 2nd triggering event, and a 3rd triggering event occurred message is displayed when replaying said audio data is paused due to said 3rd triggering event, and the current location of said communication device, a 1st triggering event occurred location which indicates the geographic location at which said 1st triggering event occurred, a 2nd triggering event occurred location which indicates the geographic location at which said 2nd triggering event occurred, and a 3rd triggering event occurred location which indicates the geographic location at which said 3rd triggering event occurred, are indicated on said display.

This paragraph illustrates the relationship between Communication Device 200 and Headphone HP731. In the present embodiment, Headphone HP731 is connected to Communication Device 200 via Data Bus 203 (FIG. 1). Here, Headphone HP731 is a headphone which outputs audio data in a stereo fashion.

This paragraph illustrates the elements included in Headphone HP731. In the present embodiment, Headphone HP731 includes Headphone Speaker HS731L, Headphone Speaker HS731R, Mounted Microphone MM731L, and Mounted Microphone MM731R. Headphone Speaker HS731L is the speaker which outputs audio data to the user's left ear (not shown). Headphone Speaker HS731R is the speaker which outputs audio data to the user's right ear (not shown). Mounted Microphone MM731L is the microphone mounted on Headphone Speaker HS731L. Mounted Microphone MM731R L is the microphone mounted on Headphone Speaker HS731R. As another embodiment, Speaker 216 (FIG. 1) may be utilized in addition to or in lieu of Headphone Speaker HS731L and Headphone Speaker HS731R. As another embodiment, Microphone 215 (FIG. 1) may be utilized in addition to or in lieu of Mounted Microphone MM731L and Mounted Microphone MM731R.

This paragraph illustrates the storage area included in Host H. In the present embodiment, Host H includes Microphone Mounted Headphone Replay Pausing Info Storage Area H731a of which the data and the software program(s) stored therein are described hereinafter.

This paragraph illustrates the storage area(s) included in Microphone Mounted Headphone Replay Pausing Info Storage Area H731a. In the present embodiment, Microphone Mounted Headphone Replay Pausing Info Storage Area H731a includes Microphone Mounted Headphone Replay Pausing Data Storage Area H731b and Microphone Mounted Headphone Replay Pausing Software Storage Area H731c. Microphone Mounted Headphone Replay Pausing Data Storage Area H731b stores the data necessary to implement the present function on the side of Host H, such as the one(s) described hereinafter. Microphone Mounted Headphone Replay Pausing Software Storage Area H731c stores the software program(s) necessary to implement the present function on the side of Host H, such as the one(s) described hereinafter.

This paragraph illustrates the storage area(s) included in Microphone Mounted Headphone Replay Pausing Data Storage Area H731b. In the present embodiment, Microphone Mounted Headphone Replay Pausing Data Storage Area H731b includes Replaying Audio Data Storage Area H731b1, Mounted Microphone Entered Audio Data Storage Area H731b2, Mounted Microphone Recorded Audio Data Storage Area H731b3, Entire Replay Pause Triggering Event Data Storage Area H731b4, Entire Replay Pause Triggering Event Occurred Message Data Storage Area H731b5, Current Location Data Storage Area H731b6, Entire Replay Paused Location Data Storage Area H731b7, Map Data Storage Area H731b8, Entire Icon Data Storage Area H731b9, and Work Area H731b10. Replaying Audio Data Storage Area H731b1 stores the replaying audio data which is the audio data (e.g., music) replayed and output from Headphone Speaker HS731L and Headphone Speaker HS731R in a stereo fashion. Mounted Microphone Entered Audio Data Storage Area H731b2 stores the mounted microphone entered audio data which is the audio data just retrieved via Mounted Microphone MM731L and Mounted Microphone MM731R. Mounted Microphone Recorded Audio Data Storage Area H731b3 stores the mounted microphone recorded audio data which is the mounted microphone entered audio data recorded for a certain period of time (e.g., 10 seconds). In other words, the audio data retrieved via Mounted Microphone MM731L and Mounted Microphone MM731R are recorded and replayable of the last certain period of time (e.g., 10 seconds). Entire Replay Pause Triggering Event Data Storage Area H731b4 stores the data described hereinafter. Entire Replay Pause Triggering Event Occurred Message Data Storage Area H731b5 stores the data described hereinafter. Current Location Data Storage Area H731b6 stores the current location data which indicates the current geographic location of Communication Device 200 in (x,y,z) format. Entire Replay Paused Location Data Storage Area H731b7 stores the data described hereinafter. Map Data Storage Area H731b8 stores the map data which is the three dimensional image data indicating a map. Entire Icon Data Storage Area H731b9 stores the data described hereinafter. Work Area H731b10 is utilized as a work area to perform calculation and temporarily store data to implement the present function.

This paragraph illustrates the storage area(s) included in Entire Replay Pause Triggering Event Data Storage Area H731b4. In the present embodiment, Entire Replay Pause Triggering Event Data Storage Area H731b4 includes 1st Replay Pause Triggering Event Data Storage Area H731b4a, 2nd Replay Pause Triggering Event Data Storage Area H731b4b, and 3rd Replay Pause Triggering Event Data Storage Area H731b4c. 1st Replay Pause Triggering Event Data Storage Area H731b4a stores the 1st replay pause triggering event data which indicates the sound volume of the mounted microphone entered audio data. If the sound volume of the mounted microphone entered audio data exceeds the sound volume indicated by the 1st replay pause triggering event data, outputting the replaying audio data is paused. 2nd Replay Pause Triggering Event Data Storage Area H731b4b stores the 2nd replay pause triggering event data which indicates the voice type data or the voice print data of certain people (e.g., the user's boss, and family members). If one of the voice type data or the voice print data indicated by the 2nd replay pause triggering event data is detected in the mounted microphone entered audio data, outputting the replaying audio data is paused. 3rd Replay Pause Triggering Event Data Storage Area H731b4c stores the 3rd replay pause triggering event data which indicates certain text data (e.g., "hello", "hi", the user's name, "good morning", "good evening", and "good night"). If one of the certain text data indicated by the 3rd replay pause triggering event data is detected in the mounted microphone entered audio data, outputting the replaying audio data is paused.

This paragraph illustrates the storage area(s) included in Entire Replay Pause Triggering Event Occurred Message Data Storage Area H731b5. In the present embodiment, Entire Replay Pause Triggering Event Occurred Message Data Storage Area H731b5 includes 1st Replay Pause Triggering Event Occurred Message Data Storage Area H731b5a, 2nd Replay Pause Triggering Event Occurred Message Data Storage Area H731b5b, and 3rd Replay Pause Triggering Event Occurred Message Data Storage Area H731b5c. 1st Replay Pause Triggering Event Occurred Message Data Storage Area H731b5a stores the 1st replay pause triggering event occurred message data which is the message indicating that outputting the replaying audio data is paused due to the event indicated by the 1st replay pause triggering event data. 2nd Replay Pause Triggering Event Occurred Message Data Storage Area H731b5b stores the 2nd replay pause triggering event occurred message data which is the message indicating that outputting the replaying audio data is paused due to the event indicated by the 2nd replay pause triggering event data. 3rd Replay Pause Triggering Event Occurred Message Data Storage Area H731b5c stores the 3rd replay pause triggering event occurred message data which is the message indicating that outputting the replaying audio data is paused due to the event indicated by the 3rd replay pause triggering event data.

This paragraph illustrates the storage area(s) included in Entire Replay Paused Location Data Storage Area H731b7. In the present embodiment, Entire Replay Paused Location Data Storage Area H731b7 includes 1st Replay Paused Location Data Storage Area H731b7a, 2nd Replay Paused Location Data Storage Area H731b7b, and 3rd Replay Paused Location Data Storage Area H731b7c. 1st Replay Paused Location Data Storage Area H731b7a stores the 1st replay paused location data which indicates the geographic location of Communication Device 200 at which outputting the replaying audio data from Headphone Speaker HS731L and Headphone Speaker HS731R is paused due to the event indicated by the 1st replay pause triggering event data. 2nd Replay Paused Location Data Storage Area H731b7b stores the 2nd replay paused location data which indicates the geographic location of Communication Device 200 at which outputting the replaying audio data from Headphone Speaker HS731L and Headphone Speaker HS731R is paused due to the event indicated by the 2nd replay pause triggering event data. 3rd Replay Paused Location Data Storage Area H731b7c stores the 3rd replay paused location data which indicates the geographic location of Communication Device 200 at which outputting the replaying audio data from Headphone Speaker HS731L and Headphone Speaker HS731R is paused due to the event indicated by the 3rd replay pause triggering event data.

This paragraph illustrates the storage area(s) included in Entire Icon Data Storage Area H731b9. In the present embodiment, Entire Icon Data Storage Area H731b9 includes Current Location Icon Data Storage Area H731b9a, 1st Replay Paused Location Icon Data Storage Area H731b9b, 2nd Replay Paused Location Icon Data Storage Area H731b9c, and 3rd Replay Paused Location Icon Data Storage Area H731b9d. Current Location Icon Data Storage Area H731b9a stores the current location icon data which is the image of the icon utilized to indicate the current location data on the map data. 1st Replay Paused Location Icon Data Storage Area H731b9b stores the 1st replay paused location icon data which is the image of the icon utilized to indicate the 1st replay paused location data on the map data. 2nd Replay Paused Location Icon Data Storage Area H731b9c stores the 2nd replay paused location icon data which is the image of the icon utilized to indicate the 2nd replay paused location data on the map data. 3rd Replay Paused Location Icon Data Storage Area H731b9d stores the 3rd replay paused location icon data which is the image of the icon utilized to indicate the 3rd replay paused location data on the map data.

This paragraph illustrates the software program(s) stored in Microphone Mounted Headphone Replay Pausing Software Storage Area H731c. In the present embodiment, Microphone Mounted Headphone Replay Pausing Software Storage Area H731c stores Current Location Data Producing Software H731c1, Replaying Audio Data Outputting Software H731c2, Mounted Microphone Entered Audio Data Producing Software H731c3, Mounted Microphone Recorded Audio Data Producing Software H731c4, 1st Replay Pause Triggering Event Identifying Software H731c5, 2nd Replay Pause Triggering Event Identifying Software H731c6, 3rd Replay Pause Triggering Event Identifying Software H731c7, and Replay Paused Location Data Displaying Software H731c8. Current Location Data Producing Software H731c1 is the software program described hereinafter. Replaying Audio Data Outputting Software H731c2 is the software program described hereinafter. Mounted Microphone Entered Audio Data Producing Software H731c3 is the software program described hereinafter. Mounted Microphone Recorded Audio Data Producing Software H731c4 is the software program described hereinafter. 1st Replay Pause Triggering Event Identifying Software H731c5 is the software program described hereinafter. 2nd Replay Pause Triggering Event Identifying Software H731c6 is the software program described hereinafter. 3rd Replay Pause Triggering Event Identifying Software H731c7 is the software program described hereinafter. Replay Paused Location Data Displaying Software H731c8 is the software program described hereinafter.

This paragraph illustrates the storage area included in RAM 206 (FIG. 1) of Communication Device 200. In the present embodiment, RAM 206 includes Microphone Mounted Headphone Replay Pausing Info Storage Area 206731a of which the data and the software program(s) stored therein are described hereinafter.

The data and/or the software program(s) necessary to implement the present function may be downloaded from Host H to Communication Device 200.

This paragraph illustrates the storage area(s) included in Microphone Mounted Headphone Replay Pausing Info Storage Area 206731a. In the present embodiment, Microphone Mounted Headphone Replay Pausing Info Storage Area 206731a includes Microphone Mounted Headphone Replay Pausing Data Storage Area 206731b and Microphone Mounted Headphone Replay Pausing Software Storage Area 206731c. Microphone Mounted Headphone Replay Pausing Data Storage Area 206731b stores the data necessary to implement the present function on the side of Communication Device 200, such as the one(s) described hereinafter. Microphone Mounted Headphone Replay Pausing Software Storage Area 206731c stores the software program(s) necessary to implement the present function on the side of Communication Device 200, such as the one(s) described hereinafter.

This paragraph illustrates the storage area(s) included in Microphone Mounted Headphone Replay Pausing Data Storage Area 206731b. In the present embodiment, Microphone Mounted Headphone Replay Pausing Data Storage Area 206731b includes Replaying Audio Data Storage Area 206731b1, Mounted Microphone Entered Audio Data Storage Area 206731b2, Mounted Microphone Recorded Audio Data Storage Area 206731b3, Entire Replay Pause Triggering Event Data Storage Area 206731b4, Entire Replay Pause Triggering Event Occurred Message Data Storage Area 206731b5, Current Location Data Storage Area 206731b6, Entire Replay Paused Location Data Storage Area 206731b7, Map Data Storage Area 206731b8, Entire Icon Data Storage Area 206731b9, and Work Area 206731b10. Replaying Audio Data Storage Area 206731b1 stores the replaying audio data which is the audio data (e.g., music) replayed and output from Headphone Speaker HS731L and Headphone Speaker HS731R in a stereo fashion. Mounted Microphone Entered Audio Data Storage Area 206731b2 stores the mounted microphone entered audio data which is the audio data just retrieved via Mounted Microphone MM731L and Mounted Microphone MM731R. Mounted Microphone Recorded Audio Data Storage Area 206731b3 stores the mounted microphone recorded audio data which is the mounted microphone entered audio data recorded for a certain period of time (e.g., 10 seconds). In other words, the audio data retrieved via Mounted Microphone MM731L and Mounted Microphone MM731R are recorded and replayable of the last certain period of time (e.g., 10 seconds). Entire Replay Pause Triggering Event Data Storage Area 206731b4 stores the data described hereinafter. Entire Replay Pause Triggering Event Occurred Message Data Storage Area 206731b5 stores the data described hereinafter. Current Location Data Storage Area 206731b6 stores the current location data which indicates the current geographic location of Communication Device 200 in (x,y,z) format. Entire Replay Paused Location Data Storage Area 206731b7 stores the data described hereinafter. Map Data Storage Area 206731b8 stores the map data which is the three dimensional image data indicating a map. Entire Icon Data Storage Area 206731b9 stores the data described hereinafter. Work Area 206731b10 is utilized as a work area to perform calculation and temporarily store data to implement the present function.

This paragraph illustrates the storage area(s) included in Entire Replay Pause Triggering Event Data Storage Area 206731b4. In the present embodiment, Entire Replay Pause Triggering Event Data Storage Area 206731b4 includes 1st Replay Pause Triggering Event Data Storage Area 206731b4a, 2nd Replay Pause Triggering Event Data Storage Area 206731b4b, and 3rd Replay Pause Triggering Event Data Storage Area 206731b4c. 1st Replay Pause Triggering Event Data Storage Area 206731b4a stores the 1st replay pause triggering event data which indicates the sound volume of the mounted microphone entered audio data. If the sound volume of the mounted microphone entered audio data exceeds the sound volume indicated by the 1st replay pause triggering event data, outputting the replaying audio data is paused. 2nd Replay Pause Triggering Event Data Storage Area 206731b4b stores the 2nd replay pause triggering event data which indicates the voice type data or the voice print data of certain people (e.g., the user's boss, and family members). If one of the voice type data or the voice print data indicated by the 2nd replay pause triggering event data is detected in the mounted microphone entered audio data, outputting the replaying audio data is paused. 3rd Replay Pause Triggering Event Data Storage Area 206731b4c stores the 3rd replay pause triggering event data which indicates certain text data (e.g., "hello", "hi", the user's name, "good morning", "good evening", and "good night"). If one of the certain text data indicated by the 3rd replay pause triggering event data is detected in the mounted microphone entered audio data, outputting the replaying audio data is paused.

This paragraph illustrates the storage area(s) included in Entire Replay Pause Triggering Event Occurred Message Data Storage Area 206731b5. In the present embodiment, Entire Replay Pause Triggering Event Occurred Message Data Storage Area 206731b5 includes 1st Replay Pause Triggering Event Occurred Message Data Storage Area 206731b5a, 2nd Replay Pause Triggering Event Occurred Message Data Storage Area 206731b5b, and 3rd Replay Pause Triggering Event Occurred Message Data Storage Area 206731b5c. 1st Replay Pause Triggering Event Occurred Message Data Storage Area 206731b5a stores the 1st replay pause triggering event occurred message data which is the message indicating that outputting the replaying audio data is paused due to the event indicated by the 1st replay pause triggering event data. 2nd Replay Pause Triggering Event Occurred Message Data Storage Area 206731b5b stores the 2nd replay pause triggering event occurred message data which is the message indicating that outputting the replaying audio data is paused due to the event indicated by the 2nd replay pause triggering event data. 3rd Replay Pause Triggering Event Occurred Message Data Storage Area 206731b5c stores the 3rd replay pause triggering event occurred message data which is the message indicating that outputting the replaying audio data is paused due to the event indicated by the 3rd replay pause triggering event data.

This paragraph illustrates the storage area(s) included in Entire Replay Paused Location Data Storage Area 206731b7. In the present embodiment, Entire Replay Paused Location Data Storage Area 206731b7 includes 1st Replay Paused Location Data Storage Area 206731b7a, 2nd Replay Paused Location Data Storage Area 206731b7b, and 3rd Replay Paused Location Data Storage Area 206731b7c. 1st Replay Paused Location Data Storage Area 206731b7a stores the 1st replay paused location data which indicates the geographic location of Communication Device 200 at which outputting the replaying audio data from Headphone Speaker HS731L and Headphone Speaker HS731R is paused due to the event indicated by the 1st replay pause triggering event data. 2nd Replay Paused Location Data Storage Area 206731b7b stores the 2nd replay paused location data which indicates the geographic location of Communication Device 200 at which outputting the replaying audio data from Headphone Speaker HS731L and Headphone Speaker HS731R is paused due to the event indicated by the 2nd replay pause triggering event data. 3rd Replay Paused Location Data Storage Area 206731b7c stores the 3rd replay paused location data which indicates the geographic location of Communication Device 200 at which outputting the replaying audio data from Headphone Speaker HS731L and Headphone Speaker HS731R is paused due to the event indicated by the 3rd replay pause triggering event data.

This paragraph illustrates the storage area(s) included in Entire Icon Data Storage Area 206731b9. In the present embodiment, Entire Icon Data Storage Area 206731b9 includes Current Location Icon Data Storage Area 206731b9a, 1st Replay Paused Location Icon Data Storage Area 206731b9b, 2nd Replay Paused Location Icon Data Storage Area 206731b9c, and 3rd Replay Paused Location Icon Data Storage Area 206731b9d. Current Location Icon Data Storage Area 206731b9a stores the current location icon data which is the image of the icon utilized to indicate the current location data on the map data. 1st Replay Paused Location Icon Data Storage Area 206731b9b stores the 1st replay paused location icon data which is the image of the icon utilized to indicate the 1st replay paused location data on the map data. 2nd Replay Paused Location Icon Data Storage Area 206731b9c stores the 2nd replay paused location icon data which is the image of the icon utilized to indicate the 2nd replay paused location data on the map data. 3rd Replay Paused Location Icon Data Storage Area 206731b9d stores the 3rd replay paused location icon data which is the image of the icon utilized to indicate the 3rd replay paused location data on the map data.

This paragraph illustrates the software program(s) stored in Microphone Mounted Headphone Replay Pausing Software Storage Area 206731c. In the present embodiment, Microphone Mounted Headphone Replay Pausing Software Storage Area 206731c stores Current Location Data Producing Software 206731c1, Replaying Audio Data Outputting Software 206731c2, Mounted Microphone Entered Audio Data Producing Software 206731c3, Mounted Microphone Recorded Audio Data Producing Software 206731c4, 1st Replay Pause Triggering Event Identifying Software 206731c5, 2nd Replay Pause Triggering Event Identifying Software 206731c6, 3rd Replay Pause Triggering Event Identifying Software 206731c7, and Replay Paused Location Data Displaying Software 206731c8. Current Location Data Producing Software 206731c1 is the software program described hereinafter. Replaying Audio Data Outputting Software 206731c2 is the software program described hereinafter. Mounted Microphone Entered Audio Data Producing Software 206731c3 is the software program described hereinafter. Mounted Microphone Recorded Audio Data Producing Software 206731c4 is the software program described hereinafter. 1st Replay Pause Triggering Event Identifying Software 206731c5 is the software program described hereinafter. 2nd Replay Pause Triggering Event Identifying Software 206731c6 is the software program described hereinafter. 3rd Replay Pause Triggering Event Identifying Software 206731c7 is the software program described hereinafter. Replay Paused Location Data Displaying Software 206731c8 is the software program described hereinafter.

This paragraph illustrate(s) Current Location Data Producing Software H731c1 of Host H and Current Location Data Producing Software 206731c1 of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step and sends the data to Host H in a wireless fashion (S2). Host H receives the current location data from Communication Device 200 and stores the data in Current Location Data Storage Area H731b6 (S3). The foregoing sequence is repeated periodically.

This paragraph illustrate(s) Replaying Audio Data Outputting Software H731c2 of Host H and Replaying Audio Data Outputting Software 206731c2 of Communication Device 200, which output(s) the replaying audio data from Headphone Speaker HS731L and Headphone Speaker HS731R in a stereo fashion. In the present embodiment, Host H retrieves the replaying audio data from Replaying Audio Data Storage Area H731b1 and sends the data to Communication Device 200 (S1). CPU 211 (FIG. 1) receives the replaying audio data from Host H in a wireless fashion and outputs the data from Headphone Speaker HS731L and Headphone Speaker HS731R (S2). The foregoing sequence is repeated and thereby replaying the audio data is continued unless a pause command or a stop command is input by utilizing Input Device 210 (FIG. 1) or via voice recognition system.

This paragraph illustrate(s) Mounted Microphone Entered Audio Data Producing Software H731c3 of Host H and Mounted Microphone Entered Audio Data Producing Software 206731*c*3 of Communication Device 200, which produce(s) the mounted microphone entered audio data. In the present embodiment, CPU 211 (FIG. 1) retrieves the audio data from Mounted Microphone MM731L and Mounted Microphone MM731R and sends the data to Host H in a wireless fashion (S1). Host H receives the audio data from Communication Device 200 and stores the data as the mounted microphone entered audio data in Mounted Microphone Entered Audio Data Storage Area H731*b*2 (S2). The foregoing sequence is repeated periodically.

This paragraph illustrate(s) Mounted Microphone Recorded Audio Data Producing Software H731*c*4 of Host H, which produce(s) the mounted microphone recorded audio data. In the present embodiment, Host H retrieves the mounted microphone entered audio data from Mounted Microphone Entered Audio Data Storage Area H731*b*2 (S1). Host H stores the mounted microphone entered audio data retrieved in the previous step as the mounted microphone recorded audio data in Mounted Microphone Recorded Audio Data Storage Area H731*b*3 (S2). The foregoing sequence is repeated periodically.

This paragraph illustrate(s) 1st Replay Pause Triggering Event Identifying Software H731*c*5 of Host H and 1st Replay Pause Triggering Event Identifying Software 206731*c*5 of Communication Device 200, which identify(ies) whether the triggering event indicated by the 1st replay pause triggering event data has occurred. This sequence is implemented while outputting the replaying audio data. In the present embodiment, Host H retrieves the mounted microphone entered audio data from Mounted Microphone Entered Audio Data Storage Area H731*b*2 (S1). Host H identifies the sound volume of the mounted microphone entered audio data retrieved in the previous step (S2). Host H retrieves the 1st replay pause triggering event data from 1st Replay Pause Triggering Event Data Storage Area H731*b*4*a* (S3). If the sound volume identified in S2 is larger than the sound volume indicated by the 1st replay pause triggering event data retrieved in the previous step, Host H proceeds to the next step (S4). Host H pauses outputting the replaying audio data from Headphone Speaker HS731L and Headphone Speaker HS731R (S5). Host H retrieves the 1st replay pause triggering event occurred message data from 1st Replay Pause Triggering Event Occurred Message Data Storage Area H731*b*5*a* and sends the data to Communication Device 200 (S6). CPU 211 (FIG. 1) receives the 1st replay pause triggering event occurred message data from Host H in a wireless fashion and displays the data on LCD 201 (FIG. 1) (S7). Host H retrieves the current location data from Current Location Data Storage Area H731*b*6 (S8). Host H stores the current location data retrieved in the previous step as the 1st replay paused location data in 1st Replay Paused Location Data Storage Area H731*b*7*a* (S9). Host H retrieves the mounted microphone recorded audio data from Mounted Microphone Recorded Audio Data Storage Area H731*b*3 and sends the data to Communication Device 200 (S10). CPU 211 (FIG. 1) receives the mounted microphone recorded audio data from Host H in a wireless fashion and outputs the data from Headphone Speaker HS731L and Headphone Speaker HS731R (S11). Here, S10 and S11 are implemented to output the portion which the user failed to hear. Host H retrieves the mounted microphone entered audio data from Mounted Microphone Entered Audio Data Storage Area H731*b*2 and sends the data to Communication Device 200 (S12). CPU 211 (FIG. 1) receives the mounted microphone entered audio data from Host H in a wireless fashion and outputs the data from Headphone Speaker HS731L and Headphone Speaker HS731R (S13). Here, S12 and S13 are implemented until the pause command is input, by utilizing Input Device 210 (FIG. 1) or via voice recognition system, in the next step. If the pause command is input, by utilizing Input Device 210 (FIG. 1) or via voice recognition system, within 5 seconds from implementing S12 and S13, Host H proceeds to the next step; if not, Host H proceeds to S16 (S14). Here, the pause command is the command to pause outputting the replaying audio data from Headphone Speaker HS731L and Headphone Speaker HS731R. The pause command can be input by pressing any key/button of Input Device 210 (FIG. 1), if utilizing Input Device 210 (FIG. 1). Host H remains paused to output the replaying audio data from Headphone Speaker HS731L and Headphone Speaker HS731R (end of sequence) (S15). Host H resumes outputting the replaying audio data from Headphone Speaker HS731L and Headphone Speaker HS731R (S16). The foregoing sequence is repeated periodically.

This paragraph illustrate(s) 2nd Replay Pause Triggering Event Identifying Software H731*c*6 of Host H and 2nd Replay Pause Triggering Event Identifying Software 206731*c*6 of Communication Device 200, which identify(ies) whether the triggering event indicated by the 2nd replay pause triggering event data has occurred. This sequence is implemented while outputting the replaying audio data. In the present embodiment, Host H retrieves the mounted microphone entered audio data from Mounted Microphone Entered Audio Data Storage Area H731*b*2 (S1). Host H identifies the voice type data or the voice print data of the mounted microphone entered audio data retrieved in the previous step (S2). Host H retrieves the 2nd replay pause triggering event data from 2nd Replay Pause Triggering Event Data Storage Area H731*b*4*b* (S3). If the voice type data or the voice print data identified in S2 matches with the voice type data or the voice print data indicated by the 2nd replay pause triggering event data retrieved in the previous step, Host H proceeds to the next step (S4). Host H pauses outputting the replaying audio data from Headphone Speaker HS731L and Headphone Speaker HS731R (S5). Host H retrieves the 2nd replay pause triggering event occurred message data from 2nd Replay Pause Triggering Event Occurred Message Data Storage Area H731*b*5*b* and sends the data to Communication Device 200 (S6). CPU 211 (FIG. 1) receives the 2nd replay pause triggering event occurred message data from Host H in a wireless fashion and displays the data on LCD 201 (FIG. 1) (S7). Host H retrieves the current location data from Current Location Data Storage Area H731*b*6 (S8). Host H stores the current location data retrieved in the previous step as the 2nd replay paused location data in 2nd Replay Paused Location Data Storage Area H731*b*7*b* (S9). Host H retrieves the mounted microphone recorded audio data from Mounted Microphone Recorded Audio Data Storage Area H731*b*3 and sends the data to Communication Device 200 (S10). CPU 211 (FIG. 1) receives the mounted microphone recorded audio data from Host H in a wireless fashion and outputs the data from Headphone Speaker HS731L and Headphone Speaker HS731R (S11). Here, S10 and S11 are implemented to output the portion which the user failed to hear. Host H retrieves the mounted microphone entered audio data from Mounted Microphone Entered Audio Data Storage Area H731*b*2 and sends the data to Communication Device 200 (S12). CPU 211 (FIG. 1) receives the mounted microphone entered audio data from Host H in a wireless fashion and outputs the data from Headphone Speaker HS731L and Headphone Speaker HS731R (S13). Here, S12 and S13 are implemented until the pause command is input, by utilizing Input Device 210 (FIG. 1) or via voice recognition system, in the next step. If the pause command is input, by utilizing Input Device 210 (FIG. 1) or via voice recognition system, within 5 seconds from implementing S12 and S13, Host H proceeds to the next step; if not, Host H proceeds to S16 (S14). Here, the pause command is the command to pause outputting the replaying audio data from Headphone Speaker HS731L and Headphone Speaker HS731R. The pause command can be input by pressing any key/button of Input Device 210 (FIG. 1), if utilizing Input Device 210 (FIG. 1). Host H remains paused to output the replaying audio data from Headphone Speaker HS731L and Headphone Speaker HS731R (end of sequence) (S15). Host H resumes outputting the replaying audio data from Headphone Speaker HS731L and Headphone Speaker HS731R (S16). The foregoing sequence is repeated periodically.

This paragraph illustrate(s) 3rd Replay Pause Triggering Event Identifying Software H731c7 of Host H and 3rd Replay Pause Triggering Event Identifying Software 206731c7 of Communication Device 200, which identify(ies) whether the triggering event indicated by the 3rd replay pause triggering event data has occurred. This sequence is implemented while outputting the replaying audio data. In the present embodiment, Host H retrieves the mounted microphone entered audio data from Mounted Microphone Entered Audio Data Storage Area H731b2 (S1). Host H identifies the text data included in the mounted microphone entered audio data retrieved in the previous step by implementing the voice recognition system (S2). Host H retrieves the 3rd replay pause triggering event data from 3rd Replay Pause Triggering Event Data Storage Area H731b4c (S3). If the text data identified in S2 includes one of the text data indicated by the 3rd replay pause triggering event data retrieved in the previous step, Host H proceeds to the next step (S4). Host H pauses outputting the replaying audio data from Headphone Speaker HS731L and Headphone Speaker HS731R (S5). Host H retrieves the 3rd replay pause triggering event occurred message data from 3rd Replay Pause Triggering Event Occurred Message Data Storage Area H731b5c and sends the data to Communication Device 200 (S6). CPU 211 (FIG. 1) receives the 3rd replay pause triggering event occurred message data from Host H in a wireless fashion and displays the data on LCD 201 (FIG. 1) (S7). Host H retrieves the current location data from Current Location Data Storage Area H731b6 (S8). Host H stores the current location data retrieved in the previous step as the 3rd replay paused location data in 3rd Replay Paused Location Data Storage Area H731b7c (S9). Host H retrieves the mounted microphone recorded audio data from Mounted Microphone Recorded Audio Data Storage Area H731b3 and sends the data to Communication Device 200 (S10). CPU 211 (FIG. 1) receives the mounted microphone recorded audio data from Host H in a wireless fashion and outputs the data from Headphone Speaker HS731L and Headphone Speaker HS731R (S11). Here, S10 and S11 are implemented to output the portion which the user failed to hear. Host H retrieves the mounted microphone entered audio data from Mounted Microphone Entered Audio Data Storage Area H731b2 and sends the data to Communication Device 200 (S12). CPU 211 (FIG. 1) receives the mounted microphone entered audio data from Host H in a wireless fashion and outputs the data from Headphone Speaker HS731L and Headphone Speaker HS731R (S13). Here, S12 and S13 are implemented until the pause command is input, by utilizing Input Device 210 (FIG. 1) or via voice recognition system, in the next step. If the pause command is input, by utilizing Input Device 210 (FIG. 1) or via voice recognition system, within 5 seconds from implementing S12 and S13, Host H proceeds to the next step; if not, Host H proceeds to S16 (S14). Here, the pause command is the command to pause outputting the replaying audio data from Headphone Speaker HS731L and Headphone Speaker HS731R. The pause command can be input by pressing any key/button of Input Device 210 (FIG. 1), if utilizing Input Device 210 (FIG. 1). Host H remains paused to output the replaying audio data from Headphone Speaker HS731L and Headphone Speaker HS731R (end of sequence) (S15). Host H resumes outputting the replaying audio data from Headphone Speaker HS731L and Headphone Speaker HS731R (S16). The foregoing sequence is repeated periodically.

This paragraph illustrate(s) Replay Paused Location Data Displaying Software H731c8 of Host H and Replay Paused Location Data Displaying Software 206731c8 of Communication Device 200, which display(s) the log of the locations at which outputting the replaying audio data was paused. In the present embodiment, Host H retrieves the map data from Map Data Storage Area H731b8 and sends the data to Communication Device 200 (S1). CPU 211 (FIG. 1) receives the map data from Host H in a wireless fashion and displays the data on LCD 201 (FIG. 1) (S2). Host H retrieves the current location data from Current Location Data Storage Area H731b6 and sends the data to Communication Device 200 (S3). CPU 211 (FIG. 1) receives the current location data from Host H in a wireless fashion (S4). Host H retrieves the current location icon data from Current Location Icon Data Storage Area H731b9a and sends the data to Communication Device 200 (S5). CPU 211 (FIG. 1) receives the current location icon data from Host H in a wireless fashion (S6). CPU 211 (FIG. 1) displays the current location icon data received in the previous step at the location corresponding to the current location data received in S4 on the map data displayed in S2 (S7). Host H retrieves the 1st replay paused location data from 1st Replay Paused Location Data Storage Area H731b7a and sends the data to Communication Device 200 (S8). CPU 211 (FIG. 1) receives the 1st replay paused location data from Host H in a wireless fashion (S9). Host H retrieves the 1st replay paused location icon data from 1st Replay Paused Location Icon Data Storage Area H731b9b and sends the data to Communication Device 200 (S10). CPU 211 (FIG. 1) receives the 1st replay paused location icon data from Host H in a wireless fashion (S11). CPU 211 (FIG. 1) displays the 1st replay paused location icon data received in the previous step at the location corresponding to the 1st replay paused location data received in S9 on the map data displayed in S2 (S12). Host H retrieves the 2nd replay paused location data from 2nd Replay Paused Location Data Storage Area H731b7b and sends the data to Communication Device 200 (S13). CPU 211 (FIG. 1) receives the 2nd replay paused location data from Host H in a wireless fashion (S14). Host H retrieves the 2nd replay paused location icon data from 2nd Replay Paused Location Icon Data Storage Area H731b9c and sends the data to Communication Device 200 (S15). CPU 211 (FIG. 1) receives the 2nd replay paused location icon data from Host H in a wireless fashion (S16). CPU 211 (FIG. 1) displays the 2nd replay paused location icon data received in the previous step at the location corresponding to the 2nd replay paused location data received in S14 on the map data displayed in S2 (S17). Host H retrieves the 3rd replay paused location data from 3rd Replay Paused Location Data Storage Area H731b7c and sends the data to Communication Device 200 (S18). CPU 211 (FIG. 1) receives the 3rd replay paused location data from Host H in a wireless fashion (S19). Host H retrieves the 3rd replay paused location icon data from 3rd Replay Paused Location Icon Data Storage Area H731b9d and sends the data to Communication Device 200 (S20). CPU 211 (FIG. 1) receives the 3rd replay paused location icon data from Host H in a wireless fashion (S21). CPU 211 (FIG. 1) displays the 3rd replay paused location icon data received in the previous step at the location corresponding to the 3rd replay paused location data received in S19 on the map data displayed in S2 (S22). The foregoing sequence is repeated periodically.

The following paragraphs illustrate another embodiment wherein Communication Device 200 plays the major role in implementing the present function.

This paragraph illustrate(s) Current Location Data Producing Software 206731c1 of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step (S2). CPU 211 (FIG. 1) stores the current location data produced in the previous step in Current Location Data Storage Area 206731b6 (S3). The foregoing sequence is repeated periodically.

This paragraph illustrate(s) Replaying Audio Data Outputting Software 206731c2 of Communication Device 200, which output(s) the replaying audio data from Headphone Speaker HS731L and Headphone Speaker HS731R in a stereo fashion. In the present embodiment, CPU 211 (FIG. 1) retrieves the replaying audio data from Replaying Audio Data Storage Area 206731b1 (S1). CPU 211 (FIG. 1) outputs the replaying audio data retrieved in the previous step from Headphone Speaker HS731L and Headphone Speaker HS731R (S2). The foregoing sequence is repeated and thereby replaying the audio data is continued unless a pause command or a stop command is input by utilizing Input Device 210 (FIG. 1) or via voice recognition system.

This paragraph illustrate(s) Mounted Microphone Entered Audio Data Producing Software 206731c3 of Communication Device 200, which produce(s) the mounted microphone entered audio data. In the present embodiment, CPU 211 (FIG. 1) retrieves the audio data from Mounted Microphone MM731L and Mounted Microphone MM731R (S1). CPU 211 (FIG. 1) stores the audio data retrieved in the previous step as the mounted microphone entered audio data in Mounted Microphone Entered Audio Data Storage Area 206731b2 (S2). The foregoing sequence is repeated periodically.

This paragraph illustrate(s) Mounted Microphone Recorded Audio Data Producing Software 206731c4 of Communication Device 200, which produce(s) the mounted microphone recorded audio data. In the present embodiment, CPU 211 (FIG. 1) retrieves the mounted microphone entered audio data from Mounted Microphone Entered Audio Data Storage Area 206731b2 (S1). CPU 211 (FIG. 1) stores the mounted microphone entered audio data retrieved in the previous step as the mounted microphone recorded audio data in Mounted Microphone Recorded Audio Data Storage Area 206731b3 (S2). The foregoing sequence is repeated periodically.

This paragraph illustrate(s) 1st Replay Pause Triggering Event Identifying Software 206731c5 of Communication Device 200, which identify(ies) whether the triggering event indicated by the 1st replay pause triggering event data has occurred. This sequence is implemented while outputting the replaying audio data. In the present embodiment, CPU 211 (FIG. 1) retrieves the mounted microphone entered audio data from Mounted Microphone Entered Audio Data Storage Area 206731b2 (S1). CPU 211 (FIG. 1) identifies the sound volume of the mounted microphone entered audio data retrieved in the previous step (S2). CPU 211 (FIG. 1) retrieves the 1st replay pause triggering event data from 1st Replay Pause Triggering Event Data Storage Area 206731b4a (S3). If the sound volume identified in S2 is larger than the sound volume indicated by the 1st replay pause triggering event data retrieved in the previous step, CPU 211 (FIG. 1) proceeds to the next step (S4). CPU 211 (FIG. 1) pauses outputting the replaying audio data from Headphone Speaker HS731L and Headphone Speaker HS731R (S5). CPU 211 (FIG. 1) retrieves the 1st replay pause triggering event occurred message data from 1st Replay Pause Triggering Event Occurred Message Data Storage Area 206731b5a (S6). CPU 211 (FIG. 1) displays the 1st replay pause triggering event occurred message data retrieved in the previous step on LCD 201 (FIG. 1) (S7). CPU 211 (FIG. 1) retrieves the current location data from Current Location Data Storage Area 206731b6 (S8). CPU 211 (FIG. 1) stores the current location data retrieved in the previous step as the 1st replay paused location data in 1st Replay Paused Location Data Storage Area 206731b7a (S9). CPU 211 (FIG. 1) retrieves the mounted microphone recorded audio data from Mounted Microphone Recorded Audio Data Storage Area 206731b3 (S10). CPU 211 (FIG. 1) outputs the mounted microphone recorded audio data retrieved in the previous step from Headphone Speaker HS731L and Headphone Speaker HS731R (S11). Here, S10 and S11 are implemented to output the portion which the user failed to hear. CPU 211 (FIG. 1) retrieves the mounted microphone entered audio data from Mounted Microphone Entered Audio Data Storage Area 206731b2 (S12). CPU 211 (FIG. 1) outputs the mounted microphone entered audio data retrieved in the previous step from Headphone Speaker HS731L and Headphone Speaker HS731R (S13). Here, S12 and S13 are implemented until the pause command is input, by utilizing Input Device 210 (FIG. 1) or via voice recognition system, in the next step. If the pause command is input, by utilizing Input Device 210 (FIG. 1) or via voice recognition system, within 5 seconds from implementing S12 and S13, CPU 211 (FIG. 1) proceeds to the next step; if not, CPU 211 (FIG. 1) proceeds to S16 (S14). Here, the pause command is the command to pause outputting the replaying audio data from Headphone Speaker HS731L and Headphone Speaker HS731R. The pause command can be input by pressing any key/button of Input Device 210 (FIG. 1), if utilizing Input Device 210 (FIG. 1). CPU 211 (FIG. 1) remains paused to output the replaying audio data from Headphone Speaker HS731L and Headphone Speaker HS731R (end of sequence) (S15). CPU 211 (FIG. 1) resumes outputting the replaying audio data from Headphone Speaker HS731L and Headphone Speaker HS731R (S16). The foregoing sequence is repeated periodically.

This paragraph illustrate(s) 2nd Replay Pause Triggering Event Identifying Software 206731c6 of Communication Device 200, which identify(ies) whether the triggering event indicated by the 2nd replay pause triggering event data has occurred. This sequence is implemented while outputting the replaying audio data. In the present embodiment, CPU 211 (FIG. 1) retrieves the mounted microphone entered audio data from Mounted Microphone Entered Audio Data Storage Area 206731b2 (S1). CPU 211 (FIG. 1) identifies the voice type data or the voice print data of the mounted microphone entered audio data retrieved in the previous step (S2). CPU 211 (FIG. 1) retrieves the 2nd replay pause triggering event data from 2nd Replay Pause Triggering Event Data Storage Area 206731b4b (S3). If the voice type data or the voice print data identified in S2 matches with the voice type data or the voice print data indicated by the 2nd replay pause triggering event data retrieved in the previous step, CPU 211 (FIG. 1) proceeds to the next step (S4). CPU 211 (FIG. 1) pauses outputting the replaying audio data from Headphone Speaker HS731L and Headphone Speaker HS731R (S5). CPU 211 (FIG. 1) retrieves the 2nd replay pause triggering event occurred message data from 2nd Replay Pause Triggering Event Occurred Message Data Storage Area 206731*b*5*b* (S6). CPU 211 (FIG. 1) displays the 2nd replay pause triggering event occurred message data retrieved in the previous step on LCD 201 (FIG. 1) (S7). CPU 211 (FIG. 1) retrieves the current location data from Current Location Data Storage Area 206731*b*6 (S8). CPU 211 (FIG. 1) stores the current location data retrieved in the previous step as the 2nd replay paused location data in 2nd Replay Paused Location Data Storage Area 206731*b*7*b* (S9). CPU 211 (FIG. 1) retrieves the mounted microphone recorded audio data from Mounted Microphone Recorded Audio Data Storage Area 206731*b*3 (S10). CPU 211 (FIG. 1) outputs the mounted microphone recorded audio data retrieved in the previous step from Headphone Speaker HS731L and Headphone Speaker HS731R (S11). Here, S10 and S11 are implemented to output the portion which the user failed to hear. CPU 211 (FIG. 1) retrieves the mounted microphone entered audio data from Mounted Microphone Entered Audio Data Storage Area 206731*b*2 (S12). CPU 211 (FIG. 1) outputs the mounted microphone entered audio data retrieved in the previous step from Headphone Speaker HS731L and Headphone Speaker HS731R (S13). Here, S12 and S13 are implemented until the pause command is input, by utilizing Input Device 210 (FIG. 1) or via voice recognition system, in the next step. If the pause command is input, by utilizing Input Device 210 (FIG. 1) or via voice recognition system, within 5 seconds from implementing S12 and S13, CPU 211 (FIG. 1) proceeds to the next step; if not, CPU 211 (FIG. 1) proceeds to S16 (S14). Here, the pause command is the command to pause outputting the replaying audio data from Headphone Speaker HS731L and Headphone Speaker HS731R. The pause command can be input by pressing any key/button of Input Device 210 (FIG. 1), if utilizing Input Device 210 (FIG. 1). CPU 211 (FIG. 1) remains paused to output the replaying audio data from Headphone Speaker HS731L and Headphone Speaker HS731R (end of sequence) (S15). CPU 211 (FIG. 1) resumes outputting the replaying audio data from Headphone Speaker HS731L and Headphone Speaker HS731R (S16). The foregoing sequence is repeated periodically.

This paragraph illustrate(s) 3rd Replay Pause Triggering Event Identifying Software 206731*c*7 of Communication Device 200, which identify(ies) whether the triggering event indicated by the 3rd replay pause triggering event data has occurred. This sequence is implemented while outputting the replaying audio data. In the present embodiment, CPU 211 (FIG. 1) retrieves the mounted microphone entered audio data from Mounted Microphone Entered Audio Data Storage Area 206731*b*2 (S1). CPU 211 (FIG. 1) identifies the text data included in the mounted microphone entered audio data retrieved in the previous step by implementing the voice recognition system (S2). CPU 211 (FIG. 1) retrieves the 3rd replay pause triggering event data from 3rd Replay Pause Triggering Event Data Storage Area 206731*b*4*c* (S3). If the text data identified in S2 includes one of the text data indicated by the 3rd replay pause triggering event data retrieved in the previous step, CPU 211 (FIG. 1) proceeds to the next step (S4). CPU 211 (FIG. 1) pauses outputting the replaying audio data from Headphone Speaker HS731L and Headphone Speaker HS731R (S5). CPU 211 (FIG. 1) retrieves the 3rd replay pause triggering event occurred message data from 3rd Replay Pause Triggering Event Occurred Message Data Storage Area 206731*b*5*c* (S6). CPU 211 (FIG. 1) displays the 3rd replay pause triggering event occurred message data retrieved in the previous step on LCD 201 (FIG. 1) (S7). CPU 211 (FIG. 1) retrieves the current location data from Current Location Data Storage Area 206731*b*6 (S8). CPU 211 (FIG. 1) stores the current location data retrieved in the previous step as the 3rd replay paused location data in 3rd Replay Paused Location Data Storage Area 206731*b*7*c* (S9). CPU 211 (FIG. 1) retrieves the mounted microphone recorded audio data from Mounted Microphone Recorded Audio Data Storage Area 206731*b*3 (S10). CPU 211 (FIG. 1) outputs the mounted microphone recorded audio data retrieved in the previous step from Headphone Speaker HS731L and Headphone Speaker HS731R (S11). Here, S10 and S11 are implemented to output the portion which the user failed to hear. CPU 211 (FIG. 1) retrieves the mounted microphone entered audio data from Mounted Microphone Entered Audio Data Storage Area 206731*b*2 (S12). CPU 211 (FIG. 1) outputs the mounted microphone entered audio data retrieved in the previous step from Headphone Speaker HS731L and Headphone Speaker HS731R (S13). Here, S12 and S13 are implemented until the pause command is input, by utilizing Input Device 210 (FIG. 1) or via voice recognition system, in the next step. If the pause command is input, by utilizing Input Device 210 (FIG. 1) or via voice recognition system, within 5 seconds from implementing S12 and S13, CPU 211 (FIG. 1) proceeds to the next step; if not, CPU 211 (FIG. 1) proceeds to S16 (S14). Here, the pause command is the command to pause outputting the replaying audio data from Headphone Speaker HS731L and Headphone Speaker HS731R. The pause command can be input by pressing any key/button of Input Device 210 (FIG. 1), if utilizing Input Device 210 (FIG. 1). CPU 211 (FIG. 1) remains paused to output the replaying audio data from Headphone Speaker HS731L and Headphone Speaker HS731R (end of sequence) (S15). CPU 211 (FIG. 1) resumes outputting the replaying audio data from Headphone Speaker HS731L and Headphone Speaker HS731R (S16). The foregoing sequence is repeated periodically.

This paragraph illustrate(s) Replay Paused Location Data Displaying Software 206731*c*8 of Communication Device 200, which display(s) the log of the locations at which outputting the replaying audio data was paused. In the present embodiment, CPU 211 (FIG. 1) retrieves the map data from Map Data Storage Area 206731*b*8 (S1). CPU 211 (FIG. 1) displays the map data retrieved in the previous step on LCD 201 (FIG. 1) (S2). CPU 211 (FIG. 1) retrieves the current location data from Current Location Data Storage Area 206731*b*6 (S3). CPU 211 (FIG. 1) retrieves the current location icon data from Current Location Icon Data Storage Area 206731*b*9*a* (S4). CPU 211 (FIG. 1) displays the current location icon data retrieved in the previous step at the location corresponding to the current location data retrieved in S3 on the map data displayed in S2 (S5). CPU 211 (FIG. 1) retrieves the 1st replay paused location data from 1st Replay Paused Location Data Storage Area 206731*b*7*a* (S6). CPU 211 (FIG. 1) retrieves the 1st replay paused location icon data from 1st Replay Paused Location Icon Data Storage Area 206731*b*9*b* (S7). CPU 211 (FIG. 1) displays the 1st replay paused location icon data retrieved in the previous step at the location corresponding to the 1st replay paused location data retrieved in S6 on the map data displayed in S2 (S8). CPU 211 (FIG. 1) retrieves the 2nd replay paused location data from 2nd Replay Paused Location Data Storage Area 206731*b*7*b* (S9). CPU 211 (FIG. 1) retrieves the 2nd replay paused location icon data from 2nd Replay Paused Location Icon Data Storage Area 206731*b*9*c* (S10). CPU 211 (FIG. 1) displays the 2nd replay paused location icon data retrieved in the previous step at the location corresponding to the 2nd replay paused location data retrieved in S9 on the map data displayed in S2 (S11). CPU 211 (FIG. 1) retrieves the 3rd replay paused location data from 3rd Replay Paused Location Data Storage Area 206731*b*7*c* (S12). CPU 211 (FIG. 1) retrieves the 3rd replay paused location icon data from 3rd Replay Paused Location Icon Data Storage Area 206731b9d (S13). CPU 211 (FIG. 1) displays the 3rd replay paused location icon data retrieved in the previous step at the location corresponding to the 3rd replay paused location data retrieved in S12 on the map data displayed in S2 (S14). The foregoing sequence is repeated periodically.

Instead of pausing to output the replaying audio data when the triggering event indicated by the 1st, 2nd, or 3rd replay pause triggering event data occurs, the replaying audio data may be continuously output, however, with the a predetermined low sound volume when the foregoing triggering event occurs, in which case the replaying audio data is replayed with the previous sound volume unless a permanently sound volume lowering command is input, by utilizing Input Device 210 (FIG. 1) or via voice recognition system, within a predetermined period of time. The summary of this embodiment is the following: the microphone mounted headphone replay sound volume lowering function, wherein a headphone is connected to said communication device and a mounted microphone is mounted on said headphone, when a 1st triggering event, a 2nd triggering event, or a 3rd triggering event occurs while replaying an audio data, said audio data is temporarily replayed with the a lowered sound volume and replaying said audio data is resumed with the previous sound volume unless a permanently sound volume lowering command is input, by utilizing Input Device 210 (FIG. 1) or via voice recognition system, within a predetermined period of time, wherein said 1st triggering event indicates that the sound volume of the audio data retrieved from said mounted microphone exceeds a certain level, said 2nd triggering event indicates that a certain voice type data or voice print data is detected in the audio data retrieved from said mounted microphone, and said 3rd triggering event indicates that a certain text data is detected in the audio data retrieved from said mounted microphone, a 1st triggering event occurred message is displayed when said audio data is replayed with the said lowered sound volume due to said 1st triggering event, a 2nd triggering event occurred message is displayed when said audio data is replayed with the said lowered sound volume due to said 2nd triggering event, and a 3rd triggering event occurred message is displayed when said audio data is replayed with the said lowered sound volume due to said 3rd triggering event, and the current location of said communication device, a 1st triggering event occurred location which indicates the geographic location at which said 1st triggering event occurred, a 2nd triggering event occurred location which indicates the geographic location at which said 2nd triggering event occurred, and a 3rd triggering event occurred location which indicates the geographic location at which said 3rd triggering event occurred are indicated on said display.

<<First Area Dependent Notice Type Changing Function>>

The following paragraphs illustrate the first area dependent notice type changing function, wherein when said communication device is identified to be located in a 1st geographic area, a pin-point location of said communication device is notified to another device and a pin-point location notified message data is displayed on said display, when said communication device is identified to be located in a 2nd geographic area, a 1st specific zone in which said communication device is located is notified to said another device and a 1st specific zone notified message data is displayed on said display if the current time is within a 1st time frame, and a 2nd specific zone in which said communication device is located is notified to said another device and a 2nd specific zone notified message data is displayed on said display if the current time is within a 2nd time frame, when said communication device is identified to be located in a 3rd geographic area, a 1st false location is notified to said another device and a 1st false location notified message data is displayed on said display if the current time is within a 1st time frame, and a 2nd false location is notified to said another device and a 2nd false location notified message data is displayed on said display if the current time is within a 2nd time frame, when said communication device is identified to be located in a 4th geographic area, a current geographic location unknown notice is sent to said another device and a current geographic location unknown message data is displayed on said display, and when said communication device is identified to be located in a 5th geographic area, a 1st previous location which indicates the location of said communication device at a 1st previous time is notified to said another device and a 1st previous location notified message data is displayed on said display if the current time is within a 1st time frame, and a 2nd previous location which indicates the location of said communication device at a 2nd previous time is notified to said another device and a 2nd previous location notified message data is displayed on said display if the current time is within a 2nd time frame.

This paragraph illustrates the storage area included in Host H. In the present embodiment, Host H includes First Area Dependent Notice Type Changing Info Storage Area H732a of which the data and the software program(s) stored therein are described hereinafter.

This paragraph illustrates the storage area(s) included in First Area Dependent Notice Type Changing Info Storage Area H732a. In the present embodiment, First Area Dependent Notice Type Changing Info Storage Area H732a includes First Area Dependent Notice Type Changing Data Storage Area H732b and First Area Dependent Notice Type Changing Software Storage Area H732c. First Area Dependent Notice Type Changing Data Storage Area H732b stores the data necessary to implement the present function on the side of Host H, such as the one(s) described hereinafter. First Area Dependent Notice Type Changing Software Storage Area H732c stores the software program(s) necessary to implement the present function on the side of Host H, such as the one(s) described hereinafter.

This paragraph illustrates the storage area(s) included in First Area Dependent Notice Type Changing Data Storage Area H732b. In the present embodiment, First Area Dependent Notice Type Changing Data Storage Area H732b includes Current Location Data Storage Area H732b1, Entire Geographic Area Data Storage Area H732b2, Entire Specific Zone Data Storage Area H732b3, Entire False Location Data Storage Area H732b4, Entire Previous Location Data Storage Area H732b5, Entire Notified Message Data Storage Area H732b6, Entire Time Frame Data Storage Area H732b7, and Work Area H732b8. Current Location Data Storage Area H732b1 stores the current location data which indicates the current geographic location of Communication Device 200 in (x,y,z) format. Entire Geographic Area Data Storage Area H732b2 stores the data described hereinafter. Entire Specific Zone Data Storage Area H732b3 stores the data described hereinafter. Entire False Location Data Storage Area H732b4 stores the data described hereinafter. Entire Previous Location Data Storage Area H732b5 stores the data described hereinafter. Entire Notified Message Data Storage Area H732b6 stores the data described hereinafter. Entire Time Frame Data Storage Area H732b7 stores the data described hereinafter. Work Area H732b8 is utilized as a work area to perform calculation and temporarily store data to implement the present function.

This paragraph illustrates the storage area(s) included in Entire Geographic Area Data Storage Area H732b2. In the present embodiment, Entire Geographic Area Data Storage Area H732b2 includes 1st Geographic Area Data Storage Area H732b2a, 2nd Geographic Area Data Storage Area H732b2b, 3rd Geographic Area Data Storage Area H732b2c, 4th Geographic Area Data Storage Area H732b2d, and 5th Geographic Area Data Storage Area H732b2e. 1st Geographic Area Data Storage Area H732b2a stores the 1st geographic area data which indicates the 1st geographic area. Here, the 1st geographic area may indicate a specific county, city, town, or state. The 1st geographic area may indicate a specific artificial structure (e.g., house, building, railway station, subway station, airport, movie theater, or shopping mall). The 1st geographic area may indicate a specific area (e.g., 2nd floor or 2nd room of the 2nd floor) of a specific artificial structure (e.g., house, building, railway station, subway station, airport, movie theater, or shopping mall). 2nd Geographic Area Data Storage Area H732b2b stores the 2nd geographic area data which indicates the 2nd geographic area. Here, the 2nd geographic area may indicate a specific county, city, town, or state. The 2nd geographic area may indicate a specific artificial structure (e.g., house, building, railway station, subway station, airport, movie theater, or shopping mall). The 2nd geographic area may indicate a specific area (e.g., 2nd floor or 2nd room of the 2nd floor) of a specific artificial structure (e.g., house, building, railway station, subway station, airport, movie theater, or shopping mall). 3rd Geographic Area Data Storage Area H732b2c stores the 3rd geographic area data which indicates the 3rd geographic area. Here, the 3rd geographic area may indicate a specific county, city, town, or state. The 3rd geographic area may indicate a specific artificial structure (e.g., house, building, railway station, subway station, airport, movie theater, or shopping mall). The 3rd geographic area may indicate a specific area (e.g., 2nd floor or 2nd room of the 2nd floor) of a specific artificial structure (e.g., house, building, railway station, subway station, airport, movie theater, or shopping mall). 4th Geographic Area Data Storage Area H732b2d stores the 4th geographic area data which indicates the 4th geographic area. Here, the 4th geographic area may indicate a specific county, city, town, or state. The 4th geographic area may indicate a specific artificial structure (e.g., house, building, railway station, subway station, airport, movie theater, or shopping mall). The 4th geographic area may indicate a specific area (e.g., 2nd floor or 2nd room of the 2nd floor) of a specific artificial structure (e.g., house, building, railway station, subway station, airport, movie theater, or shopping mall). 5th Geographic Area Data Storage Area H732b2e stores the 5th geographic area data which indicates the 5th geographic area. Here, the 5th geographic area may indicate a specific county, city, town, or state. The 5th geographic area may indicate a specific artificial structure (e.g., house, building, railway station, subway station, airport, movie theater, or shopping mall). The 5th geographic area may indicate a specific area (e.g., 2nd floor or 2nd room of the 2nd floor) of a specific artificial structure (e.g., house, building, railway station, subway station, airport, movie theater, or shopping mall).

This paragraph illustrates the storage area(s) included in Entire Specific Zone Data Storage Area H732b3. In the present embodiment, Entire Specific Zone Data Storage Area H732b3 includes 1st Specific Zone Data Storage Area H732b3a and 2nd Specific Zone Data Storage Area H732b3b. 1st Specific Zone Data Storage Area H732b3a stores the 1st specific zone data which indicates the 1st specific zone. The 1st specific zone may indicate an area of 10 meter diameter in which Communication Device 200 is currently located. The 1st specific zone may indicate a specific portion (e.g., the 2nd floor) of the artificial structure (e.g., house, building, railway station, subway station, airport, movie theater, or shopping mall) in which Communication Device 200 is currently located. 2nd Specific Zone Data Storage Area H732b3b stores the 2nd specific zone data which indicates the 2nd specific zone. The 2nd specific zone may indicate an area of 100 meter diameter in which Communication Device 200 is currently located. The 2nd specific zone may indicate the entire artificial structure (e.g., house, building, railway station, subway station, airport, movie theater, or shopping mall) in which Communication Device 200 is currently located.

This paragraph illustrates the storage area(s) included in Entire False Location Data Storage Area H732b4. In the present embodiment, Entire False Location Data Storage Area H732b4 includes 1st False Location Data Storage Area H732b4a and 2nd False Location Data Storage Area H732b4b. 1st False Location Data Storage Area H732b4a stores the 1st false location data which indicates the 1st false location in (x,y,z) format. The 1st false location does not reflect the current geographic location of Communication Device 200. 2nd False Location Data Storage Area H732b4b stores the 2nd false location data which indicates the 2nd false location in (x,y,z) format. The 2nd false location does not reflect the current geographic location of Communication Device 200.

This paragraph illustrates the storage area(s) included in Entire Previous Location Data Storage Area H732b5. In the present embodiment, Entire Previous Location Data Storage Area H732b5 includes 1st Previous Location Data Storage Area H732b5a and 2nd Previous Location Data Storage Area H732b5b. 1st Previous Location Data Storage Area H732b5a stores the 1st previous location data which indicates the 1st previous location. Here, the 1st previous location is the pin-point location at which Communication Device 200 was located 10 minutes ago. 2nd Previous Location Data Storage Area H732b5b stores the 2nd previous location data which indicates the 2nd previous location. Here, the 2nd previous location is the pin-point location at which Communication Device 200 was located 20 minutes ago.

This paragraph illustrates the storage area(s) included in Entire Notified Message Data Storage Area H732b6. In the present embodiment, Entire Notified Message Data Storage Area H732b6 includes Pin-point Location Notified Message Data Storage Area H732b6a, 1st Specific Zone Notified Message Data Storage Area H732b6b, 2nd Specific Zone Notified Message Data Storage Area H732b6c, 1st False Location Notified Message Data Storage Area H732b6d, 2nd False Location Notified Message Data Storage Area H732b6e, Current Geographic Location Unknown Notified Message Data Storage Area H732b6f, 1st Previous Location Notified Message Data Storage Area H732b6g, and 2nd Previous Location Notified Message Data Storage Area H732b6h. Pin-point Location Notified Message Data Storage Area H732b6a stores the pin-point location notified message data which is the message indicating that the pin-point current geographic location of Communication Device 200 is notified to the requester. 1st Specific Zone Notified Message Data Storage Area H732b6b stores the 1st specific zone notified message data which is the message indicating that the 1st specific zone in which Communication Device 200 is currently located is notified to the requester. 2nd Specific Zone Notified Message Data Storage Area H732b6c stores the 2nd specific zone notified message data which is the message indicating that the 2nd specific zone in which Communication Device 200 is currently located is notified to the requester. 1st False Location Notified Message Data Storage Area H732b6d stores the 1st false location notified message data which is the message indicating that the 1st false location is notified to the requester as the pin-point current geographic location of Communication Device 200. 2nd False Location Notified Message Data Storage Area H732b6e stores the 2nd false location notified message data which is the message indicating that the 2nd false location is notified to the requester as the pin-point current geographic location of Communication Device 200. Current Geographic Location Unknown Notified Message Data Storage Area H732b6f stores the current geographic location unknown notified message data which is the message indicating that the current geographic location of Communication Device 200 is notified to the requester as unknown. 1st Previous Location Notified Message Data Storage Area H732b6g stores the 1st previous location notified message data which is the message indicating that the 1st previous location is notified to the requester as the pin-point current geographic location of Communication Device 200. 2nd Previous Location Notified Message Data Storage Area H732b6h stores the 2nd previous location notified message data which is the message indicating that the 2nd previous location is notified to the requester as the pin-point current geographic location of Communication Device 200.

This paragraph illustrates the storage area(s) included in Entire Time Frame Data Storage Area H732b7. In the present embodiment, Entire Time Frame Data Storage Area H732b7 includes 1st Time Frame Data Storage Area H732b7a and 2nd Time Frame Data Storage Area H732b7b. 1st Time Frame Data Storage Area H732b7a stores the 1st time frame data which indicates the 1st time frame (e.g., 8:00 am through 6:00 pm). 2nd Time Frame Data Storage Area H732b7b stores the 2nd time frame data which indicates the 2nd time frame. The 2nd time frame is the time frame other than the 1st time frame.

This paragraph illustrates the software program(s) stored in First Area Dependent Notice Type Changing Software Storage Area H732c. In the present embodiment, First Area Dependent Notice Type Changing Software Storage Area H732c stores Current Location Data Producing Software H732c1, 1st Previous Location Data Producing Software H732c2, 2nd Previous Location Data Producing Software H732c3, 1st Specific Zone Data Producing Software H732c4, 2nd Specific Zone Data Producing Software H732c5, Current Location Data Sending Software H732c6, 1st Specific Zone Data Sending Software H732c7, 2nd Specific Zone Data Sending Software H732c8, 1st False Location Data Sending Software H732c9, 2nd False Location Data Sending Software H732c10, Current Geographic Location Unknown Notice Sending Software H732c11, 1st Previous Location Data Sending Software H732c12, and 2nd Previous Location Data Sending Software H732c13. Current Location Data Producing Software H732c1 is the software program described hereinafter. 1st Previous Location Data Producing Software H732c2 is the software program described hereinafter. 2nd Previous Location Data Producing Software H732c3 is the software program described hereinafter. 1st Specific Zone Data Producing Software H732c4 is the software program described hereinafter. 2nd Specific Zone Data Producing Software H732c5 is the software program described hereinafter. Current Location Data Sending Software H732c6 is the software program described hereinafter. 1st Specific Zone Data Sending Software H732c7 is the software program described hereinafter. 2nd Specific Zone Data Sending Software H732c8 is the software program described hereinafter. 1st False Location Data Sending Software H732c9 is the software program described hereinafter. 2nd False Location Data Sending Software H732c10 is the software program described hereinafter. Current Geographic Location Unknown Notice Sending Software H732c11 is the software program described hereinafter. 1st Previous Location Data Sending Software H732c12 is the software program described hereinafter. 2nd Previous Location Data Sending Software H732c13 is the software program described hereinafter.

This paragraph illustrates the storage area included in RAM 206 (FIG. 1) of Communication Device 200. In the present embodiment, RAM 206 includes First Area Dependent Notice Type Changing Info Storage Area 206732a of which the data and the software program(s) stored therein are described hereinafter.

The data and/or the software program(s) necessary to implement the present function may be downloaded from Host H to Communication Device 200.

This paragraph illustrates the storage area(s) included in First Area Dependent Notice Type Changing Info Storage Area 206732a. In the present embodiment, First Area Dependent Notice Type Changing Info Storage Area 206732a includes First Area Dependent Notice Type Changing Data Storage Area 206732b and First Area Dependent Notice Type Changing Software Storage Area 206732c. First Area Dependent Notice Type Changing Data Storage Area 206732b stores the data necessary to implement the present function on the side of Communication Device 200, such as the one(s) described hereinafter. First Area Dependent Notice Type Changing Software Storage Area 206732c stores the software program(s) necessary to implement the present function on the side of Communication Device 200, such as the one(s) described hereinafter.

This paragraph illustrates the storage area(s) included in First Area Dependent Notice Type Changing Data Storage Area 206732b. In the present embodiment, First Area Dependent Notice Type Changing Data Storage Area 206732b includes Current Location Data Storage Area 206732b1, Entire Geographic Area Data Storage Area 206732b2, Entire Specific Zone Data Storage Area 206732b3, Entire False Location Data Storage Area 206732b4, Entire Previous Location Data Storage Area 206732b5, Entire Notified Message Data Storage Area 206732b6, Entire Time Frame Data Storage Area 206732b7, and Work Area 206732b8. Current Location Data Storage Area 206732b1 stores the current location data which indicates the current geographic location of Communication Device 200 in (x,y,z) format. Entire Geographic Area Data Storage Area 206732b2 stores the data described hereinafter. Entire Specific Zone Data Storage Area 206732b3 stores the data described hereinafter. Entire False Location Data Storage Area 206732b4 stores the data described hereinafter. Entire Previous Location Data Storage Area 206732b5 stores the data described hereinafter. Entire Notified Message Data Storage Area 206732b6 stores the data described hereinafter. Entire Time Frame Data Storage Area 206732b7 stores the data described hereinafter. Work Area 206732b8 is utilized as a work area to perform calculation and temporarily store data to implement the present function.

This paragraph illustrates the storage area(s) included in Entire Geographic Area Data Storage Area 206732b2. In the present embodiment, Entire Geographic Area Data Storage Area 206732b2 includes 1st Geographic Area Data Storage Area 206732b2a, 2nd Geographic Area Data Storage Area 206732b2b, 3rd Geographic Area Data Storage Area 206732b2c, 4th Geographic Area Data Storage Area 206732b2d, and 5th Geographic Area Data Storage Area 206732b2e. 1st Geographic Area Data Storage Area 206732b2a stores the 1st geographic area data which indicates the 1st geographic area. Here, the 1st geographic area may indicate a specific county, city, town, or state. The 1st geographic area may indicate a specific artificial structure (e.g., house, building, railway station, subway station, airport, movie theater, or shopping mall). The 1st geographic area may indicate a specific area (e.g., 2nd floor or 2nd room of the 2nd floor) of a specific artificial structure (e.g., house, building, railway station, subway station, airport, movie theater, or shopping mall). 2nd Geographic Area Data Storage Area 206732*b*2*b* stores the 2nd geographic area data which indicates the 2nd geographic area. Here, the 2nd geographic area may indicate a specific county, city, town, or state. The 2nd geographic area may indicate a specific artificial structure (e.g., house, building, railway station, subway station, airport, movie theater, or shopping mall). The 2nd geographic area may indicate a specific area (e.g., 2nd floor or 2nd room of the 2nd floor) of a specific artificial structure (e.g., house, building, railway station, subway station, airport, movie theater, or shopping mall). 3rd Geographic Area Data Storage Area 206732*b*2*c* stores the 3rd geographic area data which indicates the 3rd geographic area. Here, the 3rd geographic area may indicate a specific county, city, town, or state. The 3rd geographic area may indicate a specific artificial structure (e.g., house, building, railway station, subway station, airport, movie theater, or shopping mall). The 3rd geographic area may indicate a specific area (e.g., 2nd floor or 2nd room of the 2nd floor) of a specific artificial structure (e.g., house, building, railway station, subway station, airport, movie theater, or shopping mall). 4th Geographic Area Data Storage Area 206732*b*2*d* stores the 4th geographic area data which indicates the 4th geographic area. Here, the 4th geographic area may indicate a specific county, city, town, or state. The 4th geographic area may indicate a specific artificial structure (e.g., house, building, railway station, subway station, airport, movie theater, or shopping mall). The 4th geographic area may indicate a specific area (e.g., 2nd floor or 2nd room of the 2nd floor) of a specific artificial structure (e.g., house, building, railway station, subway station, airport, movie theater, or shopping mall). 5th Geographic Area Data Storage Area 206732*b*2*e* stores the 5th geographic area data which indicates the 5th geographic area. Here, the 5th geographic area may indicate a specific county, city, town, or state. The 5th geographic area may indicate a specific artificial structure (e.g., house, building, railway station, subway station, airport, movie theater, or shopping mall). The 5th geographic area may indicate a specific area (e.g., 2nd floor or 2nd room of the 2nd floor) of a specific artificial structure (e.g., house, building, railway station, subway station, airport, movie theater, or shopping mall).

This paragraph illustrates the storage area(s) included in Entire Specific Zone Data Storage Area 206732*b*3. In the present embodiment, Entire Specific Zone Data Storage Area 206732*b*3 includes 1st Specific Zone Data Storage Area 206732*b*3*a* and 2nd Specific Zone Data Storage Area 206732*b*3*b*. 1st Specific Zone Data Storage Area 206732*b*3*a* stores the 1st specific zone data which indicates the 1st specific zone. The 1st specific zone may indicate an area of 10 meter diameter in which Communication Device 200 is currently located. The 1st specific zone may indicate a specific portion (e.g., the 2nd floor) of the artificial structure (e.g., house, building, railway station, subway station, airport, movie theater, or shopping mall) in which Communication Device 200 is currently located. 2nd Specific Zone Data Storage Area 206732*b*3*b* stores the 2nd specific zone data which indicates the 2nd specific zone. The 2nd specific zone may indicate an area of 100 meter diameter in which Communication Device 200 is currently located. The 2nd specific zone may indicate the entire artificial structure (e.g., house, building, railway station, subway station, airport, movie theater, or shopping mall) in which Communication Device 200 is currently located.

This paragraph illustrates the storage area(s) included in Entire False Location Data Storage Area 206732*b*4. In the present embodiment, Entire False Location Data Storage Area 206732*b*4 includes 1st False Location Data Storage Area 206732*b*4*a* and 2nd False Location Data Storage Area 206732*b*4*b*. 1st False Location Data Storage Area 206732*b*4*a* stores the 1st false location data which indicates the 1st false location in (x,y,z) format. The 1st false location does not reflect the current geographic location of Communication Device 200. 2nd False Location Data Storage Area 206732*b*4*b* stores the 2nd false location data which indicates the 2nd false location in (x,y,z) format. The 2nd false location does not reflect the current geographic location of Communication Device 200.

This paragraph illustrates the storage area(s) included in Entire Previous Location Data Storage Area 206732*b*5. In the present embodiment, Entire Previous Location Data Storage Area 206732*b*5 includes 1st Previous Location Data Storage Area 206732*b*5*a* and 2nd Previous Location Data Storage Area 206732*b*5*b*. 1st Previous Location Data Storage Area 206732*b*5*a* stores the 1st previous location data which indicates the 1st previous location. Here, the 1st previous location is the pin-point location at which Communication Device 200 was located 10 minutes ago. 2nd Previous Location Data Storage Area 206732*b*5*b* stores the 2nd previous location data which indicates the 2nd previous location. Here, the 2nd previous location is the pin-point location at which Communication Device 200 was located 20 minutes ago.

This paragraph illustrates the storage area(s) included in Entire Notified Message Data Storage Area 206732*b*6. In the present embodiment, Entire Notified Message Data Storage Area 206732*b*6 includes Pin-point Location Notified Message Data Storage Area 206732*b*6*a*, 1st Specific Zone Notified Message Data Storage Area 206732*b*6*b*, 2nd Specific Zone Notified Message Data Storage Area 206732*b*6*c*, 1st False Location Notified Message Data Storage Area 206732*b*6*d*, 2nd False Location Notified Message Data Storage Area 206732*b*6*e*, Current Geographic Location Unknown Notified Message Data Storage Area 206732*b*6*f*, 1st Previous Location Notified Message Data Storage Area 206732*b*6*g*, and 2nd Previous Location Notified Message Data Storage Area 206732*b*6*h*. Pin-point Location Notified Message Data Storage Area 206732*b*6*a* stores the pin-point location notified message data which is the message indicating that the pin-point current geographic location of Communication Device 200 is notified to the requester. 1st Specific Zone Notified Message Data Storage Area 206732*b*6*b* stores the 1st specific zone notified message data which is the message indicating that the 1st specific zone in which Communication Device 200 is currently located is notified to the requester. 2nd Specific Zone Notified Message Data Storage Area 206732*b*6*c* stores the 2nd specific zone notified message data which is the message indicating that the 2nd specific zone in which Communication Device 200 is currently located is notified to the requester. 1st False Location Notified Message Data Storage Area 206732*b*6*d* stores the 1st false location notified message data which is the message indicating that the 1st false location is notified to the requester as the pin-point current geographic location of Communication Device 200. 2nd False Location Notified Message Data Storage Area 206732*b*6*e* stores the 2nd false location notified message data which is the message indicating that the 2nd false location is notified to the requester as the pin-point current geographic location of Communication Device 200. Current Geographic Location Unknown Notified Message Data Storage Area 206732b6f stores the current geographic location unknown notified message data which is the message indicating that the current geographic location of Communication Device 200 is notified to the requester as unknown. 1st Previous Location Notified Message Data Storage Area 206732b6g stores the 1st previous location notified message data which is the message indicating that the 1st previous location is notified to the requester as the pin-point current geographic location of Communication Device 200. 2nd Previous Location Notified Message Data Storage Area 206732b6h stores the 2nd previous location notified message data which is the message indicating that the 2nd previous location is notified to the requester as the pin-point current geographic location of Communication Device 200.

This paragraph illustrates the storage area(s) included in Entire Time Frame Data Storage Area 206732b7. In the present embodiment, Entire Time Frame Data Storage Area 206732b7 includes 1st Time Frame Data Storage Area 206732b7a and 2nd Time Frame Data Storage Area 206732b7b. 1st Time Frame Data Storage Area 206732b7a stores the 1st time frame data which indicates the 1st time frame (e.g., 8:00 am through 6:00 pm). 2nd Time Frame Data Storage Area 206732b7b stores the 2nd time frame data which indicates the 2nd time frame. The 2nd time frame is the time frame other than the 1st time frame.

This paragraph illustrates the software program(s) stored in First Area Dependent Notice Type Changing Software Storage Area 206732c. In the present embodiment, First Area Dependent Notice Type Changing Software Storage Area 206732c stores Current Location Data Producing Software 206732c1, 1st Previous Location Data Producing Software 206732c2, 2nd Previous Location Data Producing Software 206732c3, 1st Specific Zone Data Producing Software 206732c4, 2nd Specific Zone Data Producing Software 206732c5, Current Location Data Sending Software 206732c6, 1st Specific Zone Data Sending Software 206732c7, 2nd Specific Zone Data Sending Software 206732c8, 1st False Location Data Sending Software 206732c9, 2nd False Location Data Sending Software 206732c10, Current Geographic Location Unknown Notice Sending Software 206732c11, 1st Previous Location Data Sending Software 206732c12, and 2nd Previous Location Data Sending Software 206732c13. Current Location Data Producing Software 206732c1 is the software program described hereinafter. 1st Previous Location Data Producing Software 206732c2 is the software program described hereinafter. 2nd Previous Location Data Producing Software 206732c3 is the software program described hereinafter. 1st Specific Zone Data Producing Software 206732c4 is the software program described hereinafter. 2nd Specific Zone Data Producing Software 206732c5 is the software program described hereinafter. Current Location Data Sending Software 206732c6 is the software program described hereinafter. 1st Specific Zone Data Sending Software 206732c7 is the software program described hereinafter. 2nd Specific Zone Data Sending Software 206732c8 is the software program described hereinafter. 1st False Location Data Sending Software 206732c9 is the software program described hereinafter. 2nd False Location Data Sending Software 206732c10 is the software program described hereinafter. Current Geographic Location Unknown Notice Sending Software 206732c11 is the software program described hereinafter. 1st Previous Location Data Sending Software 206732c12 is the software program described hereinafter. 2nd Previous Location Data Sending Software 206732c13 is the software program described hereinafter.

This paragraph illustrate(s) Current Location Data Producing Software H732c1 of Host H and Current Location Data Producing Software 206732c1 of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step and sends the data to Host H in a wireless fashion (S2). Host H receives the current location data from Communication Device 200 and stores the data in Current Location Data Storage Area H732b1 (S3). The foregoing sequence is repeated periodically.

This paragraph illustrate(s) 1st Previous Location Data Producing Software H732c2 of Host H, which produce(s) the 1st previous location data. In the present embodiment, Host H increments the timer (not shown) (S1). If the timer value thereof indicates the lapsed time of 10 minutes, Host H proceeds to the next step (S2). Host H retrieves the current location data from Current Location Data Storage Area H732b1 (S3). Host H stores the current location data retrieved in the previous step as the 1st previous location data in 1st Previous Location Data Storage Area H732b5a (S4). The foregoing sequence is repeated periodically.

This paragraph illustrate(s) 2nd Previous Location Data Producing Software H732c3 of Host H, which produce(s) the 2nd previous location data. In the present embodiment, Host H increments the timer (not shown) (S1). If the timer value thereof indicates the lapsed time of 20 minutes, Host H proceeds to the next step (S2). Host H retrieves the current location data from Current Location Data Storage Area H732b1 (S3). Host H stores the current location data retrieved in the previous step as the 2nd previous location data in 2nd Previous Location Data Storage Area H732b5b (S4). The foregoing sequence is repeated periodically.

This paragraph illustrate(s) 1st Specific Zone Data Producing Software H732c4 of Host H, which produce(s) the 1st specific zone data. In the present embodiment, Host H retrieves the current location data from Current Location Data Storage Area H732b1 (S1). Host H produces the 1st specific zone data by referring to the current location data retrieved in the previous step (S2). Host H stores the 1st specific zone data produced in the previous step in 1st Specific Zone Data Storage Area H732b3a (S3). The foregoing sequence is repeated periodically.

This paragraph illustrate(s) 2nd Specific Zone Data Producing Software H732c5 of Host H, which produce(s) the 2nd specific zone data. In the present embodiment, Host H retrieves the current location data from Current Location Data Storage Area H732b1 (S1). Host H produces the 2nd specific zone data by referring to the current location data retrieved in the previous step (S2). Host H stores the 2nd specific zone data produced in the previous step in 2nd Specific Zone Data Storage Area H732b3b (S3). The foregoing sequence is repeated periodically.

This paragraph illustrate(s) Current Location Data Sending Software H732c6 of Host H and Current Location Data Sending Software 206732c6 of Communication Device 200, which send(s) the current location data to the requester. In the present embodiment, Host H periodically checks the incoming signal addressed to Communication Device 200 (S1). If the current geographic location notifying request is detected in the incoming signal, Host H proceeds to the next step (S2). Here, the current geographic location notifying request is the request sent by another device (requester) to notify the current geographic location of Communication Device 200 to the requester. Host H retrieves the current location data from Current Location Data Storage Area H732*b*1 (S3). Host H retrieves the 1st geographic area data from 1st Geographic Area Data Storage Area H732*b*2*a* (S4). If the current location data retrieved in S3 is included in the 1st geographic area data retrieved in the previous step, Host H proceeds to the next step (S5). Host H sends the current location data retrieved in S3 to the requester in a wireless fashion in response to the current geographic location notifying request detected in S2 (S6). Host H retrieves the pin-point location notified message data from Pin-point Location Notified Message Data Storage Area H732*b*6*a* and sends the data to Communication Device 200 (S7). CPU 211 (FIG. 1) receives the pin-point location notified message data from Host H in a wireless fashion and displays the data on LCD 201 (FIG. 1) (S8). The foregoing sequence is repeated periodically.

This paragraph illustrate(s) 1st Specific Zone Data Sending Software H732*c*7 of Host H and 1st Specific Zone Data Sending Software 206732*c*7 of Communication Device 200, which send(s) the 1st specific zone data to the requester. In the present embodiment, Host H periodically checks the incoming signal addressed to Communication Device 200 (S1). If the current geographic location notifying request is detected in the incoming signal, Host H proceeds to the next step (S2). Here, the current geographic location notifying request is the request sent by another device (requester) to notify the current geographic location of Communication Device 200 to the requester. Host H retrieves the current location data from Current Location Data Storage Area H732*b*1 (S3). Host H retrieves the 2nd geographic area data from 2nd Geographic Area Data Storage Area H732*b*2*b* (S4). If the current location data retrieved in S3 is included in the 2nd geographic area data retrieved in the previous step, Host H proceeds to the next step (S5). Host H identifies the current time (S6). Host H retrieves the 1st time frame data from 1st Time Frame Data Storage Area H732*b*7*a* (S7). If the current time identified in S6 is included in the 1st time frame data retrieved in the previous step, Host H proceeds to the next step (S8). Host H retrieves the 1st specific zone data from 1st Specific Zone Data Storage Area H732*b*3*a* (S9). Host H sends the 1st specific zone data retrieved in the previous step to the requester in a wireless fashion in response to the current geographic location notifying request detected in S2 (S10). Host H retrieves the 1st specific zone notified message data from 1st Specific Zone Notified Message Data Storage Area H732*b*6*b* and sends the data to Communication Device 200 (S11). CPU 211 (FIG. 1) receives the 1st specific zone notified message data from Host H in a wireless fashion and displays the data on LCD 201 (FIG. 1) (S12). The foregoing sequence is repeated periodically.

This paragraph illustrate(s) 2nd Specific Zone Data Sending Software H732*c*8 of Host H and 2nd Specific Zone Data Sending Software 206732*c*8 of Communication Device 200, which send(s) the 2nd specific zone data to the requester. In the present embodiment, Host H periodically checks the incoming signal addressed to Communication Device 200 (S1). If the current geographic location notifying request is detected in the incoming signal, Host H proceeds to the next step (S2). Here, the current geographic location notifying request is the request sent by another device (requester) to notify the current geographic location of Communication Device 200 to the requester. Host H retrieves the current location data from Current Location Data Storage Area H732*b*1 (S3). Host H retrieves the 2nd geographic area data from 2nd Geographic Area Data Storage Area H732*b*2*b* (S4). If the current location data retrieved in S3 is included in the 2nd geographic area data retrieved in the previous step, Host H proceeds to the next step (S5). Host H identifies the current time (S6). Host H retrieves the 2nd time frame data from 2nd Time Frame Data Storage Area H732*b*7*b* (S7). If the current time identified in S6 is included in the 2nd time frame data retrieved in the previous step, Host H proceeds to the next step (S8). Host H retrieves the 2nd specific zone data from 2nd Specific Zone Data Storage Area H732*b*3*b* (S9). Host H sends the 2nd specific zone data retrieved in the previous step to the requester in a wireless fashion in response to the current geographic location notifying request detected in S2 (S10). Host H retrieves the 2nd specific zone notified message data from 2nd Specific Zone Notified Message Data Storage Area H732*b*6*c* and sends the data to Communication Device 200 (S11). CPU 211 (FIG. 1) receives the 2nd specific zone notified message data from Host H in a wireless fashion and displays the data on LCD 201 (FIG. 1) (S12). The foregoing sequence is repeated periodically.

This paragraph illustrate(s) 1st False Location Data Sending Software H732*c*9 of Host H and 1st False Location Data Sending Software 206732*c*9 of Communication Device 200, which send(s) the 1st false location data to the requester. In the present embodiment, Host H periodically checks the incoming signal addressed to Communication Device 200 (S1). If the current geographic location notifying request is detected in the incoming signal, Host H proceeds to the next step (S2). Here, the current geographic location notifying request is the request sent by another device (requester) to notify the current geographic location of Communication Device 200 to the requester. Host H retrieves the current location data from Current Location Data Storage Area H732*b*1 (S3). Host H retrieves the 3rd geographic area data from 3rd Geographic Area Data Storage Area H732*b*2*c* (S4). If the current location data retrieved in S3 is included in the 3rd geographic area data retrieved in the previous step, Host H proceeds to the next step (S5). Host H identifies the current time (S6). Host H retrieves the 1st time frame data from 1st Time Frame Data Storage Area H732*b*7*a* (S7). If the current time identified in S6 is included in the 1st time frame data retrieved in the previous step, Host H proceeds to the next step (S8). Host H retrieves the 1st false location data from 1st False Location Data Storage Area H732*b*4*a* (S9). Host H sends the 1st false location data retrieved in the previous step to the requester in a wireless fashion in response to the current geographic location notifying request detected in S2 (S10). Host H retrieves the 1st false location notified message data from 1st False Location Notified Message Data Storage Area H732*b*6*d* and sends the data to Communication Device 200 (S11). CPU 211 (FIG. 1) receives the 1st false location notified message data from Host H in a wireless fashion and displays the data on LCD 201 (FIG. 1) (S12). The foregoing sequence is repeated periodically.

This paragraph illustrate(s) 2nd False Location Data Sending Software H732*c*10 of Host H and 2nd False Location Data Sending Software 206732*c*10 of Communication Device 200, which send(s) the 2nd false location data to the requester. In the present embodiment, Host H periodically checks the incoming signal addressed to Communication Device 200 (S1). If the current geographic location notifying request is detected in the incoming signal, Host H proceeds to the next step (S2). Here, the current geographic location notifying request is the request sent by another device (requester) to notify the current geographic location of Communication Device 200 to the requester. Host H retrieves the current location data from Current Location Data Storage Area H732*b*1 (S3). Host H retrieves the 3rd geographic area data from 3rd Geographic Area Data Storage Area H732*b*2*c* (S4).

If the current location data retrieved in S3 is included in the 3rd geographic area data retrieved in the previous step, Host H proceeds to the next step (S5). Host H identifies the current time (S6). Host H retrieves the 2nd time frame data from 2nd Time Frame Data Storage Area H732b7b (S7). If the current time identified in S6 is included in the 2nd time frame data retrieved in the previous step, Host H proceeds to the next step (S8). Host H retrieves the 2nd false location data from 2nd False Location Data Storage Area H732b4b (S9). Host H sends the 2nd false location data retrieved in the previous step to the requester in a wireless fashion in response to the current geographic location notifying request detected in S2 (S10). Host H retrieves the 2nd false location notified message data from 2nd False Location Notified Message Data Storage Area H732b6e and sends the data to Communication Device 200 (S11). CPU 211 (FIG. 1) receives the 2nd false location notified message data from Host H in a wireless fashion and displays the data on LCD 201 (FIG. 1) (S12). The foregoing sequence is repeated periodically.

This paragraph illustrate(s) Current Geographic Location Unknown Notice Sending Software H732c11 of Host H and Current Geographic Location Unknown Notice Sending Software 206732c11 of Communication Device 200, which send(s) the current geographic location unknown notice to the requester. In the present embodiment, Host H periodically checks the incoming signal addressed to Communication Device 200 (S1). If the current geographic location notifying request is detected in the incoming signal, Host H proceeds to the next step (S2). Here, the current geographic location notifying request is the request sent by another device (requester) to notify the current geographic location of Communication Device 200 to the requester. Host H retrieves the current location data from Current Location Data Storage Area H732b1 (S3). Host H retrieves the 4th geographic area data from 4th Geographic Area Data Storage Area H732b2d (S4). If the current location data retrieved in S3 is included in the 4th geographic area data retrieved in the previous step, Host H proceeds to the next step (S5). Host H sends the current geographic location unknown notice to the requester in a wireless fashion in response to the current geographic location notifying request detected in S2 (S6). Here, the current geographic location unknown notice indicates that the current geographic location is unknown. Host H retrieves the current geographic location unknown notified message data from Current Geographic Location Unknown Notified Message Data Storage Area H732b6f and sends the data to Communication Device 200 (S7). CPU 211 (FIG. 1) receives the current geographic location unknown notified message data from Host H in a wireless fashion and displays the data on LCD 201 (FIG. 1) (S8). The foregoing sequence is repeated periodically.

This paragraph illustrate(s) 1st Previous Location Data Sending Software H732c12 of Host H and 1st Previous Location Data Sending Software 206732c12 of Communication Device 200, which send(s) the 1st previous location data to the requester. In the present embodiment, Host H periodically checks the incoming signal addressed to Communication Device 200 (S1). If the current geographic location notifying request is detected in the incoming signal, Host H proceeds to the next step (S2). Here, the current geographic location notifying request is the request sent by another device (requester) to notify the current geographic location of Communication Device 200 to the requester. Host H retrieves the current location data from Current Location Data Storage Area H732b1 (S3). Host H retrieves the 5th geographic area data from 5th Geographic Area Data Storage Area H732b2e (S4). If the current location data retrieved in S3 is included in the 5th geographic area data retrieved in the previous step, Host H proceeds to the next step (S5). Host H identifies the current time (S6). Host H retrieves the 1st time frame data from 1st Time Frame Data Storage Area H732b7a (S7). If the current time identified in S6 is included in the 1st time frame data retrieved in the previous step, Host H proceeds to the next step (S8). Host H retrieves the 1st previous location data from 1st Previous Location Data Storage Area H732b5a (S9). Host H sends the 1st previous location data retrieved in the previous step to the requester in a wireless fashion in response to the current geographic location notifying request detected in S2 (S10). Host H retrieves the 1st previous location notified message data from 1st Previous Location Notified Message Data Storage Area H732b6g and sends the data to Communication Device 200 (S11). CPU 211 (FIG. 1) receives the 1st previous location notified message data from Host H in a wireless fashion and displays the data on LCD 201 (FIG. 1) (S12). The foregoing sequence is repeated periodically.

This paragraph illustrate(s) 2nd Previous Location Data Sending Software H732c13 of Host H and 2nd Previous Location Data Sending Software 206732c13 of Communication Device 200, which send(s) the 2nd previous location data to the requester. In the present embodiment, Host H periodically checks the incoming signal addressed to Communication Device 200 (S1). If the current geographic location notifying request is detected in the incoming signal, Host H proceeds to the next step (S2). Here, the current geographic location notifying request is the request sent by another device (requester) to notify the current geographic location of Communication Device 200 to the requester. Host H retrieves the current location data from Current Location Data Storage Area H732b1 (S3). Host H retrieves the 5th geographic area data from 5th Geographic Area Data Storage Area H732b2e (S4). If the current location data retrieved in S3 is included in the 5th geographic area data retrieved in the previous step, Host H proceeds to the next step (S5). Host H identifies the current time (S6). Host H retrieves the 2nd time frame data from 2nd Time Frame Data Storage Area H732b7b (S7). If the current time identified in S6 is included in the 2nd time frame data retrieved in the previous step, Host H proceeds to the next step (S8). Host H retrieves the 2nd previous location data from 2nd Previous Location Data Storage Area H732b5b (S9). Host H sends the 2nd previous location data retrieved in the previous step to the requester in a wireless fashion in response to the current geographic location notifying request detected in S2 (S10). Host H retrieves the 2nd previous location notified message data from 2nd Previous Location Notified Message Data Storage Area H732b6h and sends the data to Communication Device 200 (S11). CPU 211 (FIG. 1) receives the 2nd previous location notified message data from Host H in a wireless fashion and displays the data on LCD 201 (FIG. 1) (S12). The foregoing sequence is repeated periodically.

The following paragraphs illustrate another embodiment wherein Communication Device 200 plays the major role in implementing the present function.

This paragraph illustrate(s) Current Location Data Producing Software 206732c1 of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step (S2). CPU 211 (FIG. 1) stores the current location data produced in the previous step in Current Location Data Storage Area 206732b1 (S3). The foregoing sequence is repeated periodically.

This paragraph illustrate(s) 1st Previous Location Data Producing Software 206732c2 of Communication Device 200, which produce(s) the 1st previous location data. In the present embodiment, CPU 211 (FIG. 1) increments the timer (not shown) (S1). If the timer value thereof indicates the lapsed time of 10 minutes, CPU 211 (FIG. 1) proceeds to the next step (S2). CPU 211 (FIG. 1) retrieves the current location data from Current Location Data Storage Area 206732b1 (S3). CPU 211 (FIG. 1) stores the current location data retrieved in the previous step as the 1st previous location data in 1st Previous Location Data Storage Area 206732b5a (S4). The foregoing sequence is repeated periodically.

This paragraph illustrate(s) 2nd Previous Location Data Producing Software 206732c3 of Communication Device 200, which produce(s) the 2nd previous location data. In the present embodiment, CPU 211 (FIG. 1) increments the timer (not shown) (S1). If the timer value thereof indicates the lapsed time of 20 minutes, CPU 211 (FIG. 1) proceeds to the next step (S2). CPU 211 (FIG. 1) retrieves the current location data from Current Location Data Storage Area 206732b1 (S3). CPU 211 (FIG. 1) stores the current location data retrieved in the previous step as the 2nd previous location data in 2nd Previous Location Data Storage Area 206732b5b (S4). The foregoing sequence is repeated periodically.

This paragraph illustrate(s) 1st Specific Zone Data Producing Software 206732c4 of Communication Device 200, which produce(s) the 1st specific zone data. In the present embodiment, CPU 211 (FIG. 1) retrieves the current location data from Current Location Data Storage Area 206732b1 (S1). CPU 211 (FIG. 1) produces the 1st specific zone data by referring to the current location data retrieved in the previous step (S2). CPU 211 (FIG. 1) stores the 1st specific zone data produced in the previous step in 1st Specific Zone Data Storage Area 206732b3a (S3). The foregoing sequence is repeated periodically.

This paragraph illustrate(s) 2nd Specific Zone Data Producing Software 206732c5 of Communication Device 200, which produce(s) the 2nd specific zone data. In the present embodiment, CPU 211 (FIG. 1) retrieves the current location data from Current Location Data Storage Area 206732b1 (S1). CPU 211 (FIG. 1) produces the 2nd specific zone data by referring to the current location data retrieved in the previous step (S2). CPU 211 (FIG. 1) stores the 2nd specific zone data produced in the previous step in 2nd Specific Zone Data Storage Area 206732b3b (S3). The foregoing sequence is repeated periodically.

This paragraph illustrate(s) Current Location Data Sending Software 206732c6 of Communication Device 200, which send(s) the current location data to the requester. In the present embodiment, CPU 211 (FIG. 1) periodically checks the incoming signal addressed to Communication Device 200 (S1). If the current geographic location notifying request is detected in the incoming signal, CPU 211 (FIG. 1) proceeds to the next step (S2). Here, the current geographic location notifying request is the request sent by another device (requester) to notify the current geographic location of Communication Device 200 to the requester. CPU 211 (FIG. 1) retrieves the current location data from Current Location Data Storage Area 206732b1 (S3). CPU 211 (FIG. 1) retrieves the 1st geographic area data from 1st Geographic Area Data Storage Area 206732b2a (S4). If the current location data retrieved in S3 is included in the 1st geographic area data retrieved in the previous step, CPU 211 (FIG. 1) proceeds to the next step (S5). CPU 211 (FIG. 1) sends the current location data retrieved in S3 to the requester in a wireless fashion in response to the current geographic location notifying request detected in S2 (S6). CPU 211 (FIG. 1) retrieves the pin-point location notified message data from Pin-point Location Notified Message Data Storage Area 206732b6a (S7). CPU 211 (FIG. 1) displays the pin-point location notified message data retrieved in the previous step on LCD 201 (FIG. 1) (S8). The foregoing sequence is repeated periodically.

This paragraph illustrate(s) 1st Specific Zone Data Sending Software 206732c7 of Communication Device 200, which send(s) the 1st specific zone data to the requester. In the present embodiment, CPU 211 (FIG. 1) periodically checks the incoming signal addressed to Communication Device 200 (S1). If the current geographic location notifying request is detected in the incoming signal, CPU 211 (FIG. 1) proceeds to the next step (S2). Here, the current geographic location notifying request is the request sent by another device (requester) to notify the current geographic location of Communication Device 200 to the requester. CPU 211 (FIG. 1) retrieves the current location data from Current Location Data Storage Area 206732b1 (S3). CPU 211 (FIG. 1) retrieves the 2nd geographic area data from 2nd Geographic Area Data Storage Area 206732b2b (S4). If the current location data retrieved in S3 is included in the 2nd geographic area data retrieved in the previous step, CPU 211 (FIG. 1) proceeds to the next step (S5). CPU 211 (FIG. 1) identifies the current time (S6). CPU 211 (FIG. 1) retrieves the 1st time frame data from 1st Time Frame Data Storage Area 206732b7a (S7). If the current time identified in S6 is included in the 1st time frame data retrieved in the previous step, CPU 211 (FIG. 1) proceeds to the next step (S8). CPU 211 (FIG. 1) retrieves the 1st specific zone data from 1st Specific Zone Data Storage Area 206732b3a (S9). CPU 211 (FIG. 1) sends the 1st specific zone data retrieved in the previous step to the requester in a wireless fashion in response to the current geographic location notifying request detected in S2 (S10). CPU 211 (FIG. 1) retrieves the 1st specific zone notified message data from 1st Specific Zone Notified Message Data Storage Area 206732b6b (S11). CPU 211 (FIG. 1) displays the 1st specific zone notified message data retrieved in the previous step on LCD 201 (FIG. 1) (S12). The foregoing sequence is repeated periodically.

This paragraph illustrate(s) 2nd Specific Zone Data Sending Software 206732c8 of Communication Device 200, which send(s) the 2nd specific zone data to the requester. In the present embodiment, CPU 211 (FIG. 1) periodically checks the incoming signal addressed to Communication Device 200 (S1). If the current geographic location notifying request is detected in the incoming signal, CPU 211 (FIG. 1) proceeds to the next step (S2). Here, the current geographic location notifying request is the request sent by another device (requester) to notify the current geographic location of Communication Device 200 to the requester. CPU 211 (FIG. 1) retrieves the current location data from Current Location Data Storage Area 206732b1 (S3). CPU 211 (FIG. 1) retrieves the 2nd geographic area data from 2nd Geographic Area Data Storage Area 206732b2b (S4). If the current location data retrieved in S3 is included in the 2nd geographic area data retrieved in the previous step, CPU 211 (FIG. 1) proceeds to the next step (S5). CPU 211 (FIG. 1) identifies the current time (S6). CPU 211 (FIG. 1) retrieves the 2nd time frame data from 2nd Time Frame Data Storage Area 206732b7b (S7). If the current time identified in S6 is included in the 2nd time frame data retrieved in the previous step, CPU 211 (FIG. 1) proceeds to the next step (S8). CPU 211 (FIG. 1) retrieves the 2nd specific zone data from 2nd Specific Zone Data Storage Area 206732b3b (S9). CPU 211 (FIG. 1) sends the 2nd specific zone data retrieved in the previous step to the requester in a wireless fashion in response to the current geographic location notifying request detected in S2 (S10). CPU 211 (FIG. 1) retrieves the 2nd specific zone notified message data from 2nd Specific Zone Notified Message Data Storage Area 206732b6c (S11). CPU 211 (FIG. 1) displays the 2nd specific zone notified message data retrieved in the previous step on LCD 201 (FIG. 1) (S12). The foregoing sequence is repeated periodically.

This paragraph illustrate(s) 1st False Location Data Sending Software 206732c9 of Communication Device 200, which send(s) the 1st false location data to the requester. In the present embodiment, CPU 211 (FIG. 1) periodically checks the incoming signal addressed to Communication Device 200 (S1). If the current geographic location notifying request is detected in the incoming signal, CPU 211 (FIG. 1) proceeds to the next step (S2). Here, the current geographic location notifying request is the request sent by another device (requester) to notify the current geographic location of Communication Device 200 to the requester. CPU 211 (FIG. 1) retrieves the current location data from Current Location Data Storage Area 206732b1 (S3). CPU 211 (FIG. 1) retrieves the 3rd geographic area data from 3rd Geographic Area Data Storage Area 206732b2c (S4). If the current location data retrieved in S3 is included in the 3rd geographic area data retrieved in the previous step, CPU 211 (FIG. 1) proceeds to the next step (S5). CPU 211 (FIG. 1) identifies the current time (S6). CPU 211 (FIG. 1) retrieves the 1st time frame data from 1st Time Frame Data Storage Area 206732b7a (S7). If the current time identified in S6 is included in the 1st time frame data retrieved in the previous step, CPU 211 (FIG. 1) proceeds to the next step (S8). CPU 211 (FIG. 1) retrieves the 1st false location data from 1st False Location Data Storage Area 206732b4a (S9). CPU 211 (FIG. 1) sends the 1st false location data retrieved in the previous step to the requester in a wireless fashion in response to the current geographic location notifying request detected in S2 (S10). CPU 211 (FIG. 1) retrieves the 1st false location notified message data from 1st False Location Notified Message Data Storage Area 206732b6d (S11). CPU 211 (FIG. 1) displays the 1st false location notified message data retrieved in the previous step on LCD 201 (FIG. 1) (S12). The foregoing sequence is repeated periodically.

This paragraph illustrate(s) 2nd False Location Data Sending Software 206732c10 of Communication Device 200, which send(s) the 2nd false location data to the requester. In the present embodiment, CPU 211 (FIG. 1) periodically checks the incoming signal addressed to Communication Device 200 (S1). If the current geographic location notifying request is detected in the incoming signal, CPU 211 (FIG. 1) proceeds to the next step (S2). Here, the current geographic location notifying request is the request sent by another device (requester) to notify the current geographic location of Communication Device 200 to the requester. CPU 211 (FIG. 1) retrieves the current location data from Current Location Data Storage Area 206732b1 (S3). CPU 211 (FIG. 1) retrieves the 3rd geographic area data from 3rd Geographic Area Data Storage Area 206732b2c (S4). If the current location data retrieved in S3 is included in the 3rd geographic area data retrieved in the previous step, CPU 211 (FIG. 1) proceeds to the next step (S5). CPU 211 (FIG. 1) identifies the current time (S6). CPU 211 (FIG. 1) retrieves the 2nd time frame data from 2nd Time Frame Data Storage Area 206732b7b (S7). If the current time identified in S6 is included in the 2nd time frame data retrieved in the previous step, CPU 211 (FIG. 1) proceeds to the next step (S8). CPU 211 (FIG. 1) retrieves the 2nd false location data from 2nd False Location Data Storage Area 206732b4b (S9). CPU 211 (FIG. 1) sends the 2nd false location data retrieved in the previous step to the requester in a wireless fashion in response to the current geographic location notifying request detected in S2 (S10). CPU 211 (FIG. 1) retrieves the 2nd false location notified message data from 2nd False Location Notified Message Data Storage Area 206732b6e (S11). CPU 211 (FIG. 1) displays the 2nd false location notified message data retrieved in the previous step on LCD 201 (FIG. 1) (S12). The foregoing sequence is repeated periodically.

This paragraph illustrate(s) Current Geographic Location Unknown Notice Sending Software 206732c11 of Communication Device 200, which send(s) the current geographic location unknown notice to the requester. In the present embodiment, CPU 211 (FIG. 1) periodically checks the incoming signal addressed to Communication Device 200 (S1). If the current geographic location notifying request is detected in the incoming signal, CPU 211 (FIG. 1) proceeds to the next step (S2). Here, the current geographic location notifying request is the request sent by another device (requester) to notify the current geographic location of Communication Device 200 to the requester. CPU 211 (FIG. 1) retrieves the current location data from Current Location Data Storage Area 206732b1 (S3). CPU 211 (FIG. 1) retrieves the 4th geographic area data from 4th Geographic Area Data Storage Area 206732b2d (S4). If the current location data retrieved in S3 is included in the 4th geographic area data retrieved in the previous step, CPU 211 (FIG. 1) proceeds to the next step (S5). CPU 211 (FIG. 1) sends the current geographic location unknown notice to the requester in a wireless fashion in response to the current geographic location notifying request detected in S2 (S6). Here, the current geographic location unknown notice indicates that the current geographic location is unknown. CPU 211 (FIG. 1) retrieves the current geographic location unknown notified message data from Current Geographic Location Unknown Notified Message Data Storage Area 206732b6f (S7). CPU 211 (FIG. 1) displays the current geographic location unknown notified message data retrieved in the previous step on LCD 201 (FIG. 1) (S8). The foregoing sequence is repeated periodically.

This paragraph illustrate(s) 1st Previous Location Data Sending Software 206732c12 of Communication Device 200, which send(s) the 1st previous location data to the requester. In the present embodiment, CPU 211 (FIG. 1) periodically checks the incoming signal addressed to Communication Device 200 (S1). If the current geographic location notifying request is detected in the incoming signal, CPU 211 (FIG. 1) proceeds to the next step (S2). Here, the current geographic location notifying request is the request sent by another device (requester) to notify the current geographic location of Communication Device 200 to the requester. CPU 211 (FIG. 1) retrieves the current location data from Current Location Data Storage Area 206732b1 (S3). CPU 211 (FIG. 1) retrieves the 5th geographic area data from 5th Geographic Area Data Storage Area 206732b2e (S4). If the current location data retrieved in S3 is included in the 5th geographic area data retrieved in the previous step, CPU 211 (FIG. 1) proceeds to the next step (S5). CPU 211 (FIG. 1) identifies the current time (S6). CPU 211 (FIG. 1) retrieves the 1st time frame data from 1st Time Frame Data Storage Area 206732b7a (S7). If the current time identified in S6 is included in the 1st time frame data retrieved in the previous step, CPU 211 (FIG. 1) proceeds to the next step (S8). CPU 211 (FIG. 1) retrieves the 1st previous location data from 1st Previous Location Data Storage Area 206732b5a (S9). CPU 211 (FIG. 1) sends the 1st previous location data retrieved in the previous step to the requester in a wireless fashion in response to the current geographic location notifying request detected in S2 (S10). CPU 211 (FIG. 1) retrieves the 1st previous location notified message data from 1st Previous Location Notified Message Data Storage Area 206732b6g (S11). CPU 211 (FIG. 1) displays the 1st previous location notified message data retrieved in the previous step on LCD 201 (FIG. 1) (S12). The foregoing sequence is repeated periodically.

This paragraph illustrate(s) 2nd Previous Location Data Sending Software 206732c13 of Communication Device 200, which send(s) the 2nd previous location data to the requester. In the present embodiment, CPU 211 (FIG. 1) periodically checks the incoming signal addressed to Communication Device 200 (S1). If the current geographic location notifying request is detected in the incoming signal, CPU 211 (FIG. 1) proceeds to the next step (S2). Here, the current geographic location notifying request is the request sent by another device (requester) to notify the current geographic location of Communication Device 200 to the requester. CPU 211 (FIG. 1) retrieves the current location data from Current Location Data Storage Area 206732b1 (S3). CPU 211 (FIG. 1) retrieves the 5th geographic area data from 5th Geographic Area Data Storage Area 206732b2e (S4). If the current location data retrieved in S3 is included in the 5th geographic area data retrieved in the previous step, CPU 211 (FIG. 1) proceeds to the next step (S5). CPU 211 (FIG. 1) identifies the current time (S6). CPU 211 (FIG. 1) retrieves the 2nd time frame data from 2nd Time Frame Data Storage Area 206732b7b (S7). If the current time identified in S6 is included in the 2nd time frame data retrieved in the previous step, CPU 211 (FIG. 1) proceeds to the next step (S8). CPU 211 (FIG. 1) retrieves the 2nd previous location data from 2nd Previous Location Data Storage Area 206732b5b (S9). CPU 211 (FIG. 1) sends the 2nd previous location data retrieved in the previous step to the requester in a wireless fashion in response to the current geographic location notifying request detected in S2 (S10). CPU 211 (FIG. 1) retrieves the 2nd previous location notified message data from 2nd Previous Location Notified Message Data Storage Area 206732b6h (S11). CPU 211 (FIG. 1) displays the 2nd previous location notified message data retrieved in the previous step on LCD 201 (FIG. 1) (S12). The foregoing sequence is repeated periodically.

<<Second Area Dependent Notice Type Changing Function>>

The following paragraphs illustrate the second area dependent notice type changing function, wherein when another device is identified to be located in a 1st geographic area, a pin-point location of said communication device is notified to another device and a pin-point location notified message data is displayed on said display, when said another device is identified to be located in a 2nd geographic area, a 1st specific zone in which said communication device is located is notified to said another device and a 1st specific zone notified message data is displayed on said display if the current time is within a 1st time frame, and a 2nd specific zone in which said communication device is located is notified to said another device and a 2nd specific zone notified message data is displayed on said display if the current time is within a 2nd time frame, when said another device is identified to be located in a 3rd geographic area, a 1st false location is notified to said another device and a 1st false location notified message data is displayed on said display if the current time is within a 1st time frame, and a 2nd false location is notified to said another device and a 2nd false location notified message data is displayed on said display if the current time is within a 2nd time frame, when said another device is identified to be located in a 4th geographic area, a current geographic location unknown notice is sent to said another device and a current geographic location unknown message data is displayed on said display, and when said another device is identified to be located in a 5th geographic area, a 1st previous location which indicates the location of said communication device at a 1st previous time is notified to said another device and a 1st previous location notified message data is displayed on said display if the current time is within a 1st time frame, and a 2nd previous location which indicates the location of said communication device at a 2nd previous time is notified to said another device and a 2nd previous location notified message data is displayed on said display if the current time is within a 2nd time frame.

This paragraph illustrates the storage area included in Host H. In the present embodiment, Host H includes Second Area Dependent Notice Type Changing Info Storage Area H733a of which the data and the software program(s) stored therein are described hereinafter.

This paragraph illustrates the storage area(s) included in Second Area Dependent Notice Type Changing Info Storage Area H733a. In the present embodiment, Second Area Dependent Notice Type Changing Info Storage Area H733a includes Second Area Dependent Notice Type Changing Data Storage Area H733b and Second Area Dependent Notice Type Changing Software Storage Area H733c. Second Area Dependent Notice Type Changing Data Storage Area H733b stores the data necessary to implement the present function on the side of Host H, such as the one(s) described hereinafter. Second Area Dependent Notice Type Changing Software Storage Area H733c stores the software program(s) necessary to implement the present function on the side of Host H, such as the one(s) described hereinafter.

This paragraph illustrates the storage area(s) included in Second Area Dependent Notice Type Changing Data Storage Area H733b. In the present embodiment, Second Area Dependent Notice Type Changing Data Storage Area H733b includes Current Location Data Storage Area H733b1, Entire Geographic Area Data Storage Area H733b2, Entire Specific Zone Data Storage Area H733b3, Entire False Location Data Storage Area H733b4, Entire Previous Location Data Storage Area H733b5, Entire Notified Message Data Storage Area H733b6, Entire Time Frame Data Storage Area H733b7, Requester's Location Data Storage Area H733b8, and Work Area H733b9. Current Location Data Storage Area H733b1 stores the current location data which indicates the current geographic location of Communication Device 200 in (x,y,z) format. Entire Geographic Area Data Storage Area H733b2 stores the data described hereinafter. Entire Specific Zone Data Storage Area H733b3 stores the data described hereinafter. Entire False Location Data Storage Area H733b4 stores the data described hereinafter. Entire Previous Location Data Storage Area H733b5 stores the data described hereinafter. Entire Notified Message Data Storage Area H733b6 stores the data described hereinafter. Entire Time Frame Data Storage Area H733b7 stores the data described hereinafter. Requester's Location Data Storage Area H733b8 stores the requester's location data which indicates the current geographic location of another device (requester) in (x,y,z) format. Work Area H733b9 is utilized as a work area to perform calculation and temporarily store data to implement the present function.

This paragraph illustrates the storage area(s) included in Entire Geographic Area Data Storage Area H733b2. In the present embodiment, Entire Geographic Area Data Storage Area H733b2 includes 1st Geographic Area Data Storage Area H733b2a, 2nd Geographic Area Data Storage Area H733b2b, 3rd Geographic Area Data Storage Area H733b2c, 4th Geographic Area Data Storage Area H733b2d, and 5th Geographic Area Data Storage Area H733b2e. 1st Geographic Area Data Storage Area H733b2a stores the 1st geographic area data which indicates the 1st geographic area.

Here, the 1st geographic area may indicate a specific county, city, town, or state. The 1st geographic area may indicate a specific artificial structure (e.g., house, building, railway station, subway station, airport, movie theater, or shopping mall). The 1st geographic area may indicate a specific area (e.g., 2nd floor or 2nd room of the 2nd floor) of a specific artificial structure (e.g., house, building, railway station, subway station, airport, movie theater, or shopping mall). 2nd Geographic Area Data Storage Area H733b2b stores the 2nd geographic area data which indicates the 2nd geographic area. Here, the 2nd geographic area may indicate a specific county, city, town, or state. The 2nd geographic area may indicate a specific artificial structure (e.g., house, building, railway station, subway station, airport, movie theater, or shopping mall). The 2nd geographic area may indicate a specific area (e.g., 2nd floor or 2nd room of the 2nd floor) of a specific artificial structure (e.g., house, building, railway station, subway station, airport, movie theater, or shopping mall). 3rd Geographic Area Data Storage Area H733b2c stores the 3rd geographic area data which indicates the 3rd geographic area. Here, the 3rd geographic area may indicate a specific county, city, town, or state. The 3rd geographic area may indicate a specific artificial structure (e.g., house, building, railway station, subway station, airport, movie theater, or shopping mall). The 3rd geographic area may indicate a specific area (e.g., 2nd floor or 2nd room of the 2nd floor) of a specific artificial structure (e.g., house, building, railway station, subway station, airport, movie theater, or shopping mall). 4th Geographic Area Data Storage Area H733b2d stores the 4th geographic area data which indicates the 4th geographic area. Here, the 4th geographic area may indicate a specific county, city, town, or state. The 4th geographic area may indicate a specific artificial structure (e.g., house, building, railway station, subway station, airport, movie theater, or shopping mall). The 4th geographic area may indicate a specific area (e.g., 2nd floor or 2nd room of the 2nd floor) of a specific artificial structure (e.g., house, building, railway station, subway station, airport, movie theater, or shopping mall). 5th Geographic Area Data Storage Area H733b2e stores the 5th geographic area data which indicates the 5th geographic area. Here, the 5th geographic area may indicate a specific county, city, town, or state. The 5th geographic area may indicate a specific artificial structure (e.g., house, building, railway station, subway station, airport, movie theater, or shopping mall). The 5th geographic area may indicate a specific area (e.g., 2nd floor or 2nd room of the 2nd floor) of a specific artificial structure (e.g., house, building, railway station, subway station, airport, movie theater, or shopping mall).

This paragraph illustrates the storage area(s) included in Entire Specific Zone Data Storage Area H733b3. In the present embodiment, Entire Specific Zone Data Storage Area H733b3 includes 1st Specific Zone Data Storage Area H733b3a and 2nd Specific Zone Data Storage Area H733b3b. 1st Specific Zone Data Storage Area H733b3a stores the 1st specific zone data which indicates the 1st specific zone. The 1st specific zone may indicate an area of 10 meter diameter in which Communication Device 200 is currently located. The 1st specific zone may indicate a specific portion (e.g., the 2nd floor) of the artificial structure (e.g., house, building, railway station, subway station, airport, movie theater, or shopping mall) in which Communication Device 200 is currently located. 2nd Specific Zone Data Storage Area H733b3b stores the 2nd specific zone data which indicates the 2nd specific zone. The 2nd specific zone may indicate an area of 100 meter diameter in which Communication Device 200 is currently located. The 2nd specific zone may indicate the entire artificial structure (e.g., house, building, railway station, subway station, airport, movie theater, or shopping mall) in which Communication Device 200 is currently located.

This paragraph illustrates the storage area(s) included in Entire False Location Data Storage Area H733b4. In the present embodiment, Entire False Location Data Storage Area H733b4 includes 1st False Location Data Storage Area H733b4a and 2nd False Location Data Storage Area H733b4b. 1st False Location Data Storage Area H733b4a stores the 1st false location data which indicates the 1st false location in (x,y,z) format. The 1st false location does not reflect the current geographic location of Communication Device 200. 2nd False Location Data Storage Area H733b4b stores the 2nd false location data which indicates the 2nd false location in (x,y,z) format. The 2nd false location does not reflect the current geographic location of Communication Device 200.

This paragraph illustrates the storage area(s) included in Entire Previous Location Data Storage Area H733b5. In the present embodiment, Entire Previous Location Data Storage Area H733b5 includes 1st Previous Location Data Storage Area H733b5a and 2nd Previous Location Data Storage Area H733b5b. 1st Previous Location Data Storage Area H733b5a stores the 1st previous location data which indicates the 1st previous location. Here, the 1st previous location is the pin-point location at which Communication Device 200 was located 10 minutes ago. 2nd Previous Location Data Storage Area H733b5b stores the 2nd previous location data which indicates the 2nd previous location. Here, the 2nd previous location is the pin-point location at which Communication Device 200 was located 20 minutes ago.

This paragraph illustrates the storage area(s) included in Entire Notified Message Data Storage Area H733b6. In the present embodiment, Entire Notified Message Data Storage Area H733b6 includes Pin-point Location Notified Message Data Storage Area H733b6a, 1st Specific Zone Notified Message Data Storage Area H733b6b, 2nd Specific Zone Notified Message Data Storage Area H733b6c, 1st False Location Notified Message Data Storage Area H733b6d, 2nd False Location Notified Message Data Storage Area H733b6e, Current Geographic Location Unknown Notified Message Data Storage Area H733b6f, 1st Previous Location Notified Message Data Storage Area H733b6g, and 2nd Previous Location Notified Message Data Storage Area H733b6h. Pin-point Location Notified Message Data Storage Area H733b6a stores the pin-point location notified message data which is the message indicating that the pin-point current geographic location of Communication Device 200 is notified to the requester. 1st Specific Zone Notified Message Data Storage Area H733b6b stores the 1st specific zone notified message data which is the message indicating that the 1st specific zone in which Communication Device 200 is currently located is notified to the requester. 2nd Specific Zone Notified Message Data Storage Area H733b6c stores the 2nd specific zone notified message data which is the message indicating that the 2nd specific zone in which Communication Device 200 is currently located is notified to the requester. 1st False Location Notified Message Data Storage Area H733b6d stores the 1st false location notified message data which is the message indicating that the 1st false location is notified to the requester as the pin-point current geographic location of Communication Device 200. 2nd False Location Notified Message Data Storage Area H733b6e stores the 2nd false location notified message data which is the message indicating that the 2nd false location is notified to the requester as the pin-point current geographic location of Communication Device 200. Current Geographic Location Unknown Notified Message Data Storage Area H733b6f stores the current geographic location unknown notified message data which is the message indicating that the current geographic location of Communication Device 200 is notified to the requester as unknown. 1st Previous Location Notified Message Data Storage Area H733b6g stores the 1st previous location notified message data which is the message indicating that the 1st previous location is notified to the requester as the pin-point current geographic location of Communication Device 200. 2nd Previous Location Notified Message Data Storage Area H733b6h stores the 2nd previous location notified message data which is the message indicating that the 2nd previous location is notified to the requester as the pin-point current geographic location of Communication Device 200.

This paragraph illustrates the storage area(s) included in Entire Time Frame Data Storage Area H733b7. In the present embodiment, Entire Time Frame Data Storage Area H733b7 includes 1st Time Frame Data Storage Area H733b7a and 2nd Time Frame Data Storage Area H733b7b. 1st Time Frame Data Storage Area H733b7a stores the 1st time frame data which indicates the 1st time frame (e.g., 8:00 am through 6:00 pm). 2nd Time Frame Data Storage Area H733b7b stores the 2nd time frame data which indicates the 2nd time frame. The 2nd time frame is the time frame other than the 1st time frame.

This paragraph illustrates the software program(s) stored in Second Area Dependent Notice Type Changing Software Storage Area H733c. In the present embodiment, Second Area Dependent Notice Type Changing Software Storage Area H733c stores Current Location Data Producing Software H733c1, 1st Previous Location Data Producing Software H733c2, 2nd Previous Location Data Producing Software H733c3, 1st Specific Zone Data Producing Software H733c4, 2nd Specific Zone Data Producing Software H733c5, Current Location Data Sending Software H733c6, 1st Specific Zone Data Sending Software H733c7, 2nd Specific Zone Data Sending Software H733c8, 1st False Location Data Sending Software H733c9, 2nd False Location Data Sending Software H733c10, Current Geographic Location Unknown Notice Sending Software H733c11, 1st Previous Location Data Sending Software H733c12, and 2nd Previous Location Data Sending Software H733c13. Current Location Data Producing Software H733c1 is the software program described hereinafter. 1st Previous Location Data Producing Software H733c2 is the software program described hereinafter. 2nd Previous Location Data Producing Software H733c3 is the software program described hereinafter. 1st Specific Zone Data Producing Software H733c4 is the software program described hereinafter. 2nd Specific Zone Data Producing Software H733c5 is the software program described hereinafter. Current Location Data Sending Software H733c6 is the software program described hereinafter. 1st Specific Zone Data Sending Software H733c7 is the software program described hereinafter. 2nd Specific Zone Data Sending Software H733c8 is the software program described hereinafter. 1st False Location Data Sending Software H733c9 is the software program described hereinafter. 2nd False Location Data Sending Software H733c10 is the software program described hereinafter. Current Geographic Location Unknown Notice Sending Software H733c11 is the software program described hereinafter. 1st Previous Location Data Sending Software H733c12 is the software program described hereinafter. 2nd Previous Location Data Sending Software H733c13 is the software program described hereinafter.

This paragraph illustrates the storage area included in RAM 206 (FIG. 1) of Communication Device 200. In the present embodiment, RAM 206 includes Second Area Dependent Notice Type Changing Info Storage Area 206733a of which the data and the software program(s) stored therein are described hereinafter.

The data and/or the software program(s) necessary to implement the present function may be downloaded from Host H to Communication Device 200.

This paragraph illustrates the storage area(s) included in Second Area Dependent Notice Type Changing Info Storage Area 206733a. In the present embodiment, Second Area Dependent Notice Type Changing Info Storage Area 206733a includes Second Area Dependent Notice Type Changing Data Storage Area 206733b and Second Area Dependent Notice Type Changing Software Storage Area 206733c. Second Area Dependent Notice Type Changing Data Storage Area 206733b stores the data necessary to implement the present function on the side of Communication Device 200, such as the one(s) described hereinafter. Second Area Dependent Notice Type Changing Software Storage Area 206733c stores the software program(s) necessary to implement the present function on the side of Communication Device 200, such as the one(s) described hereinafter.

This paragraph illustrates the storage area(s) included in Second Area Dependent Notice Type Changing Data Storage Area 206733b. In the present embodiment, Second Area Dependent Notice Type Changing Data Storage Area 206733b includes Current Location Data Storage Area 206733b1, Entire Geographic Area Data Storage Area 206733b2, Entire Specific Zone Data Storage Area 206733b3, Entire False Location Data Storage Area 206733b4, Entire Previous Location Data Storage Area 206733b5, Entire Notified Message Data Storage Area 206733b6, Entire Time Frame Data Storage Area 206733b7, Requester's Location Data Storage Area 206733b8, and Work Area 206733b9. Current Location Data Storage Area 206733b1 stores the current location data which indicates the current geographic location of Communication Device 200 in (x,y,z) format. Entire Geographic Area Data Storage Area 206733b2 stores the data described hereinafter. Entire Specific Zone Data Storage Area 206733b3 stores the data described hereinafter. Entire False Location Data Storage Area 206733b4 stores the data described hereinafter. Entire Previous Location Data Storage Area 206733b5 stores the data described hereinafter. Entire Notified Message Data Storage Area 206733b6 stores the data described hereinafter. Entire Time Frame Data Storage Area 206733b7 stores the data described hereinafter. Requester's Location Data Storage Area 206733b8 stores the requester's location data which indicates the current geographic location of another device (requester) in (x,y,z) format. Work Area 206733b9 is utilized as a work area to perform calculation and temporarily store data to implement the present function.

This paragraph illustrates the storage area(s) included in Entire Geographic Area Data Storage Area 206733b2. In the present embodiment, Entire Geographic Area Data Storage Area 206733b2 includes 1st Geographic Area Data Storage Area 206733b2a, 2nd Geographic Area Data Storage Area 206733b2b, 3rd Geographic Area Data Storage Area 206733b2c, 4th Geographic Area Data Storage Area 206733b2d, and 5th Geographic Area Data Storage Area 206733b2e. 1st Geographic Area Data Storage Area 206733b2a stores the 1st geographic area data which indicates the 1st geographic area. Here, the 1st geographic area may indicate a specific county, city, town, or state. The 1st geographic area may indicate a specific artificial structure (e.g., house, building, railway station, subway station, airport, movie theater, or shopping mall). The 1st geographic area may indicate a specific area (e.g., 2nd floor or 2nd room of the 2nd floor) of a specific artificial structure (e.g., house, building, railway station, subway station, airport, movie theater, or shopping mall). 2nd Geographic Area Data Storage Area 206733b2b stores the 2nd geographic area data which indicates the 2nd geographic area. Here, the 2nd geographic area may indicate a specific county, city, town, or state. The 2nd geographic area may indicate a specific artificial structure (e.g., house, building, railway station, subway station, airport, movie theater, or shopping mall). The 2nd geographic area may indicate a specific area (e.g., 2nd floor or 2nd room of the 2nd floor) of a specific artificial structure (e.g., house, building, railway station, subway station, airport, movie theater, or shopping mall). 3rd Geographic Area Data Storage Area 206733b2c stores the 3rd geographic area data which indicates the 3rd geographic area. Here, the 3rd geographic area may indicate a specific county, city, town, or state. The 3rd geographic area may indicate a specific artificial structure (e.g., house, building, railway station, subway station, airport, movie theater, or shopping mall). The 3rd geographic area may indicate a specific area (e.g., 2nd floor or 2nd room of the 2nd floor) of a specific artificial structure (e.g., house, building, railway station, subway station, airport, movie theater, or shopping mall). 4th Geographic Area Data Storage Area 206733b2d stores the 4th geographic area data which indicates the 4th geographic area. Here, the 4th geographic area may indicate a specific county, city, town, or state. The 4th geographic area may indicate a specific artificial structure (e.g., house, building, railway station, subway station, airport, movie theater, or shopping mall). The 4th geographic area may indicate a specific area (e.g., 2nd floor or 2nd room of the 2nd floor) of a specific artificial structure (e.g., house, building, railway station, subway station, airport, movie theater, or shopping mall). 5th Geographic Area Data Storage Area 206733b2e stores the 5th geographic area data which indicates the 5th geographic area. Here, the 5th geographic area may indicate a specific county, city, town, or state. The 5th geographic area may indicate a specific artificial structure (e.g., house, building, railway station, subway station, airport, movie theater, or shopping mall). The 5th geographic area may indicate a specific area (e.g., 2nd floor or 2nd room of the 2nd floor) of a specific artificial structure (e.g., house, building, railway station, subway station, airport, movie theater, or shopping mall).

This paragraph illustrates the storage area(s) included in Entire Specific Zone Data Storage Area 206733b3. In the present embodiment, Entire Specific Zone Data Storage Area 206733b3 includes 1st Specific Zone Data Storage Area 206733b3a and 2nd Specific Zone Data Storage Area 206733b3b. 1st Specific Zone Data Storage Area 206733b3a stores the 1st specific zone data which indicates the 1st specific zone. The 1st specific zone may indicate an area of 10 meter diameter in which Communication Device 200 is currently located. The 1st specific zone may indicate a specific portion (e.g., the 2nd floor) of the artificial structure (e.g., house, building, railway station, subway station, airport, movie theater, or shopping mall) in which Communication Device 200 is currently located. 2nd Specific Zone Data Storage Area 206733b3b stores the 2nd specific zone data which indicates the 2nd specific zone. The 2nd specific zone may indicate an area of 100 meter diameter in which Communication Device 200 is currently located. The 2nd specific zone may indicate the entire artificial structure (e.g., house, building, railway station, subway station, airport, movie theater, or shopping mall) in which Communication Device 200 is currently located.

This paragraph illustrates the storage area(s) included in Entire False Location Data Storage Area 206733b4. In the present embodiment, Entire False Location Data Storage Area 206733b4 includes 1st False Location Data Storage Area 206733b4a and 2nd False Location Data Storage Area 206733b4b. 1st False Location Data Storage Area 206733b4a stores the 1st false location data which indicates the 1st false location in (x,y,z) format. The 1st false location does not reflect the current geographic location of Communication Device 200. 2nd False Location Data Storage Area 206733b4b stores the 2nd false location data which indicates the 2nd false location in (x,y,z) format. The 2nd false location does not reflect the current geographic location of Communication Device 200.

This paragraph illustrates the storage area(s) included in Entire Previous Location Data Storage Area 206733b5. In the present embodiment, Entire Previous Location Data Storage Area 206733b5 includes 1st Previous Location Data Storage Area 206733b5a and 2nd Previous Location Data Storage Area 206733b5b. 1st Previous Location Data Storage Area 206733b5a stores the 1st previous location data which indicates the 1st previous location. Here, the 1st previous location is the pin-point location at which Communication Device 200 was located 10 minutes ago. 2nd Previous Location Data Storage Area 206733b5b stores the 2nd previous location data which indicates the 2nd previous location. Here, the 2nd previous location is the pin-point location at which Communication Device 200 was located 20 minutes ago.

This paragraph illustrates the storage area(s) included in Entire Notified Message Data Storage Area 206733b6. In the present embodiment, Entire Notified Message Data Storage Area 206733b6 includes Pin-point Location Notified Message Data Storage Area 206733b6a, 1st Specific Zone Notified Message Data Storage Area 206733b6b, 2nd Specific Zone Notified Message Data Storage Area 206733b6c, 1st False Location Notified Message Data Storage Area 206733b6d, 2nd False Location Notified Message Data Storage Area 206733b6e, Current Geographic Location Unknown Notified Message Data Storage Area 206733b6f, 1st Previous Location Notified Message Data Storage Area 206733b6g, and 2nd Previous Location Notified Message Data Storage Area 206733b6h. Pin-point Location Notified Message Data Storage Area 206733b6a stores the pin-point location notified message data which is the message indicating that the pin-point current geographic location of Communication Device 200 is notified to the requester. 1st Specific Zone Notified Message Data Storage Area 206733b6b stores the 1st specific zone notified message data which is the message indicating that the 1st specific zone in which Communication Device 200 is currently located is notified to the requester. 2nd Specific Zone Notified Message Data Storage Area 206733b6c stores the 2nd specific zone notified message data which is the message indicating that the 2nd specific zone in which Communication Device 200 is currently located is notified to the requester. 1st False Location Notified Message Data Storage Area 206733b6d stores the 1st false location notified message data which is the message indicating that the 1st false location is notified to the requester as the pin-point current geographic location of Communication Device 200. 2nd False Location Notified Message Data Storage Area 206733b6e stores the 2nd false location notified message data which is the message indicating that the 2nd false location is notified to the requester as the pin-point current geographic location of Communication Device 200. Current Geographic Location Unknown Notified Message Data Storage Area 206733b6f stores the current geographic location unknown notified message data which is the message indicating that the current geographic location of Communication Device 200 is notified to the requester as unknown. 1st Previous Location Notified Message Data Storage Area 206733b6g stores the 1st previous location notified message data which is the message indicating that the 1st previous location is notified to the requester as the pin-point current geographic location of Communication Device 200. 2nd Previous Location Notified Message Data Storage Area 206733b6h stores the 2nd previous location notified message data which is the message indicating that the 2nd previous location is notified to the requester as the pin-point current geographic location of Communication Device 200.

This paragraph illustrates the storage area(s) included in Entire Time Frame Data Storage Area 206733b7. In the present embodiment, Entire Time Frame Data Storage Area 206733b7 includes 1st Time Frame Data Storage Area 206733b7a and 2nd Time Frame Data Storage Area 206733b7b. 1st Time Frame Data Storage Area 206733b7a stores the 1st time frame data which indicates the 1st time frame (e.g., 8:00 am through 6:00 pm). 2nd Time Frame Data Storage Area 206733b7b stores the 2nd time frame data which indicates the 2nd time frame. The 2nd time frame is the time frame other than the 1st time frame.

This paragraph illustrates the software program(s) stored in Second Area Dependent Notice Type Changing Software Storage Area 206733c. In the present embodiment, Second Area Dependent Notice Type Changing Software Storage Area 206733c stores Current Location Data Producing Software 206733c1, 1st Previous Location Data Producing Software 206733c2, 2nd Previous Location Data Producing Software 206733c3, 1st Specific Zone Data Producing Software 206733c4, 2nd Specific Zone Data Producing Software 206733c5, Current Location Data Sending Software 206733c6, 1st Specific Zone Data Sending Software 206733c7, 2nd Specific Zone Data Sending Software 206733c8, 1st False Location Data Sending Software 206733c9, 2nd False Location Data Sending Software 206733c10, Current Geographic Location Unknown Notice Sending Software 206733c11, 1st Previous Location Data Sending Software 206733c12, and 2nd Previous Location Data Sending Software 206733c13. Current Location Data Producing Software 206733c1 is the software program described hereinafter. 1st Previous Location Data Producing Software 206733c2 is the software program described hereinafter. 2nd Previous Location Data Producing Software 206733c3 is the software program described hereinafter. 1st Specific Zone Data Producing Software 206733c4 is the software program described hereinafter. 2nd Specific Zone Data Producing Software 206733c5 is the software program described hereinafter. Current Location Data Sending Software 206733c6 is the software program described hereinafter. 1st Specific Zone Data Sending Software 206733c7 is the software program described hereinafter. 2nd Specific Zone Data Sending Software 206733c8 is the software program described hereinafter. 1st False Location Data Sending Software 206733c9 is the software program described hereinafter. 2nd False Location Data Sending Software 206733c10 is the software program described hereinafter. Current Geographic Location Unknown Notice Sending Software 206733c11 is the software program described hereinafter. 1st Previous Location Data Sending Software 206733c12 is the software program described hereinafter. 2nd Previous Location Data Sending Software 206733c13 is the software program described hereinafter.

This paragraph illustrate(s) Current Location Data Producing Software H733c1 of Host H and Current Location Data Producing Software 206733c1 of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step and sends the data to Host H in a wireless fashion (S2). Host H receives the current location data from Communication Device 200 and stores the data in Current Location Data Storage Area H733b1 (S3). The foregoing sequence is repeated periodically.

This paragraph illustrate(s) 1st Previous Location Data Producing Software H733c2 of Host H, which produce(s) the 1st previous location data. In the present embodiment, Host H increments the timer (not shown) (S1). If the timer value indicates the lapsed time of 10 minutes, Host H proceeds to the next step (S2). Host H retrieves the current location data from Current Location Data Storage Area H733b1 (S3). Host H stores the current location data retrieved in the previous step as the 1st previous location data in 1st Previous Location Data Storage Area H733b5a (S4). The foregoing sequence is repeated periodically.

This paragraph illustrate(s) 2nd Previous Location Data Producing Software H733c3 of Host H, which produce(s) the 2nd previous location data. In the present embodiment, Host H increments the timer (not shown) (S1). If the timer value indicates the lapsed time of 20 minutes, Host H proceeds to the next step (S2). Host H retrieves the current location data from Current Location Data Storage Area H733b1 (S3). Host H stores the current location data retrieved in the previous step as the 2nd previous location data in 2nd Previous Location Data Storage Area H733b5b (S4). The foregoing sequence is repeated periodically.

This paragraph illustrate(s) 1st Specific Zone Data Producing Software H733c4 of Host H, which produce(s) the 1st specific zone data. In the present embodiment, Host H retrieves the current location data from Current Location Data Storage Area H733b1 (S1). Host H produces the 1st specific zone data by referring to the current location data retrieved in the previous step (S2). Host H stores the 1st specific zone data produced in the previous step in 1st Specific Zone Data Storage Area H733b3a (S3). The foregoing sequence is repeated periodically.

This paragraph illustrate(s) 2nd Specific Zone Data Producing Software H733c5 of Host H, which produce(s) the 2nd specific zone data. In the present embodiment, Host H retrieves the current location data from Current Location Data Storage Area H733b1 (S1). Host H produces the 2nd specific zone data by referring to the current location data retrieved in the previous step (S2). Host H stores the 2nd specific zone data produced in the previous step in 2nd Specific Zone Data Storage Area H733b3b (S3). The foregoing sequence is repeated periodically.

This paragraph illustrate(s) Current Location Data Sending Software H733c6 of Host H and Current Location Data Sending Software 206733c6 of Communication Device 200, which send(s) the current location data to the requester. In the present embodiment, Host H periodically checks the incoming signal addressed to Communication Device 200 (S1). If the current geographic location notifying request is detected in the incoming signal, Host H proceeds to the next step (S2). Here, the current geographic location notifying request is the request sent by another device (requester) to notify the current geographic location of Communication Device 200 to the requester. Host H receives the requester's location data from the requester and stores the data in Requester's Location Data Storage Area H733b8 (S3). Host H retrieves the requester's location data from Requester's Location Data Storage Area H733b8 (S4). Host H retrieves the 1st geographic area data from 1st Geographic Area Data Storage Area H733b2a (S5). If the requester's location data retrieved in S4 is included in the 1st geographic area data retrieved in the previous step, Host H proceeds to the next step (S6). Host H retrieves the current location data from Current Location Data Storage Area H733b1 (S7). Host H sends the current location data retrieved in the previous step to the requester in response to the current geographic location notifying request detected in S2 (S8). Host H retrieves the pin-point location notified message data from Pin-point Location Notified Message Data Storage Area H733b6a and sends the data to Communication Device 200 (S9). CPU 211 (FIG. 1) receives the pin-point location notified message data from Host H in a wireless fashion and displays the data on LCD 201 (FIG. 1) (S10). The foregoing sequence is repeated periodically.

This paragraph illustrate(s) 1st Specific Zone Data Sending Software H733c7 of Host H and 1st Specific Zone Data Sending Software 206733c7 of Communication Device 200, which send(s) the 1st specific zone data to the requester. In the present embodiment, Host H periodically checks the incoming signal addressed to Communication Device 200 (S1). If the current geographic location notifying request is detected in the incoming signal, Host H proceeds to the next step (S2). Here, the current geographic location notifying request is the request sent by another device (requester) to notify the current geographic location of Communication Device 200 to the requester. Host H receives the requester's location data from the requester and stores the data in Requester's Location Data Storage Area H733b8 (S3). Host H retrieves the requester's location data from Requester's Location Data Storage Area H733b8 (S4). Host H retrieves the 2nd geographic area data from 2nd Geographic Area Data Storage Area H733b2b (S5). If the requester's location data retrieved in S4 is included in the 2nd geographic area data retrieved in the previous step, Host H proceeds to the next step (S6). Host H identifies the current time (S7). Host H retrieves the 1st time frame data from 1st Time Frame Data Storage Area H733b7a (S8). If the current time identified in S7 is included in the 1st time frame data retrieved in the previous step, Host H proceeds to the next step (S9). Host H retrieves the 1st specific zone data from 1st Specific Zone Data Storage Area H733b3a (S10). Host H sends the 1st specific zone data retrieved in the previous step to the requester in response to the current geographic location notifying request detected in S2 (S11). Host H retrieves the 1st specific zone notified message data from 1st Specific Zone Notified Message Data Storage Area H733b6b and sends the data to Communication Device 200 (S12). CPU 211 (FIG. 1) receives the 1st specific zone notified message data from Host H in a wireless fashion and displays the data on LCD 201 (FIG. 1) (S13). The foregoing sequence is repeated periodically.

This paragraph illustrate(s) 2nd Specific Zone Data Sending Software H733c8 of Host H and 2nd Specific Zone Data Sending Software 206733c8 of Communication Device 200, which send(s) the 2nd specific zone data to the requester. In the present embodiment, Host H periodically checks the incoming signal addressed to Communication Device 200 (S1). If the current geographic location notifying request is detected in the incoming signal, Host H proceeds to the next step (S2). Here, the current geographic location notifying request is the request sent by another device (requester) to notify the current geographic location of Communication Device 200 to the requester. Host H receives the requester's location data from the requester and stores the data in Requester's Location Data Storage Area H733b8 (S3). Host H retrieves the requester's location data from Requester's Location Data Storage Area H733b8 (S4). Host H retrieves the 2nd geographic area data from 2nd Geographic Area Data Storage Area H733b2b (S5). If the requester's location data retrieved in S4 is included in the 2nd geographic area data retrieved in the previous step, Host H proceeds to the next step (S6). Host H identifies the current time (S7). Host H retrieves the 2nd time frame data from 2nd Time Frame Data Storage Area H733b7b (S8). If the current time identified in S7 is included in the 2nd time frame data retrieved in the previous step, Host H proceeds to the next step (S9). Host H retrieves the 2nd specific zone data from 2nd Specific Zone Data Storage Area H733b3b (S10). Host H sends the 2nd specific zone data retrieved in the previous step to the requester in response to the current geographic location notifying request detected in S2 (S11). Host H retrieves the 2nd specific zone notified message data from 2nd Specific Zone Notified Message Data Storage Area H733b6c and sends the data to Communication Device 200 (S12). CPU 211 (FIG. 1) receives the 2nd specific zone notified message data from Host H in a wireless fashion and displays the data on LCD 201 (FIG. 1) (S13). The foregoing sequence is repeated periodically.

This paragraph illustrate(s) 1st False Location Data Sending Software H733c9 of Host H and 1st False Location Data Sending Software 206733c9 of Communication Device 200, which send(s) the 1st false location data to the requester. In the present embodiment, Host H periodically checks the incoming signal addressed to Communication Device 200 (S1). If the current geographic location notifying request is detected in the incoming signal, Host H proceeds to the next step (S2). Here, the current geographic location notifying request is the request sent by another device (requester) to notify the current geographic location of Communication Device 200 to the requester. Host H receives the requester's location data from the requester and stores the data in Requester's Location Data Storage Area H733b8 (S3). Host H retrieves the requester's location data from Requester's Location Data Storage Area H733b8 (S4). Host H retrieves the 3rd geographic area data from 3rd Geographic Area Data Storage Area H733b2c (S5). If the requester's location data retrieved in S4 is included in the 3rd geographic area data retrieved in the previous step, Host H proceeds to the next step (S6). Host H identifies the current time (S7). Host H retrieves the 1st time frame data from 1st Time Frame Data Storage Area H733b7a (S8). If the current time identified in S7 is included in the 1st time frame data retrieved in the previous step, Host H proceeds to the next step (S9). Host H retrieves the 1st false location data from 1st False Location Data Storage Area H733b4a (S10). Host H sends the 1st false location data retrieved in the previous step to the requester in response to the current geographic location notifying request detected in S2 (S11). Host H retrieves the 1st false location notified message data from 1st False Location Notified Message Data Storage Area H733b6d and sends the data to Communication Device 200 (S12). CPU 211 (FIG. 1) receives the 1st false location notified message data from Host H in a wireless fashion and displays the data on LCD 201 (FIG. 1) (S13). The foregoing sequence is repeated periodically.

This paragraph illustrate(s) 2nd False Location Data Sending Software H733c10 of Host H and 2nd False Location Data Sending Software 206733c10 of Communication Device 200, which send(s) the 2nd false location data to the requester. In the present embodiment, Host H periodically checks the incoming signal addressed to Communication Device 200 (S1). If the current geographic location notifying request is detected in the incoming signal, Host H proceeds to the next step (S2). Here, the current geographic location notifying request is the request sent by another device (requester) to notify the current geographic location of Communication Device 200 to the requester. Host H receives the requester's location data from the requester and stores the data in Requester's Location Data Storage Area H733b8 (S3). Host H retrieves the requester's location data from Requester's Location Data Storage Area H733b8 (S4). Host H retrieves the 3rd geographic area data from 3rd Geographic Area Data Storage Area H733b2c (S5). If the requester's location data retrieved in S4 is included in the 3rd geographic area data retrieved in the previous step, Host H proceeds to the next step (S6). Host H identifies the current time (S7). Host H retrieves the 2nd time frame data from 2nd Time Frame Data Storage Area H733b7b (S8). If the current time identified in S7 is included in the 2nd time frame data retrieved in the previous step, Host H proceeds to the next step (S9). Host H retrieves the 2nd false location data from 2nd False Location Data Storage Area H733b4b (S10). Host H sends the 2nd false location data retrieved in the previous step to the requester in response to the current geographic location notifying request detected in S2 (S11). Host H retrieves the 2nd false location notified message data from 2nd False Location Notified Message Data Storage Area H733b6e and sends the data to Communication Device 200 (S12). CPU 211 (FIG. 1) receives the 2nd false location notified message data from Host H in a wireless fashion and displays the data on LCD 201 (FIG. 1) (S13). The foregoing sequence is repeated periodically.

This paragraph illustrate(s) Current Geographic Location Unknown Notice Sending Software H733c11 of Host H and Current Geographic Location Unknown Notice Sending Software 206733c11 of Communication Device 200, which send(s) the current geographic location unknown notice to the requester. In the present embodiment, Host H periodically checks the incoming signal addressed to Communication Device 200 (S1). If the current geographic location notifying request is detected in the incoming signal, Host H proceeds to the next step (S2). Here, the current geographic location notifying request is the request sent by another device (requester) to notify the current geographic location of Communication Device 200 to the requester. Host H receives the requester's location data from the requester and stores the data in Requester's Location Data Storage Area H733b8 (S3). Host H retrieves the requester's location data from Requester's Location Data Storage Area H733b8 (S4). Host H retrieves the 4th geographic area data from 4th Geographic Area Data Storage Area H733b2d (S5). If the requester's location data retrieved in S4 is included in the 4th geographic area data retrieved in the previous step, Host H proceeds to the next step (S6). Host H sends the current geographic location unknown notice to the requester in response to the current geographic location notifying request detected in S2 (S7). Here, the current geographic location unknown notice indicates that the current geographic location of Communication Device 200 is unknown. Host H retrieves the current geographic location unknown notified message data from Current Geographic Location Unknown Notified Message Data Storage Area H733b6f and sends the data to Communication Device 200 (S8). CPU 211 (FIG. 1) receives the current geographic location unknown notified message data from Host H in a wireless fashion and displays the data on LCD 201 (FIG. 1) (S9). The foregoing sequence is repeated periodically.

This paragraph illustrate(s) 1st Previous Location Data Sending Software H733c12 of Host H and 1st Previous Location Data Sending Software 206733c12 of Communication Device 200, which send(s) the 1st previous location data to the requester. In the present embodiment, Host H periodically checks the incoming signal addressed to Communication Device 200 (S1). If the current geographic location notifying request is detected in the incoming signal, Host H proceeds to the next step (S2). Here, the current geographic location notifying request is the request sent by another device (requester) to notify the current geographic location of Communication Device 200 to the requester. Host H receives the requester's location data from the requester and stores the data in Requester's Location Data Storage Area H733b8 (S3). Host H retrieves the requester's location data from Requester's Location Data Storage Area H733b8 (S4). Host H retrieves the 5th geographic area data from 5th Geographic Area Data Storage Area H733b2e (S5). If the requester's location data retrieved in S4 is included in the 5th geographic area data retrieved in the previous step, Host H proceeds to the next step (S6). Host H identifies the current time (S7). Host H retrieves the 1st time frame data from 1st Time Frame Data Storage Area H733b7a (S8). If the current time identified in S7 is included in the 1st time frame data retrieved in the previous step, Host H proceeds to the next step (S9). Host H retrieves the 1st previous location data from 1st Previous Location Data Storage Area H733b5a (S10). Host H sends the 1st previous location data retrieved in the previous step to the requester in response to the current geographic location notifying request detected in S2 (S11). Host H retrieves the 1st previous location notified message data from 1st Previous Location Notified Message Data Storage Area H733b6g and sends the data to Communication Device 200 (S12). CPU 211 (FIG. 1) receives the 1st previous location notified message data from Host H in a wireless fashion and displays the data on LCD 201 (FIG. 1) (S13). The foregoing sequence is repeated periodically.

This paragraph illustrate(s) 2nd Previous Location Data Sending Software H733c13 of Host H and 2nd Previous Location Data Sending Software 206733c13 of Communication Device 200, which send(s) the 2nd previous location data to the requester. In the present embodiment, Host H periodically checks the incoming signal addressed to Communication Device 200 (S1). If the current geographic location notifying request is detected in the incoming signal, Host H proceeds to the next step (S2). Here, the current geographic location notifying request is the request sent by another device (requester) to notify the current geographic location of Communication Device 200 to the requester. Host H receives the requester's location data from the requester and stores the data in Requester's Location Data Storage Area H733b8 (S3). Host H retrieves the requester's location data from Requester's Location Data Storage Area H733b8 (S4). Host H retrieves the 5th geographic area data from 5th Geographic Area Data Storage Area H733b2e (S5). If the requester's location data retrieved in S4 is included in the 5th geographic area data retrieved in the previous step, Host H proceeds to the next step (S6). Host H identifies the current time (S7). Host H retrieves the 2nd time frame data from 2nd Time Frame Data Storage Area H733b7b (S8). If the current time identified in S7 is included in the 2nd time frame data retrieved in the previous step, Host H proceeds to the next step (S9). Host H retrieves the 2nd previous location data from 2nd Previous Location Data Storage Area H733b5b (S10). Host H sends the 2nd previous location data retrieved in the previous step to the requester in response to the current geographic location notifying request detected in S2 (S11). Host H retrieves the 2nd previous location notified message data from 2nd Previous Location Notified Message Data Storage Area H733b6h and sends the data to Communication Device 200 (S12). CPU 211 (FIG. 1) receives the 2nd previous location notified message data from Host H in a wireless fashion and displays the data on LCD 201 (FIG. 1) (S13). The foregoing sequence is repeated periodically.

The following paragraphs illustrate another embodiment wherein Communication Device 200 plays the major role in implementing the present function.

This paragraph illustrate(s) Current Location Data Producing Software 206733c1 of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step (S2). CPU 211 (FIG. 1) stores the current location data produced in the previous step in Current Location Data Storage Area 206733b1 (S3). The foregoing sequence is repeated periodically.

This paragraph illustrate(s) 1st Previous Location Data Producing Software 206733c2 of Communication Device 200, which produce(s) the 1st previous location data. In the present embodiment, CPU 211 (FIG. 1) increments the timer (not shown) (S1). If the timer value indicates the lapsed time of 10 minutes, CPU 211 (FIG. 1) proceeds to the next step (S2). CPU 211 (FIG. 1) retrieves the current location data from Current Location Data Storage Area 206733b1 (S3). CPU 211 (FIG. 1) stores the current location data retrieved in the previous step as the 1st previous location data in 1st Previous Location Data Storage Area 206733b5a (S4). The foregoing sequence is repeated periodically.

This paragraph illustrate(s) 2nd Previous Location Data Producing Software 206733c3 of Communication Device 200, which produce(s) the 2nd previous location data. In the present embodiment, CPU 211 (FIG. 1) increments the timer (not shown) (S1). If the timer value indicates the lapsed time of 20 minutes, CPU 211 (FIG. 1) proceeds to the next step (S2). CPU 211 (FIG. 1) retrieves the current location data from Current Location Data Storage Area 206733b1 (S3). CPU 211 (FIG. 1) stores the current location data retrieved in the previous step as the 2nd previous location data in 2nd Previous Location Data Storage Area 206733b5b (S4). The foregoing sequence is repeated periodically.

This paragraph illustrate(s) 1st Specific Zone Data Producing Software 206733c4 of Communication Device 200, which produce(s) the 1st specific zone data. In the present embodiment, CPU 211 (FIG. 1) retrieves the current location data from Current Location Data Storage Area 206733b1 (S1). CPU 211 (FIG. 1) produces the 1st specific zone data by referring to the current location data retrieved in the previous step (S2). CPU 211 (FIG. 1) stores the 1st specific zone data produced in the previous step in 1st Specific Zone Data Storage Area 206733b3a (S3). The foregoing sequence is repeated periodically.

This paragraph illustrate(s) 2nd Specific Zone Data Producing Software 206733c5 of Communication Device 200, which produce(s) the 2nd specific zone data. In the present embodiment, CPU 211 (FIG. 1) retrieves the current location data from Current Location Data Storage Area 206733b1 (S1). CPU 211 (FIG. 1) produces the 2nd specific zone data by referring to the current location data retrieved in the previous step (S2). CPU 211 (FIG. 1) stores the 2nd specific zone data produced in the previous step in 2nd Specific Zone Data Storage Area 206733b3b (S3). The foregoing sequence is repeated periodically.

This paragraph illustrate(s) Current Location Data Sending Software 206733c6 of Communication Device 200, which send(s) the current location data to the requester. In the present embodiment, CPU 211 (FIG. 1) periodically checks the incoming signal addressed to Communication Device 200 (S1). If the current geographic location notifying request is detected in the incoming signal, CPU 211 (FIG. 1) proceeds to the next step (S2). Here, the current geographic location notifying request is the request sent by another device (requester) to notify the current geographic location of Communication Device 200 to the requester. CPU 211 (FIG. 1) receives the requester's location data from the requester in a wireless fashion and stores the data in Requester's Location Data Storage Area 206733b8 (S3). CPU 211 (FIG. 1) retrieves the requester's location data from Requester's Location Data Storage Area 206733b8 (S4). CPU 211 (FIG. 1) retrieves the 1st geographic area data from 1st Geographic Area Data Storage Area 206733b2a (S5). If the requester's location data retrieved in S4 is included in the 1st geographic area data retrieved in the previous step, CPU 211 (FIG. 1) proceeds to the next step (S6). CPU 211 (FIG. 1) retrieves the current location data from Current Location Data Storage Area 206733b1 (S7). CPU 211 (FIG. 1) sends the current location data retrieved in the previous step to the requester in a wireless fashion in response to the current geographic location notifying request detected in S2 (S8). CPU 211 (FIG. 1) retrieves the pin-point location notified message data from Pin-point Location Notified Message Data Storage Area 206733b6a (S9). CPU 211 (FIG. 1) displays the pin-point location notified message data retrieved in the previous step on LCD 201 (FIG. 1) (S10). The foregoing sequence is repeated periodically.

This paragraph illustrate(s) 1st Specific Zone Data Sending Software 206733c7 of Communication Device 200, which send(s) the 1st specific zone data to the requester. In the present embodiment, CPU 211 (FIG. 1) periodically checks the incoming signal addressed to Communication Device 200 (S1). If the current geographic location notifying request is detected in the incoming signal, CPU 211 (FIG. 1) proceeds to the next step (S2). Here, the current geographic location notifying request is the request sent by another device (requester) to notify the current geographic location of Communication Device 200 to the requester. CPU 211 (FIG. 1) receives the requester's location data from the requester in a wireless fashion and stores the data in Requester's Location Data Storage Area 206733b8 (S3). CPU 211 (FIG. 1) retrieves the requester's location data from Requester's Location Data Storage Area 206733b8 (S4). CPU 211 (FIG. 1) retrieves the 2nd geographic area data from 2nd Geographic Area Data Storage Area 206733b2b (S5). If the requester's location data retrieved in S4 is included in the 2nd geographic area data retrieved in the previous step, CPU 211 (FIG. 1) proceeds to the next step (S6). CPU 211 (FIG. 1) identifies the current time (S7). CPU 211 (FIG. 1) retrieves the 1st time frame data from 1st Time Frame Data Storage Area 206733b7a (S8). If the current time identified in S7 is included in the 1st time frame data retrieved in the previous step, CPU 211 (FIG. 1) proceeds to the next step (S9). CPU 211 (FIG. 1) retrieves the 1st specific zone data from 1st Specific Zone Data Storage Area 206733b3a (S10). CPU 211 (FIG. 1) sends the 1st specific zone data retrieved in the previous step to the requester in a wireless fashion in response to the current geographic location notifying request detected in S2 (S11). CPU 211 (FIG. 1) retrieves the 1st specific zone notified message data from 1st Specific Zone Notified Message Data Storage Area 206733b6b (S12). CPU 211 (FIG. 1) displays the 1st specific zone notified message data retrieved in the previous step on LCD 201 (FIG. 1) (S13). The foregoing sequence is repeated periodically.

This paragraph illustrate(s) 2nd Specific Zone Data Sending Software 206733c8 of Communication Device 200, which send(s) the 2nd specific zone data to the requester. In the present embodiment, CPU 211 (FIG. 1) periodically checks the incoming signal addressed to Communication Device 200 (S1). If the current geographic location notifying request is detected in the incoming signal, CPU 211 (FIG. 1) proceeds to the next step (S2). Here, the current geographic location notifying request is the request sent by another device (requester) to notify the current geographic location of Communication Device 200 to the requester. CPU 211 (FIG. 1) receives the requester's location data from the requester in a wireless fashion and stores the data in Requester's Location Data Storage Area 206733b8 (S3). CPU 211 (FIG. 1) retrieves the requester's location data from Requester's Location Data Storage Area 206733b8 (S4). CPU 211 (FIG. 1) retrieves the 2nd geographic area data from 2nd Geographic Area Data Storage Area 206733b2b (S5). If the requester's location data retrieved in S4 is included in the 2nd geographic area data retrieved in the previous step, CPU 211 (FIG. 1) proceeds to the next step (S6). CPU 211 (FIG. 1) identifies the current time (S7). CPU 211 (FIG. 1) retrieves the 2nd time frame data from 2nd Time Frame Data Storage Area 206733b7b (S8). If the current time identified in S7 is included in the 2nd time frame data retrieved in the previous step, CPU 211 (FIG. 1) proceeds to the next step (S9). CPU 211 (FIG. 1) retrieves the 2nd specific zone data from 2nd Specific Zone Data Storage Area 206733b3b (S10). CPU 211 (FIG. 1) sends the 2nd specific zone data retrieved in the previous step to the requester in a wireless fashion in response to the current geographic location notifying request detected in S2 (S11). CPU 211 (FIG. 1) retrieves the 2nd specific zone notified message data from 2nd Specific Zone Notified Message Data Storage Area 206733b6c (S12). CPU 211 (FIG. 1) displays the 2nd specific zone notified message data retrieved in the previous step on LCD 201 (FIG. 1) (S13). The foregoing sequence is repeated periodically.

This paragraph illustrate(s) 1st False Location Data Sending Software 206733c9 of Communication Device 200, which send(s) the 1st false location data to the requester. In the present embodiment, CPU 211 (FIG. 1) periodically checks the incoming signal addressed to Communication Device 200 (S1). If the current geographic location notifying request is detected in the incoming signal, CPU 211 (FIG. 1) proceeds to the next step (S2). Here, the current geographic location notifying request is the request sent by another device (requester) to notify the current geographic location of Communication Device 200 to the requester. CPU 211 (FIG. 1) receives the requester's location data from the requester in a wireless fashion and stores the data in Requester's Location Data Storage Area 206733b8 (S3). CPU 211 (FIG. 1) retrieves the requester's location data from Requester's Location Data Storage Area 206733b8 (S4). CPU 211 (FIG. 1) retrieves the 3rd geographic area data from 3rd Geographic Area Data Storage Area 206733b2c (S5). If the requester's location data retrieved in S4 is included in the 3rd geographic area data retrieved in the previous step, CPU 211 (FIG. 1) proceeds to the next step (S6). CPU 211 (FIG. 1) identifies the current time (S7). CPU 211 (FIG. 1) retrieves the 1st time frame data from 1st Time Frame Data Storage Area 206733b7a (S8). If the current time identified in S7 is included in the 1st time frame data retrieved in the previous step, CPU 211 (FIG. 1) proceeds to the next step (S9). CPU 211 (FIG. 1) retrieves the 1st false location data from 1st False Location Data Storage Area 206733b4a (S10). CPU 211 (FIG. 1) sends the 1st false location data retrieved in the previous step to the requester in a wireless fashion in response to the current geographic location notifying request detected in S2 (S11). CPU 211 (FIG. 1) retrieves the 1st false location notified message data from 1st False Location Notified Message Data Storage Area 206733b6d (S12). CPU 211 (FIG. 1) displays the 1st false location notified message data retrieved in the previous step on LCD 201 (FIG. 1) (S13). The foregoing sequence is repeated periodically.

This paragraph illustrate(s) 2nd False Location Data Sending Software 206733c10 of Communication Device 200, which send(s) the 2nd false location data to the requester. In the present embodiment, CPU 211 (FIG. 1) periodically checks the incoming signal addressed to Communication Device 200 (S1). If the current geographic location notifying request is detected in the incoming signal, CPU 211 (FIG. 1) proceeds to the next step (S2). Here, the current geographic location notifying request is the request sent by another device (requester) to notify the current geographic location of Communication Device 200 to the requester. CPU 211 (FIG. 1) receives the requester's location data from the requester in a wireless fashion and stores the data in Requester's Location Data Storage Area 206733b8 (S3). CPU 211 (FIG. 1) retrieves the requester's location data from Requester's Location Data Storage Area 206733b8 (S4). CPU 211 (FIG. 1) retrieves the 3rd geographic area data from 3rd Geographic Area Data Storage Area 206733b2c (S5). If the requester's location data retrieved in S4 is included in the 3rd geographic area data retrieved in the previous step, CPU 211 (FIG. 1) proceeds to the next step (S6). CPU 211 (FIG. 1) identifies the current time (S7). CPU 211 (FIG. 1) retrieves the 2nd time frame data from 2nd Time Frame Data Storage Area 206733b7b (S8). If the current time identified in S7 is included in the 2nd time frame data retrieved in the previous step, CPU 211 (FIG. 1) proceeds to the next step (S9). CPU 211 (FIG. 1) retrieves the 2nd false location data from 2nd False Location Data Storage Area 206733b4b (S10). CPU 211 (FIG. 1) sends the 2nd false location data retrieved in the previous step to the requester in a wireless fashion in response to the current geographic location notifying request detected in S2 (S11). CPU 211 (FIG. 1) retrieves the 2nd false location notified message data from 2nd False Location Notified Message Data Storage Area 206733b6e (S12). CPU 211 (FIG. 1) displays the 2nd false location notified message data retrieved in the previous step on LCD 201 (FIG. 1) (S13). The foregoing sequence is repeated periodically.

This paragraph illustrate(s) Current Geographic Location Unknown Notice Sending Software 206733c11 of Communication Device 200, which send(s) the current geographic location unknown notice to the requester. In the present embodiment, CPU 211 (FIG. 1) periodically checks the incoming signal addressed to Communication Device 200 (S1). If the current geographic location notifying request is detected in the incoming signal, CPU 211 (FIG. 1) proceeds to the next step (S2). Here, the current geographic location notifying request is the request sent by another device (requester) to notify the current geographic location of Communication Device 200 to the requester. CPU 211 (FIG. 1) receives the requester's location data from the requester in a wireless fashion and stores the data in Requester's Location Data Storage Area 206733b8 (S3). CPU 211 (FIG. 1) retrieves the requester's location data from Requester's Location Data Storage Area 206733b8 (S4). CPU 211 (FIG. 1) retrieves the 4th geographic area data from 4th Geographic Area Data Storage Area 206733b2d (S5). If the requester's location data retrieved in S4 is included in the 4th geographic area data retrieved in the previous step, CPU 211 (FIG. 1) proceeds to the next step (S6). CPU 211 (FIG. 1) sends the current geographic location unknown notice to the requester in a wireless fashion in response to the current geographic location notifying request detected in S2 (S7). Here, the current geographic location unknown notice indicates that the current geographic location of Communication Device 200 is unknown. CPU 211 (FIG. 1) retrieves the current geographic location unknown notified message data from Current Geographic Location Unknown Notified Message Data Storage Area 206733b6f (S8). CPU 211 (FIG. 1) displays the current geographic location unknown notified message data retrieved in the previous step on LCD 201 (FIG. 1) (S9). The foregoing sequence is repeated periodically.

This paragraph illustrate(s) 1st Previous Location Data Sending Software 206733c12 of Communication Device 200, which send(s) the 1st previous location data to the requester. In the present embodiment, CPU 211 (FIG. 1) periodically checks the incoming signal addressed to Communication Device 200 (S1). If the current geographic location notifying request is detected in the incoming signal, CPU 211 (FIG. 1) proceeds to the next step (S2). Here, the current geographic location notifying request is the request sent by another device (requester) to notify the current geographic location of Communication Device 200 to the requester. CPU 211 (FIG. 1) receives the requester's location data from the requester in a wireless fashion and stores the data in Requester's Location Data Storage Area 206733b8 (S3). CPU 211 (FIG. 1) retrieves the requester's location data from Requester's Location Data Storage Area 206733b8 (S4). CPU 211 (FIG. 1) retrieves the 5th geographic area data from 5th Geographic Area Data Storage Area 206733b2e (S5). If the requester's location data retrieved in S4 is included in the 5th geographic area data retrieved in the previous step, CPU 211 (FIG. 1) proceeds to the next step (S6). CPU 211 (FIG. 1) identifies the current time (S7). CPU 211 (FIG. 1) retrieves the 1st time frame data from 1st Time Frame Data Storage Area 206733b7a (S8). If the current time identified in S7 is included in the 1st time frame data retrieved in the previous step, CPU 211 (FIG. 1) proceeds to the next step (S9). CPU 211 (FIG. 1) retrieves the 1st previous location data from 1st Previous Location Data Storage Area 206733b5a (S10). CPU 211 (FIG. 1) sends the 1st previous location data retrieved in the previous step to the requester in a wireless fashion in response to the current geographic location notifying request detected in S2 (S11). CPU 211 (FIG. 1) retrieves the 1st previous location notified message data from 1st Previous Location Notified Message Data Storage Area 206733b6g (S12). CPU 211 (FIG. 1) displays the 1st previous location notified message data retrieved in the previous step on LCD 201 (FIG. 1) (S13). The foregoing sequence is repeated periodically.

This paragraph illustrate(s) 2nd Previous Location Data Sending Software 206733c13 of Communication Device 200, which send(s) the 2nd previous location data to the requester. In the present embodiment, CPU 211 (FIG. 1) periodically checks the incoming signal addressed to Communication Device 200 (S1). If the current geographic location notifying request is detected in the incoming signal, CPU 211 (FIG. 1) proceeds to the next step (S2). Here, the current geographic location notifying request is the request sent by another device (requester) to notify the current geographic location of Communication Device 200 to the requester. CPU 211 (FIG. 1) receives the requester's location data from the requester in a wireless fashion and stores the data in Requester's Location Data Storage Area 206733b8 (S3). CPU 211 (FIG. 1) retrieves the requester's location data from Requester's Location Data Storage Area 206733b8 (S4). CPU 211 (FIG. 1) retrieves the 5th geographic area data from 5th Geographic Area Data Storage Area 206733b2e (S5). If the requester's location data retrieved in S4 is included in the 5th geographic area data retrieved in the previous step, CPU 211 (FIG. 1) proceeds to the next step (S6). CPU 211 (FIG. 1) identifies the current time (S7). CPU 211 (FIG. 1) retrieves the 2nd time frame data from 2nd Time Frame Data Storage Area 206733b7b (S8). If the current time identified in S7 is included in the 2nd time frame data retrieved in the previous step, CPU 211 (FIG. 1) proceeds to the next step (S9). CPU 211 (FIG. 1) retrieves the 2nd previous location data from 2nd Previous Location Data Storage Area 206733b5b (S10). CPU 211 (FIG. 1) sends the 2nd previous location data retrieved in the previous step to the requester in a wireless fashion in response to the current geographic location notifying request detected in S2 (S11). CPU 211 (FIG. 1) retrieves the 2nd previous location notified message data from 2nd Previous Location Notified Message Data Storage Area 206733b6h (S12). CPU 211 (FIG. 1) displays the 2nd previous location notified message data retrieved in the previous step on LCD 201 (FIG. 1) (S13). The foregoing sequence is repeated periodically.

<<Time Dependent Location Notifying Type Changing Function>>

The following paragraphs illustrate the time dependent location notifying type changing function, wherein when the current time is within a 1st time frame, a pin-point location of said communication device is notified to another device and a pin-point location notified message data is displayed on said display, when the current time is within a 2nd time frame, a 1st specific zone in which said communication device is located is notified to said another device and a 1st specific zone notified message data is displayed on said display, when the current time is within a 3rd time frame, a 2nd specific zone in which said communication device is located is notified to said another device and a 2nd specific zone notified message data is displayed on said display, when the current time is within a 4th time frame, a 1st false location is notified to said another device and a 1st false location notified message data is displayed on said display, when the current time is within a 5th time frame, a 2nd false location is notified to said another device and a 2nd false location notified message data is displayed on said display, when the current time is within a 6th time frame, a current geographic location unknown notice is sent to said another device and a current geographic location unknown message data is displayed on said display, when the current time is within a 7th time frame, a 1st previous location which indicates the location of said communication device at a 1st previous time is notified to said another device and a 1st previous location notified message data is displayed on said display, and when the current time is within a 8th time frame, a 2nd previous location which indicates the location of said communication device at a 2nd previous time is notified to said another device and a 2nd previous location notified message data is displayed on said display.

This paragraph illustrates the storage area included in Host H. In the present embodiment, Host H includes Time Dependent Location Notifying Type Changing Info Storage Area H734a of which the data and the software program(s) stored therein are described hereinafter.

This paragraph illustrates the storage area(s) included in Time Dependent Location Notifying Type Changing Info Storage Area H734a. In the present embodiment, Time Dependent Location Notifying Type Changing Info Storage Area H734a includes Time Dependent Location Notifying Type Changing Data Storage Area H734b and Time Dependent Location Notifying Type Changing Software Storage Area H734c. Time Dependent Location Notifying Type Changing Data Storage Area H734b stores the data necessary to implement the present function on the side of Host H, such as the one(s) described hereinafter. Time Dependent Location Notifying Type Changing Software Storage Area H734c stores the software program(s) necessary to implement the present function on the side of Host H, such as the one(s) described hereinafter.

This paragraph illustrates the storage area(s) included in Time Dependent Location Notifying Type Changing Data Storage Area H734b. In the present embodiment, Time Dependent Location Notifying Type Changing Data Storage Area H734b includes Current Location Data Storage Area H734b1, Entire Time Frame Data Storage Area H734b2, Entire Specific Zone Data Storage Area H734b3, Entire False Location Data Storage Area H734b4, Entire Previous Location Data Storage Area H734b5, Entire Notified Message Data Storage Area H734b6, and Work Area H734b7. Current Location Data Storage Area H734b1 stores the current location data which indicates the current geographic location of Communication Device 200 in (x,y,z) format. Entire Time Frame Data Storage Area H734b2 stores the data described hereinafter. Entire Specific Zone Data Storage Area H734b3 stores the data described hereinafter. Entire False Location Data Storage Area H734b4 stores the data described hereinafter. Entire Previous Location Data Storage Area H734b5 stores the data described hereinafter. Entire Notified Message Data Storage Area H734b6 stores the data described hereinafter. Work Area H734b7 is utilized as a work area to perform calculation and temporarily store data to implement the present function.

This paragraph illustrates the storage area(s) included in Entire Time Frame Data Storage Area H734b2. In the present embodiment, Entire Time Frame Data Storage Area H734b2 includes 1st Time Frame Data Storage Area H734b2a, 2nd Time Frame Data Storage Area H734b2b, 3rd Time Frame Data Storage Area H734b2c, 4th Time Frame Data Storage Area H734b2d, 5th Time Frame Data Storage Area H734b2e, 6th Time Frame Data Storage Area H734b2f, 7th Time Frame Data Storage Area H734b2g, and 8th Time Frame Data Storage Area H734b2h. 1st Time Frame Data Storage Area H734b2a stores the 1st time frame data which indicates the 1st time frame (e.g., 0:00 am midnight through 3:00 am). 2nd Time Frame Data Storage Area H734b2b stores the 2nd time frame data which indicates the 2nd time frame (e.g., 3:00 am through 6:00 am). 3rd Time Frame Data Storage Area H734b2c stores the 3rd time frame data which indicates the 3rd time frame (e.g., 6:00 am through 9:00 am). 4th Time Frame Data Storage Area H734b2d stores the 4th time frame data which indicates the 4th time frame (e.g., 9:00 am through 12:00 am noon). 5th Time Frame Data Storage Area H734b2e stores the 5th time frame data which indicates the 5th time frame (e.g., 12:00 am noon through 3:00 pm). 6th Time Frame Data Storage Area H734b2f stores the 6th time frame data which indicates the 6th time frame (e.g., 3:00 pm through 6:00 pm). 7th Time Frame Data Storage Area H734b2g stores the 7th time frame data which indicates the 7th time frame (e.g., 6:00 pm through 9:00 pm). 8th Time Frame Data Storage Area H734b2h stores the 8th time frame data which indicates the 8th time frame (e.g., 9:00 pm through 0:00 am midnight).

This paragraph illustrates the storage area(s) included in Entire Specific Zone Data Storage Area H734b3. In the present embodiment, Entire Specific Zone Data Storage Area H734b3 includes 1st Specific Zone Data Storage Area H734b3a and 2nd Specific Zone Data Storage Area H734b3b. 1st Specific Zone Data Storage Area H734b3a stores the 1st specific zone data which indicates the 1st specific zone. The 1st specific zone may indicate an area of 10 meter diameter in which Communication Device 200 is currently located. The 1st specific zone may indicate a specific portion (e.g., the 2nd floor) of the artificial structure (e.g., house, building, railway station, subway station, airport, movie theater, or shopping mall) in which Communication Device 200 is currently located. 2nd Specific Zone Data Storage Area H734b3b stores the 2nd specific zone data which indicates the 2nd specific zone. The 2nd specific zone may indicate an area of 100 meter diameter in which Communication Device 200 is currently located. The 2nd specific zone may indicate the entire artificial structure (e.g., house, building, railway station, subway station, airport, movie theater, or shopping mall) in which Communication Device 200 is currently located.

This paragraph illustrates the storage area(s) included in Entire False Location Data Storage Area H734b4. In the present embodiment, Entire False Location Data Storage Area H734b4 includes 1st False Location Data Storage Area H734b4a and 2nd False Location Data Storage Area H734b4b. 1st False Location Data Storage Area H734b4a stores the 1st false location data which indicates the 1st false location in (x,y,z) format. The 1st false location does not reflect the current geographic location of Communication Device 200. 2nd False Location Data Storage Area H734b4b stores the 2nd false location data which indicates the 2nd false location in (x,y,z) format. The 2nd false location does not reflect the current geographic location of Communication Device 200.

This paragraph illustrates the storage area(s) included in Entire Previous Location Data Storage Area H734b5. In the present embodiment, Entire Previous Location Data Storage Area H734b5 includes 1st Previous Location Data Storage Area H734b5a and 2nd Previous Location Data Storage Area H734b5b. 1st Previous Location Data Storage Area H734b5a stores the 1st previous location data which indicates the 1st previous location. Here, the 1st previous location is the pin-point location at which Communication Device 200 was located 10 minutes ago. 2nd Previous Location Data Storage Area H734b5b stores the 2nd previous location data which indicates the 2nd previous location. Here, the 2nd previous location is the pin-point location at which Communication Device 200 was located 20 minutes ago.

This paragraph illustrates the storage area(s) included in Entire Notified Message Data Storage Area H734b6. In the present embodiment, Entire Notified Message Data Storage Area H734b6 includes Pin-point Location Notified Message Data Storage Area H734b6a, 1st Specific Zone Notified Message Data Storage Area H734b6b, 2nd Specific Zone Notified Message Data Storage Area H734b6c, 1st False Location Notified Message Data Storage Area H734b6d, 2nd False Location Notified Message Data Storage Area H734b6e, Current Geographic Location Unknown Notified Message Data Storage Area H734b6f, 1st Previous Location Notified Message Data Storage Area H734b6g, and 2nd Previous Location Notified Message Data Storage Area H734b6h. Pin-point Location Notified Message Data Storage Area H734b6a stores the pin-point location notified message data which is the message indicating that the pin-point current geographic location of Communication Device 200 is notified to the requester. 1st Specific Zone Notified Message Data Storage Area H734b6b stores the 1st specific zone notified message data which is the message indicating that the 1st specific zone in which Communication Device 200 is currently located is notified to the requester. 2nd Specific Zone Notified Message Data Storage Area H734b6c stores the 2nd specific zone notified message data which is the message indicating that the 2nd specific zone in which Communication Device 200 is currently located is notified to the requester. 1st False Location Notified Message Data Storage Area H734b6d stores the 1st false location notified message data which is the message indicating that the 1st false location is notified to the requester as the pin-point current geographic location of Communication Device 200. 2nd False Location Notified Message Data Storage Area H734*b*6*e* stores the 2nd false location notified message data which is the message indicating that the 2nd false location is notified to the requester as the pin-point current geographic location of Communication Device 200. Current Geographic Location Unknown Notified Message Data Storage Area H734*b*6*f* stores the current geographic location unknown notified message data which is the message indicating that the current geographic location of Communication Device 200 is notified to the requester as unknown. 1st Previous Location Notified Message Data Storage Area H734*b*6*g* stores the 1st previous location notified message data which is the message indicating that the 1st previous location is notified to the requester as the pin-point current geographic location of Communication Device 200. 2nd Previous Location Notified Message Data Storage Area H734*b*6*h* stores the 2nd previous location notified message data which is the message indicating that the 2nd previous location is notified to the requester as the pin-point current geographic location of Communication Device 200.

This paragraph illustrates the software program(s) stored in Time Dependent Location Notifying Type Changing Software Storage Area H734*c*. In the present embodiment, Time Dependent Location Notifying Type Changing Software Storage Area H734*c* stores Current Location Data Producing Software H734*c*1, 1st Previous Location Data Producing Software H734*c*2, 2nd Previous Location Data Producing Software H734*c*3, 1st Specific Zone Data Producing Software H734*c*4, 2nd Specific Zone Data Producing Software H734*c*5, Current Location Data Sending Software H734*c*6, 1st Specific Zone Data Sending Software H734*c*7, 2nd Specific Zone Data Sending Software H734*c*8, 1st False Location Data Sending Software H734*c*9, 2nd False Location Data Sending Software H734*c*10, Current Geographic Location Unknown Notice Sending Software H734*c*11, 1st Previous Location Data Sending Software H734*c*12, and 2nd Previous Location Data Sending Software H734*c*13. Current Location Data Producing Software H734*c*1 is the software program described hereinafter. 1st Previous Location Data Producing Software H734*c*2 is the software program described hereinafter. 2nd Previous Location Data Producing Software H734*c*3 is the software program described hereinafter. 1st Specific Zone Data Producing Software H734*c*4 is the software program described hereinafter. 2nd Specific Zone Data Producing Software H734*c*5 is the software program described hereinafter. Current Location Data Sending Software H734*c*6 is the software program described hereinafter. 1st Specific Zone Data Sending Software H734*c*7 is the software program described hereinafter. 2nd Specific Zone Data Sending Software H734*c*8 is the software program described hereinafter. 1st False Location Data Sending Software H734*c*9 is the software program described hereinafter. 2nd False Location Data Sending Software H734*c*10 is the software program described hereinafter. Current Geographic Location Unknown Notice Sending Software H734*c*11 is the software program described hereinafter. 1st Previous Location Data Sending Software H734*c*12 is the software program described hereinafter. 2nd Previous Location Data Sending Software H734*c*13 is the software program described hereinafter.

This paragraph illustrates the storage area included in RAM 206 (FIG. 1) of Communication Device 200. In the present embodiment, RAM 206 includes Time Dependent Location Notifying Type Changing Info Storage Area 206734*a* of which the data and the software program(s) stored therein are described hereinafter.

The data and/or the software program(s) necessary to implement the present function may be downloaded from Host H to Communication Device 200.

This paragraph illustrates the storage area(s) included in Time Dependent Location Notifying Type Changing Info Storage Area 206734*a*. In the present embodiment, Time Dependent Location Notifying Type Changing Info Storage Area 206734*a* includes Time Dependent Location Notifying Type Changing Data Storage Area 206734*b* and Time Dependent Location Notifying Type Changing Software Storage Area 206734*c*. Time Dependent Location Notifying Type Changing Data Storage Area 206734*b* stores the data necessary to implement the present function on the side of Communication Device 200, such as the one(s) described hereinafter. Time Dependent Location Notifying Type Changing Software Storage Area 206734*c* stores the software program(s) necessary to implement the present function on the side of Communication Device 200, such as the one(s) described hereinafter.

This paragraph illustrates the storage area(s) included in Time Dependent Location Notifying Type Changing Data Storage Area 206734*b*. In the present embodiment, Time Dependent Location Notifying Type Changing Data Storage Area 206734*b* includes Current Location Data Storage Area 206734*b*1, Entire Time Frame Data Storage Area 206734*b*2, Entire Specific Zone Data Storage Area 206734*b*3, Entire False Location Data Storage Area 206734*b*4, Entire Previous Location Data Storage Area 206734*b*5, Entire Notified Message Data Storage Area 206734*b*6, and Work Area 206734*b*7. Current Location Data Storage Area 206734*b*1 stores the current location data which indicates the current geographic location of Communication Device 200 in (x,y,z) format. Entire Time Frame Data Storage Area 206734*b*2 stores the data described hereinafter. Entire Specific Zone Data Storage Area 206734*b*3 stores the data described hereinafter. Entire False Location Data Storage Area 206734*b*4 stores the data described hereinafter. Entire Previous Location Data Storage Area 206734*b*5 stores the data described hereinafter. Entire Notified Message Data Storage Area 206734*b*6 stores the data described hereinafter. Work Area 206734*b*7 is utilized as a work area to perform calculation and temporarily store data to implement the present function.

This paragraph illustrates the storage area(s) included in Entire Time Frame Data Storage Area 206734*b*2. In the present embodiment, Entire Time Frame Data Storage Area 206734*b*2 includes 1st Time Frame Data Storage Area 206734*b*2*a*, 2nd Time Frame Data Storage Area 206734*b*2*b*, 3rd Time Frame Data Storage Area 206734*b*2*c*, 4th Time Frame Data Storage Area 206734*b*2*d*, 5th Time Frame Data Storage Area 206734*b*2*e*, 6th Time Frame Data Storage Area 206734*b*2*f*, 7th Time Frame Data Storage Area 206734*b*2*g*, and 8th Time Frame Data Storage Area 206734*b*2*h*. 1st Time Frame Data Storage Area 206734*b*2*a* stores the 1st time frame data which indicates the 1st time frame (e.g., 0:00 am midnight through 3:00 am). 2nd Time Frame Data Storage Area 206734*b*2*b* stores the 2nd time frame data which indicates the 2nd time frame (e.g., 3:00 am through 6:00 am). 3rd Time Frame Data Storage Area 206734*b*2*c* stores the 3rd time frame data which indicates the 3rd time frame (e.g., 6:00 am through 9:00 am). 4th Time Frame Data Storage Area 206734*b*2*d* stores the 4th time frame data which indicates the 4th time frame (e.g., 9:00 am through 12:00 am noon). 5th Time Frame Data Storage Area 206734*b*2*e* stores the 5th time frame data which indicates the 5th time frame (e.g., 12:00 am noon through 3:00 pm). 6th Time Frame Data Storage Area 206734*b*2*f* stores the 6th time frame data which indicates the 6th time frame (e.g., 3:00 pm through 6:00 pm). 7th Time Frame Data Storage Area 206734*b*2*g* stores the 7th time frame data which indicates the 7th time frame (e.g., 6:00 pm through 9:00 pm). 8th Time Frame Data Storage Area 206734*b*2*h* stores the 8th time frame data which indicates the 8th time frame (e.g., 9:00 pm through 0:00 am midnight).

This paragraph illustrates the storage area(s) included in Entire Specific Zone Data Storage Area 206734*b*3. In the present embodiment, Entire Specific Zone Data Storage Area 206734*b*3 includes 1st Specific Zone Data Storage Area 206734*b*3*a* and 2nd Specific Zone Data Storage Area 206734*b*3*b*. 1st Specific Zone Data Storage Area 206734*b*3*a* stores the 1st specific zone data which indicates the 1st specific zone. The 1st specific zone may indicate an area of 10 meter diameter in which Communication Device 200 is currently located. The 1st specific zone may indicate a specific portion (e.g., the 2nd floor) of the artificial structure (e.g., house, building, railway station, subway station, airport, movie theater, or shopping mall) in which Communication Device 200 is currently located. 2nd Specific Zone Data Storage Area 206734*b*3*b* stores the 2nd specific zone data which indicates the 2nd specific zone. The 2nd specific zone may indicate an area of 100 meter diameter in which Communication Device 200 is currently located. The 2nd specific zone may indicate the entire artificial structure (e.g., house, building, railway station, subway station, airport, movie theater, or shopping mall) in which Communication Device 200 is currently located.

This paragraph illustrates the storage area(s) included in Entire False Location Data Storage Area 206734*b*4. In the present embodiment, Entire False Location Data Storage Area 206734*b*4 includes 1st False Location Data Storage Area 206734*b*4*a* and 2nd False Location Data Storage Area 206734*b*4*b*. 1st False Location Data Storage Area 206734*b*4*a* stores the 1st false location data which indicates the 1st false location in (x,y,z) format. The 1st false location does not reflect the current geographic location of Communication Device 200. 2nd False Location Data Storage Area 206734*b*4*b* stores the 2nd false location data which indicates the 2nd false location in (x,y,z) format. The 2nd false location does not reflect the current geographic location of Communication Device 200.

This paragraph illustrates the storage area(s) included in Entire Previous Location Data Storage Area 206734*b*5. In the present embodiment, Entire Previous Location Data Storage Area 206734*b*5 includes 1st Previous Location Data Storage Area 206734*b*5*a* and 2nd Previous Location Data Storage Area 206734*b*5*b*. 1st Previous Location Data Storage Area 206734*b*5*a* stores the 1st previous location data which indicates the 1st previous location. Here, the 1st previous location is the pin-point location at which Communication Device 200 was located 10 minutes ago. 2nd Previous Location Data Storage Area 206734*b*5*b* stores the 2nd previous location data which indicates the 2nd previous location. Here, the 2nd previous location is the pin-point location at which Communication Device 200 was located 20 minutes ago.

This paragraph illustrates the storage area(s) included in Entire Notified Message Data Storage Area 206734*b*6. In the present embodiment, Entire Notified Message Data Storage Area 206734*b*6 includes Pin-point Location Notified Message Data Storage Area 206734*b*6*a*, 1st Specific Zone Notified Message Data Storage Area 206734*b*6*b*, 2nd Specific Zone Notified Message Data Storage Area 206734*b*6*c*, 1st False Location Notified Message Data Storage Area 206734*b*6*d*, 2nd False Location Notified Message Data Storage Area 206734*b*6*e*, Current Geographic Location Unknown Notified Message Data Storage Area 206734*b*6*f*, 1st Previous Location Notified Message Data Storage Area 206734*b*6*g*, and 2nd Previous Location Notified Message Data Storage Area 206734*b*6*h*. Pin-point Location Notified Message Data Storage Area 206734*b*6*a* stores the pin-point location notified message data which is the message indicating that the pin-point current geographic location of Communication Device 200 is notified to the requester. 1st Specific Zone Notified Message Data Storage Area 206734*b*6*b* stores the 1st specific zone notified message data which is the message indicating that the 1st specific zone in which Communication Device 200 is currently located is notified to the requester. 2nd Specific Zone Notified Message Data Storage Area 206734*b*6*c* stores the 2nd specific zone notified message data which is the message indicating that the 2nd specific zone in which Communication Device 200 is currently located is notified to the requester. 1st False Location Notified Message Data Storage Area 206734*b*6*d* stores the 1st false location notified message data which is the message indicating that the 1st false location is notified to the requester as the pin-point current geographic location of Communication Device 200. 2nd False Location Notified Message Data Storage Area 206734*b*6*e* stores the 2nd false location notified message data which is the message indicating that the 2nd false location is notified to the requester as the pin-point current geographic location of Communication Device 200. Current Geographic Location Unknown Notified Message Data Storage Area 206734*b*6*f* stores the current geographic location unknown notified message data which is the message indicating that the current geographic location of Communication Device 200 is notified to the requester as unknown. 1st Previous Location Notified Message Data Storage Area 206734*b*6*g* stores the 1st previous location notified message data which is the message indicating that the 1st previous location is notified to the requester as the pin-point current geographic location of Communication Device 200. 2nd Previous Location Notified Message Data Storage Area 206734*b*6*h* stores the 2nd previous location notified message data which is the message indicating that the 2nd previous location is notified to the requester as the pin-point current geographic location of Communication Device 200.

This paragraph illustrates the software program(s) stored in Time Dependent Location Notifying Type Changing Software Storage Area 206734*c*. In the present embodiment, Time Dependent Location Notifying Type Changing Software Storage Area 206734*c* stores Current Location Data Producing Software 206734*c*1, 1st Previous Location Data Producing Software 206734*c*2, 2nd Previous Location Data Producing Software 206734*c*3, 1st Specific Zone Data Producing Software 206734*c*4, 2nd Specific Zone Data Producing Software 206734*c*5, Current Location Data Sending Software 206734*c*6, 1st Specific Zone Data Sending Software 206734*c*7, 2nd Specific Zone Data Sending Software 206734*c*8, 1st False Location Data Sending Software 206734*c*9, 2nd False Location Data Sending Software 206734*c*10, Current Geographic Location Unknown Notice Sending Software 206734*c*11, 1st Previous Location Data Sending Software 206734*c*12, and 2nd Previous Location Data Sending Software 206734*c*13. Current Location Data Producing Software 206734*c*1 is the software program described hereinafter. 1st Previous Location Data Producing Software 206734*c*2 is the software program described hereinafter. 2nd Previous Location Data Producing Software 206734*c*3 is the software program described hereinafter. 1st Specific Zone Data Producing Software 206734*c*4 is the software program described hereinafter. 2nd Specific Zone Data Producing Software 206734*c*5 is the software program described hereinafter. Current Location Data Sending Software 206734*c*6 is the software program described hereinafter.

1st Specific Zone Data Sending Software 206734c7 is the software program described hereinafter. 2nd Specific Zone Data Sending Software 206734c8 is the software program described hereinafter. 1st False Location Data Sending Software 206734c9 is the software program described hereinafter. 2nd False Location Data Sending Software 206734c10 is the software program described hereinafter. Current Geographic Location Unknown Notice Sending Software 206734c11 is the software program described hereinafter. 1st Previous Location Data Sending Software 206734c12 is the software program described hereinafter. 2nd Previous Location Data Sending Software 206734c13 is the software program described hereinafter.

This paragraph illustrate(s) Current Location Data Producing Software H734c1 of Host H and Current Location Data Producing Software 206734c1 of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step and sends the data to Host H in a wireless fashion (S2). Host H receives the current location data from Communication Device 200 and stores the data in Current Location Data Storage Area H734b1 (S3). The foregoing sequence is repeated periodically.

This paragraph illustrate(s) 1st Previous Location Data Producing Software H734c2 of Host H, which produce(s) the 1st previous location data. In the present embodiment, Host H increments the timer (not shown) (S1). If the timer value indicates the lapsed time of 10 minutes, Host H proceeds to the next step (S2). Host H retrieves the current location data from Current Location Data Storage Area H734b1 (S3). Host H stores the current location data retrieved in the previous step as the 1st previous location data in 1st Previous Location Data Storage Area H734b5a (S4). The foregoing sequence is repeated periodically.

This paragraph illustrate(s) 2nd Previous Location Data Producing Software H734c3 of Host H, which produce(s) the 2nd previous location data. In the present embodiment, Host H increments the timer (not shown) (S1). If the timer value indicates the lapsed time of 20 minutes, Host H proceeds to the next step (S2). Host H retrieves the current location data from Current Location Data Storage Area H734b1 (S3). Host H stores the current location data retrieved in the previous step as the 2nd previous location data in 2nd Previous Location Data Storage Area H734b5b (S4). The foregoing sequence is repeated periodically.

This paragraph illustrate(s) 1st Specific Zone Data Producing Software H734c4 of Host H, which produce(s) the 1st specific zone data. In the present embodiment, Host H retrieves the current location data from Current Location Data Storage Area H734b1 (S1). Host H produces the 1st specific zone data by referring to the current location data retrieved in the previous step (S2). Host H stores the 1st specific zone data produced in the previous step in 1st Specific Zone Data Storage Area H734b3a (S3). The foregoing sequence is repeated periodically.

This paragraph illustrate(s) 2nd Specific Zone Data Producing Software H734c5 of Host H, which produce(s) the 2nd specific zone data. In the present embodiment, Host H retrieves the current location data from Current Location Data Storage Area H734b1 (S1). Host H produces the 2nd specific zone data by referring to the current location data retrieved in the previous step (S2). Host H stores the 2nd specific zone data produced in the previous step in 2nd Specific Zone Data Storage Area H734b3b (S3). The foregoing sequence is repeated periodically.

This paragraph illustrate(s) Current Location Data Sending Software H734c6 of Host H and Current Location Data Sending Software 206734c6 of Communication Device 200, which send(s) the current location data to the requester. In the present embodiment, Host H periodically checks the incoming signal addressed to Communication Device 200 (S1). If the current geographic location notifying request is detected in the incoming signal, Host H proceeds to the next step (S2). Here, the current geographic location notifying request is the request sent by another device (requester) to notify the current geographic location of Communication Device 200 to the requester. Host H identifies the current time (S3). Host H retrieves the 1st time frame data from 1st Time Frame Data Storage Area H734b2a (S4). If the current time retrieved in S3 is included in the 1st time frame data retrieved in the previous step, Host H proceeds to the next step (S5). Host H retrieves the current location data from Current Location Data Storage Area H734b1 (S6). Host H sends the current location data retrieved in the previous step to the requester in response to the current geographic location notifying request detected in S2 (S7). Host H retrieves the pin-point location notified message data from Pin-point Location Notified Message Data Storage Area H734b6a and sends the data to Communication Device 200 (S8). CPU 211 (FIG. 1) receives the pin-point location notified message data from Host H in a wireless fashion and displays the data on LCD 201 (FIG. 1) (S9). The foregoing sequence is repeated periodically.

This paragraph illustrate(s) 1st Specific Zone Data Sending Software H734c7 of Host H and 1st Specific Zone Data Sending Software 206734c7 of Communication Device 200, which send(s) the 1st specific zone data to the requester. In the present embodiment, Host H periodically checks the incoming signal addressed to Communication Device 200 (S1). If the current geographic location notifying request is detected in the incoming signal, Host H proceeds to the next step (S2). Here, the current geographic location notifying request is the request sent by another device (requester) to notify the current geographic location of Communication Device 200 to the requester. Host H identifies the current time (S3). Host H retrieves the 2nd time frame data from 2nd Time Frame Data Storage Area H734b2b (S4). If the current time retrieved in S3 is included in the 2nd time frame data retrieved in the previous step, Host H proceeds to the next step (S5). Host H retrieves the 1st specific zone data from 1st Specific Zone Data Storage Area H734b3a (S6). Host H sends the 1st specific zone data retrieved in the previous step to the requester in response to the current geographic location notifying request detected in S2 (S7). Host H retrieves the 1st specific zone notified message data from 1st Specific Zone Notified Message Data Storage Area H734b6b and sends the data to Communication Device 200 (S8). CPU 211 (FIG. 1) receives the 1st specific zone notified message data from Host H in a wireless fashion and displays the data on LCD 201 (FIG. 1) (S9). The foregoing sequence is repeated periodically.

This paragraph illustrate(s) 2nd Specific Zone Data Sending Software H734c8 of Host H and 2nd Specific Zone Data Sending Software 206734c8 of Communication Device 200, which send(s) the 2nd specific zone data to the requester. In the present embodiment, Host H periodically checks the incoming signal addressed to Communication Device 200 (S1). If the current geographic location notifying request is detected in the incoming signal, Host H proceeds to the next step (S2). Here, the current geographic location notifying request is the request sent by another device (requester) to notify the current geographic location of Communication Device 200 to the requester. Host H identifies the current time (S3). Host H retrieves the 3rd time frame data from 3rd Time Frame Data Storage Area H734b2c (S4). If the current time retrieved in S3 is included in the 3rd time frame data retrieved in the previous step, Host H proceeds to the next step (S5). Host H retrieves the 2nd specific zone data from 2nd Specific Zone Data Storage Area H734b3b (S6). Host H sends the 2nd specific zone data retrieved in the previous step to the requester in response to the current geographic location notifying request detected in S2 (S7). Host H retrieves the 2nd specific zone notified message data from 2nd Specific Zone Notified Message Data Storage Area H734b6c and sends the data to Communication Device 200 (S8). CPU 211 (FIG. 1) receives the 2nd specific zone notified message data from Host H in a wireless fashion and displays the data on LCD 201 (FIG. 1) (S9). The foregoing sequence is repeated periodically.

This paragraph illustrate(s) 1st False Location Data Sending Software H734c9 of Host H and 1st False Location Data Sending Software 206734c9 of Communication Device 200, which send(s) the 1st false location data to the requester. In the present embodiment, Host H periodically checks the incoming signal addressed to Communication Device 200 (S1). If the current geographic location notifying request is detected in the incoming signal, Host H proceeds to the next step (S2). Here, the current geographic location notifying request is the request sent by another device (requester) to notify the current geographic location of Communication Device 200 to the requester. Host H identifies the current time (S3). Host H retrieves the 4th time frame data from 4th Time Frame Data Storage Area H734b2d (S4). If the current time retrieved in S3 is included in the 4th time frame data retrieved in the previous step, Host H proceeds to the next step (S5). Host H retrieves the 1st false location data from 1st False Location Data Storage Area H734b4a (S6). Host H sends the 1st false location data retrieved in the previous step to the requester in response to the current geographic location notifying request detected in S2 (S7). Host H retrieves the 1st false location notified message data from 1st False Location Notified Message Data Storage Area H734b6d and sends the data to Communication Device 200 (S8). CPU 211 (FIG. 1) receives the 1st false location notified message data from Host H in a wireless fashion and displays the data on LCD 201 (FIG. 1) (S9). The foregoing sequence is repeated periodically.

This paragraph illustrate(s) 2nd False Location Data Sending Software H734c10 of Host H and 2nd False Location Data Sending Software 206734c10 of Communication Device 200, which send(s) the 2nd false location data to the requester. In the present embodiment, Host H periodically checks the incoming signal addressed to Communication Device 200 (S1). If the current geographic location notifying request is detected in the incoming signal, Host H proceeds to the next step (S2). Here, the current geographic location notifying request is the request sent by another device (requester) to notify the current geographic location of Communication Device 200 to the requester. Host H identifies the current time (S3). Host H retrieves the 5th time frame data from 5th Time Frame Data Storage Area H734b2e (S4). If the current time retrieved in S3 is included in the 5th time frame data retrieved in the previous step, Host H proceeds to the next step (S5). Host H retrieves the 2nd false location data from 2nd False Location Data Storage Area H734b4b (S6). Host H sends the 2nd false location data retrieved in the previous step to the requester in response to the current geographic location notifying request detected in S2 (S7). Host H retrieves the 2nd false location notified message data from 2nd False Location Notified Message Data Storage Area H734b6e and sends the data to Communication Device 200 (S8). CPU 211 (FIG. 1) receives the 2nd false location notified message data from Host H in a wireless fashion and displays the data on LCD 201 (FIG. 1) (S9). The foregoing sequence is repeated periodically.

This paragraph illustrate(s) Current Geographic Location Unknown Notice Sending Software H734c11 of Host H and Current Geographic Location Unknown Notice Sending Software 206734c11 of Communication Device 200, which send(s) the current geographic location unknown notice to the requester. In the present embodiment, Host H periodically checks the incoming signal addressed to Communication Device 200 (S1). If the current geographic location notifying request is detected in the incoming signal, Host H proceeds to the next step (S2). Here, the current geographic location notifying request is the request sent by another device (requester) to notify the current geographic location of Communication Device 200 to the requester. Host H identifies the current time (S3). Host H retrieves the 6th time frame data from 6th Time Frame Data Storage Area H734b2f (S4). If the current time retrieved in S3 is included in the 6th time frame data retrieved in the previous step, Host H proceeds to the next step (S5). Host H sends the current geographic location unknown notice to the requester in response to the current geographic location notifying request detected in S2 (S6). Here, the current geographic location unknown notice indicates that the current geographic location of Communication Device 200 is unknown. Host H retrieves the current geographic location unknown notified message data from Current Geographic Location Unknown Notified Message Data Storage Area H734b6f and sends the data to Communication Device 200 (S7). CPU 211 (FIG. 1) receives the current geographic location unknown notified message data from Host H in a wireless fashion and displays the data on LCD 201 (FIG. 1) (S8). The foregoing sequence is repeated periodically.

This paragraph illustrate(s) 1st Previous Location Data Sending Software H734c12 of Host H and 1st Previous Location Data Sending Software 206734c12 of Communication Device 200, which send(s) the 1st previous location data to the requester. In the present embodiment, Host H periodically checks the incoming signal addressed to Communication Device 200 (S1). If the current geographic location notifying request is detected in the incoming signal, Host H proceeds to the next step (S2). Here, the current geographic location notifying request is the request sent by another device (requester) to notify the current geographic location of Communication Device 200 to the requester. Host H identifies the current time (S3). Host H retrieves the 7th time frame data from 7th Time Frame Data Storage Area H734b2g (S4). If the current time retrieved in S3 is included in the 7th time frame data retrieved in the previous step, Host H proceeds to the next step (S5). Host H retrieves the 1st previous location data from 1st Previous Location Data Storage Area H734b5a (S6). Host H sends the 1st previous location data retrieved in the previous step to the requester in response to the current geographic location notifying request detected in S2 (S7). Host H retrieves the 1st previous location notified message data from 1st Previous Location Notified Message Data Storage Area H734b6g and sends the data to Communication Device 200 (S8). CPU 211 (FIG. 1) receives the 1st previous location notified message data from Host H in a wireless fashion and displays the data on LCD 201 (FIG. 1) (S9). The foregoing sequence is repeated periodically.

This paragraph illustrate(s) 2nd Previous Location Data Sending Software H734c13 of Host H and 2nd Previous Location Data Sending Software 206734c13 of Communication Device 200, which send(s) the 2nd previous location data to the requester. In the present embodiment, Host H periodically checks the incoming signal addressed to Communication Device 200 (S1). If the current geographic location notifying request is detected in the incoming signal, Host H proceeds to the next step (S2). Here, the current geographic location notifying request is the request sent by another device (requester) to notify the current geographic location of Communication Device 200 to the requester. Host H identifies the current time (S3). Host H retrieves the 8th time frame data from 8th Time Frame Data Storage Area H734*b*2*h* (S4). If the current time retrieved in S3 is included in the 8th time frame data retrieved in the previous step, Host H proceeds to the next step (S5). Host H retrieves the 2nd previous location data from 2nd Previous Location Data Storage Area H734*b*5*b* (S6). Host H sends the 2nd previous location data retrieved in the previous step to the requester in response to the current geographic location notifying request detected in S2 (S7). Host H retrieves the 2nd previous location notified message data from 2nd Previous Location Notified Message Data Storage Area H734*b*6*h* and sends the data to Communication Device 200 (S8). CPU 211 (FIG. 1) receives the 2nd previous location notified message data from Host H in a wireless fashion and displays the data on LCD 201 (FIG. 1) (S9). The foregoing sequence is repeated periodically.

The following paragraphs illustrate another embodiment wherein Communication Device 200 plays the major role in implementing the present function.

This paragraph illustrate(s) Current Location Data Producing Software 206734*c*1 of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step (S2). CPU 211 (FIG. 1) stores the current location data produced in the previous step in Current Location Data Storage Area 206734*b*1 (S3). The foregoing sequence is repeated periodically.

This paragraph illustrate(s) 1st Previous Location Data Producing Software 206734*c*2 of Communication Device 200, which produce(s) the 1st previous location data. In the present embodiment, CPU 211 (FIG. 1) increments the timer (not shown) (S1). If the timer value indicates the lapsed time of 10 minutes, CPU 211 (FIG. 1) proceeds to the next step (S2). CPU 211 (FIG. 1) retrieves the current location data from Current Location Data Storage Area 206734*b*1 (S3). CPU 211 (FIG. 1) stores the current location data retrieved in the previous step as the 1st previous location data in 1st Previous Location Data Storage Area 206734*b*5*a* (S4). The foregoing sequence is repeated periodically.

This paragraph illustrate(s) 2nd Previous Location Data Producing Software 206734*c*3 of Communication Device 200, which produce(s) the 2nd previous location data. In the present embodiment, CPU 211 (FIG. 1) increments the timer (not shown) (S1). If the timer value indicates the lapsed time of 20 minutes, CPU 211 (FIG. 1) proceeds to the next step (S2). CPU 211 (FIG. 1) retrieves the current location data from Current Location Data Storage Area 206734*b*1 (S3). CPU 211 (FIG. 1) stores the current location data retrieved in the previous step as the 2nd previous location data in 2nd Previous Location Data Storage Area 206734*b*5*b* (S4). The foregoing sequence is repeated periodically.

This paragraph illustrate(s) 1st Specific Zone Data Producing Software 206734*c*4 of Communication Device 200, which produce(s) the 1st specific zone data. In the present embodiment, CPU 211 (FIG. 1) retrieves the current location data from Current Location Data Storage Area 206734*b*1 (S1). CPU 211 (FIG. 1) produces the 1st specific zone data by referring to the current location data retrieved in the previous step (S2). CPU 211 (FIG. 1) stores the 1st specific zone data produced in the previous step in 1st Specific Zone Data Storage Area 206734*b*3*a* (S3). The foregoing sequence is repeated periodically.

This paragraph illustrate(s) 2nd Specific Zone Data Producing Software 206734*c*5 of Communication Device 200, which produce(s) the 2nd specific zone data. In the present embodiment, CPU 211 (FIG. 1) retrieves the current location data from Current Location Data Storage Area 206734*b*1 (S1). CPU 211 (FIG. 1) produces the 2nd specific zone data by referring to the current location data retrieved in the previous step (S2). CPU 211 (FIG. 1) stores the 2nd specific zone data produced in the previous step in 2nd Specific Zone Data Storage Area 206734*b*3*b* (S3). The foregoing sequence is repeated periodically.

This paragraph illustrate(s) Current Location Data Sending Software 206734*c*6 of Communication Device 200, which send(s) the current location data to the requester. In the present embodiment, CPU 211 (FIG. 1) periodically checks the incoming signal addressed to Communication Device 200 (S1). If the current geographic location notifying request is detected in the incoming signal, CPU 211 (FIG. 1) proceeds to the next step (S2). Here, the current geographic location notifying request is the request sent by another device (requester) to notify the current geographic location of Communication Device 200 to the requester. CPU 211 (FIG. 1) identifies the current time (S3). CPU 211 (FIG. 1) retrieves the 1st time frame data from 1st Time Frame Data Storage Area 206734*b*2*a* (S4). If the current time retrieved in S3 is included in the 1st time frame data retrieved in the previous step, CPU 211 (FIG. 1) proceeds to the next step (S5). CPU 211 (FIG. 1) retrieves the current location data from Current Location Data Storage Area 206734*b*1 (S6). CPU 211 (FIG. 1) sends the current location data retrieved in the previous step to the requester in a wireless fashion in response to the current geographic location notifying request detected in S2 (S7). CPU 211 (FIG. 1) retrieves the pin-point location notified message data from Pin-point Location Notified Message Data Storage Area 206734*b*6*a* (S8). CPU 211 (FIG. 1) displays the pin-point location notified message data retrieved in the previous step on LCD 201 (FIG. 1) (S9). The foregoing sequence is repeated periodically.

This paragraph illustrate(s) 1st Specific Zone Data Sending Software 206734*c*7 of Communication Device 200, which send(s) the 1st specific zone data to the requester. In the present embodiment, CPU 211 (FIG. 1) periodically checks the incoming signal addressed to Communication Device 200 (S1). If the current geographic location notifying request is detected in the incoming signal, CPU 211 (FIG. 1) proceeds to the next step (S2). Here, the current geographic location notifying request is the request sent by another device (requester) to notify the current geographic location of Communication Device 200 to the requester. CPU 211 (FIG. 1) identifies the current time (S3). CPU 211 (FIG. 1) retrieves the 2nd time frame data from 2nd Time Frame Data Storage Area 206734*b*2*b* (S4). If the current time retrieved in S3 is included in the 2nd time frame data retrieved in the previous step, CPU 211 (FIG. 1) proceeds to the next step (S5). CPU 211 (FIG. 1) retrieves the 1st specific zone data from 1st Specific Zone Data Storage Area 206734*b*3*a* (S6). CPU 211 (FIG. 1) sends the 1st specific zone data retrieved in the previous step to the requester in a wireless fashion in response to the current geographic location notifying request detected in S2 (S7). CPU 211 (FIG. 1) retrieves the 1st specific zone notified message data from 1st Specific Zone Notified Message Data Storage Area 206734*b*6*b* (S8). CPU 211 (FIG. 1) displays the 1st specific zone notified message data retrieved in the previous step on LCD 201 (FIG. 1) (S9). The foregoing sequence is repeated periodically.

This paragraph illustrate(s) 2nd Specific Zone Data Sending Software 206734c8 of Communication Device 200, which send(s) the 2nd specific zone data to the requester. In the present embodiment, CPU 211 (FIG. 1) periodically checks the incoming signal addressed to Communication Device 200 (S1). If the current geographic location notifying request is detected in the incoming signal, CPU 211 (FIG. 1) proceeds to the next step (S2). Here, the current geographic location notifying request is the request sent by another device (requester) to notify the current geographic location of Communication Device 200 to the requester. CPU 211 (FIG. 1) identifies the current time (S3). CPU 211 (FIG. 1) retrieves the 3rd time frame data from 3rd Time Frame Data Storage Area 206734b2c (S4). If the current time retrieved in S3 is included in the 3rd time frame data retrieved in the previous step, CPU 211 (FIG. 1) proceeds to the next step (S5). CPU 211 (FIG. 1) retrieves the 2nd specific zone data from 2nd Specific Zone Data Storage Area 206734b3b (S6). CPU 211 (FIG. 1) sends the 2nd specific zone data retrieved in the previous step to the requester in a wireless fashion in response to the current geographic location notifying request detected in S2 (S7). CPU 211 (FIG. 1) retrieves the 2nd specific zone notified message data from 2nd Specific Zone Notified Message Data Storage Area 206734b6c (S8). CPU 211 (FIG. 1) displays the 2nd specific zone notified message data retrieved in the previous step on LCD 201 (FIG. 1) (S9). The foregoing sequence is repeated periodically.

This paragraph illustrate(s) 1st False Location Data Sending Software 206734c9 of Communication Device 200, which send(s) the 1st false location data to the requester. In the present embodiment, CPU 211 (FIG. 1) periodically checks the incoming signal addressed to Communication Device 200 (S1). If the current geographic location notifying request is detected in the incoming signal, CPU 211 (FIG. 1) proceeds to the next step (S2). Here, the current geographic location notifying request is the request sent by another device (requester) to notify the current geographic location of Communication Device 200 to the requester. CPU 211 (FIG. 1) identifies the current time (S3). CPU 211 (FIG. 1) retrieves the 4th time frame data from 4th Time Frame Data Storage Area 206734b2d (S4). If the current time retrieved in S3 is included in the 4th time frame data retrieved in the previous step, CPU 211 (FIG. 1) proceeds to the next step (S5). CPU 211 (FIG. 1) retrieves the 1st false location data from 1st False Location Data Storage Area 206734b4a (S6). CPU 211 (FIG. 1) sends the 1st false location data retrieved in the previous step to the requester in a wireless fashion in response to the current geographic location notifying request detected in S2 (S7). CPU 211 (FIG. 1) retrieves the 1st false location notified message data from 1st False Location Notified Message Data Storage Area 206734b6d (S8). CPU 211 (FIG. 1) displays the 1st false location notified message data retrieved in the previous step on LCD 201 (FIG. 1) (S9). The foregoing sequence is repeated periodically.

This paragraph illustrate(s) 2nd False Location Data Sending Software 206734c10 of Communication Device 200, which send(s) the 2nd false location data to the requester. In the present embodiment, CPU 211 (FIG. 1) periodically checks the incoming signal addressed to Communication Device 200 (S1). If the current geographic location notifying request is detected in the incoming signal, CPU 211 (FIG. 1) proceeds to the next step (S2). Here, the current geographic location notifying request is the request sent by another device (requester) to notify the current geographic location of Communication Device 200 to the requester. CPU 211 (FIG. 1) identifies the current time (S3). CPU 211 (FIG. 1) retrieves the 5th time frame data from 5th Time Frame Data Storage Area 206734b2e (S4). If the current time retrieved in S3 is included in the 5th time frame data retrieved in the previous step, CPU 211 (FIG. 1) proceeds to the next step (S5). CPU 211 (FIG. 1) retrieves the 2nd false location data from 2nd False Location Data Storage Area 206734b4b (S6). CPU 211 (FIG. 1) sends the 2nd false location data retrieved in the previous step to the requester in a wireless fashion in response to the current geographic location notifying request detected in S2 (S7). CPU 211 (FIG. 1) retrieves the 2nd false location notified message data from 2nd False Location Notified Message Data Storage Area 206734b6e (S8). CPU 211 (FIG. 1) displays the 2nd false location notified message data retrieved in the previous step on LCD 201 (FIG. 1) (S9). The foregoing sequence is repeated periodically.

This paragraph illustrate(s) Current Geographic Location Unknown Notice Sending Software 206734c11 of Communication Device 200, which send(s) the current geographic location unknown notice to the requester. In the present embodiment, CPU 211 (FIG. 1) periodically checks the incoming signal addressed to Communication Device 200 (S1). If the current geographic location notifying request is detected in the incoming signal, CPU 211 (FIG. 1) proceeds to the next step (S2). Here, the current geographic location notifying request is the request sent by another device (requester) to notify the current geographic location of Communication Device 200 to the requester. CPU 211 (FIG. 1) identifies the current time (S3). CPU 211 (FIG. 1) retrieves the 6th time frame data from 6th Time Frame Data Storage Area 206734b2f (S4). If the current time retrieved in S3 is included in the 6th time frame data retrieved in the previous step, CPU 211 (FIG. 1) proceeds to the next step (S5). CPU 211 (FIG. 1) sends the current geographic location unknown notice to the requester in a wireless fashion in response to the current geographic location notifying request detected in S2 (S6). Here, the current geographic location unknown notice indicates that the current geographic location of Communication Device 200 is unknown. CPU 211 (FIG. 1) retrieves the current geographic location unknown notified message data from Current Geographic Location Unknown Notified Message Data Storage Area 206734b6f (S7). CPU 211 (FIG. 1) displays the current geographic location unknown notified message data retrieved in the previous step on LCD 201 (FIG. 1) (S8). The foregoing sequence is repeated periodically.

This paragraph illustrate(s) 1st Previous Location Data Sending Software 206734c12 of Communication Device 200, which send(s) the 1st previous location data to the requester. In the present embodiment, CPU 211 (FIG. 1) periodically checks the incoming signal addressed to Communication Device 200 (S1). If the current geographic location notifying request is detected in the incoming signal, CPU 211 (FIG. 1) proceeds to the next step (S2). Here, the current geographic location notifying request is the request sent by another device (requester) to notify the current geographic location of Communication Device 200 to the requester. CPU 211 (FIG. 1) identifies the current time (S3). CPU 211 (FIG. 1) retrieves the 7th time frame data from 7th Time Frame Data Storage Area 206734b2g (S4). If the current time retrieved in S3 is included in the 7th time frame data retrieved in the previous step, CPU 211 (FIG. 1) proceeds to the next step (S5). CPU 211 (FIG. 1) retrieves the 1st previous location data from 1st Previous Location Data Storage Area 206734b5a (S6). CPU 211 (FIG. 1) sends the 1st previous location data retrieved in the previous step to the requester in a wireless fashion in response to the current geographic location notifying request detected in S2 (S7). CPU 211 (FIG. 1) retrieves the 1st previous location notified message data from 1st Previous Location Notified Message Data Storage Area 206734*b*6*g* (S8). CPU 211 (FIG. 1) displays the 1st previous location notified message data retrieved in the previous step on LCD 201 (FIG. 1) (S9). The foregoing sequence is repeated periodically.

This paragraph illustrate(s) 2nd Previous Location Data Sending Software 206734*c*13 of Communication Device 200, which send(s) the 2nd previous location data to the requester. In the present embodiment, CPU 211 (FIG. 1) periodically checks the incoming signal addressed to Communication Device 200 (S1). If the current geographic location notifying request is detected in the incoming signal, CPU 211 (FIG. 1) proceeds to the next step (S2). Here, the current geographic location notifying request is the request sent by another device (requester) to notify the current geographic location of Communication Device 200 to the requester. CPU 211 (FIG. 1) identifies the current time (S3). CPU 211 (FIG. 1) retrieves the 8th time frame data from 8th Time Frame Data Storage Area 206734*b*2*h* (S4). If the current time retrieved in S3 is included in the 8th time frame data retrieved in the previous step, CPU 211 (FIG. 1) proceeds to the next step (S5). CPU 211 (FIG. 1) retrieves the 2nd previous location data from 2nd Previous Location Data Storage Area 206734*b*5*b* (S6). CPU 211 (FIG. 1) sends the 2nd previous location data retrieved in the previous step to the requester in a wireless fashion in response to the current geographic location notifying request detected in S2 (S7). CPU 211 (FIG. 1) retrieves the 2nd previous location notified message data from 2nd Previous Location Notified Message Data Storage Area 206734*b*6*h* (S8). CPU 211 (FIG. 1) displays the 2nd previous location notified message data retrieved in the previous step on LCD 201 (FIG. 1) (S9). The foregoing sequence is repeated periodically.

<<Caller's Identification Content Sharing Function>>

The following paragraphs illustrate the caller's identification content sharing function, wherein when a phone call is received, a caller's phone number data which indicates the phone number of the caller and a caller's relating data which indicates the data relating to the caller are displayed on said display, wherein said caller's relating data indicates a personal name data, a title data, a company name data, a office phone number data, a office fax number data, an email address data, a office address data, a home address data, a home phone number data, and/or a photo data, wherein said personal name data indicates the name of the caller, said title data indicates the title at work of the caller, said company name data indicates the name of the company for which the caller works, said office phone number data indicates the office phone number of the caller, said office fax number data indicates the office fax number of the caller, said email address data indicates the email address of the caller, said office address data indicates the address of the caller's office, said home address data indicates the home address of the caller, said home phone number data indicates the home phone number of the caller, and said photo data indicates the self-portrait image of the caller, said caller's phone number data and said caller's relating data displayed on said display are sent to the caller's device and displayed thereon, and a caller's identification content shared notice data which indicates that said caller's phone number data and said caller's relating data displayed on said display are displayed on the caller's device is indicated on said display of said communication device, and a 1st current location which indicates the current geographic location of the caller's device and a 2nd current location which indicates the current geographic location of said communication device are indicated on both the caller's device and said communication device.

This paragraph illustrates the storage area included in Host H. In the present embodiment, Host H includes Caller's Identification Content Sharing Info Storage Area H735*a* of which the data and the software program(s) stored therein are described hereinafter.

This paragraph illustrates the storage area(s) included in Caller's Identification Content Sharing Info Storage Area H735*a*. In the present embodiment, Caller's Identification Content Sharing Info Storage Area H735*a* includes Caller's Identification Content Sharing Data Storage Area H735*b* and Caller's Identification Content Sharing Software Storage Area H735*c*. Caller's Identification Content Sharing Data Storage Area H735*b* stores the data necessary to implement the present function on the side of Host H, such as the one(s) described hereinafter. Caller's Identification Content Sharing Software Storage Area H735*c* stores the software program(s) necessary to implement the present function on the side of Host H, such as the one(s) described hereinafter.

This paragraph illustrates the storage area(s) included in Caller's Identification Content Sharing Data Storage Area H735*b*. In the present embodiment, Caller's Identification Content Sharing Data Storage Area H735*b* includes Entire Phone Number Data Storage Area H735*b*1, Entire Phone Number Relating Data Storage Area H735*b*2, Entire Current Location Data Storage Area H735*b*3, Map Data Storage Area H735*b*4, Entire Icon Data Storage Area H735*b*5, Caller's Identification Content Shared Notice Data Storage Area H735*b*6, and Work Area H735*b*7. Entire Phone Number Data Storage Area H735*b*1 stores the data described hereinafter. Entire Phone Number Relating Data Storage Area H735*b*2 stores the data described hereinafter. Entire Current Location Data Storage Area H735*b*3 stores the data described hereinafter. Map Data Storage Area H735*b*4 stores the map data which is the three dimensional image data indicating a map. Entire Icon Data Storage Area H735*b*5 stores the data described hereinafter. Caller's Identification Content Shared Notice Data Storage Area H735*b*6 stores the caller's identification content shared notice data which indicates that the phone number relating data displayed on the callee's device is also displayed on the caller's device. Work Area H735*b*7 is utilized as a work area to perform calculation and temporarily store data to implement the present function.

This paragraph illustrates the storage area(s) included in Entire Phone Number Data Storage Area H735*b*1. In the present embodiment, Entire Phone Number Data Storage Area H735*b*1 includes 1st Phone Number Data Storage Area H735*b*1*a* and 2nd Phone Number Data Storage Area H735*b*1*b*. 1st Phone Number Data Storage Area H735*b*1*a* stores the 1st phone number data which indicates the phone number of Device A. 2nd Phone Number Data Storage Area H735*b*1*b* stores the 2nd phone number data which indicates the phone number of Device B. Only two phone number data, the 1st and 2nd phone number data are stored in the present data storage area for purposes of enabling the reader of this specification to understand the concept of the present invention. Not to mention, more than two phone number data (e.g., 100 phone number data) can be stored therein.

This paragraph illustrates the storage area(s) included in Entire Phone Number Relating Data Storage Area H735*b*2. In the present embodiment, Entire Phone Number Relating Data Storage Area H735*b*2 includes 1st Phone Number Relating Data Storage Area H735*b*2*a* and 2nd Phone Number Relating Data Storage Area H735*b*2*b*. 1st Phone Number Relating Data Storage Area H735*b*2*a* stores the 1st phone number relating data which indicates the data relating to the 1st phone number data, such as the personal name data, the title data, the company name data, the office phone number data, the office fax number data, the email address data, the office address data, the home address data, the home phone number data, and/or the photo data. The personal name data indicates the name (e.g., the first name and the last name) of the individual. The title data indicates the title at work of the individual. The company name data indicates the name of the company for which the individual works. The office phone number data indicates the office phone number of the individual. The office fax number data indicates the office fax number of the individual. The email address data indicates the email address of the individual. The office address data indicates the address of the individual's office. The home address data indicates the home address of the individual. The home phone number data indicates the home phone number of the individual. The photo data indicates the self-portrait image of the individual. Here, the term "individual" means the user of Device A. 2nd Phone Number Relating Data Storage Area H735b2b stores the 2nd phone number relating data which indicates the data relating to the 2nd phone number data, such as the personal name data, the title data, the company name data, the office phone number data, the office fax number data, the email address data, the office address data, the home address data, the home phone number data, and/or the photo data. The personal name data indicates the name (e.g., the first name and the last name) of the individual. The title data indicates the title at work of the individual. The company name data indicates the name of the company for which the individual works. The office phone number data indicates the office phone number of the individual. The office fax number data indicates the office fax number of the individual. The email address data indicates the email address of the individual. The office address data indicates the address of the individual's office. The home address data indicates the home address of the individual. The home phone number data indicates the home phone number of the individual. The photo data indicates the self-portrait image of the individual. Here, the term "individual" means the user of Device B.

This paragraph illustrates the storage area(s) included in Entire Current Location Data Storage Area H735b3. In the present embodiment, Entire Current Location Data Storage Area H735b3 includes 1st Current Location Data Storage Area H735b3a and 2nd Current Location Data Storage Area H735b3b. 1st Current Location Data Storage Area H735b3a stores the 1st current location data which indicates the current geographic location of Device A in (x,y,z) format. 2nd Current Location Data Storage Area H735b3b stores the 2nd current location data which indicates the current geographic location of Device B in (x,y,z) format.

This paragraph illustrates the storage area(s) included in Entire Icon Data Storage Area H735b5. In the present embodiment, Entire Icon Data Storage Area H735b5 includes 1st Current Location Icon Data Storage Area H735b5a and 2nd Current Location Icon Data Storage Area H735b5b. 1st Current Location Icon Data Storage Area H735b5a stores the 1st current location icon data which is the image of the icon utilized to indicate the 1st current location data on the map data. 2nd Current Location Icon Data Storage Area H735b5b stores the 2nd current location icon data which is the image of the icon utilized to indicate the 2nd current location data on the map data.

This paragraph illustrates the software program(s) stored in Caller's Identification Content Sharing Software Storage Area H735c. In the present embodiment, Caller's Identification Content Sharing Software Storage Area H735c stores 2nd Current Location Data Producing Software H735c2, 1st Current Location Data Sharing Software H735c3, 2nd Current Location Data Sharing Software H735c4, and Phone Call Implementing Software H735c5. 2nd Current Location Data Producing Software H735c2 is the software program described hereinafter. 1st Current Location Data Sharing Software H735c3 is the software program described hereinafter. 2nd Current Location Data Sharing Software H735c4 is the software program described hereinafter. Phone Call Implementing Software H735c5 is the software program described hereinafter.

This paragraph illustrates the storage area included in RAM 206 (FIG. 1) of Device A. In the present embodiment, RAM 206 includes Caller's Identification Content Sharing Info Storage Area 206A735a of which the data and the software program(s) stored therein are described hereinafter.

The data and/or the software program(s) necessary to implement the present function may be downloaded from Host H to Device A.

This paragraph illustrates the storage area(s) included in Caller's Identification Content Sharing Info Storage Area 206A735a. In the present embodiment, Caller's Identification Content Sharing Info Storage Area 206A735a includes Caller's Identification Content Sharing Data Storage Area 206A735b and Caller's Identification Content Sharing Software Storage Area 206A735c. Caller's Identification Content Sharing Data Storage Area 206A735b stores the data necessary to implement the present function on the side of Device A, such as the one(s) described hereinafter. Caller's Identification Content Sharing Software Storage Area 206A735c stores the software program(s) necessary to implement the present function on the side of Device A, such as the one(s) described hereinafter.

This paragraph illustrates the storage area(s) included in Caller's Identification Content Sharing Data Storage Area 206A735b. In the present embodiment, Caller's Identification Content Sharing Data Storage Area 206A735b includes Entire Phone Number Data Storage Area 206A735b1, Entire Phone Number Relating Data Storage Area 206A735b2, Entire Current Location Data Storage Area 206A735b3, Map Data Storage Area 206A735b4, Entire Icon Data Storage Area 206A735b5, Caller's Identification Content Shared Notice Data Storage Area 206A735b6, and Work Area 206A735b7. Entire Phone Number Data Storage Area 206A735b1 stores the data described hereinafter. Entire Phone Number Relating Data Storage Area 206A735b2 stores the data described hereinafter. Entire Current Location Data Storage Area 206A735b3 stores the data described hereinafter. Map Data Storage Area 206A735b4 stores the map data which is the three dimensional image data indicating a map. Entire Icon Data Storage Area 206A735b5 stores the data described hereinafter. Caller's Identification Content Shared Notice Data Storage Area 206A735b6 stores the caller's identification content shared notice data which indicates that the phone number relating data displayed on the callee's device is also displayed on the caller's device. Work Area 206A735b7 is utilized as a work area to perform calculation and temporarily store data to implement the present function.

This paragraph illustrates the storage area(s) included in Entire Phone Number Data Storage Area 206A735b1. In the present embodiment, Entire Phone Number Data Storage Area 206A735b1 includes 1st Phone Number Data Storage Area 206A735b1a and 2nd Phone Number Data Storage Area 206A735b1b. 1st Phone Number Data Storage Area 206A735b1a stores the 1st phone number data which indicates the phone number of Device A. 2nd Phone Number Data Storage Area 206A735b1b stores the 2nd phone number data which indicates the phone number of Device B. Only two phone number data, the 1st and 2nd phone number data are stored in the present data storage area for purposes of enabling the reader of this specification to understand the concept of the present invention. Not to mention, more than two phone number data (e.g., 100 phone number data) can be stored therein.

This paragraph illustrates the storage area(s) included in Entire Phone Number Relating Data Storage Area 206A735b2. In the present embodiment, Entire Phone Number Relating Data Storage Area 206A735b2 includes 1st Phone Number Relating Data Storage Area 206A735b2a and 2nd Phone Number Relating Data Storage Area 206A735b2b. 1st Phone Number Relating Data Storage Area 206A735b2a stores the 1st phone number relating data which indicates the data relating to the 1st phone number data, such as the personal name data, the title data, the company name data, the office phone number data, the office fax number data, the email address data, the office address data, the home address data, the home phone number data, and/or the photo data. The personal name data indicates the name (e.g., the first name and the last name) of the individual. The title data indicates the title at work of the individual. The company name data indicates the name of the company for which the individual works. The office phone number data indicates the office phone number of the individual. The office fax number data indicates the office fax number of the individual. The email address data indicates the email address of the individual. The office address data indicates the address of the individual's office. The home address data indicates the home address of the individual. The home phone number data indicates the home phone number of the individual. The photo data indicates the self-portrait image of the individual. Here, the term "individual" means the user of Device A. 2nd Phone Number Relating Data Storage Area 206A735b2b stores the 2nd phone number relating data which indicates the data relating to the 2nd phone number data, such as the personal name data, the title data, the company name data, the office phone number data, the office fax number data, the email address data, the office address data, the home address data, the home phone number data, and/or the photo data. The personal name data indicates the name (e.g., the first name and the last name) of the individual. The title data indicates the title at work of the individual. The company name data indicates the name of the company for which the individual works. The office phone number data indicates the office phone number of the individual. The office fax number data indicates the office fax number of the individual. The email address data indicates the email address of the individual. The office address data indicates the address of the individual's office. The home address data indicates the home address of the individual. The home phone number data indicates the home phone number of the individual. The photo data indicates the self-portrait image of the individual. Here, the term "individual" means the user of Device B.

This paragraph illustrates the storage area(s) included in Entire Current Location Data Storage Area 206A735b3. In the present embodiment, Entire Current Location Data Storage Area 206A735b3 includes 1st Current Location Data Storage Area 206A735b3a and 2nd Current Location Data Storage Area 206A735b3b. 1st Current Location Data Storage Area 206A735b3a stores the 1st current location data which indicates the current geographic location of Device A in (x,y,z) format. 2nd Current Location Data Storage Area 206A735b3b stores the 2nd current location data which indicates the current geographic location of Device B in (x,y,z) format.

This paragraph illustrates the storage area(s) included in Entire Icon Data Storage Area 206A735b5. In the present embodiment, Entire Icon Data Storage Area 206A735b5 includes 1st Current Location Icon Data Storage Area 206A735b5a and 2nd Current Location Icon Data Storage Area 206A735b5b. 1st Current Location Icon Data Storage Area 206A735b5a stores the 1st current location icon data which is the image of the icon utilized to indicate the 1st current location data on the map data. 2nd Current Location Icon Data Storage Area 206A735b5b stores the 2nd current location icon data which is the image of the icon utilized to indicate the 2nd current location data on the map data.

This paragraph illustrates the software program(s) stored in Caller's Identification Content Sharing Software Storage Area 206A735c. In the present embodiment, Caller's Identification Content Sharing Software Storage Area 206A735c stores 1st Current Location Data Producing Software 206A735c1, 1st Current Location Data Sharing Software 206A735c3, 2nd Current Location Data Sharing Software 206A735c4, and Phone Call Implementing Software 206A735c5. 1st Current Location Data Producing Software 206A735c1 is the software program described hereinafter. 1st Current Location Data Sharing Software 206A735c3 is the software program described hereinafter. 2nd Current Location Data Sharing Software 206A735c4 is the software program described hereinafter. Phone Call Implementing Software 206A735c5 is the software program described hereinafter.

This paragraph illustrates the storage area included in RAM 206 (FIG. 1) of Device B. In the present embodiment, RAM 206 includes Caller's Identification Content Sharing Info Storage Area 206B735a of which the data and the software program(s) stored therein are described hereinafter.

The data and/or the software program(s) necessary to implement the present function may be downloaded from Host H to Device B.

This paragraph illustrates the storage area(s) included in Caller's Identification Content Sharing Info Storage Area 206B735a. In the present embodiment, Caller's Identification Content Sharing Info Storage Area 206B735a includes Caller's Identification Content Sharing Data Storage Area 206B735b and Caller's Identification Content Sharing Software Storage Area 206B735c. Caller's Identification Content Sharing Data Storage Area 206B735b stores the data necessary to implement the present function on the side of Device B, such as the one(s) described hereinafter. Caller's Identification Content Sharing Software Storage Area 206B735c stores the software program(s) necessary to implement the present function on the side of Device B, such as the one(s) described hereinafter.

This paragraph illustrates the storage area(s) included in Caller's Identification Content Sharing Data Storage Area 206B735b. In the present embodiment, Caller's Identification Content Sharing Data Storage Area 206B735b includes Entire Phone Number Data Storage Area 206B735b1, Entire Phone Number Relating Data Storage Area 206B735b2, Entire Current Location Data Storage Area 206B735b3, Map Data Storage Area 206B735b4, Entire Icon Data Storage Area 206B735b5, Caller's Identification Content Shared Notice Data Storage Area 206B735b6, and Work Area 206B735b7. Entire Phone Number Data Storage Area 206B735b1 stores the data described hereinafter. Entire Phone Number Relating Data Storage Area 206B735b2 stores the data described hereinafter. Entire Current Location Data Storage Area 206B735b3 stores the data described hereinafter. Map Data Storage Area 206B735b4 stores the map data which is the three dimensional image data indicating a map. Entire Icon Data Storage Area 206B735*b*5 stores the data described hereinafter. Caller's Identification Content Shared Notice Data Storage Area 206B735*b*6 stores the caller's identification content shared notice data which indicates that the phone number relating data displayed on the callee's device is also displayed on the caller's device. Work Area 206B735*b*7 is utilized as a work area to perform calculation and temporarily store data to implement the present function.

This paragraph illustrates the storage area(s) included in Entire Phone Number Data Storage Area 206B735*b*1. In the present embodiment, Entire Phone Number Data Storage Area 206B735*b*1 includes 1st Phone Number Data Storage Area 206B735*b*1*a* and 2nd Phone Number Data Storage Area 206B735*b*1*b*. 1st Phone Number Data Storage Area 206B735*b*1*a* stores the 1st phone number data which indicates the phone number of Device A. 2nd Phone Number Data Storage Area 206B735*b*1*b* stores the 2nd phone number data which indicates the phone number of Device B. Only two phone number data, the 1st and 2nd phone number data are stored in the present data storage area for purposes of enabling the reader of this specification to understand the concept of the present invention. Not to mention, more than two phone number data (e.g., 100 phone number data) can be stored therein.

This paragraph illustrates the storage area(s) included in Entire Phone Number Relating Data Storage Area 206B735*b*2. In the present embodiment, Entire Phone Number Relating Data Storage Area 206B735*b*2 includes 1st Phone Number Relating Data Storage Area 206B735*b*2*a* and 2nd Phone Number Relating Data Storage Area 206B735*b*2*b*. 1st Phone Number Relating Data Storage Area 206B735*b*2*a* stores the 1st phone number relating data which indicates the data relating to the 1st phone number data, such as the personal name data, the title data, the company name data, the office phone number data, the office fax number data, the email address data, the office address data, the home address data, the home phone number data, and/or the photo data. The personal name data indicates the name (e.g., the first name and the last name) of the individual. The title data indicates the title at work of the individual. The company name data indicates the name of the company for which the individual works. The office phone number data indicates the office phone number of the individual. The office fax number data indicates the office fax number of the individual. The email address data indicates the email address of the individual. The office address data indicates the address of the individual's office. The home address data indicates the home address of the individual. The home phone number data indicates the home phone number of the individual. The photo data indicates the self-portrait image of the individual. Here, the term "individual" means the user of Device A. 2nd Phone Number Relating Data Storage Area 206B735*b*2*b* stores the 2nd phone number relating data which indicates the data relating to the 2nd phone number data, such as the personal name data, the title data, the company name data, the office phone number data, the office fax number data, the email address data, the office address data, the home address data, the home phone number data, and/or the photo data. The personal name data indicates the name (e.g., the first name and the last name) of the individual. The title data indicates the title at work of the individual. The company name data indicates the name of the company for which the individual works. The office phone number data indicates the office phone number of the individual. The office fax number data indicates the office fax number of the individual. The email address data indicates the email address of the individual. The office address data indicates the address of the individual's office. The home address data indicates the home address of the individual. The home phone number data indicates the home phone number of the individual. The photo data indicates the self-portrait image of the individual. Here, the term "individual" means the user of Device B.

This paragraph illustrates the storage area(s) included in Entire Current Location Data Storage Area 206B735*b*3. In the present embodiment, Entire Current Location Data Storage Area 206B735*b*3 includes 1st Current Location Data Storage Area 206B735*b*3*a* and 2nd Current Location Data Storage Area 206B735*b*3*b*. 1st Current Location Data Storage Area 206B735*b*3*a* stores the 1st current location data which indicates the current geographic location of Device A in (x,y,z) format. 2nd Current Location Data Storage Area 206B735*b*3*b* stores the 2nd current location data which indicates the current geographic location of Device B in (x,y,z) format.

This paragraph illustrates the storage area(s) included in Entire Icon Data Storage Area 206B735*b*5. In the present embodiment, Entire Icon Data Storage Area 206B735*b*5 includes 1st Current Location Icon Data Storage Area 206B735*b*5*a* and 2nd Current Location Icon Data Storage Area 206B735*b*5*b*. 1st Current Location Icon Data Storage Area 206B735*b*5*a* stores the 1st current location icon data which is the image of the icon utilized to indicate the 1st current location data on the map data. 2nd Current Location Icon Data Storage Area 206B735*b*5*b* stores the 2nd current location icon data which is the image of the icon utilized to indicate the 2nd current location data on the map data.

This paragraph illustrates the software program(s) stored in Caller's Identification Content Sharing Software Storage Area 206B735*c*. In the present embodiment, Caller's Identification Content Sharing Software Storage Area 206B735*c* stores 2nd Current Location Data Producing Software 206B735*c*2, 1st Current Location Data Sharing Software 206B735*c*3, 2nd Current Location Data Sharing Software 206B735*c*4, and Phone Call Implementing Software 206B735*c*5. 2nd Current Location Data Producing Software 206B735*c*2 is the software program described hereinafter. 1st Current Location Data Sharing Software 206B735*c*3 is the software program described hereinafter. 2nd Current Location Data Sharing Software 206B735*c*4 is the software program described hereinafter. Phone Call Implementing Software 206B735*c*5 is the software program described hereinafter.

This paragraph illustrate(s) 1st Current Location Data Producing Software 206A735*c*1 of Device A, which produce(s) the 1st current location data. In the present embodiment, CPU 211 (FIG. 1) of Device A identifies the current location of Device A (S1). CPU 211 (FIG. 1) of Device A produces the 1st current location data by referring to the current location identified in the previous step (S2). CPU 211 (FIG. 1) of Device A stores the 1st current location data produced in the previous step in 1st Current Location Data Storage Area 206A735*b*3*a* (S3). The foregoing sequence is repeated periodically.

This paragraph illustrate(s) 2nd Current Location Data Producing Software H735*c*2 of Host H and 2nd Current Location Data Producing Software 206B735*c*2 of Device B, which produce(s) the 2nd current location data. In the present embodiment, CPU 211 (FIG. 1) of Device B identifies the current location of Device B (S1). CPU 211 (FIG. 1) of Device B produces the 2nd current location data by referring to the current location identified in the previous step and sends the data to Host H in a wireless fashion (S2). Host H receives the 2nd current location data from Device B and stores the data in 2nd Current Location Data Storage Area H735*b*3*b* (S3). The foregoing sequence is repeated periodically.

This paragraph illustrate(s) 1st Current Location Data Sharing Software H735*c*3 of Host H and 1st Current Location Data Sharing Software 206A735*c*3 of Device A, which share(s) the 1st current location data. In the present embodiment, CPU 211 (FIG. 1) of Device A retrieves the 1st current location data from 1st Current Location Data Storage Area 206A735*b*3*a* and sends the data to Host H in a wireless fashion (S1). Host H receives the 1st current location data from Device A and stores the data in 1st Current Location Data Storage Area H735*b*3*a* (S2). The foregoing sequence is repeated periodically.

This paragraph illustrate(s) 2nd Current Location Data Sharing Software H735*c*4 of Host H and 2nd Current Location Data Sharing Software 206A735*c*4 of Device A, which share(s) the 2nd current location data. In the present embodiment, Host H retrieves the 2nd current location data from 2nd Current Location Data Storage Area H735*b*3*b* and sends the data to Device A (S1). CPU 211 (FIG. 1) of Device A receives the 2nd current location data from Host H in a wireless fashion and stores the data in 2nd Current Location Data Storage Area 206A735*b*3*b* (S2). The foregoing sequence is repeated periodically.

This paragraph illustrate(s) Phone Call Implementing Software H735*c*5 of Host H, Phone Call Implementing Software 206A735*c*5 of Device A, and Phone Call Implementing Software 206B735*c*5 of Device B, which implement(s) a phone call. In this embodiment, a phone call is made from Device A to Device B. In the present embodiment, CPU 211 (FIG. 1) of Device A retrieves the 1st phone number data from 1st Phone Number Data Storage Area 206A735*b*1*a* (S1). CPU 211 (FIG. 1) of Device A retrieves the 2nd phone number data from 2nd Phone Number Data Storage Area 206A735*b*1*b* (S2). CPU 211 (FIG. 1) of Device A sends the phone call implementing request to Host H in a wireless fashion (S3). Here, the phone call implementing request is the request to implement a phone conversation. The phone call implementing request includes the 1st phone number data. Host H receives the phone call implementing request from Device A (S4). Host H retrieves the 1st phone number data from the phone call implementing request received in the previous step (S5). Host H searches Entire Phone Number Data Storage Area H735*b*1 to identify the phone number data matching with the 1st phone number data retrieved in the previous step (S6). In the present embodiment, the 1st phone number data stored in 1st Phone Number Data Storage Area H735*b*1*a* is identified. Host H retrieves the phone number relating data (e.g., 1st phone number relating data) from Entire Phone Number Relating Data Storage Area H735*b*2 corresponding to the phone number data identified in the previous step (S7). In the present embodiment, the 1st phone number relating data stored in 1st Phone Number Relating Data Storage Area H735*b*2*a* is retrieved. Host H sends the 1st phone number data retrieved in S5 and the phone number relating data (e.g., 1st phone number relating data) retrieved in the previous step to Device B (S8). CPU 211 (FIG. 1) of Device B receives the 1st phone number data and the phone number relating data (e.g., 1st phone number relating data) from Host H in a wireless fashion (S9). CPU 211 (FIG. 1) of Device B displays the 1st phone number data and the phone number relating data (e.g., 1st phone number relating data) received in the previous step on LCD 201 (FIG. 1) of Device B (S10). Host H sends the 1st phone number data retrieved in S5 and the phone number relating data (e.g., 1st phone number relating data) retrieved in S7 to Device A (S11). CPU 211 (FIG. 1) of Device A receives the 1st phone number data and the phone number relating data (e.g., 1st phone number relating data) from Host H in a wireless fashion (S12). CPU 211 (FIG. 1) of Device A displays the 1st phone number data and the phone number relating data (e.g., 1st phone number relating data) received in the previous step on LCD 201 (FIG. 1) of Device A (S13). Host H retrieves the caller's identification content shared notice data from Caller's Identification Content Shared Notice Data Storage Area H735*b*6 and sends the data to Device B (S14). CPU 211 (FIG. 1) of Device B receives the caller's identification content shared notice data from Host H in a wireless fashion and displays the data on LCD 201 (FIG. 1) of Device B (S15). CPU 211 (FIG. 1) of Device A retrieves the map data from Map Data Storage Area 206A735*b*4 (S16). CPU 211 (FIG. 1) of Device A displays the map data retrieved in the previous step on LCD 201 (FIG. 1) of Device A (S17). CPU 211 (FIG. 1) of Device A retrieves the 1st current location data from 1st Current Location Data Storage Area 206A735*b*3*a* (S18). CPU 211 (FIG. 1) of Device A retrieves the 1st current location icon data from 1st Current Location Icon Data Storage Area 206A735*b*5*a* (S19). CPU 211 (FIG. 1) of Device A displays the 1st current location icon data retrieved in the previous step at the location corresponding to the 1st current location data retrieved in S18 on the map data displayed in S17 (S20). CPU 211 (FIG. 1) of Device A retrieves the 2nd current location data from 2nd Current Location Data Storage Area 206A735*b*3*b* (S21). CPU 211 (FIG. 1) of Device A retrieves the 2nd current location icon data from 2nd Current Location Icon Data Storage Area 206A735*b*5*b* (S22). CPU 211 (FIG. 1) of Device A displays the 2nd current location icon data retrieved in the previous step at the location corresponding to the 2nd current location data retrieved in S21 on the map data displayed in S17 (S23). Host H retrieves the map data from Map Data Storage Area H735*b*4 and sends the data to Device B (S24). CPU 211 (FIG. 1) of Device B receives the map data from Host H in a wireless fashion and displays the data on LCD 201 (FIG. 1) of Device B (S25). Host H retrieves the 1st current location data from 1st Current Location Data Storage Area H735*b*3*a* and sends the data to Device B (S26). CPU 211 (FIG. 1) of Device B receives the 1st current location data from Host H in a wireless fashion (S27). Host H retrieves the 1st current location icon data from 1st Current Location Icon Data Storage Area H735*b*5*a* and sends the data to Device B (S28). CPU 211 (FIG. 1) of Device B receives the 1st current location icon data from Host H in a wireless fashion (S29). CPU 211 (FIG. 1) of Device B displays the 1st current location icon data received in the previous step at the location corresponding to the 1st current location data received in S27 on the map data displayed in S25 (S30). Host H retrieves the 2nd current location data from 2nd Current Location Data Storage Area H735*b*3*b* and sends the data to Device B (S31). CPU 211 (FIG. 1) of Device B receives the 2nd current location data from Host H in a wireless fashion (S32). Host H retrieves the 2nd current location icon data from 2nd Current Location Icon Data Storage Area H735*b*5*b* and sends the data to Device B (S33). CPU 211 (FIG. 1) of Device B receives the 2nd current location icon data from Host H in a wireless fashion (S34). CPU 211 (FIG. 1) of Device B displays the 2nd current location icon data received in the previous step at the location corresponding to the 2nd current location data received in S32 on the map data displayed in S25 (S35). A phone communication is implemented between the users of Device A and Device B thereafter, if the user of Device B answers the phone call.

The following paragraphs illustrate another embodiment wherein Device B plays the major role in implementing the present function.

This paragraph illustrate(s) 1st Current Location Data Producing Software 206A735c1 of Device A, which produce(s) the 1st current location data. In the present embodiment, CPU 211 (FIG. 1) of Device A identifies the current location of Device A (S1). CPU 211 (FIG. 1) of Device A produces the 1st current location data by referring to the current location identified in the previous step (S2). CPU 211 (FIG. 1) of Device A stores the 1st current location data produced in the previous step in 1st Current Location Data Storage Area 206A735b3a (S3). The foregoing sequence is repeated periodically.

This paragraph illustrate(s) 2nd Current Location Data Producing Software 206B735c2 of Device B, which produce(s) the 2nd current location data. In the present embodiment, CPU 211 (FIG. 1) of Device B identifies the current location of Device B (S1). CPU 211 (FIG. 1) of Device B produces the 2nd current location data by referring to the current location identified in the previous step (S2). CPU 211 (FIG. 1) of Device B stores the 2nd current location data produced in the previous step in 2nd Current Location Data Storage Area 206B735b3b (S3). The foregoing sequence is repeated periodically.

This paragraph illustrate(s) 1st Current Location Data Sharing Software 206A735c3 of Device A and 1st Current Location Data Sharing Software 206B735c3 of Device B, which share(s) the 1st current location data. In the present embodiment, CPU 211 (FIG. 1) of Device A retrieves the 1st current location data from 1st Current Location Data Storage Area 206A735b3a and sends the data to Device B in a wireless fashion (S1). CPU 211 (FIG. 1) of Device B receives the 1st current location data from Device A in a wireless fashion and stores the data in 1st Current Location Data Storage Area 206B735b3a (S2). The foregoing sequence is repeated periodically.

This paragraph illustrate(s) 2nd Current Location Data Sharing Software 206A735c4 of Device A and 2nd Current Location Data Sharing Software 206B735c4 of Device B, which share(s) the 2nd current location data. In the present embodiment, CPU 211 (FIG. 1) of Device B retrieves the 2nd current location data from 2nd Current Location Data Storage Area 206B735b3b and sends the data to Device A in a wireless fashion (S1). CPU 211 (FIG. 1) of Device A receives the 2nd current location data from Device B in a wireless fashion and stores the data in 2nd Current Location Data Storage Area 206A735b3b (S2). The foregoing sequence is repeated periodically.

This paragraph illustrate(s) Phone Call Implementing Software 206A735c5 of Device A and Phone Call Implementing Software 206B735c5 of Device B, which implement(s) a phone call. In this embodiment, a phone call is made from Device A to Device B. In the present embodiment, CPU 211 (FIG. 1) of Device A retrieves the 1st phone number data from 1st Phone Number Data Storage Area 206A735b1a (S1). CPU 211 (FIG. 1) of Device A retrieves the 2nd phone number data from 2nd Phone Number Data Storage Area 206A735b1b (S2). CPU 211 (FIG. 1) of Device A sends the phone call implementing request to Device B in a wireless fashion (S3). Here, the phone call implementing request is the request to implement a phone conversation. The phone call implementing request includes the 1st phone number data. CPU 211 (FIG. 1) of Device B receives the phone call implementing request from Device A in a wireless fashion (S4). CPU 211 (FIG. 1) of Device B retrieves the 1st phone number data from the phone call implementing request received in the previous step (S5). CPU 211 (FIG. 1) of Device B searches Entire Phone Number Data Storage Area 206B735b1 to identify the phone number data matching with the 1st phone number data retrieved in the previous step (S6). In the present embodiment, the 1st phone number data stored in 1st Phone Number Data Storage Area 206B735b1a is identified. CPU 211 (FIG. 1) of Device B retrieves the phone number relating data (e.g., 1st phone number relating data) from Entire Phone Number Relating Data Storage Area 206B735b2 corresponding to the phone number data identified in the previous step (S7). In the present embodiment, the 1st phone number relating data stored in 1st Phone Number Relating Data Storage Area 206B735b2a is retrieved. CPU 211 (FIG. 1) of Device B displays the 1st phone number data retrieved in S5 and the phone number relating data (e.g., 1st phone number relating data) retrieved in the previous step on LCD 201 (FIG. 1) of Device B (S8). CPU 211 (FIG. 1) of Device B sends the 1st phone number data retrieved in S5 and the phone number relating data (e.g., 1st phone number relating data) retrieved in S7 to Device A in a wireless fashion (S9). CPU 211 (FIG. 1) of Device A receives the 1st phone number data and the phone number relating data (e.g., 1st phone number relating data) from Device B in a wireless fashion (S10). CPU 211 (FIG. 1) of Device A displays the 1st phone number data and the phone number relating data (e.g., 1st phone number relating data) received in the previous step on LCD 201 (FIG. 1) of Device A (S11). CPU 211 (FIG. 1) of Device B retrieves the caller's identification content shared notice data from Caller's Identification Content Shared Notice Data Storage Area 206B735b6 (S12). CPU 211 (FIG. 1) of Device B displays the caller's identification content shared notice data retrieved in the previous step on LCD 201 (FIG. 1) of Device B (S13). CPU 211 (FIG. 1) of Device A retrieves the map data from Map Data Storage Area 206A735b4 (S14). CPU 211 (FIG. 1) of Device A displays the map data retrieved in the previous step on LCD 201 (FIG. 1) of Device A (S15). CPU 211 (FIG. 1) of Device A retrieves the 1st current location data from 1st Current Location Data Storage Area 206A735b3a (S16). CPU 211 (FIG. 1) of Device A retrieves the 1st current location icon data from 1st Current Location Icon Data Storage Area 206A735b5a (S17). CPU 211 (FIG. 1) of Device A displays the 1st current location icon data retrieved in the previous step at the location corresponding to the 1st current location data retrieved in S16 on the map data displayed in S15 (S18). CPU 211 (FIG. 1) of Device A retrieves the 2nd current location data from 2nd Current Location Data Storage Area 206A735b3b (S19). CPU 211 (FIG. 1) of Device A retrieves the 2nd current location icon data from 2nd Current Location Icon Data Storage Area 206A735b5b (S20). CPU 211 (FIG. 1) of Device A displays the 2nd current location icon data retrieved in the previous step at the location corresponding to the 2nd current location data retrieved in S19 on the map data displayed in S15 (S21). CPU 211 (FIG. 1) of Device B retrieves the map data from Map Data Storage Area 206B735b4 (S22). CPU 211 (FIG. 1) of Device B displays the map data retrieved in the previous step on LCD 201 (FIG. 1) of Device B (S23). CPU 211 (FIG. 1) of Device B retrieves the 1st current location data from 1st Current Location Data Storage Area 206B735b3a (S24). CPU 211 (FIG. 1) of Device B retrieves the 1st current location icon data from 1st Current Location Icon Data Storage Area 206B735b5a (S25). CPU 211 (FIG. 1) of Device B displays the 1st current location icon data retrieved in the previous step at the location corresponding to the 1st current location data retrieved in S24 on the map data displayed in S23 (S26). CPU 211 (FIG. 1) of Device B retrieves the 2nd current location data from 2nd Current Location Data Storage Area 206B735b3b (S27).

CPU 211 (FIG. 1) of Device B retrieves the 2nd current location icon data from 2nd Current Location Icon Data Storage Area 206B735b5b (S28). CPU 211 (FIG. 1) of Device B displays the 2nd current location icon data retrieved in the previous step at the location corresponding to the 2nd current location data retrieved in S27 on the map data displayed in S23 (S29). A phone communication is implemented between the users of Device A and Device B thereafter, if the user of Device B answers the phone call.

<<Virtual Three Dimensional Space Near Focal Point Image Displaying Function>>

The following paragraphs illustrate the virtual three dimensional space near focal point image displaying function, wherein a virtual three dimensional space which indicates a computer-generated three dimensional space is produced, a focal point which indicates the user's eye focal point in said virtual three dimensional space is identified, a focal point icon is located at said focal point in said virtual three dimensional space, a mouse pointer icon which is movable by said user is located in said virtual three dimensional space, a digital material shortcut icon is located at a 1st specific location adjacent to said focal point, when said digital material shortcut icon is selected by said mouse pointer icon, a digital material which is represented by said digital material shortcut icon is located at a 2nd specific location adjacent to said focal point, a three dimensional map and a current location icon which indicates the current geographic location of said communication device are located in said virtual three dimensional space, and said virtual three dimensional space with said focal point icon, said mouse pointer icon, said digital material shortcut icon, said digital material, said three dimensional map, and/or said current location icon are displayed in a stereo fashion.

This paragraph illustrates the eye tracking devices connected to Communication Device 200 via Data Bus 203 (FIG. 1). In the present embodiment, Left Eye Tracking Device LETD727 and Right Eye Tracking Device RETD727 are connected to Data Bus 203 (FIG. 1). Left Eye Tracking Device LETD727 is the device which tracks the movement of the user's left eye (not shown). Right Eye Tracking Device RETD727 is the device which tracks the movement of the user's right eye (not shown).

This paragraph illustrates the displaying devices connected to Communication Device 200 via Data Bus 203 (FIG. 1). In the present embodiment, Left Eye Displaying Device LEDD727 and Right Eye Displaying Device REDD727 are connected to Data Bus 203 (FIG. 1). Left Eye Displaying Device LEDD727 is the device which displays visual data to the user's left eye (not shown). Right Eye Displaying Device REDD727 is the device which displays visual data to the user's right eye (not shown).

This paragraph illustrates the storage area included in Host H. In the present embodiment, Host H includes Virtual Three Dimensional Space Near Focal Point Image Displaying Info Storage Area H727a of which the data and the software program(s) stored therein are described hereinafter.

This paragraph illustrates the storage area(s) included in Virtual Three Dimensional Space Near Focal Point Image Displaying Info Storage Area H727a. In the present embodiment, Virtual Three Dimensional Space Near Focal Point Image Displaying Info Storage Area H727a includes Virtual Three Dimensional Space Near Focal Point Image Displaying Data Storage Area H727b and Virtual Three Dimensional Space Near Focal Point Image Displaying Software Storage Area H727c. Virtual Three Dimensional Space Near Focal Point Image Displaying Data Storage Area H727b stores the data necessary to implement the present function on the side of Host H, such as the one(s) described hereinafter. Virtual Three Dimensional Space Near Focal Point Image Displaying Software Storage Area H727c stores the software program(s) necessary to implement the present function on the side of Host H, such as the one(s) described hereinafter.

This paragraph illustrates the storage area(s) included in Virtual Three Dimensional Space Near Focal Point Image Displaying Data Storage Area H727b. In the present embodiment, Virtual Three Dimensional Space Near Focal Point Image Displaying Data Storage Area H727b includes Virtual Three Dimensional Space Data Storage Area H727b1, Entire Virtual Three Dimensional Space Internal Location Data Storage Area H727b2, Focal Point Adjacent Displaying Material Overall Data Storage Area H727b3, Focal Point Adjacent Displaying Material Displaying Property Data Storage Area H727b4, Entire Virtual Eye Location Data Storage Area H727b5, Entire Perspective View Data Storage Area H727b6, Current Location Data Storage Area H727b7, Map Data Storage Area H727b8, Current Location Icon Data Storage Area H727b9, and Work Area H727b10. Virtual Three Dimensional Space Data Storage Area H727b1 stores the virtual three dimensional space data which indicates a computer-generated 3D space. Entire Virtual Three Dimensional Space Internal Location Data Storage Area H727b2 stores the data described hereinafter. Focal Point Adjacent Displaying Material Overall Data Storage Area H727b3 stores the data described hereinafter. Focal Point Adjacent Displaying Material Displaying Property Data Storage Area H727b4 stores the focal point adjacent displaying material displaying property data which is either the focal point adjacent displaying material displaying positive data or the focal point adjacent displaying material displaying negative data. When the focal point adjacent displaying material displaying positive data is stored therein, the focal point adjacent displaying material data is activated and/or located in the virtual three dimensional space data. When the focal point adjacent displaying material displaying negative data is stored therein, the focal point adjacent displaying material data is not activated and/or not located in the virtual three dimensional space data. The default data stored therein is the focal point adjacent displaying material displaying negative data. Entire Virtual Eye Location Data Storage Area H727b5 stores the data described hereinafter. Entire Perspective View Data Storage Area H727b6 stores the data described hereinafter. Current Location Data Storage Area H727b7 stores the current location data which indicates the current geographic location of Communication Device 200 in (x,y,z) format. Map Data Storage Area H727b8 stores the map data which is the three dimensional image data indicating a map. Current Location Icon Data Storage Area H727b9 stores the current location icon data which is the three dimensional image of the icon utilized to indicate the current location data on the map data. Work Area H727b10 is utilized as a work area to perform calculation and temporarily store data to implement the present function.

This paragraph illustrates the storage area(s) included in Entire Virtual Three Dimensional Space Internal Location Data Storage Area H727b2. In the present embodiment, Entire Virtual Three Dimensional Space Internal Location Data Storage Area H727b2 includes Focal Point Icon Location Data Storage Area H727b2a, Focal Point Adjacent Displaying Material Shortcut Icon Location Data Storage Area H727b2b, Focal Point Adjacent Displaying Material Location Data Storage Area H727b2c, and Mouse Pointer Location Data Storage Area H727b2d. Focal Point Icon Location Data Storage Area H727b2a stores the focal point icon location data which indicates the location in the virtual three dimensional space data in (x,y,z) format at which the focal point icon data is located. In other words, the focal point icon location data indicates the focal point of the user's eye in the virtual three dimensional space data in (x,y,z) format. For the avoidance of doubt, the focal point icon location data may indicate any location within the virtual three dimensional space data. Focal Point Adjacent Displaying Material Shortcut Icon Location Data Storage Area H727b2b stores the focal point adjacent displaying material shortcut icon location data which indicates a specific location in the virtual three dimensional space data in (x,y,z) format at which the focal point adjacent displaying material shortcut icon data is displayed. The focal point adjacent displaying material shortcut icon location data indicates the location adjacent to the location indicated by the focal point icon location data (e.g., the location on the left hand side of the focal point icon location data at a pre-determined distance therefrom). Focal Point Adjacent Displaying Material Location Data Storage Area H727b2c stores the focal point adjacent displaying material location data which indicates the location in the virtual three dimensional space data in (x,y,z) format at which the focal point adjacent displaying material data is displayed. The focal point adjacent displaying material location data indicates the location adjacent to the location indicated by the focal point icon location data (e.g., the location on the right hand side of the focal point icon location data at a pre-determined distance therefrom). Mouse Pointer Location Data Storage Area H727b2d stores the mouse pointer location data which indicates the location in the virtual three dimensional space data in (x,y,z) format at which the mouse pointer data is displayed. The mouse pointer location data may indicate any location within the virtual three dimensional space data.

This paragraph illustrates the storage area(s) included in Focal Point Adjacent Displaying Material Overall Data Storage Area H727b3. In the present embodiment, Focal Point Adjacent Displaying Material Overall Data Storage Area H727b3 includes Focal Point Icon Data Storage Area H727b3a, Focal Point Adjacent Displaying Material Shortcut Icon Data Storage Area H727b3b, Focal Point Adjacent Displaying Material Data Storage Area H727b3c, and Mouse Pointer Data Storage Area H727b3d. Focal Point Icon Data Storage Area H727b3a stores the focal point icon data which is the three dimensional image of the icon utilized to indicate the focal point of the user's eye in the virtual three dimensional space data. Focal Point Adjacent Displaying Material Shortcut Icon Data Storage Area H727b3b stores the focal point adjacent displaying material shortcut icon data which is the three dimensional image of the icon utilized to indicate the shortcut icon of the focal point adjacent displaying material data in the virtual three dimensional space data. Focal Point Adjacent Displaying Material Data Storage Area H727b3c stores the focal point adjacent displaying material data which indicates the data displayed adjacent to the focal point indicated by the focal point icon location data. Here, the focal point adjacent displaying material data may be any type of digital data, such as a text data, fixed picture data, or moving picture data. The focal point adjacent displaying material data may be a three dimensional data. Mouse Pointer Data Storage Area H727b3d stores the mouse pointer data which is the three dimensional image of the mouse pointer.

This paragraph illustrates the storage area(s) included in Entire Virtual Eye Location Data Storage Area H727b5. In the present embodiment, Entire Virtual Eye Location Data Storage Area H727b5 includes Left Virtual Eye Location Data Storage Area H727b5a and Right Virtual Eye Location Data Storage Area H727b5b. Left Virtual Eye Location Data Storage Area H727b5a stores the left virtual eye location data which indicates the user's left eye in the virtual three dimensional space data in (x,y,z) format. Right Virtual Eye Location Data Storage Area H727b5b stores the right virtual eye location data which indicates the user's right eye in the virtual three dimensional space data in (x,y,z) format.

This paragraph illustrates the storage area(s) included in Entire Perspective View Data Storage Area H727b6. In the present embodiment, Entire Perspective View Data Storage Area H727b6 includes Left Perspective View Data Storage Area H727b6a and Right Perspective View Data Storage Area H727b6b. Left Perspective View Data Storage Area H727b6a stores the left perspective view data which indicates the perspective view of the virtual three dimensional space data and the focal point adjacent displaying material data to display on Left Eye Displaying Device LEDD727. Right Perspective View Data Storage Area H727b6b stores the right perspective view data which indicates the perspective view of the virtual three dimensional space data and the focal point adjacent displaying material data to display on Right Eye Displaying Device REDD727.

This paragraph illustrates the software program(s) stored in Virtual Three Dimensional Space Near Focal Point Image Displaying Software Storage Area H727c. In the present embodiment, Virtual Three Dimensional Space Near Focal Point Image Displaying Software Storage Area H727c stores Focal Point Icon Location Data Producing Software H727c1, Focal Point Icon Data Locating Software H727c2, Focal Point Adjacent Displaying Material Shortcut Icon Location Data Producing Software H727c3, Focal Point Adjacent Displaying Material Shortcut Icon Data Locating Software H727c4, Mouse Pointer Location Data Producing Software H727c5, Mouse Pointer Data Locating Software H727c6, Focal Point Adjacent Displaying Material Location Data Producing Software H727c7, Focal Point Adjacent Displaying Material Data Implementing Software H727c8, Focal Point Adjacent Displaying Material Data Locating Software H727c9, Current Location Data Producing Software H727c10, Current Location Icon Data Locating Software H727c11, Left Perspective View Data Producing Software H727c12, Right Perspective View Data Producing Software H727c13, Left Perspective View Data Displaying Software H727c14, and Right Perspective View Data Displaying Software H727c15. Focal Point Icon Location Data Producing Software H727c1 is the software program described hereinafter. Focal Point Icon Data Locating Software H727c2 is the software program described hereinafter. Focal Point Adjacent Displaying Material Shortcut Icon Location Data Producing Software H727c3 is the software program described hereinafter. Focal Point Adjacent Displaying Material Shortcut Icon Data Locating Software H727c4 is the software program described hereinafter. Mouse Pointer Location Data Producing Software H727c5 is the software program described hereinafter. Mouse Pointer Data Locating Software H727c6 is the software program described hereinafter. Focal Point Adjacent Displaying Material Location Data Producing Software H727c7 is the software program described hereinafter. Focal Point Adjacent Displaying Material Data Implementing Software H727c8 is the software program described hereinafter. Focal Point Adjacent Displaying Material Data Locating Software H727c9 is the software program described hereinafter. Current Location Data Producing Software H727c10 is the software program described hereinafter. Current Location Icon Data Locating Software H727c11 is the software program described hereinafter. Left Perspective View Data Producing Software H727c12 is the software program described hereinafter. Right Perspective View Data Producing Software H727c13 is the software program described hereinafter. Left Perspective View Data Displaying Software H727c14 is the software program described hereinafter. Right Perspective View Data Displaying Software H727c15 is the software program described hereinafter.

This paragraph illustrates the storage area included in RAM 206 (FIG. 1) of Communication Device 200. In the present embodiment, RAM 206 includes Virtual Three Dimensional Space Near Focal Point Image Displaying Info Storage Area 206727a of which the data and the software program(s) stored therein are described hereinafter.

The data and/or the software program(s) necessary to implement the present function may be downloaded from Host H to Communication Device 200.

This paragraph illustrates the storage area(s) included in Virtual Three Dimensional Space Near Focal Point Image Displaying Info Storage Area 206727a. In the present embodiment, Virtual Three Dimensional Space Near Focal Point Image Displaying Info Storage Area 206727a includes Virtual Three Dimensional Space Near Focal Point Image Displaying Data Storage Area 206727b and Virtual Three Dimensional Space Near Focal Point Image Displaying Software Storage Area 206727c. Virtual Three Dimensional Space Near Focal Point Image Displaying Data Storage Area 206727b stores the data necessary to implement the present function on the side of Communication Device 200, such as the one(s) described hereinafter. Virtual Three Dimensional Space Near Focal Point Image Displaying Software Storage Area 206727c stores the software program(s) necessary to implement the present function on the side of Communication Device 200, such as the one(s) described hereinafter.

This paragraph illustrates the storage area(s) included in Virtual Three Dimensional Space Near Focal Point Image Displaying Data Storage Area 206727b. In the present embodiment, Virtual Three Dimensional Space Near Focal Point Image Displaying Data Storage Area 206727b includes Virtual Three Dimensional Space Data Storage Area 206727b1, Entire Virtual Three Dimensional Space Internal Location Data Storage Area 206727b2, Focal Point Adjacent Displaying Material Overall Data Storage Area 206727b3, Focal Point Adjacent Displaying Material Displaying Property Data Storage Area 206727b4, Entire Virtual Eye Location Data Storage Area 206727b5, Entire Perspective View Data Storage Area 206727b6, Current Location Data Storage Area 206727b7, Map Data Storage Area 206727b8, Current Location Icon Data Storage Area 206727b9, and Work Area 206727b10. Virtual Three Dimensional Space Data Storage Area 206727b1 stores the virtual three dimensional space data which indicates a computer-generated 3D space. Entire Virtual Three Dimensional Space Internal Location Data Storage Area 206727b2 stores the data described hereinafter. Focal Point Adjacent Displaying Material Overall Data Storage Area 206727b3 stores the data described hereinafter. Focal Point Adjacent Displaying Material Displaying Property Data Storage Area 206727b4 stores the focal point adjacent displaying material displaying property data which is either the focal point adjacent displaying material displaying positive data or the focal point adjacent displaying material displaying negative data. When the focal point adjacent displaying material displaying positive data is stored therein, the focal point adjacent displaying material data is activated and/or located in the virtual three dimensional space data. When the focal point adjacent displaying material displaying negative data is stored therein, the focal point adjacent displaying material data is not activated and/or not located in the virtual three dimensional space data. The default data stored therein is the focal point adjacent displaying material displaying negative data. Entire Virtual Eye Location Data Storage Area 206727b5 stores the data described hereinafter. Entire Perspective View Data Storage Area 206727b6 stores the data described hereinafter. Current Location Data Storage Area 206727b7 stores the current location data which indicates the current geographic location of Communication Device 200 in (x,y,z) format. Map Data Storage Area 206727b8 stores the map data which is the three dimensional image data indicating a map. Current Location Icon Data Storage Area 206727b9 stores the current location icon data which is the three dimensional image of the icon utilized to indicate the current location data on the map data. Work Area 206727b10 is utilized as a work area to perform calculation and temporarily store data to implement the present function.

This paragraph illustrates the storage area(s) included in Entire Virtual Three Dimensional Space Internal Location Data Storage Area 206727b2. In the present embodiment, Entire Virtual Three Dimensional Space Internal Location Data Storage Area 206727b2 includes Focal Point Icon Location Data Storage Area 206727b2a, Focal Point Adjacent Displaying Material Shortcut Icon Location Data Storage Area 206727b2b, Focal Point Adjacent Displaying Material Location Data Storage Area 206727b2c, and Mouse Pointer Location Data Storage Area 206727b2d. Focal Point Icon Location Data Storage Area 206727b2a stores the focal point icon location data which indicates the location in the virtual three dimensional space data in (x,y,z) format at which the focal point icon data is located. In other words, the focal point icon location data indicates the focal point of the user's eye in the virtual three dimensional space data in (x,y,z) format. For the avoidance of doubt, the focal point icon location data may indicate any location within the virtual three dimensional space data. Focal Point Adjacent Displaying Material Shortcut Icon Location Data Storage Area 206727b2b stores the focal point adjacent displaying material shortcut icon location data which indicates a specific location in the virtual three dimensional space data in (x,y,z) format at which the focal point adjacent displaying material shortcut icon data is displayed. The focal point adjacent displaying material shortcut icon location data indicates the location adjacent to the location indicated by the focal point icon location data (e.g., the location on the left hand side of the focal point icon location data at a pre-determined distance therefrom). Focal Point Adjacent Displaying Material Location Data Storage Area 206727b2c stores the focal point adjacent displaying material location data which indicates the location in the virtual three dimensional space data in (x,y,z) format at which the focal point adjacent displaying material data is displayed. The focal point adjacent displaying material location data indicates the location adjacent to the location indicated by the focal point icon location data (e.g., the location on the right hand side of the focal point icon location data at a pre-determined distance therefrom). Mouse Pointer Location Data Storage Area 206727b2d stores the mouse pointer location data which indicates the location in the virtual three dimensional space data in (x,y,z) format at which the mouse pointer data is displayed. The mouse pointer location data may indicate any location within the virtual three dimensional space data.

This paragraph illustrates the storage area(s) included in Focal Point Adjacent Displaying Material Overall Data Storage Area 206727b3. In the present embodiment, Focal Point Adjacent Displaying Material Overall Data Storage Area 206727b3 includes Focal Point Icon Data Storage Area 206727b3a, Focal Point Adjacent Displaying Material Shortcut Icon Data Storage Area 206727b3b, Focal Point Adjacent Displaying Material Data Storage Area 206727b3c, and Mouse Pointer Data Storage Area 206727b3d. Focal Point Icon Data Storage Area 206727b3a stores the focal point icon data which is the three dimensional image of the icon utilized to indicate the focal point of the user's eye in the virtual three dimensional space data. Focal Point Adjacent Displaying Material Shortcut Icon Data Storage Area 206727b3b stores the focal point adjacent displaying material shortcut icon data which is the three dimensional image of the icon utilized to indicate the shortcut icon of the focal point adjacent displaying material data in the virtual three dimensional space data. Focal Point Adjacent Displaying Material Data Storage Area 206727b3c stores the focal point adjacent displaying material data which indicates the data displayed adjacent to the focal point indicated by the focal point icon location data. Here, the focal point adjacent displaying material data may be any type of digital data, such as a text data, fixed picture data, or moving picture data. The focal point adjacent displaying material data may be a three dimensional data. Mouse Pointer Data Storage Area 206727b3d stores the mouse pointer data which is the three dimensional image of the mouse pointer.

This paragraph illustrates the storage area(s) included in Entire Virtual Eye Location Data Storage Area 206727b5. In the present embodiment, Entire Virtual Eye Location Data Storage Area 206727b5 includes Left Virtual Eye Location Data Storage Area 206727b5a and Right Virtual Eye Location Data Storage Area 206727b5b. Left Virtual Eye Location Data Storage Area 206727b5a stores the left virtual eye location data which indicates the user's left eye in the virtual three dimensional space data in (x,y,z) format. Right Virtual Eye Location Data Storage Area 206727b5b stores the right virtual eye location data which indicates the user's right eye in the virtual three dimensional space data in (x,y,z) format.

This paragraph illustrates the storage area(s) included in Entire Perspective View Data Storage Area 206727b6. In the present embodiment, Entire Perspective View Data Storage Area 206727b6 includes Left Perspective View Data Storage Area 206727b6a and Right Perspective View Data Storage Area 206727b6b. Left Perspective View Data Storage Area 206727b6a stores the left perspective view data which indicates the perspective view of the virtual three dimensional space data and the focal point adjacent displaying material data to display on Left Eye Displaying Device LEDD727. Right Perspective View Data Storage Area 206727b6b stores the right perspective view data which indicates the perspective view of the virtual three dimensional space data and the focal point adjacent displaying material data to display on Right Eye Displaying Device REDD727.

This paragraph illustrates the software program(s) stored in Virtual Three Dimensional Space Near Focal Point Image Displaying Software Storage Area 206727c. In the present embodiment, Virtual Three Dimensional Space Near Focal Point Image Displaying Software Storage Area 206727c stores Focal Point Icon Location Data Producing Software 206727c1, Focal Point Icon Data Locating Software 206727c2, Focal Point Adjacent Displaying Material Shortcut Icon Location Data Producing Software 206727c3, Focal Point Adjacent Displaying Material Shortcut Icon Data Locating Software 206727c4, Mouse Pointer Location Data Producing Software 206727c5, Mouse Pointer Data Locating Software 206727c6, Focal Point Adjacent Displaying Material Location Data Producing Software 206727c7, Focal Point Adjacent Displaying Material Data Implementing Software 206727c8, Focal Point Adjacent Displaying Material Data Locating Software 206727c9, Current Location Data Producing Software 206727c10, Current Location Icon Data Locating Software 206727c11, Left Perspective View Data Producing Software 206727c12, Right Perspective View Data Producing Software 206727c13, Left Perspective View Data Displaying Software 206727c14, and Right Perspective View Data Displaying Software 206727c15. Focal Point Icon Location Data Producing Software 206727c1 is the software program described hereinafter. Focal Point Icon Data Locating Software 206727c2 is the software program described hereinafter. Focal Point Adjacent Displaying Material Shortcut Icon Location Data Producing Software 206727c3 is the software program described hereinafter. Focal Point Adjacent Displaying Material Shortcut Icon Data Locating Software 206727c4 is the software program described hereinafter. Mouse Pointer Location Data Producing Software 206727c5 is the software program described hereinafter. Mouse Pointer Data Locating Software 206727c6 is the software program described hereinafter. Focal Point Adjacent Displaying Material Location Data Producing Software 206727c7 is the software program described hereinafter. Focal Point Adjacent Displaying Material Data Implementing Software 206727c8 is the software program described hereinafter. Focal Point Adjacent Displaying Material Data Locating Software 206727c9 is the software program described hereinafter. Current Location Data Producing Software 206727c10 is the software program described hereinafter. Current Location Icon Data Locating Software 206727c11 is the software program described hereinafter. Left Perspective View Data Producing Software 206727c12 is the software program described hereinafter. Right Perspective View Data Producing Software 206727c13 is the software program described hereinafter. Left Perspective View Data Displaying Software 206727c14 is the software program described hereinafter. Right Perspective View Data Displaying Software 206727c15 is the software program described hereinafter.

This paragraph illustrate(s) Focal Point Icon Location Data Producing Software H727c1 of Host H and Focal Point Icon Location Data Producing Software 206727c1 of Communication Device 200, which produce(s) the focal point icon location data. In the present embodiment, CPU 211 (FIG. 1) identifies the direction to which the left eye of the user is currently perceiving by utilizing Left Eye Tracking Device LETD727 (S1). CPU 211 (FIG. 1) identifies the direction to which the right eye of the user is currently perceiving by utilizing Right Eye Tracking Device RETD727 (S2). CPU 211 (FIG. 1) identifies the focal point of the user's eye in the virtual three dimensional space data stored in Virtual Three Dimensional Space Data Storage Area H727b1 by referring to the directions identified in S1 and the previous step (S3). CPU 211 (FIG. 1) produces the focal point icon location data by referring to the focal point of the user's eye identified in the previous step and sends the data to Host H in a wireless fashion (S4). Host H receives the focal point icon location data from Communication Device 200 and stores the data in Focal Point Icon Location Data Storage Area H727b2a (S5). The foregoing sequence is repeated periodically.

This paragraph illustrate(s) Focal Point Icon Data Locating Software H727c2 of Host H, which locate(s) the focal point icon data in the virtual three dimensional space data. In the present embodiment, Host H retrieves the focal point icon data from Focal Point Icon Data Storage Area H727b3a (S1). Host H retrieves the focal point icon location data from Focal Point Icon Location Data Storage Area H727b2a (S2). Host H locates the focal point icon data retrieved in S1 at the location corresponding to the focal point icon location data retrieved in the previous step in the virtual three dimensional space data stored in Virtual Three Dimensional Space Data Storage Area H727b1 (S3). The foregoing sequence is repeated periodically.

This paragraph illustrate(s) Focal Point Adjacent Displaying Material Shortcut Icon Location Data Producing Software H727*c*3 of Host H, which produce(s) the focal point adjacent displaying material shortcut icon location data. In the present embodiment, Host H retrieves the focal point icon location data from Focal Point Icon Location Data Storage Area H727*b*2*a* (S1). Host H produces the focal point adjacent displaying material shortcut icon location data by referring to the focal point icon location data retrieved in the previous step (S2). In the present embodiment, the focal point adjacent displaying material shortcut icon location data indicates a certain point located on the left hand side from the focal point icon location data at a certain distance therefrom. Host H stores the focal point adjacent displaying material shortcut icon location data produced in the previous step in Focal Point Adjacent Displaying Material Shortcut Icon Location Data Storage Area H727*b*2*b* (S3). The foregoing sequence is repeated periodically.

This paragraph illustrate(s) Focal Point Adjacent Displaying Material Shortcut Icon Data Locating Software H727*c*4 of Host H, which locate(s) the focal point adjacent displaying material shortcut icon data in the virtual three dimensional space data. In the present embodiment, Host H retrieves the focal point adjacent displaying material shortcut icon data from Focal Point Adjacent Displaying Material Shortcut Icon Data Storage Area H727*b*3*b* (S1). Host H retrieves the focal point adjacent displaying material shortcut icon location data from Focal Point Adjacent Displaying Material Shortcut Icon Location Data Storage Area H727*b*2*b* (S2). Host H locates the focal point adjacent displaying material shortcut icon data retrieved in S1 at the location corresponding to the focal point adjacent displaying material shortcut icon location data retrieved in the previous step in the virtual three dimensional space data stored in Virtual Three Dimensional Space Data Storage Area H727*b*1 (S3). The foregoing sequence is repeated periodically.

This paragraph illustrate(s) Mouse Pointer Location Data Producing Software H727*c*5 of Host H and Mouse Pointer Location Data Producing Software 206727*c*5 of Communication Device 200, which produce(s) the mouse pointer location data. In the present embodiment, the user of Communication Device 200 inputs, by utilizing Input Device 210 (FIG. 1) or via voice recognition system, the mouse pointer moving command (S1). Here, the mouse pointer moving command is the command to move the mouse pointer data in the virtual three dimensional space data. The mouse pointer data may be moved to any direction in the virtual three dimensional space data by this command. CPU 211 (FIG. 1) sends the mouse pointer moving command input in the previous step to Host H in a wireless fashion (S2). Host H receives the mouse pointer moving command from Communication Device 200 (S3). Host H produces the mouse pointer location data by referring to the mouse pointer moving command received in the previous step (S4). Host H stores the mouse pointer location data produced in the previous step in Mouse Pointer Location Data Storage Area H727*b*2*d* (S5). The foregoing sequence is repeated periodically.

This paragraph illustrate(s) Mouse Pointer Data Locating Software H727*c*6 of Host H, which locate(s) the mouse pointer data in the virtual three dimensional space data. In the present embodiment, Host H retrieves the mouse pointer data from Mouse Pointer Data Storage Area H727*b*3*d* (S1). Host H retrieves the mouse pointer location data from Mouse Pointer Location Data Storage Area H727*b*2*d* (S2). Host H locates the mouse pointer data retrieved in S1 at the location corresponding to the mouse pointer location data retrieved in the previous step in the virtual three dimensional space data stored in Virtual Three Dimensional Space Data Storage Area H727*b*1 (S3). The foregoing sequence is repeated periodically.

This paragraph illustrate(s) Focal Point Adjacent Displaying Material Location Data Producing Software H727*c*7 of Host H, which produce(s) the focal point adjacent displaying material location data. In the present embodiment, Host H retrieves the focal point icon location data from Focal Point Icon Location Data Storage Area H727*b*2*a* (S1). Host H produces the focal point adjacent displaying material location data by referring to the focal point icon location data retrieved in the previous step (S2). In the present embodiment, the focal point adjacent displaying material location data indicates a certain point located on the right hand side from the focal point icon location data at a certain distance therefrom. Host H stores the focal point adjacent displaying material location data produced in the previous step in Focal Point Adjacent Displaying Material Location Data Storage Area H727*b*2*c* (S3). The foregoing sequence is repeated periodically.

This paragraph illustrate(s) Focal Point Adjacent Displaying Material Data Implementing Software H727*c*8 of Host H and Focal Point Adjacent Displaying Material Data Implementing Software 206727*c*8 of Communication Device 200, which implement(s) the focal point adjacent displaying material data. In the present embodiment, Host H retrieves the mouse pointer location data from Mouse Pointer Location Data Storage Area H727*b*2*d* (S1). Host H retrieves the focal point adjacent displaying material shortcut icon location data from Focal Point Adjacent Displaying Material Shortcut Icon Location Data Storage Area H727*b*2*b* (S2). If the mouse pointer location data retrieved in S1 and the focal point adjacent displaying material shortcut icon location data retrieved in the previous step matches, Host H proceeds to the next step (S3). If the focal point adjacent displaying material data implementing command is input via Input Device 210 (FIG. 1) or voice recognition system, CPU 211 (FIG. 1) proceeds to the next step (S4). Here, the focal point adjacent displaying material data implementing command is the command to implement the focal point adjacent displaying material data. CPU 211 (FIG. 1) sends the focal point adjacent displaying material data implementing command to Host H in a wireless fashion (S5). Host H receives the focal point adjacent displaying material data implementing command from Communication Device 200 (S6). Host H stores the focal point adjacent displaying material displaying positive data in Focal Point Adjacent Displaying Material Displaying Property Data Storage Area H727*b*4 (S7). The foregoing sequence is repeated periodically.

This paragraph illustrate(s) Focal Point Adjacent Displaying Material Data Locating Software H727*c*9 of Host H, which locate(s) the focal point adjacent displaying material data in the virtual three dimensional space data. In the present embodiment, Host H identifies the data stored in Focal Point Adjacent Displaying Material Displaying Property Data Storage Area H727*b*4 (S1). If the focal point adjacent displaying material displaying positive data is stored in Focal Point Adjacent Displaying Material Displaying Property Data Storage Area H727*b*4, Host H proceeds to the next step (S2). Host H retrieves the focal point adjacent displaying material data from Focal Point Adjacent Displaying Material Data Storage Area H727*b*3*c* (S3). Host H retrieves the focal point adjacent displaying material location data from Focal Point Adjacent Displaying Material Location Data Storage Area H727*b*2*c* (S4). Host H locates the focal point adjacent displaying material data retrieved in S3 at the location corresponding to the focal point adjacent displaying material location data retrieved in the previous step in the virtual three dimensional space data stored in Virtual Three Dimensional Space Data Storage Area H727b1 (S5). The foregoing sequence is repeated periodically.

This paragraph illustrate(s) Current Location Data Producing Software H727c10 of Host H and Current Location Data Producing Software 206727c10 of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step and sends the data to Host H in a wireless fashion (S2). Host H receives the current location data from Communication Device 200 and stores the data in Current Location Data Storage Area H727b7 (S3). The foregoing sequence is repeated periodically.

This paragraph illustrate(s) Current Location Icon Data Locating Software H727c11 of Host H, which locate(s) the current location icon data in the virtual three dimensional space data. In the present embodiment, Host H retrieves the map data from Map Data Storage Area H727b8 (S1). Host H locates the map data retrieved in the previous step at a certain location in the virtual three dimensional space data stored in Virtual Three Dimensional Space Data Storage Area H727b1 (S2). Host H retrieves the current location icon data from Current Location Icon Data Storage Area H727b9 (S3). Host H retrieves the current location data from Current Location Data Storage Area H727b7 (S4). Host H locates the current location icon data retrieved in S3 at the location corresponding to the current location data retrieved in the previous step on the map data located in S2 (S5). The foregoing sequence is repeated periodically.

This paragraph illustrate(s) Left Perspective View Data Producing Software H727c12 of Host H, which produce(s) the left perspective view data. In the present embodiment, Host H retrieves the virtual three dimensional space data from Virtual Three Dimensional Space Data Storage Area H727b1 (S1). Here, the focal point icon data, the focal point adjacent displaying material shortcut icon data, the focal point adjacent displaying material data, the mouse pointer data, and/or the map data (with the current location icon data located thereon) located in the virtual three dimensional space data are also retrieved therefrom. Host H retrieves the left virtual eye location data from Left Virtual Eye Location Data Storage Area H727b5a (S2). Host H produces the two dimensional image indicating the perspective view of the virtual three dimensional space data retrieved in S1 perceived from the location indicated by the left virtual eye location data retrieved in the previous step (S3). Host H stores the two dimensional image produced in the previous step as the left perspective view data in Left Perspective View Data Storage Area H727b6a (S4). The foregoing sequence is repeated periodically.

This paragraph illustrate(s) Right Perspective View Data Producing Software H727c13 of Host H, which produce(s) the right perspective view data. In the present embodiment, Host H retrieves the virtual three dimensional space data from Virtual Three Dimensional Space Data Storage Area H727b1 (S1). Here, the focal point icon data, the focal point adjacent displaying material shortcut icon data, the focal point adjacent displaying material data, the mouse pointer data, and/or the map data (with the current location icon data located thereon) located in the virtual three dimensional space data are also retrieved therefrom. Host H retrieves the right virtual eye location data from Right Virtual Eye Location Data Storage Area H727b5b (S2). Host H produces the two dimensional image indicating the perspective view of the virtual three dimensional space data retrieved in S1 perceived from the location indicated by the right virtual eye location data retrieved in the previous step (S3). Host H stores the two dimensional image produced in the previous step as the right perspective view data in Right Perspective View Data Storage Area H727b6b (S4). The foregoing sequence is repeated periodically.

This paragraph illustrate(s) Left Perspective View Data Displaying Software H727c14 of Host H and Left Perspective View Data Displaying Software 206727c14 of Communication Device 200, which display(s) the left perspective view data. In the present embodiment, Host H retrieves the left perspective view data from Left Perspective View Data Storage Area H727b6a and sends the data to Communication Device 200 (S1). CPU 211 (FIG. 1) receives the left perspective view data from Host H in a wireless fashion and displays the data on Left Eye Displaying Device LEDD727 (S2). The foregoing sequence is repeated periodically.

This paragraph illustrate(s) Right Perspective View Data Displaying Software H727c15 of Host H and Right Perspective View Data Displaying Software 206727c15 of Communication Device 200, which display(s) the right perspective view data. In the present embodiment, Host H retrieves the right perspective view data from Right Perspective View Data Storage Area H727b6b and sends the data to Communication Device 200 (S1). CPU 211 (FIG. 1) receives the right perspective view data from Host H in a wireless fashion and displays the data on Right Eye Displaying Device REDD727 (S2). By utilizing the method of binocular disparity, the user perceives the virtual three dimensional space data, the focal point icon data, the focal point adjacent displaying material shortcut icon data, the focal point adjacent displaying material data, and/or the mouse pointer data located therein in a three dimensional manner. The foregoing sequence is repeated periodically.

The following paragraphs illustrate another embodiment wherein Communication Device 200 plays the major role in implementing the present function.

This paragraph illustrate(s) Focal Point Icon Location Data Producing Software 206727c1 of Communication Device 200, which produce(s) the focal point icon location data. In the present embodiment, CPU 211 (FIG. 1) identifies the direction to which the left eye of the user is currently perceiving by utilizing Left Eye Tracking Device LETD727 (S1). CPU 211 (FIG. 1) identifies the direction to which the right eye of the user is currently perceiving by utilizing Right Eye Tracking Device RETD727 (S2). CPU 211 (FIG. 1) identifies the focal point of the user's eye in the virtual three dimensional space data stored in Virtual Three Dimensional Space Data Storage Area 206727b1 by referring to the directions identified in S1 and the previous step (S3). CPU 211 (FIG. 1) produces the focal point icon location data by referring to the focal point of the user's eye identified in the previous step (S4). CPU 211 (FIG. 1) stores the focal point icon location data produced in the previous step in Focal Point Icon Location Data Storage Area 206727b2a (S5). The foregoing sequence is repeated periodically.

This paragraph illustrate(s) Focal Point Icon Data Locating Software 206727c2 of Communication Device 200, which locate(s) the focal point icon data in the virtual three dimensional space data. In the present embodiment, CPU 211 (FIG. 1) retrieves the focal point icon data from Focal Point Icon Data Storage Area 206727b3a (S1). CPU 211 (FIG. 1) retrieves the focal point icon location data from Focal Point Icon Location Data Storage Area 206727b2a (S2). CPU 211 (FIG. 1) locates the focal point icon data retrieved in S1 at the location corresponding to the focal point icon location data retrieved in the previous step in the virtual three dimensional space data stored in Virtual Three Dimensional Space Data Storage Area 206727*b*1 (S3). The foregoing sequence is repeated periodically.

This paragraph illustrate(s) Focal Point Adjacent Displaying Material Shortcut Icon Location Data Producing Software 206727*c*3 of Communication Device 200, which produce(s) the focal point adjacent displaying material shortcut icon location data. In the present embodiment, CPU 211 (FIG. 1) retrieves the focal point icon location data from Focal Point Icon Location Data Storage Area 206727*b*2*a* (S1). CPU 211 (FIG. 1) produces the focal point adjacent displaying material shortcut icon location data by referring to the focal point icon location data retrieved in the previous step (S2). In the present embodiment, the focal point adjacent displaying material shortcut icon location data indicates a certain point located on the left hand side from the focal point icon location data at a certain distance therefrom. CPU 211 (FIG. 1) stores the focal point adjacent displaying material shortcut icon location data produced in the previous step in Focal Point Adjacent Displaying Material Shortcut Icon Location Data Storage Area 206727*b*2*b* (S3). The foregoing sequence is repeated periodically.

This paragraph illustrate(s) Focal Point Adjacent Displaying Material Shortcut Icon Data Locating Software 206727*c*4 of Communication Device 200, which locate(s) the focal point adjacent displaying material shortcut icon data in the virtual three dimensional space data. In the present embodiment, CPU 211 (FIG. 1) retrieves the focal point adjacent displaying material shortcut icon data from Focal Point Adjacent Displaying Material Shortcut Icon Data Storage Area 206727*b*3*b* (S1). CPU 211 (FIG. 1) retrieves the focal point adjacent displaying material shortcut icon location data from Focal Point Adjacent Displaying Material Shortcut Icon Location Data Storage Area 206727*b*2*b* (S2). CPU 211 (FIG. 1) locates the focal point adjacent displaying material shortcut icon data retrieved in S1 at the location corresponding to the focal point adjacent displaying material shortcut icon location data retrieved in the previous step in the virtual three dimensional space data stored in Virtual Three Dimensional Space Data Storage Area 206727*b*1 (S3). The foregoing sequence is repeated periodically.

This paragraph illustrate(s) Mouse Pointer Location Data Producing Software 206727*c*5 of Communication Device 200, which produce(s) the mouse pointer location data. In the present embodiment, the user of Communication Device 200 inputs, by utilizing Input Device 210 (FIG. 1) or via voice recognition system, the mouse pointer moving command (S1). Here, the mouse pointer moving command is the command to move the mouse pointer data in the virtual three dimensional space data. The mouse pointer data may be moved to any direction in the virtual three dimensional space data by this command. CPU 211 (FIG. 1) produces the mouse pointer location data by referring to the mouse pointer moving command input in the previous step (S2). CPU 211 (FIG. 1) stores the mouse pointer location data produced in the previous step in Mouse Pointer Location Data Storage Area 206727*b*2*d* (S3). The foregoing sequence is repeated periodically.

This paragraph illustrate(s) Mouse Pointer Data Locating Software 206727*c*6 of Communication Device 200, which locate(s) the mouse pointer data in the virtual three dimensional space data. In the present embodiment, CPU 211 (FIG. 1) retrieves the mouse pointer data from Mouse Pointer Data Storage Area 206727*b*3*d* (S1). CPU 211 (FIG. 1) retrieves the mouse pointer location data from Mouse Pointer Location Data Storage Area 206727*b*2*d* (S2). CPU 211 (FIG. 1) locates the mouse pointer data retrieved in S1 at the location corresponding to the mouse pointer location data retrieved in the previous step in the virtual three dimensional space data stored in Virtual Three Dimensional Space Data Storage Area 206727*b*1 (S3). The foregoing sequence is repeated periodically.

This paragraph illustrate(s) Focal Point Adjacent Displaying Material Location Data Producing Software 206727*c*7 of Communication Device 200, which produce(s) the focal point adjacent displaying material location data. In the present embodiment, CPU 211 (FIG. 1) retrieves the focal point icon location data from Focal Point Icon Location Data Storage Area 206727*b*2*a* (S1). CPU 211 (FIG. 1) produces the focal point adjacent displaying material location data by referring to the focal point icon location data retrieved in the previous step (S2). In the present embodiment, the focal point adjacent displaying material location data indicates a certain point located on the right hand side from the focal point icon location data at a certain distance therefrom. CPU 211 (FIG. 1) stores the focal point adjacent displaying material location data produced in the previous step in Focal Point Adjacent Displaying Material Location Data Storage Area 206727*b*2*c* (S3). The foregoing sequence is repeated periodically.

This paragraph illustrate(s) Focal Point Adjacent Displaying Material Data Implementing Software 206727*c*8 of Communication Device 200, which implement(s) the focal point adjacent displaying material data. In the present embodiment, CPU 211 (FIG. 1) retrieves the mouse pointer location data from Mouse Pointer Location Data Storage Area 206727*b*2*d* (S1). CPU 211 (FIG. 1) retrieves the focal point adjacent displaying material shortcut icon location data from Focal Point Adjacent Displaying Material Shortcut Icon Location Data Storage Area 206727*b*2*b* (S2). If the mouse pointer location data retrieved in S1 and the focal point adjacent displaying material shortcut icon location data retrieved in the previous step matches, CPU 211 (FIG. 1) proceeds to the next step (S3). If the focal point adjacent displaying material data implementing command is input via Input Device 210 (FIG. 1) or voice recognition system, CPU 211 (FIG. 1) proceeds to the next step (S4). Here, the focal point adjacent displaying material data implementing command is the command to implement the focal point adjacent displaying material data. CPU 211 (FIG. 1) stores the focal point adjacent displaying material displaying positive data in Focal Point Adjacent Displaying Material Displaying Property Data Storage Area 206727*b*4 (S5). The foregoing sequence is repeated periodically.

This paragraph illustrate(s) Focal Point Adjacent Displaying Material Data Locating Software 206727*c*9 of Communication Device 200, which locate(s) the focal point adjacent displaying material data in the virtual three dimensional space data. In the present embodiment, CPU 211 (FIG. 1) identifies the data stored in Focal Point Adjacent Displaying Material Displaying Property Data Storage Area 206727*b*4 (S1). If the focal point adjacent displaying material displaying positive data is stored in Focal Point Adjacent Displaying Material Displaying Property Data Storage Area 206727*b*4, CPU 211 (FIG. 1) proceeds to the next step (S2). CPU 211 (FIG. 1) retrieves the focal point adjacent displaying material data from Focal Point Adjacent Displaying Material Data Storage Area 206727*b*3*c* (S3). CPU 211 (FIG. 1) retrieves the focal point adjacent displaying material location data from Focal Point Adjacent Displaying Material Location Data Storage Area 206727*b*2*c* (S4). CPU 211 (FIG. 1) locates the focal point adjacent displaying material data retrieved in S3 at the location corresponding to the focal point adjacent displaying material location data retrieved in the previous step in the virtual three dimensional space data stored in Virtual Three Dimensional Space Data Storage Area 206727*b*1 (S5). The foregoing sequence is repeated periodically.

This paragraph illustrate(s) Current Location Data Producing Software 206727*c*10 of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step (S2). CPU 211 (FIG. 1) stores the current location data produced in the previous step in Current Location Data Storage Area 206727*b*7 (S3). The foregoing sequence is repeated periodically.

This paragraph illustrate(s) Current Location Icon Data Locating Software 206727*c*11 of Communication Device 200, which locate(s) the map data in the virtual three dimensional space data. In the present embodiment, CPU 211 (FIG. 1) retrieves the map data from Map Data Storage Area 206727*b*8 (S1). CPU 211 (FIG. 1) locates the map data retrieved in the previous step at a certain location in the virtual three dimensional space data stored in Virtual Three Dimensional Space Data Storage Area 206727*b*1 (S2). CPU 211 (FIG. 1) retrieves the current location icon data from Current Location Icon Data Storage Area 206727*b*9 (S3). CPU 211 (FIG. 1) retrieves the current location data from Current Location Data Storage Area 206727*b*7 (S4). CPU 211 (FIG. 1) locates the current location icon data retrieved in S3 at the location corresponding to the current location data retrieved in the previous step on the map data located in S2 (S5). The foregoing sequence is repeated periodically.

This paragraph illustrate(s) Left Perspective View Data Producing Software 206727*c*12 of Communication Device 200, which produce(s) the left perspective view data. In the present embodiment, CPU 211 (FIG. 1) retrieves the virtual three dimensional space data from Virtual Three Dimensional Space Data Storage Area 206727*b*1 (S1). Here, the focal point icon data, the focal point adjacent displaying material shortcut icon data, the focal point adjacent displaying material data, the mouse pointer data, and/or the map data (with the current location icon data located thereon) located in the virtual three dimensional space data are also retrieved therefrom. CPU 211 (FIG. 1) retrieves the left virtual eye location data from Left Virtual Eye Location Data Storage Area 206727*b*5*a* (S2). CPU 211 (FIG. 1) produces the two dimensional image indicating the perspective view of the virtual three dimensional space data retrieved in S1 perceived from the location indicated by the left virtual eye location data retrieved in the previous step (S3). CPU 211 (FIG. 1) stores the two dimensional image produced in the previous step as the left perspective view data in Left Perspective View Data Storage Area 206727*b*6*a* (S4). The foregoing sequence is repeated periodically.

This paragraph illustrate(s) Right Perspective View Data Producing Software 206727*c*13 of Communication Device 200, which produce(s) the right perspective view data. In the present embodiment, CPU 211 (FIG. 1) retrieves the virtual three dimensional space data from Virtual Three Dimensional Space Data Storage Area 206727*b*1 (S1). Here, the focal point icon data, the focal point adjacent displaying material shortcut icon data, the focal point adjacent displaying material data, the mouse pointer data, and/or the map data (with the current location icon data located thereon) located in the virtual three dimensional space data are also retrieved therefrom. CPU 211 (FIG. 1) retrieves the right virtual eye location data from Right Virtual Eye Location Data Storage Area 206727*b*5*b* (S2). CPU 211 (FIG. 1) produces the two dimensional image indicating the perspective view of the virtual three dimensional space data retrieved in S1 perceived from the location indicated by the right virtual eye location data retrieved in the previous step (S3). CPU 211 (FIG. 1) stores the two dimensional image produced in the previous step as the right perspective view data in Right Perspective View Data Storage Area 206727*b*6*b* (S4). The foregoing sequence is repeated periodically.

This paragraph illustrate(s) Left Perspective View Data Displaying Software 206727*c*14 of Communication Device 200, which display(s) the left perspective view data. In the present embodiment, CPU 211 (FIG. 1) retrieves the left perspective view data from Left Perspective View Data Storage Area 206727*b*6*a* (S1). CPU 211 (FIG. 1) displays the left perspective view data on Left Eye Displaying Device LEDD727 (S2). The foregoing sequence is repeated periodically.

This paragraph illustrate(s) Right Perspective View Data Displaying Software 206727*c*15 of Communication Device 200, which display(s) the right perspective view data. In the present embodiment, CPU 211 (FIG. 1) retrieves the right perspective view data from Right Perspective View Data Storage Area 206727*b*6*b* (S1). CPU 211 (FIG. 1) displays the right perspective view data on Right Eye Displaying Device REDD727 (S2). By utilizing the method of binocular disparity, the user perceives the virtual three dimensional space data, the focal point icon data, the focal point adjacent displaying material shortcut icon data, the focal point adjacent displaying material data, and/or the mouse pointer data located therein in a three dimensional manner. The foregoing sequence is repeated periodically.

INCORPORATION BY REFERENCE

The following paragraphs and drawings described in U.S. Ser. No. 12/166,478, filed 2008 Jul. 2, are particularly incorporated to this application by reference: the preamble described in paragraph [2149] (no drawings); Communication Device 200 (Voice Communication Mode) described in paragraphs [2150] through [2155] (FIGS. 1 through 2c); Voice Recognition System described in paragraphs [2156] through [2188] (FIGS. 3 through 19); Positioning System described in paragraphs [2189] through [2220] (FIGS. 20a through 32e); Auto Backup System described in paragraphs [2221] through [2230] (FIGS. 33 through 37); Signal Amplifier described in paragraphs [2231] through [2236] (FIG. 38); Audio/Video Data Capturing System described in paragraphs [2237] through [2249] (FIGS. 39 through 44b); Digital Mirror Function (1) described in paragraphs [2250] through [2258] (FIGS. 44c through 44e); Caller ID System described in paragraphs [2259] through [2266] (FIGS. 45 through 47); Stock Purchasing Function described in paragraphs [2267] through [2276] (FIGS. 48 through 52); Timer Email Function described in paragraphs [2277] through [2283] (FIGS. 53a and 53b); Call Blocking Function described in paragraphs [2284] through [2297] (FIGS. 54 through 59); Online Payment Function described in paragraphs [2298] through [2307] (FIGS. 60 through 64); Navigation System described in paragraphs [2308] through [2330] (FIGS. 65 through 74a); Remote Controlling System described in paragraphs [2331] through [2349] (FIGS. 75 through 85); Auto Emergency Calling System described in paragraphs [2350] through [2358] (FIGS. 86 and 87); Cellular TV Function described in paragraphs [2359] through [2443] (FIGS. 88 through 135); 3D Video Game Function described in paragraphs [2444] through [2456] (FIGS. 136 through 144); Digital Mirror Function (2) described in paragraphs [2457] through [2466] (FIGS. 145 through 155); Voice Recognition Sys—E-mail (2) described in paragraphs [2467] through [2475] (FIGS. 156 through 160); Positioning System—GPS Search Engine described in paragraphs [2476] through [2518] (FIGS. 161 through 182); Mobile Ignition Key Function described in paragraphs [2519] through [2541] (FIGS. 183 through 201); Voice Print Authentication System described in paragraphs [2542] through [2552] (FIGS. 202 through 211); Fingerprint Authentication System described in paragraphs [2553] through [2565] (FIGS. 212 through 221); Auto Time Adjust Function described in paragraphs [2566] through [2570] (FIGS. 222 through 224); Video/Photo Mode described in paragraphs [2571] through [2599] (FIGS. 225 through 242); Call Taxi Function described in paragraphs [2600] through [2640] (FIGS. 243 through 269); Shooting Video Game Function described in paragraphs [2641] through [2657] (FIGS. 270 through 283); Driving Video Game Function described in paragraphs [2658] through [2671] (FIGS. 284 through 294); Address Book Updating Function described in paragraphs [2672] through [2692] (FIGS. 295 through 312); Batch Address Book Updating Function—With Host described in paragraphs through [2714] (FIGS. 313 through 329); Batch Address Book Updating Function—Peer-To-Peer Connection described in paragraphs [2715] through [2719] (FIGS. 329a through 329c); Batch Scheduler Updating Function—With Host described in paragraphs [2720] through [2743] (FIGS. 330 through 350); Batch Scheduler Updating Function—Peer-To-Peer Connection described in paragraphs [2744] through [2748] (FIGS. 351 and 352); Calculator Function described in paragraphs [2749] through [2754] (FIGS. 353 through 356); Spreadsheet Function described in paragraphs [2755] through [2762] (FIGS. 357 through 360); Word Processing Function described in paragraphs [2763] through [2778] (FIGS. 361 through 373); TV Remote Controller Function described in paragraphs [2779] through [2801] (FIGS. 374 through 394); CD/PC Inter-communicating Function described in paragraphs [2802] through [2826] (FIGS. 413 through 427); PDWR Sound Selecting Function described in paragraphs [2827] through [2863] (FIGS. 428 through 456); Start Up Software Function described in paragraphs [2864] through [2880] (FIGS. 457 through 466); Another Embodiment Of Communication Device 200 described in paragraphs [2881] through [2885] (FIGS. 467a through 467d); Stereo Audio Data Output Function described in paragraphs [2886] through [2905] (FIGS. 468 through 479); Stereo Visual Data Output Function described in paragraphs [2906] through [2925] (FIGS. 480 through 491); Multiple Signal Processing Function described in paragraphs [2926] through [2998] (FIGS. 492 through 529); Positioning System—Pin-pointing Function described in paragraphs [2999] through [3032] (FIGS. 530 through 553); Artificial Satellite Host described in paragraphs [3033] through [3051] (FIGS. 554 through 567); CCD Bar Code Reader Function described in paragraphs [3052] through [3073] (FIGS. 568 through 579); Online Renting Function described in paragraphs [3074] through [3151] (FIGS. 580 through 633); SOS Calling Function described in paragraphs [3152] through [3172] (FIGS. 634 through 645); Input Device described in paragraphs [3173] through [3178] (FIGS. 646 through 650); PC Remote Controlling Function described in paragraphs [3179] through [3214] (FIGS. 651 through 670); PC Remote Downloading Function described in paragraphs [3215] through [3264] (FIGS. 671 through 701); Audiovisual Playback Function described in paragraphs [3265] through [3290] (FIGS. 702 through 716); Audio Playback Function described in paragraphs [3291] through [3315] (FIGS. 717 through 731); Ticket Purchasing Function described in paragraphs [3316] through [3345] (FIGS. 732 through 753); Remote Data Erasing Function described in paragraphs [3346] through [3375] (FIGS. 754 through 774); Business Card Function described in paragraphs [3376] through [3392] (FIGS. 775 through 783); Game Vibrating Function described in paragraphs [3393] through [3403] (FIGS. 784 through 786); Part-time Job Finding Function described in paragraphs [3404] through [3424] (FIGS. 787 through 801); Parking Lot Finding Function described in paragraphs [3425] through [3464] (FIGS. 802 through 832); Parts Upgradable Communication Device described in paragraphs [3465] through [3490] (FIGS. 833a through 833x); On Demand TV Function described in paragraphs [3491] through [3521] (FIGS. 834 through 855); Inter-communicating TV Function described in paragraphs [3522] through [3556] (FIGS. 856 through 882); Display Controlling Function described in paragraphs [3557] through [3574] (FIGS. 883 through 894); Multiple Party Communicating Function described in paragraphs [3575] through [3608] (FIGS. 894a through 917); Display Brightness Controlling Function described in paragraphs [3609] through [3618] (FIGS. 918 through 923); Multiple Party Pin-pointing Function described in paragraphs [3619] through [3666] (FIGS. 924 through 950f); Digital Camera Function described in paragraphs [3667] through [3694] (FIGS. 951 through 968); Phone Number Linking Function described in paragraphs [3695] through [3718] (FIGS. 968a through 983); Multiple Window Displaying Function described in paragraphs [3719] through [3737] (FIGS. 984 through 995); Mouse Pointer Displaying Function described in paragraphs [3738] through [3775] (FIGS. 996 through 1021); House Item Pin-pointing Function described in paragraphs [3776] through [3935] (FIGS. 1022 through 1152); Membership Administrating Function described in paragraphs [3936] through [3978] (FIGS. 1153 through 1188); Keyword Search Timer Recording Function described in paragraphs [3979] through [4070] (FIGS. 1189 through 1254); Weather Forecast Displaying Function described in paragraphs [4071] through [4112] (FIGS. 1255 through 1288); Multiple Language Displaying Function described in paragraphs [4113] through [4170] (FIGS. 1289 through 1331); Caller's Information Displaying Function described in paragraphs [4171] through [4224] (FIGS. 1332 through 1375); Communication Device Remote Controlling Function (By Phone) described in paragraphs [4225] through [4265] (FIGS. 1394 through 1415); Communication Device Remote Controlling Function (By Web) described in paragraphs [4266] through [4306] (FIGS. 1416 through 1437); Shortcut Icon Displaying Function described in paragraphs [4307] through [4334] (FIGS. 1438 through 1455); Task Tray Icon Displaying Function described in paragraphs [4335] through [4357] (FIGS. 1456 through 1470); Multiple Channel Processing Function described in paragraphs [4358] through [4405] (FIGS. 1471 through 1498); Solar Battery Charging Function described in paragraphs [4406] through [4419] (FIGS. 1499 through 1509); OS Updating Function described in paragraphs [4420] through [4487] (FIGS. 1510 through 1575); Device Managing Function described in paragraphs [4488] through [4505] (FIGS. 1576 through 1587); Automobile Controlling Function described in paragraphs [4506] through [4554] (FIGS. 1588 through 1627); OCR Function described in paragraphs [4555] through [4590] (FIGS. 1628 through 1652); Real-time GPS Function described in paragraphs [4591] through [4660] (FIGS. 1653 through 1712); CCD Video Stabilizing Function described in paragraphs [4661] through [4692] (FIGS. 1713 through 1736); DVD Remote Controlling Function described in paragraphs [4693] through [4731] (FIGS. 1737 through 1757); Dual Frame Buffer Implementing Function described in paragraphs [4732] through [4748] (FIGS. 1758 through 1767);

Mouse Pointer Image Auto Changing Function described in paragraphs [4749] through [4762] (FIGS. 1768 through 1774); Dual CCD Camera Function described in paragraphs [4763] through [4783] (FIGS. 1775a through 1786); Radio Tuner Function described in paragraphs [4784] through [4814] (FIGS. 1787 through 1812); Registered Voice Recognizing Function described in paragraphs [4815] through [4854] (FIGS. 1813 through 1842); Host's TV Resolution Converting Function described in paragraphs [4855] through [4884] (FIGS. 1843 through 1864); Voice Shortcut Recognizing Function described in paragraphs [4885] through [4919] (FIGS. 1865 through 1889); Vital Sign Monitoring Function described in paragraphs [4920] through [5009] (FIGS. 1890a through 1954); Three-Dimensional Map described in (FIGS. 2 and 3); Auto Collision Avoiding Function described in (FIGS. 4 through 7); Remote Controlling System described in (FIG. 8a through FIG. 10); Emergency Landing System described in (FIG. 11 through FIG. 12b); Connection Between Host H And Carrier 300 described in (FIG. 13); 3D Map Data Updating Function described in (FIGS. 16 through 30); Auto Collision Avoiding Function—Other Embodiments described in (FIGS. 31 through 34); Satellite TV Function described in (FIGS. 35 through 50); Wireless Communication Facilitating System described in (FIGS. 51 through 64b); Three-Dimensional Map described in (??); Attached File Emailing Function described in paragraphs [5009.1] through [5009.13] (FIGS. 1955 through 1961); Movie eTicket Function described in paragraphs [5009.14] through [5009.66] (FIGS. 1962 through 2002); Carrier Prepaid eCard Function described in paragraphs [5009.67] through [5009.104] (FIGS. 2003 through 2032); Carrier ePass Function described in paragraphs [5009.105] through [5009.144] (FIGS. 2033 through 2061b); Communication Device 200 Installed In Carrier described in paragraphs [5009.145] and [5009.146] (FIG. 2062); Wireless Communication Facilitating System described in paragraphs [5009.147] through [5009.176] (FIGS. 2063 through 2076b); In-Carrier Notifying Function described in paragraphs [5009.177] through [5009.207] (FIGS. 2077 through 2093); Station Name Notifying Function described in paragraphs [5009.208] through [5009.237] (FIGS. 2094 through 2110); Restaurant eMenu Function described in paragraphs [5009.238] through [5009.280] (FIGS. 2111 through 2144); Geographic Location Recording Function described in paragraphs [5009.281] through [5009.322] (FIGS. 2145 through 2176b); CCD Dictionary Function described in paragraphs [5009.323] through [5009.347] (FIGS. 2177 through 2195b); Schedule Notifying Function described in paragraphs [5009.348] through [5009.374] (FIGS. 2196 through 2215); Customized Device Purchasing System described in paragraphs [5009.375] through [5009.415] (FIGS. 2216 through 2250); Multiple Type TV Program Distributing System described in paragraphs [5009.416] through [5009.446] (FIGS. 2251 through 2274); Multiple TV Screen Displaying Function described in paragraphs [5009.447] through [5009.478] (FIGS. 2275 through 2297); Touch Panel Function described in paragraphs [5009.479] through [5009.504] (FIGS. 2298 through 2315); Communication Device Finding Function described in paragraphs [5009.505] through [5009.516] (FIGS. 2316 through 2322); Carrier Safety Measure Controlling Function described in paragraphs [5009.517] through [5009.551] (FIGS. 2323 through 2342); Product Information Retrieving Function (CCD) described in paragraphs [5009.552] through [5009.580] (FIGS. 2343 through 2360); Product Information Stored Chip Function described in paragraphs [5009.581] through [5009.618] (FIGS. 2361 through 2385); Karaoke Playing Function described in paragraphs [5009.619] through [5009.647] (FIGS. 2386 through 2406); Performing Pattern Identifying Anti-Virus Function described in paragraphs [5009.648] through [5009.670] (FIGS. 2407 through 2421); Continue Enabled Video Game Function described in paragraphs [5009.671] through [5009.693] (FIGS. 2422 through 2436); Resume Enabled Video Game Function described in paragraphs [5009.694] through [5009.716] (FIGS. 2437 through 2451); Signal Forwarding Function described in paragraphs [5009.717] through [5009.745] (FIGS. 2452 through 2472); In-Carrier Auto Implementing Mode Function described in paragraphs [5009.746] through [5009.775] (FIGS. 2473 through 2492); Voice Message Displaying Function described in paragraphs [5009.776] through [5009.796] (FIGS. 2493 through 2503c); Human Toes Displaying Function described in paragraphs [5009.797] through [5009.814] (FIGS. 2504 through 2521); Wrinkles/Muscles Displaying Function described in paragraphs [5009.815] through [5009.856] (FIGS. 2522a through 2552e); Protruded Body Part Displaying Function described in paragraphs [5009.857] through [5009.876] (FIGS. 2553 through 2566b); Satellite TV Program Displaying Function described in paragraphs [5009.877] through [5009.921] (FIGS. 2567 through 2601); Definition of Communication Device 200 described in paragraphs [5009.922] and [5009.923] (no drawings); Remote Parameter Setting Function described in paragraphs [5009.924] through [5009.1017] (FIGS. 2602 through 2682); Multiple Sender's Email Address Function described in paragraphs [5009.1018] through [5009.1035] (FIGS. 2683 through 2695); Multiple Phone Number Function described in paragraphs [5009.1036] through [5009.1055] (FIGS. 2696 through 2709); TV Commercial Customizing Function described in paragraphs [5009.1056] through [5009.1085] (FIGS. 2710 through 2732c); Common Video Game Platform Function described in paragraphs [5009.1086] through [5009.1102] (FIGS. 2733 through 2741); Directory Displaying Function described in paragraphs [5009.1103] through [5009.1130] (FIGS. 2742 through 2761); Directory Customizing Function described in paragraphs [5009.1131] through [5009.1186] (FIGS. 2762 through 2807); Host's Directory Customizing Function described in paragraphs [5009.1187] through [5009.1246] (FIGS. 2808 through 2853); Trash Can Function described in paragraphs [5009.1247] through [5009.1295] (FIGS. 2854 through 2895f); Motion Character Displaying Function described in paragraphs [5009.1296] through [5009.1318] (FIGS. 2896 through 2909); Bookmark Displaying Function described in paragraphs [5009.1319] through [5009.1374] (FIGS. 2910 through 2955); CCD/LCD Function described in paragraphs [5009.1375] through [5009.1387] (FIGS. 2956 through 2959b); Pop Up Window Blocking Function described in paragraphs [5009.1388] through [5009.1401] (FIGS. 2960 through 2965); Map Heading Up Function described in paragraphs [5009.1402] through [5009.1421] (FIGS. 2966 through 2976); Copy Once Function described in paragraphs [5009.1422] through [5009.1443] (FIGS. 2977 through 2991); Copy Restricted Software Integrated Data described in paragraphs [5009.1444] through [5009.1457] (FIGS. 2992 through 2998); Folder Sharing Function described in paragraphs [5009.1458] through [5009.1508] (FIGS. 2999 through 3038c); Email Folder Managing Function described in paragraphs [5009.1509] through [5009.1577] (FIGS. 3039 through 3092e); Power On Auto Software Executing Function described in paragraphs [5009.1578] through [5009.1594] (FIGS. 3093 through 3103); Enhanced TV Remote Controlling Function described in paragraphs [5009.1595] through [5009.1639] (FIGS. 3104 through 3137c); 3 CCD Unit Function described in paragraphs

[5009.1640] through [5009.1660] (FIGS. 3138 through 3150c); Multiple Direction Scrolling Function described in paragraphs [5009.1661] through [5009.1762] (FIGS. 3151 through 3238); Radio Frequency Soft Handover Function described in paragraphs [5009.1763] through [5009.1793] (FIGS. 3239 through 3262); Inter Com Function described in paragraphs [5009.1794] through [5009.1816] (FIGS. 3263 through 3277c); Website History Recording Function described in paragraphs [5009.1817] through [5009.1870] (FIGS. 3278 through 3324); Motion Picture Thumbnail Displaying Function described in paragraphs [5009.1871] through [5009.1908] (FIGS. 3325 through 3353b); 2D/3D Map Displaying Function described in paragraphs [5009.1909] through [5009.1952] (FIGS. 3354 through 3380b); Remote Schedule Notifying Function described in paragraphs [5009.1953] through [5009.1975] (FIGS. 3381 through 3393); Remote Email Notifying Function described in paragraphs [5009.1976] through [5009.2000] (FIGS. 3394 through 3406); Remote Document Printing Function described in paragraphs [5009.2001] through [5009.2022] (FIGS. 3407 through 3419b); Anti-virus Protection Identifying Function described in paragraphs [5009.2023] through [5009.2043] (FIGS. 3420 through 3431c); Alphanumeric Phone Number Dialing Function described in paragraphs [5009.2044] through [5009.2076] (FIGS. 3432 through 3453b); Automobile License Number Dialing Function described in paragraphs [5009.2077] through [5009.2109] (FIGS. 3454 through 3475b); Point Card Function described in paragraphs [5009.2110] through [5009.2147] (FIGS. 3476 through 3504c); Display Sharing Function described in paragraphs [5009.2148] through [5009.2169] (FIGS. 3505 through 3516); Email Filtering Function described in paragraphs [5009.2170] through [5009.2212] (FIGS. 3517 through 3549); Received Email Auto Sorting Function described in paragraphs [5009.2213] through [5009.2238] (FIGS. 3550 through 3565b); Sent Email Auto Sorting Function described in paragraphs [5009.2239] through [5009.2264] (FIGS. 3566 through 3581b); Country Name Displaying Function described in paragraphs [5009.2265] through [5009.2286] (FIGS. 3582 through 3595); Email Attached File Splitting Function described in paragraphs [5009.2287] through [5009.2300] (FIGS. 3596 through 3603c); Auto TV Starting Function described in paragraphs [5009.2301] through [5009.2329] (FIGS. 3604 through 3623); Enhanced TV Program Replaying Function (Communication Device 200) described in paragraphs [5009.2330] through [5009.2361] (FIGS. 3624 through 3648b); Enhanced TV Program Replaying Function (Host H) described in paragraphs [5009.2362] through [5009.2400] (FIGS. 3649 through 3680b); Enhanced TV Program Replaying Function (Devices A and B) described in paragraphs [5009.2401] through [5009.2440] (FIGS. 3681 through 3712b); Enhanced TV Program Replaying Function (Host H, and Devices A and B) described in paragraphs [5009.2441] through [5009.2491] (FIGS. 3713 through 3754b); TV Commercial Skipping Function described in paragraphs [5009.2492] through [5009.2516] (FIGS. 3755 through 3772); Timer Schedule Auto Changing Function described in paragraphs [5009.2517] through [5009.2542] (FIGS. 3773 through 3789); Remote Alarm Setting Function described in paragraphs [5009.2543] through [5009.2585] (FIGS. 3789a through 3817b); Current Location Non-notifying Function described in paragraphs [5009.2586] through [5009.2612] (FIGS. 3818 through 3833); Device Remotely Locking Function described in paragraphs [5009.2613] through [5009.2644] (FIGS. 3834 through 3857); EZ Macro Function described in paragraphs [5009.2645] through [5009.2668] (FIGS. 3858 through 3873b); Alcohol Level Identifying Function described in paragraphs [5009.2669] through [5009.2694] (FIGS. 3874 through 3889b); Displayed Visual Data Size Modifying Function described in paragraphs [5009.2695] through [5009.2729] (FIGS. 3890 through 3915); Button Size Changing Function described in paragraphs [5009.2730] through [5009.2758] (FIGS. 3916 through 3937); Epayment Sound Selecting Function described in paragraphs [5009.2759] through [5009.2778] (FIGS. 3938 through 3950c); Multiple TV Program Recording Function described in paragraphs [5009.2779] through [5009.2823] (FIGS. 3951 through 3988); TV Program Data Trashcan Function described in paragraphs [5009.2824] through [5009.2856] (FIGS. 3989 through 4010b); Ereceipt Producing Function described in paragraphs [5009.2857] through [5009.2888] (FIGS. 4011 through 4033); Memo Sharing Function described in paragraphs [5009.2889] through [5009.2930] (FIGS. 4034 through 4064); Selected Function Remotely Freezing Function described in paragraphs [5009.2931] through [5009.2964] (FIGS. 4065 through 4085); Selected Software Remotely Activating Function described in paragraphs [5009.2965] through [5009.2998] (FIGS. 4086 through 4106); Selected Function Remotely Activating Function described in paragraphs [5009.2999] through [5009.3032] (FIGS. 4107 through 4127); Selected Software Remotely Freezing Function described in paragraphs [5009.3033] through [5009.3066] (FIGS. 4128 through 4148); Selected Data Remotely Deleting Function described in paragraphs [5009.3067] through [5009.3100] (FIGS. 4149 through 4169); Web Cash Memory Function described in paragraphs [5009.3101] through [5009.3122] (FIGS. 4170 through 4183b); Keypad Auto Unlocking Function described in paragraphs [5009.3123] through [5009.3145] (FIGS. 4184 through 4199); Voice Recog Sys Auto Unlocking Function described in paragraphs [5009.3146] through [5009.3168] (FIGS. 4200 through 4215); Upgraded Voice Recog Sys Auto Unlocking Function described in paragraphs [5009.3169] through [5009.3192] (FIGS. 4216 through 4231); TV Program Information Displaying Function described in paragraphs [5009.3193] through [5009.3215] (FIGS. 4232 through 4247b); Best Signal Auto Selecting Function described in paragraphs [5009.3216] through [5009.3269] (FIGS. 4248 through 4291); Software Timer Activating Function described in paragraphs [5009.3270] through [5009.3295] (FIGS. 4292 through 4305b); Software Timer Terminating Function described in paragraphs [5009.3296] through [5009.3321] (FIGS. 4306 through 4319b); Software Timer Deleting Function described in paragraphs [5009.3322] through [5009.3347] (FIGS. 4320 through 4333b); TV Phone Recording Function described in paragraphs [5009.3348] through [5009.3381] (FIGS. 4334 through 4358b); Hybrid GPS Function described in paragraphs [5009.3382] through [5009.3421] (FIGS. 4359 through 4381); Elevator Controlling Function described in paragraphs [5009.3422] through [5009.3447] (FIGS. 4382 through 4397); Device Migrating Function described in paragraphs [5009.3448] through [5009.3509] (FIGS. 4398 through 4445b); Cordless Phone Connecting Function described in paragraphs [5009.3510] through [5009.3547] (FIGS. 4446 through 4474b); Cash Deposit Function described in paragraphs [5009.3548] through [5009.3585] (FIGS. 4475 through 4497d); Highway Fee Auto Paying Function described in paragraphs [5009.3586] through [5009.3616] (FIGS. 4498 through 45180; By Distance Auto Action Function described in paragraphs [5009.3617] through [5009.3639] (FIGS. 4519 through 4532); Emoney Transferring Function described in paragraphs [5009.3640] through [5009.3666] (FIGS. 4533 through 4548c); Coupon Disposing Function described in paragraphs [5009.3667] through [5009.3698] (FIGS. 4549 through 4569); Multiple Device Searching Function described in paragraphs [5009.3699] through [5009.3717] (FIGS. 4570 through 4581b); Battery Meter Notifying Function described in paragraphs [5009.3718] through [5009.3737] (FIGS. 4582 through 4593b); Software Infrared Transmitting Function described in paragraphs [5009.3738] through [5009.3759] (FIGS. 4594 through 4606); Electronic Key Function described in paragraphs [5009.3760] through [5009.3824] (FIGS. 4607 through 4647b); Automobile Status Monitoring Function described in paragraphs [5009.3825] through [5009.3885] (FIGS. 4648 through 4691); Enhanced Business Card Transferring Function described in paragraphs [5009.3886] through [5009.3928] (FIGS. 4692 through 4720c); Removal Media Data Transferring Function described in paragraphs [5009.3929] through [5009.3954] (FIGS. 4721 through 4737c); Audiovisual Data Sharing Function described in paragraphs [5009.3955] through [5009.3992] (FIGS. 4738 through 4763b); Email Attachment Supplementing Function described in paragraphs [5009.3993] through [5009.4012] (FIGS. 4764 through 4775c); Other Device File Emailing Function described in paragraphs [5009.4013] through [5009.4043] (FIGS. 4776 through 4799b); Slide Authoring Function described in paragraphs [5009.4044] through [5009.4082] (FIGS. 4800 through 4828); Remote/Local Credit Card Transaction Function described in paragraphs [5009.4083] through [5009.4119] (FIGS. 4829 through 4855d); Unread Email Sorting Function described in paragraphs [5009.4120] through [5009.4166] (FIGS. 4856 through 4890); TV Program Replying Function described in paragraphs [5009.4167] through [5009.4200] (FIGS. 4891 through 4914); PC Keyboard Function described in paragraphs [5009.4201] through [5009.4212] (FIGS. 4915 through 4920b); Antenna Mark Displaying Function described in paragraphs [5009.4213] through [5009.4228] (FIGS. 4921 through 4928b); Enhanced Caller ID Displaying Function described in paragraphs [5009.4229] through [5009.4264] (FIGS. 4929 through 4951c); Enhanced Call Waiting Function described in paragraphs [5009.4265] through [5009.4300] (FIGS. 4952 through 4974c); Phonebook Auto Icon Displaying Function described in paragraphs [5009.4301] through [5009.4332] (FIGS. 4975 through 4996); One Click Call Back Function described in paragraphs [5009.4333] through [5009.4357] (FIGS. 4997 through 5014); Phone Conversation Storing Function described in paragraphs [5009.4358] through [5009.4386] (FIGS. 5015 through 5031c); Caller ID Requesting Function described in paragraphs [5009.4387] through [5009.4410] (FIGS. 5032 through 5045c); Phone Call Audio Notifying Function described in paragraphs [5009.4411] through [5009.4433] (FIGS. 5046 through 5059c); Entry Phone Function described in paragraphs [5009.4434] through [5009.4459] (FIGS. 5060 through 5074b); FAX Sending/Receiving Function described in paragraphs [5009.4460] through [5009.4505] (FIGS. 5075 through 5108b); Other Device's Phone Book Utilizing Function described in paragraphs [5009.4506] through [5009.4536] (FIGS. 5109 through 5128); Multiple Program Executing Function described in paragraphs [5009.4537] through [5009.4564] (FIGS. 5129 through 5148); Removal Medium Operating Function described in paragraphs [5009.4565] through [5009.4601] (FIGS. 5149 through 5178); Removal Medium Audiovisual Data Recording Function described in paragraphs [5009.4602] through [5009.4629] (FIGS. 5178a through 5199); Nearest Printer Selecting Function described in paragraphs [5009.4630] through [5009.4656] (FIGS. 5200 through 5216d); In-Cabin Com Function described in paragraphs [5009.4657] through [5009.4680] (FIGS. 5217 through 5233c); Carrier Current Condition Notifying Function described in paragraphs [5009.4681] through [5009.4710] (FIGS. 5234 through 5251b); Virtual Space Creating Function described in paragraphs [5009.4711] through [5009.4743] (FIGS. 5252 through 5274); Security Camera Function described in paragraphs [5009.4744] through [5009.4778] (FIGS. 5275 through 5295); Remote Camera Controlling Function described in paragraphs [5009.4779] through [5009.4820] (FIGS. 5296 through 5326); Day/Night Camera Function described in paragraphs [5009.4821] through [5009.4851] (FIGS. 5327 through 5346); Multiple Wireless Signal Handover Function described in paragraphs [5009.4852] through [5009.4897] (FIGS. 5347 through 5365); Multiple Tab Web Browsing Function described in paragraphs [5009.4898] through [5009.4926] (FIGS. 5366 through 5388); Multiple Tab Visual Data Viewing Function described in paragraphs [5009.4927] through [5009.4955] (FIGS. 5389 through 5411); Multiple Tab Document Data Viewing Function described in paragraphs [5009.4956] through [5009.4984] (FIGS. 5412 through 5434); Multiple Tab Email Data Viewing Function described in paragraphs [5009.4985] through [5009.5013] (FIGS. 5435 through 5457); Convenient TV Remote Controlling Function described in paragraphs [5009.5014] through [5009.5034] (FIGS. 5458 through 5471); Form Auto Filling Function described in paragraphs [5009.5035] through [5009.5072] (FIGS. 5472 through 5495e); Hybrid Carrier Function described in paragraphs [5009.5073] through [5009.5105] (FIGS. 5496 through 5522b); Carrier Current Condition Monitoring Function described in paragraphs [5009.5106] through [5009.5141] (FIGS. 5523 through 5546c); Memory Defragmenting Function described in paragraphs [5009.5142] through [5009.5175] (FIGS. 5547 through 5568); Memory Formatting Function described in paragraphs [5009.5176] through [5009.5209] (FIGS. 5569 through 5590); Memory Partitioning Function described in paragraphs [5009.5210] through [5009.5243] (FIGS. 5591 through 5612); TV Phone Pausing Function described in paragraphs [5009.5244] through [5009.5268] (FIGS. 5613 through 5629); Reflecting Object Displaying Function described in paragraphs [5009.5269] through [5009.5294] (FIGS. 5630 through 5648c); Alternative TV Program Receiving Function described in paragraphs [5009.5295] through [5009.5325] (FIGS. 5649 through 5670c); Alternative Radio Program Receiving Function described in paragraphs [5009.5326] through [5009.5356] (FIGS. 5671 through 5692c); Audiovisual Auto Fading Function described in paragraphs [5009.5357] through [5009.5377] (FIGS. 5693 through 5706); Audio Auto Fading Function described in paragraphs [5009.5378] through [5009.5398] (FIGS. 5707 through 5720); Video-In-Video Displaying Function described in paragraphs [5009.5399] through [5009.5431] (FIGS. 5721 through 5747b); Pre-Installed Item Purchasing Function described in paragraphs [5009.5432] through [5009.5470] (FIGS. 5748 through 5775b); Multiple CPU Function described in paragraphs [5009.5471] through [5009.5476] (FIGS. 5776 and 5777); Radio Music Downloading Function described in paragraphs [5009.5477] through [5009.5516] (FIGS. 5778 through 5807); File Auto Saving Function described in paragraphs [5009.5517] through [5009.5559] (FIGS. 5808 through 5837b); TV Tuner Function described in paragraphs [5009.5560] through [5009.5600] (FIGS. 5838 through 5866); GPS Receiver's Log Function described in paragraphs [5009.5601] through [5009.5629] (FIGS. 5867 through 5884b); Remote Room Light Controlling Function described in paragraphs [5009.5630] through [5009.5662] (FIGS. 5885 through 5906b); Remote Kitchen Stove Controlling Function described in paragraphs [5009.5663] through [5009.5695] (FIGS. 5907 through 5928b); Remote Refrigerator Controlling Function described in paragraphs [5009.5696] through [5009.5728] (FIGS. 5929 through 5950b); Remote Washing Machine Controlling Function described in paragraphs [5009.5729] through [5009.5761] (FIGS. 5951 through 5972b); Remote Faucet Controlling Function described in paragraphs [5009.5762] through [5009.5794] (FIGS. 5973 through 5994b); Remote Door Lock Controlling Function described in paragraphs [5009.5795] through [5009.5827] (FIGS. 5995 through 6016b); Remote Air Conditioner Controlling Function described in paragraphs [5009.5828] through [5009.5860] (FIGS. 6017 through 6038b); Remote Vending Machine Controlling Function described in paragraphs [5009.5861] through [5009.5893] (FIGS. 6039 through 6060b); Remote Video Recorder Controlling Function described in paragraphs [5009.5894] through [5009.5926] (FIGS. 6061 through 6082b); Remote Printer Controlling Function described in paragraphs [5009.5927] through [5009.5959] (FIGS. 6083 through 6104b); Remote Camera Controlling Function described in paragraphs [5009.5960] through [5009.5992] (FIGS. 6105 through 6126b); Remote TV Tuner Controlling Function described in paragraphs [5009.5993] through [5009.6025] (FIGS. 6127 through 6148b); Remote Radio Tuner Controlling Function described in paragraphs [5009.6026] through [5009.6058] (FIGS. 6149 through 6170b); Remote Computer Controlling Function described in paragraphs [5009.6059] through [5009.6091] (FIGS. 6171 through 6192b); Remote Carrier Controlling Function described in paragraphs [5009.6092] through [5009.6124] (FIGS. 6193 through 6214b); Remote Food Processor Controlling Function described in paragraphs [5009.6125] through [5009.6157] (FIGS. 6215 and 6236b); Remote Dryer Controlling Function described in paragraphs [5009.6158] through [5009.6190] (FIGS. 6237 and 6258b); Remote Rice Cooker Controlling Function described in paragraphs [5009.6191] through [5009.6223] (FIGS. 6259 and 6280b); Remote Sound Outputting Device Controlling Function described in paragraphs [5009.6224] through [5009.6256] (FIGS. 6281 and 6302b); Remote Vacuum Cleaner Controlling Function described in paragraphs [5009.6257] through [5009.6289] (FIGS. 6303 and 6324b); Remote FAX Machine Controlling Function described in paragraphs [5009.6290] through [5009.6322] (FIGS. 6325 and 6346b); Remote Copying Machine Controlling Function described in paragraphs [5009.6323] through [5009.6355] (FIGS. 6347 and 6368b); Remote Coffee Maker Controlling Function described in paragraphs [5009.6356] through [5009.6388] (FIGS. 6369 and 6390b); Remote Scanner Controlling Function described in paragraphs [5009.6389] through [5009.6421] (FIGS. 6391 and 6412b); Remote Clothes Iron Controlling Function described in paragraphs [5009.6422] through [5009.6454] (FIGS. 6413 and 6434b); Remote Escalator Controlling Function described in paragraphs [5009.6455] through [5009.6487] (FIGS. 6435 and 6456b); Vending Machine Accessing Function described in paragraphs [5009.6488] through [5009.6527] (FIGS. 6457 through 6485d); Audiovisual Data Shuffling Function described in paragraphs [5009.6528] through [5009.6551] (FIGS. 6486 through 6503b); Unknown File Icon Displaying Function described in paragraphs [5009.6552] through [5009.6575] (FIGS. 6504 through 6521c); Audiovisual Document Producing Function described in paragraphs [5009.6576] through [5009.6601] (FIGS. 6522 through 6539b); Audiovisual Data Searching Function described in paragraphs [5009.6602] through [5009.6626] (FIGS. 6540 through 6558b); Finger Print Log-on Function described in paragraphs [5009.6627] through [5009.6645] (FIGS. 6559 through 6571c); Voice Print Log-on Function described in paragraphs [5009.6646] through [5009.6663] (FIGS. 6572 through 6583c); Finger Print Screen Saver Deactivating Function described in paragraphs [5009.6664] through [5009.6682] (FIGS. 6584 through 6596c); Voice Print Screen Saver Deactivating Function described in paragraphs [5009.6683] through [5009.6700] (FIGS. 6597 through 6608c); Finger Print Folder Accessing Function described in paragraphs [5009.6701] through [5009.6719] (FIGS. 6609 through 6621c); Voice Print Folder Accessing Function described in paragraphs [5009.6720] through [5009.6737] (FIGS. 6622 through 6633c); Finger Print File Accessing Function described in paragraphs [5009.6738] through [5009.6756] (FIGS. 6634 through 6646c); Voice Print File Accessing Function described in paragraphs [5009.6757] through [5009.6774] (FIGS. 6647 through 6658c); Finger Print Internet Accessing Function described in paragraphs [5009.6775] through [5009.6793] (FIGS. 6659 through 6671c); Voice Print Internet Accessing Function described in paragraphs [5009.6794] through [5009.6811] (FIGS. 6672 through 6683c); Finger Print PC Log-on Function described in paragraphs [5009.6812] through [5009.6838] (FIGS. 6684 through 6703b); Voice Print PC Log-on Function described in paragraphs [5009.6839] through [5009.6864] (FIGS. 6704 through 6722b); Finger Print PC Screen Saver Deactivating Function described in paragraphs [5009.6865] through [5009.6891] (FIGS. 6723 through 6742b); Voice Print PC Screen Saver Deactivating Function described in paragraphs [5009.6892] through [5009.6917] (FIGS. 6743 through 6761b); Finger Print PC Folder Accessing Function described in paragraphs [5009.6918] through [5009.6944] (FIGS. 6762 through 6781b); Voice Print PC Folder Accessing Function described in paragraphs [5009.6945] through [5009.6970] (FIGS. 6782 through 6800b); Finger Print PC File Accessing Function described in paragraphs [5009.6971] through [5009.6997] (FIGS. 6801 through 6820b); Voice Print PC File Accessing Function described in paragraphs [5009.6998] through [5009.7023] (FIGS. 6821 through 6839b); Finger Print PC Internet Accessing Function described in paragraphs [5009.7024] through [5009.7050] (FIGS. 6840 through 6859b); Voice Print PC Internet Accessing Function described in paragraphs [5009.7051] through [5009.7076] (FIGS. 6860 through 6878b); Shock Proof Memory Function described in paragraphs [5009.7077] through [5009.7093] (FIGS. 6879 through 6889b); Remote Audiovisual Device Controlling Function described in paragraphs [5009.7094] through [5009.7133] (FIGS. 6890 through 6916); Direct TV-Audio Phone Switching Function described in paragraphs [5009.7134] through [5009.7157] (FIGS. 6917 through 6932b); Audiovisual Data Downloading Function described in paragraphs [5009.7158] through [5009.7218] (FIGS. 6933 through 6972); Audio Data Downloading Function described in paragraphs [5009.7219] through [5009.7279] (FIGS. 6973 through 7012); Self-Active Encrypted Image Reader Function described in paragraphs [5009.7280] through [5009.7301] (FIGS. 7013 through 7028c); Robot Remote Controlling Function described in paragraphs [5009.7302] through [5009.7371] (FIGS. 7029 through 7071b); Home Page Displaying Function described in paragraphs [5009.7372] through [5009.7396] (FIGS. 7072 through 7090); Multiple OS Operating Function described in paragraphs [5009.7397] through [5009.7442] (FIGS. 7091 through 7130c); Audiovisual Conversation Data Forwarding Function described in paragraphs [5009.7443] through [5009.7465] (FIGS. 7131 through 7146b); Audio Conversation Data Forwarding Function described in paragraphs [5009.7466] through [5009.7488] (FIGS. 7147 through 7162b); Phone Call Auto Forwarding Function described in paragraphs [5009.7489] through [5009.7514] (FIGS. 7163 through 7180c); Wireless Communication Method Switching Function described in paragraphs [5009.7515] through [5009.7535] (FIGS. 7181 through 7194e); Drafted Email Viewing Function described in paragraphs [5009.7536] through [5009.7585] (FIGS. 7195 through 7236); Email Replying Function described in paragraphs [5009.7586] through [5009.7617] (FIGS. 7237 through 7262b); Attached File Editing Function described in paragraphs [5009.7618] through [5009.7649] (FIGS. 7263 through 7288b); Email Audiovisual Data Auto Blocking Function described in paragraphs [5009.7650] through [5009.7673] (FIGS. 7289 through 7306); HDD Stored TV Program Replaying Function described in paragraphs [5009.7674] through [5009.7695] (FIGS. 7307 through 7322b); Cooking Menu Auto Implementing Function described in paragraphs [5009.7696] through [5009.7722] (FIGS. 7323 through 7343b); Micro Wave Oven Auto Alarm Function described in paragraphs [5009.7723] through [5009.7776] (FIGS. 7344 through 7387b); Oven Temperature Remote Controlling Function described in paragraphs [5009.7777] through [5009.7830] (FIGS. 7388 through 7431c); Audio Amplifying Function described in paragraphs [5009.7831] through [5009.7848] (FIGS. 7432 through 7443b); Calorie Calculating Function described in paragraphs [5009.7849] through [5009.7868] (FIGS. 7444 through 7457b); Sickness Identifying Function described in paragraphs [5009.7869] through [5009.7902] (FIGS. 7458 through 7481b); Weather Hazard Auto Notifying Function described in paragraphs [5009.7903] through [5009.7955] (FIGS. 7482 through 7517d); Phone Call Auto Forwarding Function described in paragraphs [5009.7956] through [5009.7981] (FIGS. 7518 through 7535c); Multiple Massaging Function described in paragraphs [5009.7982] through [5009.8022] (FIGS. 7536 through 7566); Microscope Function described in paragraphs [5009.8023] through [5009.8097] (FIGS. 7567 through 7629); Door Auto Lock/Unlock Function described in paragraphs [5009.8098] through [5009.8139] (FIGS. 7630 through 7658b); Door Auto Close/Open Function described in paragraphs [5009.8140] through [5009.8181] (FIGS. 7659 through 7687b); Room Light Auto On/Off Function described in paragraphs [5009.8182] through [5009.8223] (FIGS. 7688 through 7716b); Air Conditioner Auto On/Off Function described in paragraphs [5009.8224] through [5009.8265] (FIGS. 7717 through 7745b); Heater Auto On/Off Function described in paragraphs [5009.8266] through [5009.8307] (FIGS. 7746 through 7774b); Faucet Auto On/Off Function described in paragraphs [5009.8308] through [5009.8349] (FIGS. 7775 through 7803b); Sound Outputting Device Auto On/Off Function described in paragraphs [5009.8350] through [5009.8391] (FIGS. 7804 through 7832b); Vein Print Log-on Function described in paragraphs [5009.8392] through [5009.8410] (FIGS. 7833 through 7845c); Vein Print Screen Saver Deactivating Function described in paragraphs [5009.8411] through [5009.8429] (FIGS. 7846 through 7858c); Vein Print Folder Accessing Function described in paragraphs [5009.8430] through [5009.8448] (FIGS. 7859 through 7871c); Vein Print File Accessing Function described in paragraphs [5009.8449] through [5009.8467] (FIGS. 7872 through 7884c); Vein Print Internet Accessing Function described in paragraphs [5009.8468] through [5009.8486] (FIGS. 7885 through 7897c); Vein Print PC Log-on Function described in paragraphs [5009.8487] through [5009.8513] (FIGS. 7898 through 7917b); Vein Print PC Screen Saver Deactivating Function described in paragraphs [5009.8514] through [5009.8540] (FIGS. 7918 through 7937b); Vein Print PC Folder Accessing Function described in paragraphs [5009.8541] through [5009.8567] (FIGS. 7938 through 7957b); Vein Print PC File Accessing Function described in paragraphs [5009.8568] through [5009.8594] (FIGS. 7958 through 7977b); Vein Print PC Internet Accessing Function described in paragraphs [5009.8595] through [5009.8621] (FIGS. 7978 through 7997b); Ringtone Auto Updating Function described in paragraphs [5009.8622] through [5009.8643] (FIGS. 7998 through 8013b); Time Limited Current Location Identifying Function described in paragraphs [5009.8644] through [5009.8673] (FIGS. 8014 through 8035b); In Carrier Message Inserting Function described in paragraphs [5009.8674] through [5009.8695] (FIGS. 8036 through 8050b); Electric Cable Networking Function described in paragraphs [5009.8696] through [5009.8707] (FIGS. 8051 through 8057); Shoe Sole Pressure Adjusting Function described in paragraphs [5009.8708] through [5009.8741] (FIGS. 8058 through 8080b); Finger Print Removal Media Accessing Function described in paragraphs [5009.8742] through [5009.8762] (FIGS. 8081 through 8095b); Voice Print Removal Media Accessing Function described in paragraphs [5009.8763] through [5009.8783] (FIGS. 8096 through 8110b); Vein Print Removal Media Accessing Function described in paragraphs [5009.8784] through [5009.8804] (FIGS. 8111 through 8125b); Finger Print PC Removal Media Accessing Function described in paragraphs [5009.8805] through [5009.8833] (FIGS. 8126 through 8145b); Voice Print PC Removal Media Accessing Function described in paragraphs [5009.8834] through [5009.8862] (FIGS. 8146 through 8165b); Vein Print PC Removal Media Accessing Function described in paragraphs [5009.8863] through [5009.8891] (FIGS. 8166 through 8185b); Printer Function described in paragraphs [5009.8892] through [5009.8967] (FIGS. 8186 through 8245f); Scanner Function described in paragraphs [5009.8968] through [5009.9016] (FIGS. 8246 through 8284b); Multiple Signal Transferring Function described in paragraphs [5009.9017] through [5009.9205] (FIGS. 8285 through 8453); Free Access Point Function described in paragraphs [5009.9206] through [5009.9245] (FIGS. 8454 through 8482); Partial BCC Email Function described in paragraphs [5009.9246] through [5009.9273] (FIGS. 8483 through 8504b); Noise Reversing Function described in paragraphs [5009.9274] through [5009.9291] (FIGS. 8505 through 8516); Door Status Sensing Function described in paragraphs [5009.9292] through [5009.9345] (FIGS. 8517 through 8557); Drawer Status Sensing Function described in paragraphs [5009.9346] through [5009.9399] (FIGS. 8558 through 8598); Window Status Sensing Function described in paragraphs [5009.9400] through [5009.9453] (FIGS. 8599 through 8639); Curtain Status Sensing Function described in paragraphs [5009.9454] through [5009.9509] (FIGS. 8640 through 8680); Gate Status Sensing Function described in paragraphs [5009.9510] through [5009.9563] (FIGS. 8681 through 8721); Stop Watch Function described in paragraphs [5009.9564] through [5009.9584] (FIGS. 8722 through 8736b); Decrementing Time Function described in paragraphs [5009.9585] through [5009.9607] (FIGS. 8737 through 8753b); Energy Efficient Multiple CPU Function described in paragraphs [5009.9608] through [5009.9636] (FIGS. 8754 through 8776b); Content Notifying Function described in paragraphs [5009.9637] through [5009.9681] (FIGS. 8777 through 8809); Virtual Tilting Function described in paragraphs [5009.9682] through [5009.9720] (FIGS. 8810 through 8840); Virtual Vehicle Tilting Function described in paragraphs [5009.9721] through [5009.9758] (FIGS. 8841 through 8871); Device Approach Notifying Function described in paragraphs [5009.9759] through [5009.9801] (FIGS. 8872 through 8904); Clock Alarm Snooze Function described in paragraphs [5009.9802] through [5009.9829] (FIGS. 8905 through 8926); News Auto Outputting Function described in paragraphs [5009.9830] through [5009.9867] (FIGS. 8927 through 8958b); Advertisement Auto Outputting Function described in paragraphs [5009.9868] through [5009.9905] (FIGS. 8959 through 8990b); Online RPG Function described in paragraphs [5009.9906] through [5009.10028] (FIGS. 8991 through 9098b); Inter Device Distance Notifying Function described in paragraphs [5009.10029] through [5009.10065] (FIGS. 9099 through 9126); Link Embedded Motion Picture Displaying Function described in paragraphs [5009.10066] through [5009.10089] (FIGS. 9127 through 9141); Audiovisual Meta Data Producing Function described in paragraphs [5009.10090] through [5009.10128] (FIGS. 9142 through 9171c); Audiovisual Highlight Producing Function described in paragraphs [5009.10129] through [5009.10163] (FIGS. 9172 through 9197); Enhanced Audiovisual Highlight Producing Function described in paragraphs [5009.10164] through [5009.10196] (FIGS. 9198 through 9221); Wireless Power Off Function described in paragraphs [5009.10197] through [5009.10227] (FIGS. 9222 through 9240); Screen Layout Changing Function described in paragraphs [5009.10228] through [5009.10255] (FIGS. 9241 through 9258b); Face Feature Log-on Function described in paragraphs [5009.10256] through [5009.10273] (FIGS. 9259 through 9270c); Face Feature Screen Saver Deactivating Function described in paragraphs [5009.10274] through [5009.10291] (FIGS. 9271 through 9282c); Face Feature Folder Accessing Function described in paragraphs [5009.10292] through [5009.10309] (FIGS. 9283 through 9294c); Face Feature File Accessing Function described in paragraphs [5009.10310] through [5009.10327] (FIGS. 9295 through 9306c); Face Feature Internet Accessing Function described in paragraphs [5009.10328] through [5009.10345] (FIGS. 9307 through 9318c); Face Feature PC Log-on Function described in paragraphs [5009.10346] through [5009.10371] (FIGS. 9319 through 9337b); Face Feature PC Screen Saver Deactivating Function described in paragraphs [5009.10372] through [5009.10397] (FIGS. 9338 through 9356b); Face Feature PC Folder Accessing Function described in paragraphs [5009.10398] through [5009.10423] (FIGS. 9357 through 9375b); Face Feature PC File Accessing Function described in paragraphs [5009.10424] through [5009.10449] (FIGS. 9376 through 9394b); Face Feature PC Internet Accessing Function described in paragraphs [5009.10450] through [5009.10475] (FIGS. 9395 through 9413b); Face Feature Removal Media Accessing Function described in paragraphs [5009.10476] through [5009.10496] (FIGS. 9414 through 9428b); Face Feature PC Removal Media Accessing Function described in paragraphs [5009.10497] through [5009.10524] (FIGS. 9429 through 9448b); Security Formatted Removal Media Function described in paragraphs [5009.10525] through [5009.10545] (FIGS. 9449 through 9463b); Lite Security Formatted Removal Media Function described in paragraphs [5009.10546] through [5009.10568] (FIGS. 9464 through 9480b); Security Formatted Folder Function described in paragraphs [5009.10569] through [5009.10605] (FIGS. 9481 through 9509b); Host Host Security Formatted Folder Function described in paragraphs [5009.10606] through [5009.10631] (FIGS. 9510 through 9528); Email Security Formatted Folder Function described in paragraphs [5009.10632] through [5009.10668] (FIGS. 9529 through 9557b); Host Email Security Formatted Folder Function described in paragraphs [5009.10669] through [5009.10694] (FIGS. 9558 through 9576); Secured Email Sending Function described in paragraphs [5009.10695] through [5009.10726] (FIGS. 9577 through 9599c); Secured Email Receiving Function described in paragraphs [5009.10727] through [5009.10746] (FIGS. 9600 through 9613); Received Email Security Auto Sorting Function described in paragraphs [5009.10747] through [5009.10770] (FIGS. 9614 through 9629b); Secured Email Opening Function described in paragraphs [5009.10771] through [5009.10793] (FIGS. 9630 through 9645b); Secured Email Attached File Opening Function described in paragraphs [5009.10794] through [5009.10818] (FIGS. 9646 through 9663b); Secured Email Attached File Deleting Function described in paragraphs [5009.10819] through [5009.10845] (FIGS. 9664 through 9679b); Unsafe Email Host Handled Function described in paragraphs [5009.10846] through [5009.10873] (FIGS. 9680 through 9701b); Unsafe Attached File Host Handled Function described in paragraphs [5009.10874] through [5009.10901] (FIGS. 9702 through 9723c); Com Stored Email Viewing Function described in paragraphs [5009.10902] through [5009.10925] (FIGS. 9724 through 9741c); Non-secured Email Forwarding Function described in paragraphs [5009.10926] through [5009.10950] (FIGS. 9742 through 9759b); Electronic Money Transferring Function described in paragraphs [5009.10951] through [5009.10993] (FIGS. 9760 through 9790b); Electronic Money Time Identified Transferring Function described in paragraphs [5009.10994] through [5009.11051] (FIGS. 9791 through 9835b); Electronic Money Repeatedly Transferring Function described in paragraphs [5009.11052] through [5009.11117] (FIGS. 9836 through 9888b); Electronic Money Transfer Canceling Function described in paragraphs [5009.11118] through [5009.11194] (FIGS. 9889 through 9952b); Electronic Money Email Transferring Function described in paragraphs [5009.11195] through [5009.11238] (FIGS. 9953 through 9985c); Money Email Time Identified Transferring Function described in paragraphs [5009.11239] through [5009.11286] (FIGS. 9986 through 10022c); Money Email Repeatedly Transferring Function described in paragraphs [5009.11287] through [5009.11338] (FIGS. 10023 through 10063c); Electronic Money Email Transfer Canceling Function described in paragraphs [5009.11339] through [5009.11405] (FIGS. 10064 through 10119c); Address Book Administrating Function described in paragraphs [5009.11406] through [5009.11451] (FIGS. 10120 through 10152b); File Synchronizing Function described in paragraphs [5009.11452] through [5009.11578] (FIGS. 10153 through 10263b); Folder Synchronizing Function described in paragraphs [5009.11579] through [5009.11671] (FIGS. 10264 through 10342b); Area Dependent Software Activating Function described in paragraphs [5009.11672] through [5009.11702] (FIGS. 10343 through 10366b); Area Dependent Message Displaying Function described in paragraphs [5009.11703] through [5009.11730] (FIGS. 10367 through 10388); Visible Light Schedule Communicating Function described in paragraphs [5009.11731] through [5009.11796] (FIGS. 10389 through 10437b); Visible Light Web Address Communicating Function described in paragraphs [5009.11797] through [5009.11862] (FIGS. 10438 through 10486b); Visible Light Software Program Communicating Function described in paragraphs [5009.11863] through [5009.11928] (FIGS. 10487 through 10535b); Visible Light Restaurant Menu Communicating Function described in paragraphs [5009.11929] through [5009.11994] (FIGS. 10536 through 10584b); Visible Light TV Listing Communicating Function described in paragraphs [5009.11995] through [5009.12060] (FIGS. 10585 through 10633b); Visible Light Movie Listing Communicating Function described in paragraphs [5009.12061] through [5009.12126] (FIGS. 10634 through 10682b); Visible Light Product Advertisement Communicating Function described in paragraphs [5009.12127] through [5009.12192] (FIGS. 10683 through 10731b); Visible Light Message Communicating Function described in paragraphs [5009.12193] through [5009.12258] (FIGS. 10732 through 10780b); Visible Light Visual Clip Communicating Function described in paragraphs [5009.12259] through [5009.12324] (FIGS. 10781 through 10829b); Visible Light Weather Forecast Communicating Function described in paragraphs [5009.12325] through [5009.12390] (FIGS. 10830 through 10878b); Visible Light News Clip Communicating Function described in paragraphs [5009.12391] through [5009.12456] (FIGS. 10879 through 10927b); Visible Light Map Clip Communicating Function described in paragraphs [5009.12457] through [5009.12522] (FIGS. 10928 through 10976b); File Thumbnail Preview Function described in paragraphs [5009.12523] through [5009.12555] (FIGS. 10977 through 11002b); Taxi Fare Credit Card Payment Function described in paragraphs [5009.12556] through [5009.12632] (FIGS. 11003 through 11067); Taxi Fare Electronic Money Payment Function described in paragraphs [5009.12633] through [5009.12712] (FIGS. 11068 through 11132); Taxi Destination Identifying Function described in paragraphs [5009.12713] through [5009.12783] (FIGS. 11133 through 11194); Taxi Destination Map Displaying Function described in paragraphs [5009.12784] through [5009.12860] (FIGS. 11195 through 11262); QR Code Schedule Communicating Function described in paragraphs [5009.12861] through [5009.12906] (FIGS. 11263 through 11298b); QR Code Web Address Communicating Function described in paragraphs [5009.12907] through [5009.12952] (FIGS. 11299 through 11334b); QR Code Software Program Communicating Function described in paragraphs [5009.12953] through [5009.12998] (FIGS. 11335 through 11370b); QR Code Restaurant Menu Communicating Function described in paragraphs [5009.12999] through [5009.13044] (FIGS. 11371 through 11406b); QR Code TV Listing Communicating Function described in paragraphs [5009.13045] through [5009.13090] (FIGS. 11407 through 11442b); QR Code Movie Listing Communicating Function described in paragraphs [5009.13091] through [5009.13136] (FIGS. 11443 through 11478b); QR Code Product Advertisement Communicating Function described in paragraphs [5009.13137] through [5009.13182] (FIGS. 11479 through 11514b); QR Code Message Communicating Function described in paragraphs [5009.13183] through [5009.13228] (FIGS. 11515 through 11550b); QR Code Visual Clip Communicating Function described in paragraphs [5009.13229] through [5009.13274] (FIGS. 11551 through 11586b); QR Code Weather Forecast Communicating Function described in paragraphs [5009.13275] through [5009.13320] (FIGS. 11587 through 11622b); QR Code News Clip Communicating Function described in paragraphs [5009.13321] through [5009.13366] (FIGS. 11623 through 11658b); QR Code Map Clip Communicating Function described in paragraphs [5009.13367] through [5009.13412] (FIGS. 11659 through 11694b); QR Code Software Activating Function described in paragraphs [5009.13413] through [5009.13458] (FIGS. 11695 through 11730b); RFID Schedule Communicating Function described in paragraphs [5009.13459] through [5009.13508] (FIGS. 11731 through 11770b); RFID Web Address Communicating Function described in paragraphs [5009.13509] through [5009.13558] (FIGS. 11771 through 11810b); RFID Software Program Communicating Function described in paragraphs [5009.13559] through [5009.13608] (FIGS. 11811 through 11850b); RFID Restaurant Menu Communicating Function described in paragraphs [5009.13609] through [5009.13658] (FIGS. 11851 through 11890b); RFID TV Listing Communicating Function described in paragraphs [5009.13659] through [5009.13708] (FIGS. 11891 through 11930b); RFID Movie Listing Communicating Function described in paragraphs [5009.13709] through [5009.13758] (FIGS. 11931 through 11970b); RFID Product Advertisement Communicating Function described in paragraphs [5009.13759] through [5009.13808] (FIGS. 11971 through 12010b); RFID Message Communicating Function described in paragraphs [5009.13809] through [5009.13858] (FIGS. 12011 through 12050b); RFID Visual Clip Communicating Function described in paragraphs [5009.13859] through [5009.13908] (FIGS. 12051 through 12090b); RFID Weather Forecast Communicating Function described in paragraphs [5009.13909] through [5009.13958] (FIGS. 12091 through 12130b); RFID News Clip Communicating Function described in paragraphs [5009.13959] through [5009.14008] (FIGS. 12131 through 12170b); RFID Map Clip Communicating Function described in paragraphs [5009.14009] through [5009.14058] (FIGS. 12171 through 12210b); RFID Software Activating Function described in paragraphs [5009.14059] through [5009.14108] (FIGS. 12211 through 12250b); RFID Software Auto Activating Function described in paragraphs [5009.14109] through [5009.14158] (FIGS. 12251 through 12290b); Carrier Arrival Time Displaying Function described in paragraphs [5009.14159] through [5009.14283] (FIGS. 12291 through 12401); Multiple Audio Outputting Function described in paragraphs [5009.14284] through [5009.14310] (FIGS. 12402 through 12419); Closest Device Notifying Function described in paragraphs [5009.14311] through [5009.14416] (FIGS. 12420 through 12515); Print Screen Function described in paragraphs [5009.14417] through [5009.14474] (FIGS. 12516 through 12559b); Caller Answering Machine Activating Function described in paragraphs [5009.14475] through [5009.14513] (FIGS. 12560 through 12587); Audiovisual Answering Machine Function described in paragraphs [5009.14514] through [5009.14546] (FIGS. 12588 through 12611); Answering Machine Message Forwarding Function described in paragraphs [5009.14547] through [5009.14607] (FIGS. 12612 through 12657); Area Map Displaying Function described in paragraphs [5009.14608] through [5009.14679] (FIGS. 12658 through 12721b); Road Map Displaying Function described in paragraphs [5009.14680] through [5009.14752] (FIGS. 12722 through 12785b); Email Reading Function described in paragraphs [5009.14753] through [5009.14781] (FIGS. 12786 through 12805c); Stand Alone Email Function described in paragraphs [5009.14782] through [5009.14850] (FIGS. 12806 through 12857b); TV Seamless Viewing Function described in paragraphs [5009.14851] through [5009.14896] (FIGS. 12858 through 12895); Multiple Movable Tab Web Browsing Function described in paragraphs [5009.14897] through [5009.14975] (FIGS. 12896 through 12966); Multiple Movable Tab Visual Data Viewing Function described in paragraphs [5009.14976] through [5009.15054] (FIGS. 12967 through 13037); Multiple Movable Tab Document Data Viewing Function described in paragraphs [5009.15055] through [5009.15133] (FIGS. 13038 through 13108); Multiple Movable Tab Email Data Viewing Function described in paragraphs [5009.15134] through [5009.15212] (FIGS. 13109 through 13179); Lost Com Device Memory Erasing/Rescuing Function described in paragraphs [5009.15213] through [5009.15275] (FIGS. 13180 through 13231c); Lost Com Device Beaconing Function described in paragraphs [5009.15276] through [5009.15353] (FIGS. 13232 through 13296); Area & Country Name Displaying Function described in paragraphs [5009.15354] through [5009.15437] (FIGS. 13297 through 13371); 3D Desktop Function described in paragraphs [5009.15438] through [5009.15536] (FIGS. 13372 through 13457); Carrier Auto Announcing Function described in paragraphs [5009.15537] through [5009.15586] (FIGS. 13458 through 13497b); Virtual Folder Displaying Function described in paragraphs [5009.15587] through [5009.15647] (FIGS. 13498 through 13548b); In-carrier Location Notifying Function described in paragraphs [5009.15648] through [5009.15703] (FIGS. 13549 through 13595c); Address Map Auto Displaying Function described in paragraphs [5009.15704] through [5009.15771] (FIGS. 13596 through 13650c); Brain Wave Device Controlling Function described in paragraphs [5009.15772] through [5009.15806] (FIGS. 13651 through 13679b); Brain Wave Sentence Composing Function described in paragraphs [5009.15807] through [5009.15829] (FIGS. 13680 through 13696); Wheel Standing Function described in paragraphs [5009.15830] through [5009.15858] (FIGS. 13697 through 13719); Robot Body Balancing Function described in paragraphs [5009.15859] through [5009.15905] (FIGS. 13720 through 13760); Robot Leg Balancing Function described in paragraphs [5009.15906] through [5009.15952] (FIGS. 13761 through 13801); Robot Head Balancing Function described in paragraphs [5009.15953] through [5009.15999] (FIGS. 13802 through 13842); Robot Upper Body Balancing Function described in paragraphs [5009.16000] through [5009.16045] (FIGS. 13843 through 13883); Digital Television Function described in paragraphs [5009.16046] through [5009.16075] (FIGS. 13884 through 13906); Total Price Calculating Function described in paragraphs [5009.16076] through [5009.16166] (FIGS. 13907 through 13985c); Brain Wave Carrier Controlling Function described in paragraphs [5009.16167] through [5009.16202] (FIGS. 13986 through 14015b); Electronic Billboard Controlling Function described in paragraphs [5009.16203] through [5009.16323] (FIGS. 14016 through 14123e); Common Phone Number Function described in paragraphs [5009.16324] through [5009.16424] (FIGS. 14124 through 14212c); Hybrid Common Phone Number Function described in paragraphs [5009.16425] through [5009.16525] (FIGS. 14213 through 14301c); Ringtone Volume Auto Adjusting Function described in paragraphs [5009.16526] through [5009.16547] (FIGS. 14302 through 14317b); Ringtone Type Auto Selecting Function described in paragraphs [5009.16548] through [5009.16575] (FIGS. 14318 through 14339b); Television Chatting Function described in paragraphs [5009.16576] through [5009.16650] (FIGS. 14340 through 14405); Device Battery Charging Function described in paragraphs [5009.16651] through [5009.16726] (FIGS. 14406 through 14471b); Hybrid Battery Solar Operating Function described in paragraphs [5009.16727] through [5009.16829] (FIGS. 14472 through 14561); Backup Solar Battery Operating Function described in paragraphs [5009.16830] through [5009.16932] (FIGS. 14562 through 14651); Hybrid Access Point Function described in paragraphs [5009.16933] through [5009.17169] (FIGS. 14652 through 14878g); Earphone Location Identifying Function described in paragraphs [5009.17170] through [5009.17266] (FIGS. 14879 through 14961); Microphone Location Identifying Function described in paragraphs [5009.17267] through [5009.17355] (FIGS. 14962 through 15036); Event Triggered Auto Audiovisual Recording Function described in paragraphs [5009.17356] through [5009.17402] (FIGS. 15037 through 15072b); Event Triggered Auto Audio Recording Function described in paragraphs [5009.17403] through [5009.17449] (FIGS. 15073 through 15108b); Audiovisual Message Bulk Transferring Function described in paragraphs [5009.17450] through [5009.17501] (FIGS. 15109 through 15150b); Multiple Party Conversing Function described in paragraphs [5009.17502] through [5009.17670] (FIGS. 15151 through 15299); Window Monitoring Function described in paragraphs [5009.17671] through [5009.17700] (FIGS. 15300 through 15321b); Window Status Monitoring Function described in paragraphs [5009.17701] through [5009.17730] (FIGS. 15322 through 15343b); Door Monitoring Function described in paragraphs [5009.17731] through [5009.17760] (FIGS. 15344 through 15365b); Door Monitoring Function described in paragraphs [5009.17761] through [5009.17790] (FIGS. 15366 through 15387b); Push-To-Talk Function described in paragraphs [5009.17791] through [5009.18008] (FIGS. 15388 through 15586c Push-To-T); Door Open Monitoring Function described in paragraphs [5009.18009] through [5009.18065] (FIGS. 15587 through 15633b); Window Open Monitoring Function described in paragraphs [5009.18066] through [5009.18122] (FIGS. 15634 through 15680b); Lock Open Monitoring Function described in paragraphs [5009.18123] through [5009.18179] (FIGS. 15681 through 15727b); Destination Proceeding Function described in paragraphs [5009.18180] through [5009.18265] (FIGS. 15728 through 15803d); Driver's Eye Monitoring Safety Function described in paragraphs [5009.18266] through [5009.18316] (FIGS. 15804 through 15845); Driver's Head Monitoring Safety Function described in paragraphs [5009.18317] through [5009.18365] (FIGS. 15846 through 15885); Drawer Open Monitoring Function described in paragraphs [5009.18366] through [5009.18422] (FIGS. 15886 through 15932b); Curtain Open Monitoring Function described in paragraphs [5009.18423] through [5009.18479] (FIGS. 15933 through 15979b); Gate Open Monitoring Function described in paragraphs [5009.18480] through [5009.18536] (FIGS. 15980 through 16026b); Faucet Open Monitoring Function described in paragraphs [5009.18537] through [5009.18593] (FIGS. 16027 through 16073b); Hybrid Refrigerator Function described in paragraphs [5009.18594] through [5009.18695] (FIGS. 16074 through 16159b); Multiple Purpose Chamber Function described in paragraphs [5009.18696] through [5009.18869] (FIGS. 16160 through 16312c); Audiovisual Quality Auto Adjusting Function described in paragraphs [5009.18870] through [5009.18930] (FIGS. 16313 through 16363b); Audio Quality Auto Adjusting Function described in paragraphs [5009.18931] through [5009.18991] (FIGS. 16364 through 16414b); TV Phone Quality Auto Adjusting Function described in paragraphs [5009.18992] through [5009.19100] (FIGS. 16415 through 16512); Voice Phone Quality Auto Adjusting Function described in paragraphs [5009.19101] through [5009.19209] (FIGS. 16513 through 16610); Television Related Audiovisual Downloading Function described in paragraphs [5009.19210] through [5009.19299] (FIGS. 16611 through 16687); Radio Related Audio Downloading Function described in paragraphs [5009.19300] through [5009.19389] (FIGS. 16688 through 16764); Header Displaying Function described in paragraphs [5009.19390]

through [5009.19464] (FIG. 16765 through FIG. 16826b); Footer Displaying Function described in paragraphs [5009.19465] through [5009.19539] (FIG. 16827 through FIG. 16888b); Location Scheduled Notifying Function described in paragraphs [5009.19540] through [5009.19602] (FIG. 16889 through FIG. 16941e); Zone Leaving Notifying Function described in paragraphs [5009.19603] through [5009.19675] (FIG. 16942 through FIG. 17005d); Zone Entering Notifying Function described in paragraphs [5009.19676] through [5009.19748] (FIG. 17006 through FIG. 17069d); Power Off Notifying Function described in paragraphs [5009.19749] through [5009.19794] (FIG. 17070 through FIG. 17106d); Power On Notifying Function described in paragraphs [5009.19795] through [5009.19840] (FIG. 17107 through FIG. 17143d); Security Alarm On Notifying Function described in paragraphs [5009.19841] through [5009.19886] (FIG. 17144 through FIG. 17180d); Security Alarm Off Notifying Function described in paragraphs [5009.19887] through [5009.19932] (FIG. 17181 through FIG. 17217d); Email Transfer Notifying Function described in paragraphs [5009.19933] through [5009.19978] (FIG. 17218 through FIG. 17254d); Email Reception Notifying Function described in paragraphs [5009.19979] through [5009.20024] (FIG. 17255 through FIG. 17291d); Making Phone Call Notifying Function described in paragraphs [5009.20025] through [5009.20070] (FIG. 17292 through FIG. 17328d); Phone Call Reception Notifying Function described in paragraphs [5009.20071] through [5009.20116] (FIG. 17329 through FIG. 17365d); Key Pressed Notifying Function described in paragraphs [5009.20117] through [5009.20162] (FIG. 17366 through FIG. 17402d); Software Activation Notifying Function described in paragraphs [5009.20163] through [5009.20208] (FIG. 17403 through FIG. 17439d); Document Opening Notifying Function described in paragraphs [5009.20209] through [5009.20254] (FIG. 17440 through FIG. 17476d); Specified Event Notifying Function described in paragraphs [5009.20255] through [5009.20315] (FIG. 17477 through FIG. 17527d); Television Phone Auto Backup Function described in paragraphs [5009.20316] through [5009.20447] (FIG. 17528 through FIG. 17645b); File Auto Saving Function described in paragraphs [5009.20448] through [5009.20495] (FIG. 17646 through FIG. 17678b); File Compressing Function described in paragraphs [5009.20496] through [5009.20559] (FIG. 17679 through FIG. 17727e); Multiple Phone Number Billing Function described in paragraphs [5009.20560] through [5009.20609] (FIG. 17728 through FIG. 17771); Multiple Device Door Unlocking Function described in paragraphs [5009.20610] through [5009.20685] (FIG. 17772 through FIG. 17832c); Multiple Device Door Locking Function described in paragraphs [5009.20686] through [5009.20761] (FIG. 17833 through FIG. 17893c); Phone Call Making Log Recording Function described in paragraphs [5009.20762] through [5009.20815] (FIG. 17894 through FIG. 17938d); Phone Call Receiving Log Recording Function described in paragraphs [5009.20816] through [5009.20867] (FIG. 17939 through FIG. 17981d); Phone Call Making Log Exporting Function described in paragraphs [5009.20868] through [5009.20917] (FIG. 17982 through FIG. 18022d); Phone Call Receiving Log Exporting Function described in paragraphs [5009.20918] through [5009.20967] (FIG. 18023 through FIG. 18063d); Phone Call Making Log Synchronizing Function described in paragraphs [5009.20968] through [5009.21021] (FIG. 18064 through FIG. 181060; Phone Call Receiving Log Synchronizing Function described in paragraphs [5009.21022] through [5009.21075] (FIG. 18107 through FIG. 181490; 3D Advertisement Displaying Function described in paragraphs [5009.21076] through [5009.21217] (FIG. 18150 through FIG. 18277); Audiovisual Location Capability Function described in paragraphs [5009.21218] through [5009.21276] (FIG. 18278 through FIG. 18325c); Location Audio Notifying Function described in paragraphs [5009.21277] through [5009.21319] (FIG. 18326 through FIG. 18359b); Answering Machine Location Recording Function described in paragraphs [5009.21320] through [5009.21388] (FIG. 18360 through FIG. 18417e); Visual Phone File Sharing Function described in paragraphs [5009.21389] through [5009.21526] (FIG. 18418 through FIG. 18540b); Visual Phone Magnifying Function described in paragraphs [5009.21527] through [5009.21629] (FIG. 18541 through FIG. 18631); Multiple Home Page Displaying Function described in paragraphs [5009.21630] through [5009.21700] (FIG. 18632 through FIG. 18693b FIG. 18632 through FIG. 18693b); Multiple Visual Phone Party Location Identifying Function described in paragraphs [5009.21701] through [5009.21796] (FIG. 18694 through FIG. 18778g); Individual Party Conversation Replaying Function described in paragraphs [5009.21797] through [5009.21962] (FIG. 18779 through FIG. 18929d); Multiple Phone Notifying Function described in paragraphs [5009.21963] through [5009.22050] (FIG. 18930 through FIG. 19004i); Multiple Phone Dial Tone Function described in paragraphs [5009.22051] through [5009.22160] (FIG. 19005 through FIG. 19101f); Multiple Phone New Party Joining Function described in paragraphs [5009.22161] through [5009.22276] (FIG. 19102 through FIG. 19206j); Music Property Setting Function described in paragraphs [5009.22277] through [5009.22302] (FIG. 19207 through FIG. 19226b); Fore/Background Audio Recording Function described in paragraphs [5009.22303] through [5009.22334] (FIGS. 19227 through 19248); Email Address Phone Calling Function described in paragraphs [5009.22335] through [5009.22392] (FIGS. 19249 through 19295c); Night Vision Displaying Carrier Function described in paragraphs [5009.22393] through [5009.22501] (FIGS. 19296 through 19386b); Phone Number Email Function described in paragraphs [5009.22502] through [5009.22561] (FIGS. 19387 through 19436c); No-Answer Auto Emailing Function described in paragraphs [5009.22562] through [5009.22634] (FIGS. 19437 through 19499e); Linked Page Auto Downloading Function described in paragraphs [5009.22635] through [5009.22662] (FIGS. 19500 through 19519); Folder Auto Hiding Function described in paragraphs [5009.22663] through [5009.22692] (FIGS. 19520 through 19543); Folder Time Defined Hiding Function described in paragraphs [5009.22693] through [5009.22746] (FIGS. 19544 through 19591); Folder Time Defined Revealing Function described in paragraphs [5009.22747] through [5009.22800] (FIGS. 19592 through 19639); Common Phone Number Changing Function described in paragraphs [5009.22801] through [5009.22829] (FIGS. 19640 through 19658c); Common Email Address Changing Function described in paragraphs [5009.22830] through [5009.22858] (FIGS. 19659 through 19677c); Multiple Incrementing Counter Function described in paragraphs [5009.22859] through [5009.22896] (FIGS. 19678 through 19709); Multiple Decrementing Counter Function described in paragraphs [5009.22897] through [5009.22934] (FIGS. 19710 through 19741); Multiple Alarm Clock Function described in paragraphs [5009.22935] through [5009.22984] (FIGS. 19742 through 19783); Alarm Clock Current Location Notifying Function described in paragraphs [5009.22985] through [5009.23022] (FIG. 19784 through FIG. 19815b); Camcorder Auto Time Adjusting Function described in paragraphs [5009.23023] through [5009.23047] (FIG. 19816 through FIG. 19833b); Location Identified Device Information Displaying Function described in paragraphs [5009.23048] through [5009.23098] (FIG. 19834 through FIG. 19875b); Folder Message Displaying Function described in paragraphs [5009.23099] through [5009.23126] (FIG. 19876 through FIG. 19897); Folder Audiovisual Outputting Function described in paragraphs [5009.23127] through [5009.23154] (FIG. 19898 through FIG. 19919); Pistol Monitoring Function described in paragraphs [5009.23155] through [5009.23226] (FIG. 19920 through FIG. 19983b); Earthquake Auto Locking Function described in paragraphs [5009.23227] through [5009.23264] (FIG. 19984 through FIG. 20013); Television Resolution Auto Changing Function described in paragraphs [5009.23265] through [5009.23290] (FIG. 20014 through FIG. 20033); Shortcut Auto Creating Function described in paragraphs [5009.23291] through [5009.23312] (FIG. 20034 through FIG. 20049); Auto Zooming Function described in paragraphs [5009.23313] through [5009.23332] (FIG. 20050 through FIG. 20063b); Oxygen Tank Function described in paragraphs [5009.23333] through [5009.23384] (FIG. 20064 through FIG. 20107); In Carrier Server Function described in paragraphs [5009.23385] through [5009.23430] (FIG. 20108 through FIG. 20146); Silent Mode Auto Subtitle Displaying Function described in paragraphs [5009.23431] through [5009.23454] (FIG. 20147 through FIG. 20164b); Silent Mode Auto Answerphone Message Displaying Function described in paragraphs [5009.23455] through [5009.23476] (FIG. 20165 through FIG. 20180b); Midnight Auto Downloading Function described in paragraphs [5009.23477] through [5009.23498] (FIG. 20181 through FIG. 20196); Shortcut Link Auto Updating Function described in paragraphs [5009.23499] through [5009.23522] (FIG. 20197 through FIG. 20214); Web Page Auto Refreshing Function described in paragraphs [5009.23523] through [5009.23560] (FIG. 20215 through FIG. 20246); Vibrator Remote Activation Function described in paragraphs [5009.23561] through [5009.23584] (FIG. 20247 through FIG. 20263b); Scenario Accordance Vibrating Function described in paragraphs [5009.23585] through [5009.23608] (FIG. 20264 through FIG. 20281); Location Dependent Message Outputting Function described in paragraphs [5009.23609] through [5009.23640] (FIG. 20282 through FIG. 20307c); Location Dependent Program Activating Function described in paragraphs [5009.23641] through [5009.23670] (FIG. 20308 through FIG. 20333c); Multiple Answering Machine Function described in paragraphs [5009.23671] through [5009.23716] (FIG. 20334 through FIG. 20373b); Time Dependent Answering Machine Function described in paragraphs [5009.23717] through [5009.23750] (FIG. 20374 through FIG. 20401b); Television Program Data Storage Area Selecting Function described in paragraphs [5009.23751] through [5009.23799] (FIG. 20402 through FIG. 20444c); Street Address Icon Displaying Function described in paragraphs [5009.23800] through [5009.23829] (FIG. 20445 through FIG. 20468c); Audiovisual Multiple Recording/Replaying Function described in paragraphs [5009.23830] through [5009.23867] (FIG. 20469 through FIG. 20500d); Map Editing Function described in paragraphs [5009.23868] through [5009.23901] (FIG. 20501 through FIG. 20528); Enhanced Television Tuner Remote Controlling Function described in paragraphs [5009.23902] through [5009.23940] (FIG. 20529 through FIG. 20560b); Enhanced DVD Player Remote Controlling Function described in paragraphs [5009.23941] through [5009.24002] (FIG. 20561 through FIG. 20615b); Monetary Value Data Auto Charging Function described in paragraphs [5009.24003] through [5009.24030] (FIG. 20616 through FIG. 20637c); Site Viewing Remotely Prohibiting Function described in paragraphs [5009.24031] through [5009.24062] (FIG. 20638 through FIG. 20662d); Remotely Controlled Device Auto Selecting Function described in paragraphs [5009.24063] through [5009.24110] (FIG. 20663 through FIG. 20702d); Driver Alerting Function described in paragraphs [5009.24111] through [5009.24150] (FIG. 20703 through FIG. 20735b); Robot Controlling Macro Function described in paragraphs [5009.24151] through [5009.24224] (FIG. 20736 through FIG. 20799b); Robot Predetermined Location Proceeding Function described in paragraphs [5009.24225] through [5009.24290] (FIG. 20800 through FIG. 20858); Message Leaving Function described in paragraphs [5009.24291] through [5009.24350] (FIG. 20859 through FIG. 20911c); Unique Folder Icon Attaching Function described in paragraphs [5009.24351] through [5009.24380] (FIG. 20912 through FIG. 20935d); Unique File Icon Attaching Function described in paragraphs [5009.24381] through [5009.24410] (FIG. 20936 through FIG. 20959d); Unique Email Icon Attaching Function described in paragraphs [5009.24411] through [5009.24440] (FIG. 20960 through FIG. 20983d); Device Current Condition Notifying Function described in paragraphs [5009.24441] through [5009.24536] (FIG. 20984 through FIG. 21072d); Device Bulk Duplicating Function described in paragraphs [5009.24537] through [5009.24613] (FIG. 21073 through FIG. 21142c); Program Related Audiovisual Data Auto Downloading Function described in paragraphs [5009.24614] through [5009.24643] (FIG. 21143 through FIG. 21166c); Weather Dependent Program Executing Function described in paragraphs [5009.24644] through [5009.24702] (FIG. 21167 through FIG. 21218d); Audiovisual Outputting Function described in paragraphs [5009.24703] through [5009.24745] (FIG. 21219 through FIG. 21254e); Email Outputting Function described in paragraphs [5009.24746] through [5009.24788] (FIG. 21255 through FIG. 21290e); Document Outputting Function described in paragraphs [5009.24789] through [5009.24831] (FIG. 21291 through FIG. 21326e); Program Executing Function described in paragraphs [5009.24832] through [5009.24874] (FIG. 21327 through FIG. 21362e); Electronic Postit Function described in paragraphs [5009.24875] through [5009.24945] (FIG. 21363 through FIG. 21426d); Time Dependent Game Function described in paragraphs [5009.24946] through [5009.24965] (FIG. 21427 through FIG. 21440); Season Dependent Game Function described in paragraphs [5009.24966] through [5009.24985] (FIG. 21441 through FIG. 21454); Location Dependent Game Function described in paragraphs [5009.24986] through [5009.25007] (FIG. 21455 through FIG. 21470); Enhanced Time Dependent Game Function described in paragraphs [5009.25008] through [5009.25035] (FIG. 21471 through FIG. 21492); Enhanced Season Dependent Game Function described in paragraphs [5009.25036] through [5009.25063] (FIG. 21493 through FIG. 21514); Enhanced Location Dependent Game Function described in paragraphs [5009.25064] through [5009.25093] (FIG. 21515 through FIG. 21538); Specific Game Download Prohibiting Function described in paragraphs [5009.25094] through [5009.25141] (FIG. 21539 through FIG. 21579c); Location Dependent Phone Number Function described in paragraphs [5009.25142] through [5009.25206] (FIG. 21580 through FIG. 21637e); Location Dependent Answering Machine Function described in paragraphs [5009.25207] through [5009.25228] (FIG. 21638 through FIG. 21653c); Auto Speaker Phone Function described in paragraphs [5009.25229] through [5009.25266]

(FIG. 21654 through FIG. 21684); Object Location Identifying Function described in paragraphs [5009.25267] through [5009.25312] (FIG. 21685 through FIG. 21724c); Area Dependent Answering Machine Function described in paragraphs [5009.25313] through [5009.25332] (FIG. 21725 through FIG. 21738c); Area Dependent Call Receiving Function described in paragraphs [5009.25333] through [5009.25359] (FIG. 21739 through FIG. 21760c); Device Component Distance Searching Function described in paragraphs [5009.25360] through [5009.25377] (FIG. 21761 through FIG. 21772d); Device Component Location Searching Function described in paragraphs [5009.25378] through [5009.25422] (FIG. 21773 through FIG. 21810f); Component Connection Notifying Function described in paragraphs [5009.25423] through [5009.25446] (FIG. 21811 through FIG. 21828); Multiple Phone Number Busy Notifying Function described in paragraphs [5009.25447] through [5009.25478] (FIG. 21829 through FIG. 21854b); Time Identified Incoming Call Refusing Function described in paragraphs [5009.25479] through [5009.25504] (FIG. 21855 through FIG. 21874c); Email Location Log Recording Function described in paragraphs [5009.25505] through [5009.25540] (FIG. 21875 through FIG. 21904e); Rough Location Notifying Function described in paragraphs [5009.25541] through [5009.25598] (FIG. 21905 through FIG. 21955b); Stalker Detecting Function described in paragraphs [5009.25599] through [5009.25638] (FIG. 21956 through FIG. 21989b); Location Indicating Scheduler Function described in paragraphs [5009.25639] through [5009.25742] (FIG. 21990 through FIG. 22086i); Device Program Sync Activating Function described in paragraphs [5009.25743] through [5009.25803] (FIG. 22087 through FIG. 22140c); User Dictionary Sync Function described in paragraphs [5009.25804] through [5009.25866] (FIG. 22141 through FIG. 22196d); Update Synchronizing Function described in paragraphs [5009.25867] through [5009.25916] (FIG. 22197 through FIG. 22241c); Material Viewing Location Notifying Function described in paragraphs [5009.25917] through [5009.25942] (FIG. 22242 through FIG. 22261b); Digital Data Edited Location Notifying Function described in paragraphs [5009.25943] through [5009.25982] (FIG. 22262 through FIG. 22295e); Remote Money Transferring Function described in paragraphs [5009.25983] through [5009.26046] (FIG. 22296 through FIG. 22352c); Remote Device Diagnosing Function described in paragraphs [5009.26047] through [5009.26180] (FIG. 22353 through FIG. 22479c); User Related Data Backuping Function described in paragraphs [5009.26181] through [5009.26249] (FIG. 22480 through FIG. 22542b); User Related Data Sharing Function described in paragraphs [5009.26250] through [5009.26319] (FIG. 22543 through FIG. 22605b); Location Dependent Pistol Controlling Function described in paragraphs [5009.26320] through [5009.26354] (FIG. 22606 through FIG. 22634); Direction Dependent Pistol Controlling Function described in paragraphs [5009.26355] through [5009.26429] (FIG. 22635 through FIG. 22702b); Dual Number Batch Switching Over Function described in paragraphs [5009.26430] through [5009.26485] (FIG. 22703 through FIG. 22752d); Dual Number Auto Switching Over Function described in paragraphs [5009.26486] through [5009.26553] (FIG. 22753 through FIG. 22814c); Audiovisual Text Retrieving Function described in paragraphs [5009.26554] through [5009.26591] (FIG. 22815 through FIG. 22846b); Prepaid Currency Auto Converting Function described in paragraphs [5009.26592] through [5009.26623] (FIG. 22847 through FIG. 22872d); Stereo Odor Sensing Function described in paragraphs [5009.26624] through [5009.26663] (FIG. 22873 through FIG. 22907c); Bone-Conduction Headphone Function described in paragraphs [5009.26664] through [5009.26763] (FIG. 22908 through FIG. 23000); Remote Sound Volume Controlling Function described in paragraphs [5009.26764] through [5009.26803] (FIG. 23000a through FIG. 23032c); Personal Belonging Notifying Function described in paragraphs [5009.26804] through [5009.26839] (FIG. 23033 through FIG. 23061b); Secondary Personal Belonging Notifying Function described in paragraphs [5009.26840] through [5009.26898] (FIG. 23062 through FIG. 23112c); Headphone Auto Content Replaying Function described in paragraphs [5009.26899] through [5009.26948] (FIG. 23113 through FIG. 23155b); Alternative Device Using Function described in paragraphs [5009.26949] through [5009.26987] (FIG. 23156 through FIG. 23188d); Brain Wave Color Selecting Function described in paragraphs [5009.26988] through [5009.27026] (FIG. 23189 through FIG. 23221d); Brain Wave Font Selecting Function described in paragraphs [5009.27027] through [5009.27065] (FIG. 23222 through FIG. 23254d); Another Device Location Dependent Auto Answering Function described in paragraphs [5009.27066] through [5009.27104] (FIG. 23255 through FIG. 23286d); Rear Carrier Speed Dependent Ideal Distance Maintaining Function described in paragraphs [5009.27105] through [5009.27162] (FIG. 23287 through FIG. 23337c); Front Carrier Speed Dependent Ideal Distance Maintaining Function described in paragraphs [5009.27163] through [5009.27220] (FIG. 23338 through FIG. 23388c); Inter-Carrier Middle Point Maintaining Function described in paragraphs [5009.27221] through [5009.27306] (FIG. 23389 through FIG. 23466e); Front Carrier Activity Notifying Function described in paragraphs [5009.27307] through [5009.27446] (FIG. 23467 through FIG. 23599); Past Accident Occurred Spot Auto Speed Decreasing Function described in paragraphs [5009.27447] through [5009.27473] (FIG. 23600 through FIG. 23620d); Shock Sensored Auto Backing Up Function described in paragraphs [5009.27474] through [5009.27524] (FIG. 23621 through FIG. 23664e); Redialing Data Sharing Function described in paragraphs [5009.27525] through [5009.27589] (FIG. 23665 through FIG. 23722d); Phone Call History Sharing Function described in paragraphs [5009.27590] through [5009.27696] (FIG. 23723 through FIG. 23822h); Specific Sound-Wave Triggered Program Function described in paragraphs [5009.27697] through [5009.27735] (FIG. 23823 through FIG. 23856d); Time Dependent False Location Notifying Function described in paragraphs [5009.27736] through [5009.27779] (FIG. 23857 through FIG. 23894e); Area Dependent False Location Notifying Function described in paragraphs [5009.27780] through [5009.27823] (FIG. 23895 through FIG. 23932e); Area Dependent False Location Notifying Function described in paragraphs [5009.27824] through [5009.27867] (FIG. 23933 through FIG. 23970e); Device Dependent False Location Notifying Function described in paragraphs [5009.27868] through [5009.27911] (FIG. 23971 through FIG. 24008e); Specific Image Triggered Program Function described in paragraphs [5009.27912] through [5009.27942] (FIG. 24009 through FIG. 24034c); Warning Sharing Function described in paragraphs [5009.27943] through [5009.27988] (FIG. 24035 through FIG. 24073c); Incoming Call Rejection Password Nullifying Function described in paragraphs [5009.27989] through [5009.28039] (FIG. 24074 through FIG. 24117c); Incoming Call Rejection Voice Print Nullifying Function described in paragraphs [5009.28040] through [5009.28090] (FIG. 24118 through FIG. 24161c); Incoming Call Rejection Finger Print Nullifying Function described in paragraphs [5009.28091] through [5009.28141] (FIG. 24162 through FIG. 24205c); Facedown Phone Silent Mode Implementing Function described in paragraphs [5009.28142] through [5009.28172] (FIG. 24206 through FIG. 24230c); Facedown Email Silent Mode Implementing Function described in paragraphs [5009.28173] through [5009.28203] (FIG. 24231 through FIG. 24255c); Facedown Auto Answering Mode Implementing Function described in paragraphs [5009.28204] through [5009.28234] (FIG. 24256 through FIG. 24280c); Caller's Area Dependent Ringtone Modifying Function described in paragraphs [5009.28235] through [5009.28266] (FIG. 24281 through FIG. 24306d); Caller's Distance Dependent Ringtone Modifying Function described in paragraphs [5009.28267] through [5009.28298] (FIG. 24307 through FIG. 243320; In-Carrier Device Controlling Function described in paragraphs [5009.28299] through [5009.28373] (FIG. 24333 through FIG. 24400c); Area Dependent Video Phone Auto Activating Function described in paragraphs [5009.28374] through [5009.28405] (FIG. 24401 through FIG. 24426d); Area Dependent Shortcut Icon Function described in paragraphs [5009.28406] through [5009.28453] (FIG. 24427 through FIG. 24468c); Weather Dependent Shortcut Icon Function described in paragraphs [5009.28454] through [5009.28509] (FIG. 24469 through FIG. 24518c); Actual Three Dimensional Space Near Focal Point Image Displaying Function described in paragraphs [5009.28510] through [5009.28568] (FIG. 24519 through FIG. 24571); Emotion Sensing Function described in paragraphs [5009.28569] through [5009.28643] (FIG. 24572 through FIG. 24636b); Email Reception Conditionally Notifying Function described in paragraphs [5009.28644] through [5009.28675] (FIG. 24637 through FIG. 24662c); Microphone Mounted Headphone Replay Pausing Function described in paragraphs [5009.28676] through [5009.28716] (FIG. 24663 through FIG. 24696c); First Area Dependent Notice Type Changing Function described in paragraphs [5009.28717] through [5009.28768] (FIG. 24697 through FIG. 24742c); Second Area Dependent Notice Type Changing Function described in paragraphs [5009.28769] through [5009.28820] (FIG. 24743 through FIG. 24788c); Time Dependent Location Notifying Type Changing Function described in paragraphs [5009.28821] through [5009.28870] (FIG. 24789 through FIG. 24832b); Caller's Identification Content Sharing Function described in paragraphs [5009.28871] through [5009.28911] (FIG. 24833 through FIG. 248660; Virtual Three Dimensional Space Near Focal Point Image Displaying Function described in paragraphs [5009.28912] through [5009.28964] (FIG. 24867 through FIG. 24914); Multiple Mode Implementing Function described in paragraphs [5011] through [5018] (FIGS. 395 through 400); Multiple Software Download Function described in paragraphs [5019] through [5028] (FIGS. 401 through 407); Selected Software Distributing Function described in paragraphs [5029] through [5048] (FIGS. 1376 through 1393d); Multiple Software Download And Mode Implementation Function described in paragraphs [5049] through (FIGS. 408 through 412); and the last sentence described in paragraph [5058] (no drawings).

The invention claimed is:
1. A communication device comprising:
a microphone;
a speaker;
an input device;
a display;
an antenna;
a voice communication implementer, wherein voice communication is implemented by sending and receiving audio data via said antenna;
a caller's phone number displaying implementer, wherein the phone number corresponding to the caller of incoming call is processed to be displayed; and
an area dependent notice type changing implementer, wherein a pin-point location of said communication device is operable to be identified, when said communication device is identified to be located in a 1st geographic area, said pin-point location of said communication device is processed to be notified to another device, when said communication device is identified to be located in a 2nd geographic area, a specific zone in which said communication device is located is processed to be notified to said another device in lieu of said pin-point location of said communication device, and when said communication device is identified to be located in a 4th geographic area, a current geographic location unknown notice is processed to be notified to said another device in lieu of said pin-point location of said communication device.

2. A system comprising:
a communication device comprising a microphone, a speaker, an input device, a display, and an antenna;
a voice communication implementer, wherein voice communication is implemented by sending and receiving audio data via said antenna;
a caller's phone number displaying implementer, wherein the phone number corresponding to the caller of incoming call is processed to be displayed; and
an area dependent notice type changing implementer, wherein a pin-point location of said communication device is operable to be identified, when said communication device is identified to be located in a 1st geographic area, said pin-point location of said communication device is processed to be notified to another device, when said communication device is identified to be located in a 2nd geographic area, a specific zone in which said communication device is located is processed to be notified to said another device in lieu of said pin-point location of said communication device, and when said communication device is identified to be located in a 4th geographic area, a current geographic location unknown notice is processed to be notified to said another device in lieu of said pin-point location of said communication device.

3. A method for a communication device comprising a microphone, a speaker, an input device, a display, and an antenna, said method comprising:
a voice communication implementing step, wherein voice communication is implemented by sending and receiving audio data via said antenna;
a caller's phone number displaying implementing step, wherein the phone number corresponding to the caller of incoming call is processed to be displayed; and
an area dependent notice type changing implementing step, wherein a pin-point location of said communication device is operable to be identified, when said communication device is identified to be located in a 1st geographic area, said pin-point location of said communication device is processed to be notified to another device, when said communication device is identified to be located in a 2nd geographic area, a specific zone in which said communication device is located is processed to be notified to said another device in lieu of said pin-point location of said communication device, and when said communication device is identified to be located in a 4th geographic area, a current geographic location unknown notice is processed to be notified to said another device in lieu of said pin-point location of said communication device.

4. The communication device of claim 1, wherein said communication device is a handheld device.

5. The communication device of claim 1, wherein said pin-point location of said communication device is stored with a specific format.

6. The communication device of claim 1, wherein said 1st geographic area, said 2nd geographic area, or said 4th geographic area indicates a geographic area of a specific diameter.

7. The communication device of claim 1, wherein said 1st geographic area, said 2nd geographic area, or said 4th geographic area indicates a specific artificial structure.

8. The communication device of claim 1, wherein said 1st geographic area, said 2nd geographic area, or said 4th geographic area indicates a specific portion of a specific artificial structure.

9. The system of claim 2, wherein said communication device is a handheld device.

10. The system of claim 2, wherein said pin-point location of said communication device is stored with a specific format.

11. The system of claim 2, wherein said 1st geographic area, said 2nd geographic area, or said 4th geographic area indicates a geographic area of a specific diameter.

12. The system of claim 2, wherein said 1st geographic area, said 2nd geographic area, or said 4th geographic area indicates a specific artificial structure.

13. The system of claim 2, wherein said 1st geographic area, said 2nd geographic area, or said 4th geographic area indicates a specific portion of a specific artificial structure.

14. The method of claim 3, wherein said communication device is a handheld device.

15. The method of claim 3, wherein said pin-point location of said communication device is stored with a specific format.

16. The method of claim 3, wherein said 1st geographic area, said 2nd geographic area, or said 4th geographic area indicates a geographic area of a specific diameter.

17. The method of claim 3, wherein said 1st geographic area, said 2nd geographic area, or said 4th geographic area indicates a specific artificial structure.

18. The method of claim 3, wherein said 1st geographic area, said 2nd geographic area, or said 4th geographic area indicates a specific portion of a specific artificial structure.

* * * * *